United States Patent
Harrison et al.

(10) Patent No.: US 9,253,455 B1
(45) Date of Patent: Feb. 2, 2016

(54) DOORBELL COMMUNICATION SYSTEMS AND METHODS

(71) Applicant: SkyBell Technologies, Inc., Irvine, CA (US)

(72) Inventors: Gregory Saul Harrison, Aliso Viejo, CA (US); Desiree Mejia, Yorba Linda, CA (US); Joseph Frank Scalisi, Yorba Linda, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 14/813,479

(22) Filed: Jul. 30, 2015

Related U.S. Application Data

(63) Continuation-in-part of application No. 14/797,711, filed on Jul. 13, 2015, and a continuation of application No. 14/797,637, filed on Jul. 13, 2015, and a continuation-in-part of application No. 14/743,849, filed on Jun. 18, 2015, now Pat. No. 9,172,922, and a continuation-in-part of application No. 14/726,517, filed on May 30, 2015, now Pat. No. 9,179,109, and a continuation-in-part of application No. 14/623,741, filed on Feb. 17, 2015, now Pat. No. 9,113,051.

(51) Int. Cl.
H04N 7/18 (2006.01)
H04N 9/47 (2006.01)
H04L 12/28 (2006.01)

(52) U.S. Cl.
CPC ............ *H04N 7/186* (2013.01); *H04L 12/2803* (2013.01)

(58) Field of Classification Search
CPC .. G08B 25/008; G08B 21/10; H04L 12/2803; H04L 12/2823; H04L 2012/2849; H04W 4/22; G01W 1/00; G01W 1/10; G06T 2207/30192
USPC .......................................................... 348/143
See application file for complete search history.

(56) References Cited

U.S. PATENT DOCUMENTS

| | | | |
|---|---|---|---|
| 3,708,742 | A | 1/1973 | Gunn |
| 4,523,193 | A | 6/1985 | Levinson |
| D283,130 | S | 3/1986 | Boenning |
| D297,222 | S | 8/1988 | Rauch |
| 4,843,461 | A | 6/1989 | Tatsumi |
| 5,210,520 | A | 5/1993 | Housley |

(Continued)

FOREIGN PATENT DOCUMENTS

| | | |
|---|---|---|
| CN | 1902609 | 1/2007 |
| CN | 202872976 | 4/2013 |

(Continued)

OTHER PUBLICATIONS iDoorCam—A Wi-Fi Enabled, Webcam Doorbell—Downloaded on Sep. 3, 2013 from http://www.idoorcam.com/.

(Continued)

*Primary Examiner* — Andy Rao
*Assistant Examiner* — Jared Walker

(57) ABSTRACT

A doorbell system can be configured to detect a weather event. The doorbell system can comprise a doorbell, a button coupled to the doorbell, and a pressure sensor coupled to the doorbell. As well, the doorbell system can determine an occurrence of a weather event and thereby transmit weather data to a remote server that is remotely located with respect to the doorbell system.

20 Claims, 75 Drawing Sheets

(56) References Cited

U.S. PATENT DOCUMENTS

| | | |
|---|---|---|
| 5,428,388 A | 6/1995 | Von Bauer |
| 5,493,618 A | 2/1996 | Stevens |
| 5,521,578 A | 5/1996 | DelValle |
| D371,086 S | 6/1996 | Collins |
| D381,638 S | 7/1997 | Kruse |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,429,893 B1 | 8/2002 | Xin |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| D500,751 S | 1/2005 | Yukikado |
| D501,652 S | 2/2005 | Pierson |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,193,644 B2 | 3/2007 | Carter |
| D562,306 S | 2/2008 | Jeong |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,477,134 B2 | 1/2009 | Langer |
| 7,492,303 B1 | 2/2009 | Levitan |
| D588,574 S | 3/2009 | Takahata |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,752,070 B2 | 7/2010 | Hatcher |
| 7,956,576 B2 | 6/2011 | Neu |
| 8,016,676 B2 | 9/2011 | Carter |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,669,876 B2 | 3/2014 | Anderson |
| D707,147 S | 6/2014 | Crippa |
| 8,780,201 B1 | 7/2014 | Scalisi et al. |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi et al. |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,055,202 B1 | 6/2015 | Scalisi et al. |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmiri et al. |
| 2003/0025599 A1 | 2/2003 | Monroe |
| 2004/0085205 A1 | 5/2004 | Yeh |
| 2004/0085449 A1 | 5/2004 | Millet |
| 2004/0086093 A1 | 5/2004 | Schranz |
| 2004/0178889 A1 | 9/2004 | Buckingham |
| 2004/0229569 A1 | 11/2004 | Franz |
| 2004/0257336 A1 | 12/2004 | Hershkovitz |
| 2005/0007451 A1 | 1/2005 | Chiang |
| 2005/0071879 A1 | 3/2005 | Haldavnekar |
| 2005/0097248 A1 | 5/2005 | Kelley |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0271678 A1 | 11/2006 | Jessup |
| 2007/0008081 A1 | 1/2007 | Tylicki |
| 2007/0046442 A1 | 3/2007 | Bartorelli |
| 2007/0126574 A1 | 6/2007 | Langer |
| 2007/0146115 A1 | 6/2007 | Roosli |
| 2007/0194945 A1 | 8/2007 | Atkinson |
| 2008/0036862 A1 | 2/2008 | Lang |
| 2008/0128586 A1 | 6/2008 | Johnson |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0284578 A1 | 11/2009 | Carter |
| 2009/0296641 A1 | 12/2009 | Bienas |
| 2010/0087161 A1 | 4/2010 | Young |
| 2010/0103300 A1 | 4/2010 | Jones |
| 2010/0134072 A1 | 6/2010 | Neu |
| 2010/0195810 A1 | 8/2010 | Mota |
| 2010/0245060 A1 | 9/2010 | Tylicki |
| 2010/0276570 A1 | 11/2010 | Moser |
| 2011/0121940 A1 | 5/2011 | Jones |
| 2011/0156566 A1 | 6/2011 | Chen |
| 2011/0207509 A1 | 8/2011 | Crawford |
| 2011/0287718 A1 | 11/2011 | Abel |
| 2012/0027248 A1 | 2/2012 | Feris |
| 2012/0044049 A1 | 2/2012 | Vig |
| 2012/0044050 A1 | 2/2012 | Vig |
| 2012/0098439 A1 | 4/2012 | Recker |
| 2012/0108215 A1 | 5/2012 | Kameli |
| 2012/0113253 A1 | 5/2012 | Slater |
| 2012/0162416 A1 | 6/2012 | Su |
| 2012/0229282 A1 | 9/2012 | Zagami |
| 2012/0230203 A1 | 9/2012 | Casey |
| 2012/0262581 A1 | 10/2012 | Carter |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0327225 A1 | 12/2012 | Barley |
| 2012/0327246 A1 | 12/2012 | Senior |
| 2013/0020875 A1 | 1/2013 | Wozniak |
| 2013/0045763 A1 | 2/2013 | Ruiz |
| 2013/0057695 A1 | 3/2013 | Huisking |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147964 A1 | 6/2013 | Frank |
| 2013/0169809 A1 | 7/2013 | Grignan |

(56) References Cited

U.S. PATENT DOCUMENTS

| | | |
|---|---|---|
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0293722 A1 | 11/2013 | Chen |
| 2014/0015967 A1 | 1/2014 | Moore |
| 2014/0088761 A1 | 3/2014 | Shamlian |
| 2014/0125754 A1 | 5/2014 | Haywood |
| 2014/0149706 A1 | 5/2014 | Shim |
| 2014/0167676 A1 | 6/2014 | Mack |
| 2014/0253725 A1 | 9/2014 | Hsu |
| 2015/0022618 A1 | 1/2015 | Siminoff |
| 2015/0022620 A1 | 1/2015 | Siminoff |
| 2015/0029335 A1 | 1/2015 | Kasmir et al. |
| 2015/0049191 A1 | 2/2015 | Scalisi et al. |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0092055 A1 | 4/2015 | Scalisi et al. |
| 2015/0112885 A1 | 4/2015 | Fadell |
| 2015/0156031 A1 | 6/2015 | Fadell |
| 2015/0194839 A1 | 7/2015 | Wojcik |

FOREIGN PATENT DOCUMENTS

| | | |
|---|---|---|
| CN | 202939738 | 5/2013 |
| EP | 684743 | 11/1995 |
| GB | 2400958 | 10/2004 |
| WO | 01/93220 | 12/2001 |
| WO | WO2007111802 | 10/2007 |

OTHER PUBLICATIONS

Squaritz IDS—Intelligent Doorbell System—Downloaded on Aug. 15, 2013 from http://www.indiegogo.com/projects/squaritz-ids-intelligent-doorbell-system.
Wireless Video Doorbell Pager—Downloaded on Aug. 9, 2013 from http://www.indiegogo.com/projects/wireless-video-doorbell-pager--4.
Lockitron—Downloaded on Jul. 24, 2013 from https://lockitron.com/preorder.
Eyetalk for Home—Downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
DefenDoor by Glate LLC—Downloaded on Dec. 11, 2014 from https://www.kickstarter.com/projects/85455040/defendoor-a-home-security-system-that-syncs-with-y.
Notifi by Chamberlain—Downloaded on Jan. 9, 2015 from http://www.cnet.com/products/chamberlain-notifi-video-door-chime/.
i-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
DoorBird—Downloaded on Jan. 23, 2015 from http://www.doorbird.com/.
Chui Doorbell—Downloaded on Jan. 23, 2015 from http://www.getchui.com/.
Chui Doorbell—Downloaded on Jan. 23, 2015 from http://techcrunch.com/2014/04/18/214-technologies-is-crowdfunding-a-smart-doorbell-called-chui/.
GoPano—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
MyInterCom Video System—Downloaded on Jun. 8, 2015 from http://myintercom.de/en/funktionsweise.
Kochhi's Cobell Wi-Fi Doorbell—Downloaded on Sep. 14, 2015 from http://www.kocchis.com/Cobell_Manual.pdf.
DOORBOT—Downloaded on Nov. 18, 2013 from http://www.craigncompany.com/home-tech-doorbot/; prior art publication at least as of Jun. 10, 2013.
DOORBOT—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
DOORBOT—Downloaded on Nov. 18, 2013 from http://www.digitaltrends.com/lifestyle/doorbot-camera-see-visitors-smartphone/; prior art publication at least as of Dec. 9, 2012.
DOORBOT website—Downloaded on Nov. 18, 2013 from http://www.getdoorbot.com/.
DOORBOT users manual—Downloaded on Nov. 18, 2013 from http://static.mydoorbot.com/DoorBot%20Users%20Manual%201.0.pdf.
DOORBOT "fact sheet"—Downloaded on Nov. 18, 2013 from http://cdn.shopify.com/s/files/1/024716501/files/DoorBotMediaKit.pdf?17037.
DOORBOT "features kit"—Downloaded on Nov. 18, 2013 from http://cdn.shopify.com/s/files/10247/6501/files/DoorBot_Features_Kit.pdf?17037.
CellNock index page—Originally downloaded on Sep. 23, 2013 from http://cellnock.com/index.html; The website says CellNock is "patent pending".
CellNock about founder page—downloaded on Nov. 18, 2013 from http://cellnock.com/index.html; The website says CellNock is "patent pending".
CellNock learn more page—Downloaded on Nov. 18, 2013 from http://cellnock.com/learn_more.htm; The website says CellNock is "patent pending".
CellNock product page—Downloaded on Nov. 18, 2013 from http://cellnock.com/products.htm; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
MySkyBell.com—Part 1 (previously iDoorCam.com)—Downloaded on Nov. 18, 2013 from http://www.myskybell.com/.
MySkyBell.com—Part 2 (previously iDoorCam.com)—Downloaded on Nov. 18, 2013 from http://www.myskybell.com/.
MySkyBell.com—Part 3 (previously iDoorCam.com)—Downloaded on Nov. 18, 2013 from http://www.myskybell.com/.
MySkyBell.com—Part 4 (previously iDoorCam.com)—Downloaded on Nov. 18, 2013 from http://www.myskybell.com/.
MySkyBell.com—Part 5 (previously iDoorCam.com)—Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.

(56) References Cited

OTHER PUBLICATIONS

EyeTalk for home—Downloaded on May 24, 2013 from http://www.revolutionaryconceptsinc.com/forhome.html.
EyeTalk Product—Downloaded on Nov. 18, 2013 from http://www.revolutionaryconceptsinc.com/eyetalk.html.
Langer Doorbell Light—Downloaded on Nov. 18, 2013 from http://www.youtube.com/watch?v=u9nNCm4tSYI; published at least as early as Apr. 2013.
SmartBell—Downloaded on Dec. 5, 2013 from http://smartbell.co/This_is_smartbell.html.
SmartBell—Downloaded on Dec. 5, 2013 from http://smartbell.co/Tech_specs.html.
SmartBell—Downloaded on Dec. 5, 2013 from http://smartbell.co/FAQ.html.
SmartBell—A Doorbell for Smartphones, published by Scrambled Brains Tech, LLC., Oct. 1, 2013.
August Smart Lock—Part 1—Downloaded on Jun. 10, 2014 from www.August.com.
August Smart Lock—Part 2—Downloaded on Jun. 10, 2014 from www.August.com.
August Smart Lock—Part 3—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/ Kwikset/Website%20Content/Kevo/installation_guide.pdf.
Schlage Electronic Lock—User guide—Downloaded on Jun. 10, 2014 from www.schlage.com.
Lock-Style Solenoid—Downloaded on Aug. 22, 2014 from www.AdaFruit.com.
Power Matters Alliance—Downloaded on Aug. 23, 2014 from www.wikipedia.com.
Push-Pull Solenoid—Downloaded on Aug. 22, 2014 from www.AdaFruit.com.
Push-Pull Solenoid—Technical Details—Downloaded on Aug. 22, 2014 from www.AdaFruit.com.
Qi—Downloaded on Aug. 23, 2014 from www.wikipedia.com.
TP-Link—Website—Downloaded on Jul. 15, 2014 from www.tp-link.us.
TP-Link—User guide—Downloaded on Jul. 15, 2014 from www.tp-link.us.
AC Adapter Spy Camera—Downloaded on Jun. 24, 2014 from ahdcameras.com.
FanFare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
iChime Customizable Digital Chime System—Downloaded on Nov. 7, 2014 from http://www.ichime.com/.
Philips InSight Wireless HD Baby Monitor—Downloaded on Jul. 24, 2013 from http://www.amazon.com/Philips-InSight-Wireless-Baby-Monitor/dp/B00AALO9Z6/ref=sr_1_2?ie=UTF8&qid=1374704204&sr=8-2&keywords=philips+insight+wi-fi+baby+monitor.
CellNock—Downloaded on Sep. 23, 2013 from http://cellnock.com/products.htm.
CellNock Index—Downloaded on Sep. 23, 2013 from http://cellnock.com/index.html.
DoorBot—Downloaded on Jun. 14, 2013 from https://christiestreet.com/products/doorbot.

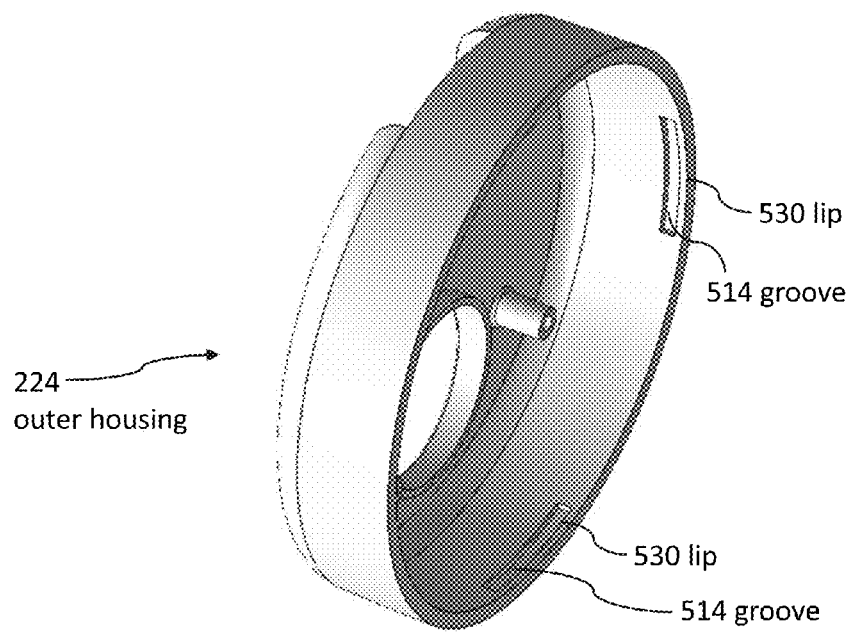
Figure 13
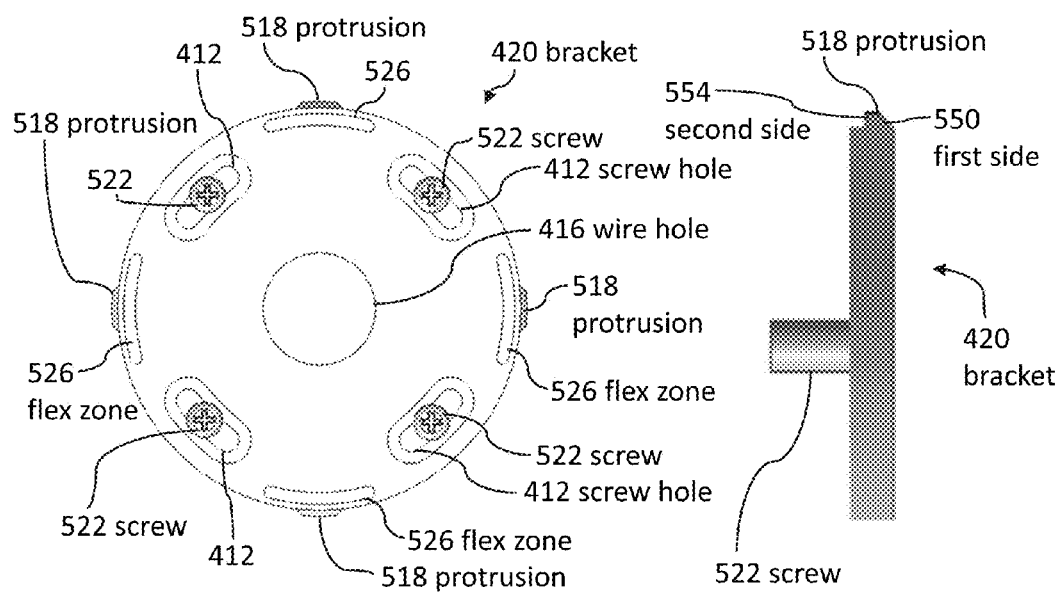
Figure 14
Figure 15

DOORBELL COMMUNICATION SYSTEMS AND METHODS

CROSS-REFERENCE TO RELATED APPLICATIONS

This application claims the benefit of U.S. Nonprovisional patent application Ser. No. 14/797,711; filed Jul. 13, 2015; and entitled DOORBELL COMMUNICATION SYSTEMS AND METHODS. The entire contents of patent application Ser. No. 14/797,711 are incorporated by reference herein.

This application claims the benefit of U.S. Nonprovisional patent application Ser. No. 14/797,637; filed Jul. 13, 2015; and entitled DOORBELL COMMUNICATION SYSTEMS AND METHODS; which claims the benefit of U.S. Provisional Patent Application No. 62/026,639; filed Jul. 19, 2014; and entitled WIRED HOME AUTOMATION METHODS AND SYSTEMS. The entire contents of patent application Ser. No. 14/797,637 and Patent Application No. 62/026,639 are incorporated by reference herein.

This application claims the benefit of U.S. Nonprovisional patent application Ser. No. 14/623,741; filed Feb. 17, 2015; and entitled POWER OUTLET CAMERAS; which claims the benefit of U.S. Provisional Patent Application No. 62/016,863; filed Jun. 25, 2014; and entitled WALL PLUG CAMERAS. The entire contents of patent application Ser. No. 14/623,741 and Patent Application No. 62/016,863 are incorporated by reference herein.

This application claims the benefit of and is a continuation-in-part of U.S. Nonprovisional patent application Ser. No. 14/743,849; filed Jun. 18, 2015; and entitled DOORBELL COMMUNICATION SYSTEMS AND METHODS. The entire contents of patent application Ser. No. 14/743,849 are incorporated by reference herein.

The entire contents of the following patent application are incorporated by reference herein: U.S. Nonprovisional patent application Ser. No. 14/612,376; filed Feb. 3, 2015; and entitled DOORBELL COMMUNICATION SYSTEMS AND METHODS.

The entire contents of the following patent application are incorporated by reference herein: U.S. Nonprovisional patent application Ser. No. 14/589,830; filed Jan. 5, 2015; and entitled DOORBELL COMMUNICATION SYSTEMS AND METHODS.

The entire contents of the following patent application are incorporated by reference herein: International Application No. PCT/US14/53506; filed Aug. 29, 2014 with the U.S. Patent and Trademark Office; and entitled DOORBELL COMMUNICATION SYSTEMS AND METHODS.

The entire contents of the following patent application are incorporated by reference herein: International Application No. PCT/US14/47622; filed Jul. 22, 2014 with the U.S. Patent and Trademark Office; and entitled DOORBELL COMMUNICATION SYSTEMS AND METHODS.

BACKGROUND

1. Field

Various embodiments disclosed herein relate to doorbells. Certain embodiments relate to communication between a person near a doorbell and a person in another location.

2. Description of Related Art

Homes, offices, and other buildings sometimes include communication and surveillance systems to enable friendly visitors to summon occupants of the buildings and to deter unwanted visitors. Communication and surveillance systems can include video cameras and doorbells.

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted. In some cases, this alerting sound can typically be heard within a short distance from the entry point or sound source. For example, a homeowner located remotely from her home likely would not be able to hear the alerting sound, and thus, would not be aware that someone is ringing her doorbell. Thus, there is a need for devices and methods to alert remotely located individuals that someone seeks the attention of the homeowner, tenant, building guardian, or steward.

SUMMARY

Doorbells can be used to wirelessly communicate with a remotely located computing device to enable a visitor to communicate remotely with a user of the remotely located computing device. The remotely located computing device can be a cellular telephone, a smartphone, a tablet, a laptop computer, a desktop computer, and/or a computer configured to use software. The remotely located computing device can be placed very close to the doorbell to configure the doorbell, but then can communicate with the doorbell from remote locations (e.g., from another portion of the building to which the doorbell is attached, from across a city, from across a country, from across the globe). In some embodiments, the remotely located computing device is communicatively coupled to the doorbell via a wire to enable the remotely located computing device to help configure the doorbell. In several embodiments, the remotely located computing device creates a wireless network to help configure the doorbell while the doorbell is within a communication range of the wireless network. Once the doorbell is configured, the wireless network created by the remotely located computing device may no longer be necessary because the doorbell can communicate with the remotely located computing device via another wireless network, which can include the Internet and cellular networks.

Some embodiments include using a doorbell that is configurable to wirelessly communicate with a remotely located computing device. Embodiments can include obtaining the doorbell that comprises a speaker, a microphone, a camera, and a button. The doorbell can be configurable to enable a visitor to sound a chime. Several embodiments include detecting a first indication of the visitor; using the doorbell to send a wireless notification to the remotely located computing device regarding the visitor; and entering a network connection mode prior to sending the wireless notification. The first indication (and other indications) can be detected using the doorbell (e.g., via a sensor of the doorbell, via data sent to the doorbell).

In several embodiments, the network connection mode comprises using the doorbell to detect a first wireless network. Using the doorbell to detect the first wireless network can include the doorbell sensing the first wireless network (e.g., by searching for wireless networks that are within range of the doorbell). The doorbell can also detect the first wireless network via data sent to the doorbell (e.g., from the remotely located computing device). In some embodiments, the doorbell detects the first wireless network when the doorbell connects to the first wireless network. Thus, the term "detect" is used herein in a very broad sense and can include direct detection and indirect detection (e.g., via another computer).

The first wireless network can comprise a first name and a first password. The network connection mode can comprise the remotely located computing device creating a second wireless network. In some embodiments, the network connection mode comprises the remotely located computing device transmitting the first password of the first wireless network directly from the remotely located computing device to the doorbell via the second wireless network to enable the doorbell to communicate with the remotely located computing device via the first wireless network. The doorbell can directly communicate with the remotely located computing device via the second wireless network prior to the doorbell indirectly communicating with the remotely located computing device via the first wireless network. In some embodiments, the doorbell indirectly communicates with the remotely located computing device via a server, the Internet, a cellular communication network, and/or a wireless router that is not physically coupled to the doorbell or to the remotely located computing device.

Some embodiments include using the doorbell to detect a proximity indication of the remotely located computing device; determining if the proximity indication meets a predetermined proximity threshold such that the proximity indication indicates that the remotely located computing device is sufficiently close to the doorbell; and connecting the doorbell to the second wireless network in response to the proximity indication meeting the predetermined proximity threshold. The proximity threshold can be a certain value or characteristic. In several embodiments, a proximity indication can meet a predetermined proximity threshold if the remotely located computing device is within a predetermined distance of the doorbell. The distance can be 100 feet, 50 feet, 20 feet, 10 feet, and/or 5 feet.

In several embodiments, a proximity indication can meet a predetermined proximity threshold if a measurement of signal quality is above a certain value (or below a certain value). In several embodiments, a proximity indication can meet a predetermined proximity threshold if a signal to noise ratio is above a certain threshold. In some embodiments, determining if the proximity indication meets a predetermined proximity threshold requires that the proximity indication indicates that the remotely located computing device is sufficiently close to the doorbell (e.g., is sufficiently close to enable the remotely located computing device to communication with the doorbell via the second wireless network).

Various embodiment use diverse proximity indications including measurements of signal quality, signal strength, upload speed, and/or download speed. The upload speed and the download speed can be measured between the doorbell and the remotely located computing device. Determining if the proximity indication meets the predetermined proximity threshold can comprise a signal to noise analysis of the second wireless network.

Some embodiments include using the remotely located computing device to run software configured to transmit the first password from the remotely located computing device to the doorbell; using the software to transmit data to the doorbell that enables the doorbell to realize that the remotely located computing device is configured to communicate with the doorbell; and accepting the first password from the remotely located computing device in response to the doorbell receiving the data from the remotely located computing device.

Several embodiments include using the doorbell to detect the second wireless network while the second wireless network does not require a password to connect to the second wireless network (e.g., the second wireless network can be configured to enable the doorbell to connect to the second wireless network without using a password). Embodiments can also include connecting the doorbell to the second wireless network prior to connecting the doorbell to the first wireless network in response to the second wireless network being configured to enable the doorbell to connect to the second wireless network without using a password.

In some embodiments, the doorbell can search for wireless networks. Then, the doorbell can automatically connect to a wireless network that does not require a password. Then, the doorbell can detect whether the wireless network transmits data that comprises a password to another wireless network. Then, the doorbell can use the password to connect to the other wireless network (e.g., in response to searching for a wireless network that allows communication access based on the password).

Embodiments can include prompting a user of the remotely located computing device to enter the first password of the first wireless network into the remotely located computing device (e.g., by typing the password into an "app" running on a smart phone or by speaking the password into the smart phone). Then, embodiments can transmit the first password of the first wireless network directly from the remotely located computing device to the doorbell via the second wireless network. Then, embodiments can include using the first password to enable indirect communication between the doorbell and the remotely located computing device via the first wireless network. This indirect communication can occur via an intermediary device such as any suitable computer or wireless router that is not attached to the doorbell or to the remotely located computing device. The direct communication does not require an intermediary device that is not attached to the doorbell or to the remotely located computing device because the second wireless network can transmit data directly from the remotely located computing device to the doorbell.

In several embodiments, the system is configured to select a wireless network for indirect communication between the doorbell and the remotely located computing device due to the remotely located computing device being configured to connect to the wireless network (e.g., the remotely located computing device previously connected to the wireless network).

In some embodiments, the network connection mode comprises connecting the doorbell to the first wireless network to which the remotely located computing device is connected such that the doorbell can send an alert regarding a presence of the visitor to the remotely located computing device via the first wireless network.

Embodiments can also include using the doorbell to detect multiple wireless networks. The multiple wireless networks can comprise the first wireless network. Embodiments can further comprise the doorbell selecting the first wireless network from the multiple wireless networks in response to the remotely located computing device being configured to connect to the first wireless network (to enable the doorbell to connect to the first wireless network to which the remotely located computing device is connected).

The doorbell can be used to detect that the remotely located computing device is connected to the first wireless network. Then, embodiments can include selecting the first wireless network from the multiple wireless networks in response to the doorbell detecting that the remotely located computing device is connected to the first wireless network. The doorbell can detect that the remotely located computing device is connected to the first wireless network based on data sent from the remotely located computing device to the doorbell via the second wireless network.

Several embodiments include using the doorbell to detect multiple wireless networks, and then selecting the first wireless network from the multiple wireless networks in response to the remotely located computing device being configured to connect to the first wireless network. The remotely located computing device can be configured to connect to the first wireless network such that the remotely located computing device has the first password of the first wireless network and such that the remotely located computing device is arranged to connect to the first wireless network when the remotely located computing device is located with a wireless range of the first wireless network. If the computing device is outside the wireless range, then the computing device cannot connect to the first wireless network. The doorbell can automatically connect to the first wireless network in response to detecting that the remotely located computing device is connected to the first wireless network and in response to receiving the first password from the remotely located computing device.

In some embodiments, a doorbell system comprises the doorbell and a remotely located computer that is connected to the Internet. Embodiments can also include connecting the doorbell to the first wireless network using the first password of the first wireless network transmitted from the remotely located computing device to the doorbell via the second wireless network (that was created by the remotely located computing device). Then, at least a portion of the doorbell system can prevent the doorbell from connecting to a third wireless network in response to the doorbell previously being configured to connect to the first wireless network. Then, the remotely located computer can enable the doorbell to connect to the third wireless network. Preventing connecting to a new wireless network after connecting with a previous wireless network can discourage theft by making a stolen doorbell unusable (e.g., without intervention from the doorbell manufacturer or customer service representative).

The doorbell system can prevent the doorbell from connecting to the third wireless network by placing the doorbell in a connection lock mode that prevents the doorbell from connecting to a new wireless network. The remotely located computer can enable the doorbell to enter a connection unlock mode that is configured such that the doorbell can connect to the new wireless network.

When the doorbell is stolen, the connection lock mode can be configured to prevent the doorbell from connecting to the new wireless network without intervention by the remotely located computer. The remotely located computer can be configured to enable the doorbell to enter the connection unlock mode in response to input from a remotely located administrator (e.g., a customer service representative, a user of the remotely located computing device that enabled the doorbell to connect to the first wireless network).

Some embodiments include entering the network connection mode in response to pressing the button for at least a predetermined amount of time. The button can be configured to sound the chime or can be another button on the doorbell. The predetermined amount of time can be at least four seconds (to enable the doorbell to distinguish between visitors who are trying to "ring" the chime and users who are trying to make the doorbell enter the network connection mode).

Several embodiments include entering the network connection mode in response to the doorbell detecting electricity from an external power source (e.g., a building's electrical system).

The doorbell can comprise a battery. Embodiments can include coupling the doorbell to an external power source, then using the external power source to charge the battery, and then entering the network connection mode in response to at least partially charging the battery.

Several embodiments include at least some of the following items: connecting the remotely located computing device to the first wireless network; and then the remotely located computing device creating the second wireless network; and then connecting the doorbell to the second wireless network; and then using the second wireless network to connect the doorbell to the first wireless network; and connecting the doorbell to the first wireless network in response to the remotely located computing device having been connected to the first wireless network; and then sending the wireless notification to the remotely located computing device via the first wireless network.

Several embodiments include performing the following items after the remotely located computing device is connected to the first wireless network and before the doorbell is connected to the first wireless network: prompting a user of the remotely located computing device to enter the first password into the remotely located computing device while the remotely located computing device already has the first password (such that the computing device can use the first password to access the first wireless network); at least temporarily recording information entered by the user in response to prompting the user to enter the first password; and sending the information from the remotely located computing device to the doorbell via the second wireless network. The information can include the first password (e.g., an encrypted form of the first password).

Some embodiments include detecting a first indication and a second indication of the visitor. The first indication and the second indication can be detected using the doorbell. Embodiments can include sending the wireless notification to the remotely located computing device regarding the presence of the visitor in response to detecting both the first indication and the second indication.

In several embodiments, detecting the first indication comprises detecting a signal indicative of the visitor above a first threshold, and detecting the second indication comprises detecting the signal indicative of the visitor above a second threshold. The second threshold can be greater than the first threshold. The doorbell can comprises a first sensor (as described in other embodiments). The signal indicative of the visitor can be sensed by the first sensor of the doorbell.

In some embodiments, the doorbell comprises a first sensor and a second sensor. The first indication can be detected using the first sensor. The second indication can be detected using the second sensor. The first sensor can be a different type of sensor than the second sensor.

In several embodiments, while the remotely located computing device and the doorbell are located within a connection range of a third wireless network, the embodiments can include using the remotely located computing device to automatically select the first wireless network rather than the third wireless network for future doorbell wireless communication in response to the remotely located computing device being connected to the first wireless network.

Then, some embodiments include connecting the doorbell to the first wireless network due at least in part to selecting the first wireless network for the future doorbell wireless communication. The future doorbell wireless communication can include the doorbell indirectly communicating with the remotely located computing device via the first wireless network to send the wireless notification regarding the visitor.

The embodiments described above can be combined with any of the embodiments described below.

Methods can include using a doorbell that is configurable to wirelessly communicate with a remotely located computing device, such as a cellular telephone, laptop, or tablet. Some embodiments include obtaining a doorbell that comprises a speaker, a microphone, a camera, and a button. The button can be configurable to enable a visitor to sound a chime (e.g., a speaker or another sound emission device located inside of a building). Several embodiments include shipping the doorbell in a shipping mode that consumes power. In the shipping mode, the doorbell can detect whether the doorbell is electrically coupled to an external power source (e.g., the electricity of a building to which the doorbell is attached). Methods can then include entering a network connection mode in response to detecting electricity from the external power source. The shipping mode can consume less power than the network connection mode. The network connection mode can comprise detecting a wireless network (e.g., a wireless network emitted by a router). Several methods include detecting a first indication of the visitor using the doorbell.

Methods for using a doorbell that is configurable to wirelessly communicate with a remotely located computing device can include obtaining the doorbell that comprises a speaker, a microphone, a camera, and a button. The button can be configured to enable a visitor to sound a chime. Some methods include shipping the doorbell in a shipping mode that consumes power. During the shipping mode, the doorbell can be configured to detect whether the doorbell is electrically coupled to an external power source. Methods can include entering a setup mode in response to detecting electricity from the external power source. The shipping mode can consume less power than the setup mode. The setup mode can increase electrical activities of the doorbell relative to the shipping mode. Some embodiments include increasing the electrical activities of the communication module, circuit board, battery, microphone, speaker, and/or camera. Some embodiments include detecting a first indication of the visitor. The first indication can be detected using the doorbell.

The remotely located computing device can be a cellular telephone having a display screen. Methods can comprise sending an image of the visitor from the doorbell to the cellular telephone and displaying the image of the visitor on the display screen of the cellular telephone.

Some embodiments comprise detecting a second indication of the visitor, wherein the second indication is detected using the doorbell. Several methods comprise sending a wireless notification to the remotely located computing device regarding a presence of the visitor in response to detecting both the first indication and the second indication.

In some embodiments, detecting the first indication comprises detecting a signal indicative of the visitor above a first threshold and detecting the second indication comprises detecting the signal indicative of the visitor above a second threshold. In some embodiments, the second threshold is greater than the first threshold. The doorbell can comprise a first sensor. The signal indicative of the visitor can be sensed by the first sensor of the doorbell.

In several embodiments, the first sensor of the doorbell comprises a motion sensor and the signal is related to motion. The camera, the speaker, and/or the microphone can be disabled during the setup mode.

The first sensor of the doorbell can comprise a proximity sensor. The signal can be related to proximity of the visitor.

The first sensor of the doorbell can comprise a microphone. The signal can be related to sound. In some embodiments, detecting the second indication comprises detecting a knocking sound.

In several embodiments, a doorbell comprises a first sensor and a second sensor. The first indication can be detected using the first sensor and the second indication can be detected using the second sensor. The first sensor can be a different type of sensor than the second sensor.

In some embodiments, the first sensor of the doorbell comprises a motion sensor. The second sensor can comprise the microphone. Methods can comprise using the microphone to detect a knocking sound to verify the presence of the visitor detected by the motion sensor.

In several embodiments, the first sensor of the doorbell can comprise an infrared detector and the second sensor can comprise the camera.

In some embodiments, the doorbell comprises a battery. The setup mode can comprise automatically charging the battery in response to detecting the electricity from the external power source.

In some embodiments, the setup mode comprises automatically replenishing at least a portion of electrical energy consumed from the battery by the doorbell during the shipping mode. Methods can comprise precluding wireless communication by the doorbell until after replenishing the portion of the electrical energy and then entering a network connection mode in response to pressing the button for at least eight seconds. Pressing the button for at least eight seconds can help the doorbell distinguish between when the user just wants to sound the chime and when the user wants the doorbell to enter the network connection mode. The network connection mode can comprise detecting a wireless network.

In several embodiments, the doorbell comprises a battery and the setup mode comprises using the electricity from the external power source to charge the battery before enabling communication between the doorbell and the remotely located computing device.

In some embodiments, the setup mode comprises a network connection mode, and the method comprises entering the network connection mode in response to pressing the button for at least eight seconds. The network connection mode can comprise detecting a wireless network and inputting a doorbell identification code into the remotely located computing device. In some embodiments, inputting the doorbell identification code includes typing letters, numbers, words, and/or symbols on the remotely located computing device. Inputting the doorbell identification code can include speaking letters, numbers, words, and/or symbols such that the remotely located computing device hears the information and captures the information.

The doorbell identification code can be associated with the doorbell such that the code is correlated with at least one doorbell. The code can be used as an electronic key to unlock access to the doorbell. The network connection mode can comprise using the doorbell identification code to verify whether the remotely located computing device is authorized to communicate with the doorbell. For example, the code can prevent an unauthorized computing device from hacking into the doorbell and receiving visitor alerts from the doorbell.

In several embodiments, the network connection mode comprises enabling communication from the remotely located computing device to the doorbell in response to pressing the button for at least eight seconds and inputting the doorbell identification code into the remotely located computing device. Pressing the button for at least eight seconds can help the doorbell distinguish between when the user just wants to sound the chime and when the user wants to enable communication from the remotely located computing device to the doorbell.

In some embodiments, the remotely located computing device is connected to the wireless network such that the remotely located computing device is configured to transmit data via the wireless network. The wireless network can comprise a name and a password. The name can identify the wireless network to entities searching for wireless networks. The password can enable an electronic device to connect to the wireless network. The wireless network can enable electronic devices to connect to the Internet.

The communication from the remotely located computing device to the doorbell can comprise the name and the password of the wireless network to which the remotely located computing device is connected. The network connection mode can comprise connecting the doorbell to the wireless network to which the remotely located computing device is connected such that the doorbell can send an alert regarding a presence of the visitor to the remotely located computing device via the wireless network.

Some embodiments include using the doorbell to detect multiple wireless networks. The wireless network to which the remotely located computing device is connected can be one of the multiple wireless networks. Methods can comprise automatically selecting the wireless network to which the remotely located computing device is connected. For example, the system can choose which wireless network to connect the doorbell without asking a person which wireless network the system should choose.

In some embodiments, a setup mode comprises a network connection mode. Methods can comprise entering the network connection mode in response to pressing the button for at least eight seconds. The network connection mode can comprise detecting a first wireless network having a name and a password. The network connection mode can comprise inputting a doorbell identification code into the remotely located computing device. The doorbell identification code can be associated with the doorbell. The network connection mode can comprise using the doorbell identification code to verify whether the remotely located computing device is authorized to communicate with the doorbell. The network connection mode can comprise the remotely located computing device creating a second wireless network (e.g., that emanates from the remotely located computing device). The network connection mode can comprise transmitting the name and the password of the first wireless network directly from the remotely located computing device to the doorbell via the second wireless network to enable the doorbell to communicate with the remotely located computing device via the first wireless network. Methods can comprise the remotely located computing device directly communicating with the doorbell via the second wireless network prior to the doorbell indirectly communicating with the remotely located computing device via the first wireless network. For example, the wireless communication from the remotely located computing device can travel through the air directly to the doorbell. The wireless communication from the remotely located computing device can travel indirectly to the doorbell via a third electronic device such as a server.

A remotely located computing device can be located near a doorbell. For example, during setup some users will hold a cellular phone within a couple of feet from the doorbell to input a doorbell identification code into the cellular phone to verify that the phone is authorized to communicate with the doorbell and to help the doorbell connect to a wireless network. The phone is located remotely from the doorbell because it is not physically attached to the doorbell.

Several methods include using a doorbell that is configurable to wirelessly communicate with a remotely located computing device. Methods can include shipping the doorbell in a shipping mode that consumes power. During some shipping mode embodiments, the doorbell is configured to detect whether the doorbell is electrically coupled to an external power source. Several embodiments include entering a standby mode in response to detecting electricity from the external power source. The shipping mode can consume less power than the standby mode. The speaker and the microphone can be disabled during the standby mode.

Some embodiments include exiting the standby mode and entering an alert mode in response to detecting a first indication of the visitor. The first indication can be detected using the doorbell. Several embodiments include sending a wireless notification to the remotely located computing device regarding a presence of the visitor in response to entering the alert mode.

Some embodiments comprise detecting multiple wireless networks and automatically selecting a first wireless network for communicating between the doorbell and the remotely located computing device. Prior to the automatic selection, the remotely located computing device can be connected to the first wireless network. Methods can further comprise authorizing the doorbell to communicate with the remotely located computing device by pressing the button for at least eight seconds and inputting a doorbell identification code into the remotely located computing device. The doorbell identification code can be associated with the doorbell. The first wireless network can comprise a name and a password. Methods can further comprise wirelessly communicating the name and the password from the remotely located computing device to the doorbell.

Several methods include entering a network connection mode prior to sending the wireless notification. The network connection mode can comprise detecting a first wireless network having a name and a password. The network connection mode can comprise inputting a doorbell identification code into the remotely located computing device. The doorbell identification code can be associated with the doorbell. The network connection mode can further comprise using the doorbell identification code to verify whether the remotely located computing device is authorized to communicate with the doorbell. The network connection mode can comprise the remotely located computing device creating a second wireless network. The network connection mode can comprise transmitting the name and the password of the first wireless network directly from the remotely located computing device to the doorbell via the second wireless network to enable the doorbell to communicate with the remotely located computing device via the first wireless network. Methods can comprise the doorbell directly communicating with the remotely located computing device via the second wireless network prior to the doorbell indirectly communicating with the remotely located computing device via the first wireless network.

In some embodiments, devices enable a person to communicate with a remotely located individual and/or remotely answer a door. For example, a person might ring a doorbell of a building when no one is inside the building. A communication system can notify a remotely located person regarding the doorbell ring via a computing device such as a computer, laptop, or phone. The computing device can then allow the remotely located person to hear, see, and/or communicate with the person who rang the doorbell. In some embodiments, communication systems include a doorbell, a microphone, a speaker, a camera, and/or a wireless communication system. In several embodiments, ringing a doorbell is unnecessary because communication is triggered by a person approaching a sensor such as a motion sensor or proximity sensor. In some embodiments, ringing a doorbell is unnecessary because communication is triggered by a person making a sound, such as a knocking sound, stepping sound, and/or rustling noises.

Some embodiments include a doorbell system configured to electrically couple to an electrical system of a building. The building can have an area in which electrical wires protrude toward an outer portion of the building. The electrical wires are electrically coupled to the electrical system. The doorbell system can include a wireless communication assembly capable of communicating with a wireless network to enable the doorbell system to communicate with a remotely located computing device. The doorbell system can also include a doorbell, a camera, a microphone, and a speaker. The doorbell system can be configured to send images recorded by the camera and sounds recorded by the microphone to the remotely located computing device. The doorbell system can also include a housing coupled to the doorbell, the camera, the microphone, and the speaker. The doorbell system can also include a mounting bracket with an open section configured to fit around the area in which electrical wires protrude toward an outer portion of the building. The mounting bracket can be configured to couple to the housing. The mounting bracket can also be configured to enable the electrical wires to pass through the open section and electrically couple with at least a portion of the doorbell system.

Some embodiments include a method for using a doorbell, wherein the doorbell can be configurable to wirelessly communicate with a remotely located computing device. Methods can include obtaining the doorbell that can comprise a speaker, a microphone, and a camera, wherein the doorbell can be configurable for mounting near an entryway. As used herein, "configurable" can be "capable."

Several methods can comprise entering a shipping mode and then entering a sleep mode in response to detecting electricity from an external power source, wherein the shipping mode consumes less power than the sleep mode. The shipping mode can consume at least 50% less power or at least 90% less power than a sleep mode.

Methods can include entering a sleep mode, wherein the sleep mode can consume less power (e.g., at least 20% less power, at least 40% less power, at least 65% less power) than a standby mode.

Wireless communication can disabled during the sleep mode such that the doorbell does not wirelessly communicate with the remotely located computing device (e.g., a smartphone or a computer that is not physically coupled to the doorbell). In some embodiments, the doorbell can temporarily exit sleep mode to wirelessly communicate (e.g., with a server or computer) before returning to sleep mode. In some embodiments, the camera of the doorbell can disabled during the sleep mode such that the doorbell does not record and/or sense images during sleep mode.

Several embodiments include entering the standby mode in response to detecting a first indication of a visitor. The first indication can be detected using the doorbell. The standby mode can consume less power (e.g., at least 20% less power, at least 40% less power, at least 65% less power) than an alert mode. Standby mode can increases an activity of at least one component relative to the sleep mode. In some embodiments, standby mode increases the electrical activity, processing activity, or sensing activity of a wireless communication system, a sensor (e.g., a motion sensor, a proximity sensor, a sound sensor, a button), a camera, a microphone, a speaker, or a computer processor. For example, a camera can be inactive during sleep mode but can be active during standby mode.

Some methods include entering the alert mode in response to detecting a second indication of the visitor. The second indication can be detected using the doorbell. The doorbell can record an image using the camera during the alert mode. As used herein, "record" is used in a very broad sense and does not necessarily mean that the image is stored in a memory of the doorbell. For example, a doorbell could "record an image" by sending data related to an image that is displayed on a remotely located computing device. Recording an image can include taking an image, capturing an image, or sensing an image.

In several embodiments, detecting the first indication can comprise detecting a signal indicative of the visitor above a first threshold. For example, detecting a very faint motion signal might be insufficient to detect the first indication that a visitor might be present, but detecting a stronger motion signal could be sufficient to detect the first indication. Detecting the second indication can comprise detecting the signal indicative of the visitor above a second threshold. The second threshold can be greater than the first threshold.

The doorbell can comprise a first sensor. The signal indicative of the visitor can be sensed by the first sensor of the doorbell. The first sensor of the doorbell can comprise a motion sensor, and the signal can be related to motion. The camera can be disabled (e.g., turned off, prevented from recording) during the sleep mode. The first sensor of the doorbell can comprise a proximity sensor, and the signal can be related to proximity of the visitor.

The first sensor of the doorbell can comprise a microphone, and the signal can be related to sound. The sound can be a knocking sound. The speaker can comprise a flat speaker located in a sound chamber configured to amplify an emitted sound.

In several embodiments, the doorbell can comprise a first sensor and a second sensor. The first indication can be detected using the first sensor, and the second indication can be detected using the second sensor. The first sensor can be a different type of sensor than the second sensor. For example, the first sensor can be one type of motion sensor while the second sensor is another type of motion sensor.

In some embodiments, the first sensor of the doorbell can comprise a motion sensor that is at least partially covered by a cover. Some methods comprise detecting motion through the cover while obscuring the motion sensor from the visitor and/or while not emitting a visible light from the doorbell. In some cases, this approach can enable the doorbell to record a visitor's actions without the visitor becoming aware the actions are being recorded and/or transmitted. The second sensor can comprise a microphone.

In several embodiments, the first sensor of the doorbell comprises a microphone. In some embodiments, the first sensor of the doorbell comprises an infrared detector and/or the second sensor comprises the camera. The first sensor of the doorbell can comprise a proximity sensor.

Some method embodiments include using a doorbell that is configurable to communicate wirelessly with a remotely located computing device. Several embodiments can include obtaining the doorbell that comprises a speaker, a microphone, a camera, and a button, wherein the button is configurable to enable a visitor to sound a chime. For example, once the doorbell is installed properly in an entryway, pressing the button can cause a chime (e.g., a speaker) to emit a sound inside of a building. Some embodiments can include entering a sleep mode, wherein the sleep mode can consume less power than an alert mode. Wireless communication can be off (e.g., disabled, inactive) during the sleep mode. Several embodiments can include entering the alert mode in response to detecting a first indication of the visitor, wherein the first indication can be detected using the doorbell. The doorbell can record an image using the camera during the alert mode.

Some embodiments can include sending a wireless notification to the remotely located computing device regarding a presence of the visitor in response to the visitor being present for more than a first threshold amount of time. Several methods comprise sending the notification to the remotely located computing device before the visitor presses the button of the doorbell or activates a switch of the doorbell configured to trigger a chime such that the chime emits a sound. The first threshold amount of time can be at least three seconds, at least eight seconds, less than 20 seconds, and/or less than 40 seconds. The camera can be off during sleep mode (although some embodiments include temporarily exiting sleep mode to turn the camera on).

Several embodiments include preventing (e.g., blocking) a redundant notification regarding the visitor (e.g., to avoid unnecessarily bothering a user). Some methods include preventing a redundant notification regarding the visitor until after a second threshold amount of time. The second threshold amount of time can be at least 20 seconds, at least 30 seconds, at least 60 seconds, at least five minutes, less than 70 seconds, and/or less than 12 minutes.

Some embodiments include a method for using a doorbell system. Several methods include obtaining a doorbell that comprises a speaker, a microphone, and/or a camera. The doorbell can be configurable for mounting near an entryway and/or in an entryway. Several methods include assigning a first priority to a first remote computing device and assigning a second priority to a second remote computing device, wherein the first priority is superior to the second priority.

As used herein, "superior" is used in a very broad sense to mean that the first priority includes rights and/or privileges not included in the second priority. In some embodiments, a superior priority means that a first remote computing device receives a notification (e.g., a doorbell communication request) before a second remote computing device. In some embodiments, a superior priority does not result in a first remote computing device receiving a notification before a second remote computing device, but means that the device with the superior priority has other rights such as the ability to block a device with an inferior priority from receiving notifications or the ability to restrict how and when a device with an inferior priority receives notifications.

Several embodiments include using the doorbell to detect a visitor. Some embodiments comprise generating a doorbell communication request regarding the visitor. The doorbell communication request can include a picture and/or video of the visitor. The doorbell communication request can include other visitor information such as the visitor's name, company, classification, number of previous visits to the doorbell, credit score, and/or criminal history.

Some embodiments comprise sending the doorbell communication request to the first remote computing device due to the first priority (e.g., in response to the first priority). Methods can include determining whether to send the doorbell communication request to the second remote computing device due to the second priority (e.g., in response to the second priority) and/or sending the doorbell communication request to the second remote computing device.

Some methods comprise entering an autonomous answering mode. The autonomous answering mode can comprise emitting a pre-recorded voice message from the speaker of the doorbell. For example, a user of a remote computing device can record a message such as, "thanks for visiting my house," or "what brings you to my home?" The speaker of the doorbell can later emit the pre-recorded message for the visitor to hear. Some methods include automatically replacing the pre-recorded voice message with a non-word sound (e.g., a beeping sound, a buzzing sound, a ringing sound) after a time such that the autonomous answering mode comprises emitting the non-word sound rather than the pre-recorded voice message. The time can be at least one hour, at least five hours, and/or at least 24 hours.

Several methods comprise emitting (e.g., displaying, notifying, ringing) the doorbell communication request from (e.g., using) the first remote computing device for at least seven seconds, at least 10 seconds, and/or at least 15 seconds before emitting the doorbell communication request from the second remote computing device. Then, some methods comprise simultaneously emitting the doorbell communication request from both the first remote computing device and the second remote computing device.

In some methods, assigning the first priority comprises assigning administrative rights (e.g., setup control, notification control, profile control). Several methods comprise simultaneously sending the doorbell communication request to the first remote computing device and the second remote computing device. Some methods comprise providing control of the doorbell communication request to the first remote computing device such that the first remote computing device can terminate communication with the second remote computing device.

In some cases, determining whether to send the doorbell communication request to the second remote computing device comprises determining whether a threshold amount of time has passed without the first remote computing device accepting the doorbell communication request. The threshold amount of time can be at least five seconds, at least eight seconds, at least 15 seconds, at least 30 seconds, and/or less than 90 seconds.

Several embodiments comprise a method for using a doorbell system. Methods can include obtaining a doorbell that comprises a speaker, a microphone, and/or a camera. The doorbell can be configurable for mounting near an entryway. Several embodiments include assigning a first priority to a first remote computing device and assigning a second priority to a second remote computing device, wherein the first priority is superior to the second priority. Some embodiments include using the doorbell to detect a visitor and generating a doorbell communication request regarding the visitor. Several embodiments comprise sending the doorbell communication request to the first remote computing device due to (e.g., as a result of) the first priority and/or determining whether to send the doorbell communication request to the second remote computing device.

Some embodiments comprise blocking the doorbell communication request from being sent to, accepted by, and/or displayed by the second remote computing device due to (e.g., as a result of) a profile associated with the second remote computing device. The profile can include restrictions that can prohibit the second remote computing device from receiving, accepting, and/or displaying the doorbell communication request in some circumstances. Methods can comprise blocking the doorbell communication request from being displayed by the second remote computing device.

The profile can include restrictions regarding a time of day, an identity of the visitor, and/or a location of the second remote computing device. In some embodiments, if a second remote computing device is located in a certain area (e.g., inside of the building to which the doorbell is coupled) then the second remote computing device will not receive, accept, and/or display doorbell communication requests.

As used herein, a "doorbell communication request" is a type of notification related to a visitor and can be sent to a user of a computing device, which can be located remotely from the doorbell.

Several methods for using a doorbell comprise obtaining a doorbell that comprises a speaker, a microphone, and a camera. The doorbell can be configurable for mounting near an entryway. Embodiments can comprise assigning a first priority to a first remote computing device and assigning a second priority to a second remote computing device. Several embodiments include using the doorbell to detect a visitor (e.g., via a sensor of the doorbell). Some methods include generating a doorbell communication request regarding the visitor. Several methods include sending the doorbell communication request to the first remote computing device and/or to the second remote computing device. Several methods include sending the doorbell communication request to a third remote computing device, a fourth remote computing device, and/or a fifth remote computing device. The order in which the doorbell communication request is sent to multiple computing devices can vary.

Some embodiments comprise terminating the doorbell communication request to the second remote computing device in response to the first remote computing device accepting the doorbell communication request. For example, once the first remote computing device accepts the doorbell communication request, the method can include blocking the second remote computing device from also accepting the doorbell communication request. In some embodiments, both the first remote computing device and the second remote computing device can accept the doorbell communication request such that multiple users can simultaneously communicate with a visitor via multiple remote computing devices. As used herein, "accepting" a doorbell communication request can include answering a doorbell communication request and/or initiating two-way audio communication between a doorbell and a remote computing device (e.g., to enable a visitor and a user to talk to each other).

Several embodiments comprise using the first remote computing device to display an image of the visitor and then using the first remote computing device to instruct the doorbell to emit a pre-recorded voice message from the speaker. For example, a user can select a button on a graphical user interface that causes the doorbell to emit the voice message from the speaker of the doorbell. Then, some embodiments comprise initiating two-way audio communication between the first remote computing device and the doorbell (e.g., after the visitor has responded to the pre-recorded voice message).

Several embodiments comprise initiating two-way audio communication between the first remote computing device and the second remote computing device in response to the doorbell communication request and before initiating two-way audio communication between the doorbell and at least one of the first remote computing device and the second remote computing device. For example, a user of the first remote computing device might want to talk with a user of the second remote computing device before starting two-way audio communication with the visitor.

Some embodiments comprise emitting a notification sound (e.g., a ringing sound) from a sound output device (e.g., a chime, a speaker) located inside of a building in response to the doorbell detecting the visitor. Then, some embodiments comprise enabling the visitor to choose whether to send the doorbell communication request to the first remote computing device. For example, the doorbell can instruct the visitor to press a button to talk with the owner of the home. Then, several embodiments comprise sending the doorbell communication request to the first remote computing device in response to the visitor choosing to send the doorbell communication request to the first remote computing device.

Several embodiments comprise determining whether the visitor is still present after sending the doorbell communication request and terminating the doorbell communication request in response to determining the visitor is not present prior to at least one of the first remote computing device and the second remote computing device accepting the doorbell communication request. In some cases, this approach can reduce occurrences of a doorbell communication request unnecessarily bothering users when a visitor is no longer present and/or when the doorbell falsely detected a visitor.

Some embodiments comprise blocking (e.g., preventing) the first remote computing device from displaying the doorbell communication request. The blocking can be response to a location of the first remote computing device.

Several embodiments comprise creating (e.g., forming, generating) a profile of user preferences related to doorbell notifications. The profile can comprise a first time when the first remote computing device will not notify a user regarding the doorbell communication request. The profile can comprise a second time when a chime (e.g., an audio speaker) located inside of a building will not emit a sound. The profile can comprise a list of computing devices capable of receiving (e.g., authorized to receive) the doorbell communication request.

Several embodiments include methods for using a doorbell system. Methods can include obtaining a doorbell that comprises a speaker, a microphone, a camera, and an outer housing. Several embodiments include connecting the doorbell electrically to an electrical power supply of a building and connecting the doorbell electrically to a sound output device located inside of the building. Some methods include receiving a first alternating current into the doorbell from the power supply of the building. Several methods include converting at least a first portion of the first alternating current into a first direct current. This conversion can occur within the outer housing of the doorbell. The doorbell can use the first direct current to provide a first electrical energy to the camera. Several embodiments include draining the first direct current to the sound output device located inside of the building.

As used herein, "connecting" electrically is used in a very broad sense to mean that a first item is coupled to a second item by at least one conductor. For example, a doorbell can be electrically connected to an electrical power supply by a conductor such as a wire (even if no electricity is flowing through the wire).

The first direct current can provide a first electrical power that is less than a triggering threshold of the sound output device such that the sound output device does not emit a notification sound in response to the first electrical power. Several methods comprise using the doorbell to supply a second electrical power to the sound output device, wherein the second electrical power is greater than the triggering threshold of the sound output device such that the sound output device emits the notification sound in response to the second electrical power. The second electrical power can comprise a second alternating current.

In some embodiments, the power supply comprises a transformer having a maximum available electrical power. The second electrical power can be at least eighty percent, at least ninety percent, or at least ninety-five percent of the maximum available electrical power. The maximum available electrical power is the maximum amount of electrical power that the transformer can emit as it is currently configured in the building. A given transformer might have a greater maximum available electrical power in a first building than in a second building.

Some embodiments comprise using the first direct current to provide a second electrical energy to a printed circuit board of the doorbell while draining the first direct current to the sound output device. Methods can include using the printed circuit board to provide a third electrical energy to the microphone and the speaker.

In several embodiments, the doorbell comprises a rectifier configured to convert the first portion of the first alternating current into the first direct current. Doorbells can comprise a battery. Some methods comprise using the first direct current to charge the battery of the doorbell while draining the first direct current to the sound output device.

Some embodiments comprise converting at least the first portion of the first alternating current into the first direct current while using the doorbell to supply a second alternating current to the sound output device. The second alternating current can supply a second electrical power to the sound output device. The second electrical power can be greater than the triggering threshold of the sound output device such that the sound output device emits the notification sound in response to the second electrical power.

In several embodiments, the doorbell comprises a battery and a printed circuit board. Some methods comprise using the battery to supply a third electrical power to the printed circuit board while using the doorbell to supply a second alternating current to the sound output device. The second alternating current can supply a second electrical power to the sound output device. The second electrical power can be greater than the triggering threshold of the sound output device such that the sound output device emits the notification sound in response to the second electrical power.

In some embodiments, the power supply comprises a transformer with a maximum available electrical power. The first electrical power can be less than fifteen percent, less than ten percent, and/or less than five percent of the maximum available electrical power.

The sound output device can comprise a chime. In some cases, the sound output device comprises a speaker located inside of a building.

Some embodiments include methods for replacing a first doorbell with a second doorbell. The first doorbell can comprise a switch configured to close a circuit between a transformer and a sound output device to enable the sound output device to emit a notification sound (e.g., a "ding-dong" sound). Several embodiments include detaching the first doorbell from a first wire that is electrically connected to the transformer and/or detaching the first doorbell from a second wire that is electrically connected to the sound output device.

As used herein, "electrically connected" is used in a very broad sense to mean that a first item is coupled to a second item by at least one conductor. Two items can be electrically connected even if no electricity is flowing through the conductor that couples the items. For example, the first wire can be electrically connected to the transformer even if no power is connected or flowing to the transformer (e.g., to prevent electrical shocks to a person detaching the first doorbell and replacing the first doorbell with the second doorbell).

Several embodiments include obtaining a second doorbell, which can comprise a speaker, a microphone, a camera, and an outer housing. The speaker, the microphone, and the camera can be coupled to the outer housing and/or located at least partially inside of the outer housing. The second doorbell can be electrically connected to the first wire that is electrically connected to the transformer. The second doorbell can be electrically connected to the second wire that is electrically connected to the sound output device. As used herein, "wire" is used in a broad sense to mean a long conductive member such as a cable or wire capable of conducting electricity.

Several embodiments include receiving a first alternating current into the second doorbell from at least one of the first wire and the second wire. Methods can include converting at least a first portion of the first alternating current into a first direct current. This conversion can occur within the outer housing of the second doorbell. Some embodiments include using the first direct current to provide a first electrical energy to at least a second portion of the second doorbell. Several methods comprise draining the first direct current via at least one of the first wire and the second wire.

In some embodiments, the draining provides a first electrical power that is less than a triggering threshold of the sound output device such that the sound output device does not emit a notification sound in response to the first electrical power. Several embodiments comprise converting at least the first portion of the first alternating current into the first direct current while using the doorbell to supply a second alternating current to the sound output device. The second alternating current can supply a second electrical power to the sound output device. The second electrical power can be equal to or greater than the triggering threshold of the sound output device such that the sound output device emits the notification sound in response to the second electrical power.

In several embodiments, the second doorbell receives the first alternating current via the first wire. The second doorbell can drain the first direct current via the second wire. In some embodiments, the second doorbell receives the first alternating current via the second wire, and the second doorbell drains the first direct current via the first wire.

In some embodiments, the second portion of the second doorbell comprises a printed circuit board connected electrically to the speaker, the microphone, and/or the camera. The printed circuit board can be located inside of the outer housing. Methods can comprise using the first direct current to provide a second electrical energy to the speaker, the microphone, and/or the camera via the printed circuit board.

Several methods of using a doorbell system include obtaining a doorbell that comprises a speaker, a microphone, a camera, and/or an outer housing. The speaker, the microphone, and/or the camera can be coupled to the outer housing of the doorbell. Some methods include receiving a first alternating current into the doorbell from an external power supply and converting at least a first portion of the first alternating current into a first direct current. This conversion can occur within the outer housing of the doorbell. Some methods include using the first direct current to provide a first electrical energy to at least a second portion of the doorbell and draining the first direct current to a chime (or other type of sound output device).

The first direct current can provide a first electrical power that is less than a triggering threshold of the chime such that the chime does not emit a notification sound in response to the first electrical power. Several embodiments comprise using the doorbell to supply a second alternating current to the chime. The second alternating current can supply a second electrical power to the chime. The second electrical power can be equal to or greater than the triggering threshold of the chime such that the chime emits the notification sound in response to the second electrical power.

Methods for using a doorbell system can include obtaining a doorbell that comprises a speaker, a microphone, a camera, and an outer housing; and connecting the doorbell electrically to an electrical power supply of a building. The electrical power supply can be provided by a utility company. In some embodiments, the electrical power supply is a transformer that is electrically connected to a building's electricity that is provided by a utility company.

In some embodiments, the doorbell can be connected electrically to a sound output device (e.g., a digital chime, a mechanical chime, a speaker) that is located remotely relative to the doorbell. For example, the doorbell can be coupled to an outside wall of a building and the sound output device can be coupled to an inside wall of the building. The building can couple the sound output device to the doorbell while the sound output device is located remotely relative to the doorbell. The doorbell can be connected communicatively to a remote computing device to enable the doorbell to communicate (e.g., wirelessly) with the remote computing device.

Methods can include receiving a first current into the doorbell from the power supply of the building and using the first current to provide at least a first portion of a first electrical energy to the camera and to the microphone. Providing the first current can enable the camera and microphone to have electricity to operate.

Some methods include using the doorbell to close an electrical circuit that comprises the sound output device such that the first current flows through the sound output device and the first current provides a first electricity that is less than a triggering threshold of the sound output device such that the sound output device does not emit a notification sound in response to the first electricity.

Some embodiments comprise using the doorbell to detect a presence of a visitor while closing the electrical circuit such that first current provides the first electricity that is less than the triggering threshold. Then, in response to detecting the presence of the visitor, methods can include using the doorbell to close the electrical circuit to supply a second electricity to the sound output device. The second electricity can be greater than the triggering threshold of the sound output device such that the sound output device emits the notification sound in response to the second electricity. Embodiments can also include sending a wireless notification to the remote computing device regarding the presence of the visitor (e.g., in response to the second electricity or in response to simply detecting the visitor).

In several embodiments, the electrical circuit comprises the doorbell, the sound output device, and a transformer. The transformer can electrically couple the electrical circuit to the power supply of the building such that the transformer is configured to provide electrical power from the power supply to the electrical circuit. The transformer can comprise an electrical output having a direct current. Receiving the first current into the doorbell from the power supply of the building can comprise receiving the direct current from the transformer.

Electrically connecting a doorbell to an electrical power supply can include indirectly electrically connecting the doorbell to the power supply. A wire can be electrically connected when the wire is connected such that it could conduct electricity if there was a complete circuit. A doorbell can be electrically connected to a wire if the doorbell is conductively coupled to the wire (even if a complete circuit is not present to enable an electrical current).

In several embodiments, the electrical circuit comprises the doorbell, the sound output device, and a transformer. The transformer can electrically couple the electrical circuit to the power supply of the building such that the transformer is configured to provide electrical power from the power supply to the electrical circuit. The transformer can comprise an electrical output having an alternating current. Receiving the first current into the doorbell from the power supply of the building can comprise receiving the alternating current from the transformer. Method can further comprise converting at least a second portion of the alternating current into a direct current. The converting can occur within the outer housing of the doorbell.

In some embodiments, the power supply provides the second electricity to the electrical circuit. The doorbell can be configured to control whether the doorbell system provides the first electricity or the second electricity to the sound output device.

Several embodiments include initiating a transmission of the wireless notification to the remote computing device regarding the presence of the visitor while using the doorbell to supply the second electricity to the sound output device. Then, after initiating the transmission of the wireless notification to the remote computing device, methods can include terminating the supply of the second electricity to the sound output device and using the doorbell to close the electrical circuit to provide a third electricity to the sound output device. The third electricity can be less than the triggering threshold of the sound output device such that the sound output device does not emit the notification sound in response to the third electricity.

Some embodiments comprise using the doorbell to supply the third electricity to the sound output device while continuing to transmit the wireless notification to the remote computing device.

Several embodiments comprise terminating the supply of the second electricity to the sound output device and using the doorbell to close the electrical circuit to provide a third electricity to the sound output device. The third electricity can be less than the triggering threshold of the sound output device such that the sound output device does not emit the notification sound in response to the third electricity. Embodiments can include initiating a transmission of the wireless notification from the doorbell to the remote computing after terminating the supply of the second electricity to the sound output device.

Some embodiments include using the doorbell to detect the presence of the visitor while closing the electrical circuit comprises using a motion sensor to detect the presence of the visitor. Methods can also include using the first current to provide at least a second portion of the first electrical energy to the motion sensor. The second portion of the first electrical energy can be greater than an operational threshold of the motion sensor such that the second portion of first electrical energy is capable of providing sufficient electrical power for the doorbell to operate the motion sensor while the first current provides the first electricity that is less than the triggering threshold of the sound output device. An operational threshold is an electrical threshold that represents the minimum electricity necessary to operate an item. The motion sensor can be replaced with a proximity sensor configured to detect whether a visitor is located near the doorbell. The proximity sensor can be a laser or infrared proximity sensor. The proximity sensor can also be the doorbell button (that rings the chime).

In several embodiments, using the doorbell to detect the presence of the visitor while closing the electrical circuit comprises using image analysis to detect the presence of the visitor. Methods can further comprise using the first current to provide at least a second portion of the first electrical energy to an image analysis system. The second portion of the first electrical energy can be greater than an operational threshold of the image analysis system such that the second portion of first electrical energy is capable of providing sufficient electrical power for the doorbell to operate the image analysis system while the first current provides the first electricity that is less than the triggering threshold of the sound output device.

In some embodiments, the first current is configured such that the first portion of the first electrical energy is greater than an operational threshold of the camera while the first current is configured such that the first current provides the first electricity that is less than the triggering threshold of the sound output device.

In several embodiments, the first current is configured such that the first portion of the first electrical energy is less than an operational threshold of the camera while the first current is configured such that the first current provides the first electricity that is less than the triggering threshold of the sound output device, the method further comprising using the first portion of the first electrical energy to charge a battery located inside of the outer housing of the doorbell, and then discharging at least an electrical portion of the battery to provide a second electrical energy that is greater than the operational threshold to the camera.

In some embodiments, the doorbell comprises a wireless communication system configured to enable sending the wireless notification from the doorbell to the remote computing device. Embodiments can include using the first current to provide at least a second portion of the first electrical energy to the wireless communication system, wherein the first current is configured such that the second portion of the first electrical energy is less than an operational threshold of the wireless communication system while the first current is configured such that the first current provides the first electricity that is less than the triggering threshold of the sound output device. Methods can also include using the second portion of the first electrical energy to charge a battery located inside of the outer housing of the doorbell, and then discharging at least an electrical portion of the battery to provide a second electrical energy that is greater than the operational threshold to the wireless communication system. Then, embodiments can include using the wireless communication system to send the wireless notification to the remote computing device using the second electrical energy.

Several embodiments include methods for replacing a first doorbell with a second doorbell. The first doorbell can comprise a switch configured to close an electrical circuit having a transformer and a sound output device to enable the sound output device to emit a notification sound. Methods can include detaching the first doorbell from a first wire that is electrically connected to the transformer; detaching the first doorbell from a second wire that is electrically connected to the sound output device; and obtaining the second doorbell. The second doorbell can comprise a speaker, a microphone, a camera, and an outer housing. The speaker, the microphone, and the camera can be coupled to the outer housing.

Some embodiments include connecting the second doorbell electrically to the first wire that is electrically connected to the transformer, and connecting the second doorbell electrically to the second wire that is electrically connected to the sound output device. The second doorbell can be located remotely relative to the sound output device. For example, the second doorbell can be located on an outside wall of a building while the sound output device is located inside of the building.

Several embodiments include connecting the second doorbell communicatively to a remote computing device such that the second doorbell is configured to communicate with the remote computing device. Embodiments can include receiving a first current into the second doorbell from at least one of the first wire and the second wire; using the first current to provide a first electrical energy to at least a first portion of the second doorbell; and draining the first current to at least one of the first wire and the second wire.

Some embodiments include entering a first mode in response to connecting the second doorbell electrically to the first wire that is electrically connected to the transformer, and in response to connecting the second doorbell electrically to the second wire that is electrically connected to the sound output device. During the first mode, methods can comprise using the second doorbell to close the electrical circuit that includes the transformer and the sound output device such that the first current flows through the sound output device and the first current provides a first electricity that is less than a triggering threshold of the sound output device such that the sound output device does not emit a notification sound in response to the first electricity.

Several embodiments include entering a second mode in response to using the doorbell to detect a presence of a visitor. During the second mode, the methods can comprise using the doorbell to close the electrical circuit to supply a second electricity to the sound output device. The second electricity can be greater than the triggering threshold of the sound output device such that the sound output device emits the notification sound in response to the second electricity. The second mode can also include sending a wireless notification to the remote computing device regarding the presence of the visitor.

In several embodiments, methods comprise obtaining the doorbell that comprises a speaker, a microphone, and a camera, wherein the doorbell is configurable for mounting near an entryway; entering a sleep mode, wherein the sleep mode consumes less power than a standby mode and wherein wireless communication, the camera, and the microphone are disabled during the sleep mode; exiting the sleep mode and entering the standby mode in response to detecting a first indication of a visitor, wherein the first indication is detected using the doorbell, the standby mode consumes less power than an alert mode, and the standby mode increases electrical activities of the camera and the microphone relative to the sleep mode; and entering the alert mode in response to detecting a second indication of the visitor, wherein the second indication is detected using the doorbell, and the doorbell records an image using the camera during the alert mode and the wireless communication is enabled during the alert mode to send an alert to the remotely located computing device, wherein detecting the first indication comprises detecting a signal indicative of the visitor above a first threshold and detecting the second indication comprises detecting the signal indicative of the visitor above a second threshold, wherein the second threshold is greater than the first threshold, and wherein the doorbell comprises a first sensor, and the signal indicative of the visitor is sensed by the first sensor of the doorbell, wherein the first sensor of the doorbell comprises a proximity sensor and the signal is related to proximity of the visitor, and wherein the method further comprises shipping the doorbell in a shipping mode that consumes power, wherein during the shipping mode the doorbell is configured to detect whether the doorbell is electrically coupled to an external power source, and then entering the sleep mode in response to detecting electricity from the external power source, wherein the shipping mode consumes less power than the sleep mode.

In another aspect, the disclosure describes methods for using a doorbell that is configurable to wirelessly communicate with a remotely located computing device. The method comprising obtaining the doorbell that comprises a speaker, a microphone, a camera, and a button, wherein the button is configurable to enable a visitor to sound a chime; shipping the doorbell in a shipping mode that consumes power, wherein during the shipping mode the doorbell is configured to detect whether the doorbell is electrically coupled to an external power source, and then entering a sleep mode in response to detecting electricity from the external power source, wherein the shipping mode consumes less power than the sleep mode; entering the sleep mode, wherein the sleep mode consumes less power than an alert mode and wherein wireless communication is off during the sleep mode; and entering the alert mode in response to detecting a first indication of the visitor, wherein the first indication is detected using the doorbell, and the doorbell records an image using the camera during the alert mode.

In yet another aspect, the disclosure describes a method for using a doorbell system capable of allowing and blocking a doorbell communication request. The method comprises obtaining a doorbell that comprises a speaker, a microphone, and a camera, wherein the doorbell is configurable for mounting near an entryway; assigning a first priority to a first remote computing device and assigning a second priority to a second remote computing device, wherein the first priority is superior to the second priority; using the doorbell to detect a visitor; generating the doorbell communication request regarding the visitor; sending the doorbell communication request to the first remote computing device due to the first priority; detecting a location of the second remote computing device; and blocking the second remote computing device from displaying the doorbell communication request, wherein the doorbell system blocks displaying the doorbell communication request in response to the location of the second remote computing device.

In another aspect, the disclosure describes a method for using a doorbell system. The method comprises obtaining a doorbell that comprises a speaker, a microphone, and a camera, wherein the doorbell is configurable for mounting near an entryway; assigning a first priority to a first remote computing device and assigning a second priority to a second remote computing device, wherein the first priority is superior to the second priority; using the doorbell to detect a visitor; generating a doorbell communication request regarding the visitor; sending the doorbell communication request to the first remote computing device due to the first priority; blocking the doorbell communication request from being accepted by the second remote computing device due to a profile associated with the second remote computing device, wherein the profile comprises restrictions that prohibit the second remote computing device from accepting the doorbell communication request; detecting a location of the second remote computing device; and blocking the second remote computing device from displaying the doorbell communication request, wherein the doorbell system blocks displaying the doorbell communication request in response to the location of the second remote computing device.

In yet another aspect, the disclosure describes a method for using a doorbell system configured to block or allow a doorbell communication request. The method comprises obtaining a doorbell that comprises a speaker, a microphone, and a camera, wherein the doorbell is configurable for mounting near an entryway; using the doorbell to detect a visitor; generating the doorbell communication request regarding the visitor; detecting a location of the first remote computing device; and blocking the first remote computing device from displaying the doorbell communication request, wherein the doorbell system blocks displaying the doorbell communication request in response to the location of the first remote computing device.

In another aspect, the disclosure describes a method for using a doorbell system. The method comprises obtaining a doorbell that comprises a speaker, a microphone, a camera, and an outer housing; connecting the doorbell electrically to an electrical power supply of a building; connecting the doorbell electrically to a sound output device located inside of the building; connecting the doorbell communicatively to a remote computing device; receiving a first alternating current into the doorbell from the power supply of the building; converting at least a first portion of the first alternating current into a first direct current, wherein the converting occurs within the outer housing of the doorbell; using the first direct current to provide a first electrical energy to the camera; draining the first direct current to the sound output device located inside of the building, wherein the first direct current provides a first electrical power that is less than a triggering threshold of the sound output device such that the sound output device does not emit a notification sound in response to the first electrical power, while draining the first direct current to the sound output device such that first direct current provides the first electrical power that is less than the triggering threshold, detecting the presence of a visitor that is located outside of the building to which the doorbell is attached; then after the detecting step, using the doorbell to supply a second electrical power to the sound output device, wherein the second electrical power is greater than the triggering threshold of the sound output device such that the sound output device emits the notification sound in response to the second electrical power; while using the doorbell to supply the second electrical power to the sound output device, initiating a transmission of a notification to the remote computing device to notify a user of the visitor's presence; then after transmitting the notification to the remote computing device, using the doorbell to supply the first electrical power to the sound output device such that the sound output device does not emit a notification sound in response to the first electrical power; and while using the doorbell to supply the first electrical power to the sound output device, continuing to transmit the notification to the remote computing device to notify the user of the visitor's presence.

In yet another aspect, the disclosure describes a method for replacing a first doorbell with a second doorbell, wherein the first doorbell comprises a switch configured to close a circuit between a transformer and a sound output device to enable the sound output device to emit a notification sound. The method comprises detaching the first doorbell from a first wire that is electrically connected to the transformer; detaching the first doorbell from a second wire that is electrically connected to the sound output device; obtaining the second doorbell, wherein the second doorbell comprises a speaker, a microphone, a camera, and an outer housing, wherein the speaker, the microphone, and the camera are coupled to the outer housing; connecting the second doorbell electrically to the first wire that is electrically connected to the transformer; connecting the second doorbell electrically to the second wire that is electrically connected to the sound output device; connecting the second doorbell communicatively to a remote computing device; receiving a first alternating current into the second doorbell from at least one of the first wire and the second wire; converting at least a first portion of the first alternating current into a first direct current, wherein the converting occurs within the outer housing of the second doorbell; using the first direct current to provide a first electrical energy to at least a second portion of the second doorbell; draining the first direct current to at least one of the first wire and the second wire; arranging and configuring the second doorbell to detect the presence of a visitor located outside of the building to which the doorbell is attached; and arranging and configuring the second doorbell to simultaneously transmit a first notification to a remote computing device to notify a user of the visitor's presence, wherein during the transmission of the first notification the doorbell supplies the sound output device with a first electrical power that is less than a triggering threshold of the sound output device such that the sound output device does not emit a notification sound in response to the first electrical power; and transmit a second notification to the sound output device located inside of the building to notify a user of the visitor's presence, wherein the second notification comprises supplying the sound output device with a second electrical power that is greater than the triggering threshold of the sound output device such that the sound output device emits the notification sound in response to the second electrical power.

In another aspect, the disclosure describes a method for using a doorbell system. The method comprises obtaining a doorbell that comprises a speaker, a microphone, a camera, and an outer housing, wherein the speaker, the microphone, and the camera are coupled to the outer housing of the doorbell; connecting the doorbell electrically to an electrical power supply of a building; connecting the doorbell electrically to a sound output device located inside of the building; connecting the doorbell communicatively to a remote computing device; receiving a first alternating current into the doorbell from the power supply of the building; converting at least a first portion of the first alternating current into a first direct current, wherein the converting occurs within the outer housing of the doorbell; using the first direct current to provide a first electrical energy to the camera; draining the first direct current to the sound output device located inside of the building, wherein the first direct current provides a first electrical power that is less than a triggering threshold of the sound output device such that the sound output device does not emit a notification sound in response to the first electrical power; detecting the presence of a visitor that is located outside of the building to which the doorbell is attached; and in response to detecting the presence of the visitor, transmitting a first notification to the remote computing device to alert a first user of the visitor's presence, wherein during the transmission of the first notification the doorbell supplies the sound output device with the first electrical power; and transmitting a second notification to the sound output device located inside of the building to alert a second user of the visitor's presence, wherein the second notification comprises supplying the sound output device with a second electrical power that is greater than the triggering threshold of the sound output device such that the sound output device emits the notification sound in response to the second electrical power.

In yet another aspect, the disclosure describes a method for using a doorbell that is configurable to wirelessly communicate with a remotely located computing device. The method comprises obtaining the doorbell that comprises a speaker, a microphone, a camera, and a button, wherein the doorbell is configurable to enable a visitor to sound a chime; entering a setup mode, wherein the setup mode comprises a network connection mode, and the method comprises entering the network connection mode in response to pressing the button for at least a predetermined amount of time, and the network connection mode comprises detecting a first wireless network and inputting a doorbell identification code into the remotely located computing device, wherein the doorbell identification code is associated with the doorbell, and wherein the network connection mode further comprises using the doorbell identification code to verify whether the remotely located computing device is authorized to communicate with the doorbell, wherein the network connection mode comprises enabling communication from the remotely located computing device to the doorbell in response to pressing the button for at least the predetermined amount of time and inputting the doorbell identification code into the remotely located computing device, wherein the remotely located computing device is connected to the first wireless network such that the remotely located computing device is configured to transmit data via the first wireless network, wherein the first wireless network comprises a name and a password, and wherein the communication from the remotely located computing device to the doorbell comprises the name and the password of the first wireless network to which the remotely located computing device is connected; and detecting a first indication of the visitor, wherein the first indication is detected using the doorbell. In some embodiments, the predetermined amount of time is eight seconds.

In another aspect, the disclosure describes a method for using a doorbell that is configurable to wirelessly communicate with a remotely located computing device. The method comprises obtaining the doorbell that comprises a speaker, a microphone, a camera, and a button, wherein the doorbell is configurable to enable a visitor to sound a chime; shipping the doorbell in a shipping mode that consumes electrical energy from the doorbell, wherein during the shipping mode the doorbell is configured to detect whether the doorbell is electrically coupled to an external power source, and then entering a standby mode in response to detecting electricity from the external power source, wherein the shipping mode consumes less electrical power than the standby mode and wherein the speaker and the microphone are disabled during the standby mode; exiting the standby mode and entering an alert mode in response to detecting a first indication of the visitor, wherein the first indication is detected using the doorbell; sending a wireless notification to the remotely located computing device regarding a presence of the visitor in response to entering the alert mode; and entering a network connection mode prior to sending the wireless notification, wherein the network connection mode comprises detecting a first wireless network having a name and a password, and the network connection mode comprises inputting a doorbell identification code into the remotely located computing device, wherein the doorbell identification code is associated with the doorbell, and wherein the network connection mode further comprises using the doorbell identification code to verify whether the remotely located computing device is authorized to communicate with the doorbell, wherein the network connection mode comprises the remotely located computing device creating a second wireless network, and the network connection mode comprises transmitting the name and the password of the first wireless network directly from the remotely located computing device to the doorbell via the second wireless network to enable the doorbell to communicate with the remotely located computing device via the first wireless network, wherein the method comprises the doorbell directly communicating with the remotely located computing device via the second wireless network prior to the doorbell indirectly communicating with the remotely located computing device via the first wireless network.

In yet another aspect, the disclosure describes a method for using a doorbell that is configurable to wirelessly communicate with a remotely located computing device. The method comprises obtaining the doorbell that comprises a speaker, a microphone, a camera, and a button, wherein the doorbell is configurable to enable a visitor to sound a chime; sending a wireless notification to the remotely located computing device regarding a presence of the visitor in response to the doorbell detecting the visitor; and entering a network connection mode prior to sending the wireless notification, wherein the network connection mode comprises detecting a first wireless network having a name and a password, and the network connection mode comprises inputting a doorbell identification code into the remotely located computing device, wherein the doorbell identification code is associated with the doorbell, and wherein the network connection mode further comprises using the doorbell identification code to verify whether the remotely located computing device is authorized to communicate with the doorbell, wherein the network connection mode comprises the remotely located computing device creating a second wireless network, and the network connection mode comprises transmitting the name and the password of the first wireless network directly from the remotely located computing device to the doorbell via the second wireless network to enable the doorbell to communicate with the remotely located computing device via the first wireless network, wherein the method comprises the doorbell directly communicating with the remotely located computing device via the second wireless network prior to the doorbell indirectly communicating with the remotely located computing device via the first wireless network.

In another aspect, the disclosure describes a doorbell system. The doorbell system comprises an electronic doorbell comprising a camera and a button, wherein the camera is configurable to visually detect a visitor and the button is configurable to enable the visitor to sound an electronic chime; an electronic switch assembly electrically coupled to the electronic doorbell and a transformer; and an electronic chime electrically coupled to the electronic switch assembly, wherein the electronic chime comprises a speaker configurable to emit a notification sound in response to the visitor pressing the button of the electronic doorbell, wherein the electronic switch assembly defines a first state and a second state, wherein the first state occurs in response to a first electricity that is less than a first threshold, and the second state occurs in response to a second electricity that is greater than the first threshold, wherein in the first state the electronic switch assembly blocks the first electricity from passing through the electronic chime so the electronic chime does not emit a sound notification, and in the second state the electronic switch assembly allows the second electricity to pass through the electronic chime such that the electronic chime emits the sound notification.

The disclosure also describes another aspect of a doorbell system. The doorbell system comprises an electronic doorbell comprising a camera and a button, wherein the camera is configurable to visually detect a visitor and the button is configurable to enable the visitor to sound an electronic chime; a printed circuit board electrically coupled to the electronic doorbell and a transformer; and an electronic chime electrically coupled to the printed circuit board and mechanically coupled to the printed circuit board, wherein the electronic chime comprises a speaker configurable to emit a notification sound in response to the visitor pressing the button of the electronic doorbell, wherein the printed circuit board is configured to block a first electricity that is less than a first threshold from entering the electronic chime, wherein the first electricity does not cause the electronic chime to emit the notification sound, and wherein the printed circuit board is configured to allow the first electricity to pass through the printed circuit board.

In another aspect, the disclosure describes a method for using a doorbell system, wherein the doorbell system comprises an electronic doorbell, an electronic chime, and a remote computing device. The method comprises obtaining the electronic doorbell that comprises a camera and a button, wherein the button is configurable to enable a visitor to sound an electronic chime, wherein the electronic chime comprises a speaker configurable to emit a notification sound in response to the visitor pressing the button of the electronic doorbell; electrically coupling an electronic switch assembly to the electronic chime; electrically coupling the electronic doorbell to the electronic switch assembly; configuring the electronic switch assembly so that a first electricity that is less than a first threshold passes through the electronic switch assembly without entering the electronic chime, wherein the first electricity does not cause the electronic chime to emit the notification sound, wherein the electronic switch assembly blocks the first electricity from passing through the electronic chime in response to the first electricity being less than the first threshold; and configuring the electronic switch assembly so that the electronic switch assembly causes a second electricity that is greater than the first threshold to pass through the electronic chime to cause the electronic chime to emit the notification sound, wherein the electronic switch assembly causes the second electricity to pass through the electronic chime in response to the second electricity being greater than the first threshold.

In yet another aspect, the disclosure describes a method for using a doorbell system, wherein the doorbell system comprises an electronic doorbell, an electronic chime, and a remote computing device. The method comprises obtaining the electronic doorbell that comprises a camera and a button, wherein the button is configurable to enable a visitor to sound an electronic chime, wherein the electronic chime comprises a speaker configurable to emit a notification sound in response to the visitor pressing the button of the electronic doorbell; mechanically coupling a printed circuit board to the electronic chime and electrically coupling the printed circuit board to the electronic chime; electrically coupling the electronic doorbell to the printed circuit board; configuring the printed circuit board so that the printed circuit board allows a first electricity to pass through the printed circuit board in response to the first electricity being less than a first threshold; and configuring the printed circuit board so that the printed circuit board blocks the first electricity from entering the electronic chime in response to the first electricity being less than the first threshold, wherein the first electricity does not cause the electronic chime to emit the notification sound.

In another aspect, the disclosure describes a method for using a doorbell system, wherein the doorbell system comprises an electronic doorbell, an electronic chime, and a remote computing device. The method comprises obtaining the electronic doorbell that comprises a camera and a button, wherein the button is configurable to enable a visitor to sound an electronic chime, wherein the electronic chime comprises a speaker configurable to emit a notification sound in response to the visitor pressing the button of the electronic doorbell; mechanically coupling a printed circuit board to the electronic chime and electrically coupling the printed circuit board to the electronic chime; electrically coupling the electronic doorbell to the printed circuit board; and configuring the electronic switch assembly so that the electronic switch assembly causes a second electricity that is greater than the first threshold to pass through the electronic chime to cause the electronic chime to emit the notification sound, wherein the electronic switch assembly causes the second electricity to pass through the electronic chime in response to the second electricity being greater than the first threshold.

In yet another aspect, the disclosure describes a method for using a doorbell system to detect a first visitor, wherein the doorbell system comprises a doorbell and a remote computing device. The method comprises obtaining the doorbell that comprises a camera and a button, wherein the button is configurable to enable the first visitor to sound a chime; configuring the camera of the doorbell such that the camera comprises a field of view; using the camera of the doorbell to take a first image; sending the first image from the doorbell to the remote computing device, wherein the remote computing device comprises an electronic display; displaying the first image on the electronic display of the remote computing device; and prompting a user of the remote computing device to select a first detection zone within the first image, wherein the first detection zone comprises a portion of the first image.

In another aspect, the disclosure describes a method for using a doorbell system to detect a first visitor, wherein the doorbell system comprises a doorbell and a remote computing device. The method comprises obtaining the doorbell that comprises a camera and a button, wherein the button is configurable to enable the first visitor to sound a chime; configuring the camera of the doorbell such that the camera comprises a field of view; using the camera of the doorbell to take a first image to calibrate the doorbell system; sending the first image from the doorbell to the remote computing device, wherein the remote computing device comprises an electronic display; displaying the first image on the electronic display of the remote computing device; prompting a user of the remote computing device to select a first detection zone within the first image, wherein the first detection zone comprises a portion of the first image; configuring the doorbell system to ignore a second visitor located within the field of view but located outside of the first detection zone, wherein ignoring the second visitor comprises not sending a first picture of the second visitor to the remote computing device; and configuring the doorbell system to send a second picture of a third visitor to the remote computing device in response to determining that the third visitor is located inside of the first detection zone as defined based on the first image.

In yet another aspect, the disclosure describes a method for using a doorbell system to detect a first visitor, wherein the doorbell system comprises a doorbell and a remote computing device. The method comprises obtaining the doorbell that comprises a camera and a button, wherein the button is configurable to enable the first visitor to sound a chime; configuring the camera of the doorbell such that the camera comprises a field of view; using the camera of the doorbell to take a first image to calibrate the doorbell system by establishing a baseline of an entryway; sending the first image from the doorbell to the remote computing device, wherein the remote computing device comprises an electronic display; displaying the first image on the electronic display of the remote computing device; selecting a first detection zone within the first image, wherein the first detection zone comprises a portion of the first image, and wherein the first detection zone comprises a two-dimensional representation of an area in which the doorbell system is configured to respond to motion detection; configuring the doorbell system to ignore a second visitor located within the field of view but located outside of the first detection zone, wherein ignoring the second visitor comprises not sending a first picture of the second visitor to the remote computing device; and configuring the doorbell system to send a second picture of a third visitor to the remote computing device in response to determining that the third visitor is located inside of the first detection zone.

A button of the doorbell can be configurable to enable a visitor to sound a chime (e.g., a speaker or another sound output device located inside a building). Some chimes are digital and others are mechanical.

Several embodiments include using a doorbell system to detect a first visitor. The doorbell system can comprise a doorbell and a remote computing device such as a smartphone, laptop, tablet, or desktop computer. Some embodiments include obtaining the doorbell that comprises a camera, a speaker, a microphone, and a button, wherein the button is configurable to enable the first visitor to sound a chime. Methods can include configuring the camera of the doorbell such that the camera comprises a field of view, and using the camera of the doorbell to take a first image. The doorbell system can send the first image from the doorbell to the remote computing device, which can comprise an electronic display (e.g., a computer screen). Some methods include displaying the first image on the electronic display of the remote computing device and prompting a user of the remote computing device to select a first detection zone within the first image. The first detection zone can comprise a portion of the first image.

Some embodiments include using the camera of the doorbell to take a second image, analyzing the second image to detect a first indication of the first visitor, and determining that the first indication of the first visitor in the second image is located outside of the first detection zone. The doorbell system can then decide not to send an alert to the remote computing device in response to determining that the first indication of the first visitor in the second image is located outside of the first detection zone. The alert can be configured to notify the remote computing device regarding a presence of the first visitor.

Analyzing the second image can include determining if there are signs of seeing the visitor in the second image. In some embodiments, the system looks for indications of motion in the image. In several embodiments, the system compares a baseline image (e.g., the first image) to the second image in order to determine if there are areas in the second image that include an object (e.g., a visitor) that was not present in the first image. Thus, some embodiments use computer vision to identify the presence of a visitor within the detection zone.

Several embodiments include using the camera of the doorbell to take a third image, and analyzing the third image to detect a second indication of the first visitor. Methods can include determining that the second indication of the first visitor in the third image is located inside of the first detection zone, and then sending the alert to the remote computing device in response to determining that the second indication of the first visitor in the third image is located inside of the first detection zone. In some embodiments, the alert is not sent unless other conditions are met.

Some embodiments include displaying a grid pattern on the first image on the electronic display of the remote computing device such that the first image is divided into at least ten sections by lines that cross each other. The lines can include horizontal and vertical lines that intersect at 90-degree angles. The lines can be straight, curved, and/or wavy. The sections can be equal in size and shape. The sections can be irregular and can vary in size. Methods can include preventing the sending of the alert to the remote computing device until after detecting an indication of a visitor in at least two, four, and/or eight of the sections. Methods can include preventing the sending of the alert to the remote computing device until after detecting an indication of a visitor in at least twenty percent and/or forty percent of the sections.

Several methods include selecting the first detection zone within the first image by the user touching at least a first subset of the sections on the electronic display of the remote computing device. Touching the first subset causes the first subset to be included in the first detection zone. The electronic display can be a touchscreen of a computer such as a smartphone or tablet. The user of the remote computing device can swipe the touchscreen to select a detection zone. Touching or clicking on each section is not necessary in some embodiments.

Some methods include causing a second subset of the sections to be included in the first detection zone in response to the first subset comprising an outer perimeter that surrounds the second subset. For example, the user can swipe the touchscreen to form a closed shape. All sections at least partially located within the closed shape can be included in the first detection zone.

Some embodiments include two, three, four, and/or many detection zones, which can be independent, interdependent, separate, and/or overlapping. Detecting a visitor in a first detection zone can lead to immediately notifying the user of the remote computing device. Detecting a visitor in a second detection zone can include additional safeguards against false-positives.

Several embodiments include selecting the first detection zone by displaying the first image on the electronic display and then recording which areas of the first image the user indicates to include in the first detection zone by touching the electronic display. Some methods include calculating a percentage of the first detection zone that includes the second indication of the first visitor. The percentage can be a percentage of the area of the detection zone or can be a percentage of the sections. Methods can include sending the alert to the remote computing device in response to determining that the percentage of the detection zone exceeds a first threshold. The first threshold can be 10 percent or 30 percent.

Some methods include sending a picture of a visitor to the remote computing device, and then waiting to open audio and/or video communication between the visitor and the user of the remote computing device until after determining a percentage of the first detection zone that includes an indication of the third visitor and calculating a time in which the indication of the third visitor has been in the first detection zone. Embodiments can include opening the audio communication between the third visitor and the user of the remote computing device in response to the percentage of the detection zone and the time. The percentage can be at least 10 percent and/or at least 25 percent. The time can be at least one second and/or at least four seconds.

Indications of the visitor can be motion indications. Motion indications can be identified by comparing a baseline image to another image. The baseline image can be taken when a visitor is not present. Other indications of the visitor can include presence indications (e.g., indications that at least a portion of the visitor is present in the section being analyzed).

Some embodiments include selecting the first detection zone by displaying the first image on the electronic display and then recording which areas of the first image the user indicates to include in the first detection zone by touching the electronic display. The remote computing device can prompt the user to select areas and/or sections to include in a detection zone. In some embodiments, the remote computing device does not display a grid on the calibration image, but the remote computing device prompts the user to select a portion of the image as the detection zone and/or prompts the user to select a portion of the image to exclude from the detection zone.

Several embodiments include calculating a percentage of the first detection zone that includes the second indication of the first visitor and/or calculating a time in which the second indication of the first visitor has been in the first detection zone. Methods can include sending the alert to the remote computing device in response to the percentage of the detection zone and the time.

The images used in several methods do not necessarily include the entire field of view of the camera of the doorbell. In some embodiments, the field of view comprises a portion, and the first image, the second image, and the third image consist of the portion of the field of view. Methods can further comprise selecting the portion of the field of view. In some embodiments, the images include the entire field of view of the camera.

The portion of the field of view can be consistent between the calibration image and subsequent images to help the system accurately analyze the images. In some methods, the first image, the second image, and the third image consist of at least a portion of the field of view, wherein the method further comprises analyzing the portion of the field of view.

Although doorbells can be used anywhere, in some embodiments, the camera of the doorbell is configured to record a portion of an entryway, wherein the first image, the second image, and the third image show the portion of the entryway.

In some embodiments, the doorbell and the remote computing device are not physically coupled. Methods can include wirelessly sending the first image from the doorbell to the remotely located computing device. Some embodiments include sending the first image directly from the doorbell to the remote computing device without an intermediary server. This direct transmission can be via wires or can be wireless. Several embodiments include intermediary servers that enable the doorbell to communicate with the remote computing device via the Internet.

Methods for using a doorbell system to detect a first visitor can include obtaining the doorbell that comprises a camera and a button. The camera can be configured such that the camera has a field of view. Several embodiments include using the camera of the doorbell to take a first image to calibrate the doorbell system and sending the first image from the doorbell to the remote computing device. Some methods include displaying the first image on the electronic display of the remote computing device. Several embodiments include prompting a user of the remote computing device to select a first detection zone within the first image. The first detection zone can comprise at least a portion of the first image. Methods can include configuring the doorbell system to ignore a second visitor located within the field of view but located outside of the first detection zone. Ignoring the second visitor can include failing to send a notification regarding the second visitor to the remote computing device (e.g., even if the doorbell otherwise responds to the second visitor, for example, by flashing an LED light).

The system can ignore a visitor by not sending an alert regarding the visitor to the remote computing device. In some embodiments, the system does not send an alert to the remote computing device in response to the presence of the visitor outside the detection zone but inside the field of view of the camera and/or inside the image. Even when the system ignores a visitor, the system can record the visitor for future reference by the user. The user can then request to see visitors who were inside the field of view but not shown via alerts (because they were ignored due to being located outside the detection zone). Thus, the system can ignore the visitor in response to the presence of the visitor outside the detection zone, but the system can later provide information regarding the visitor to the user in response to a user's request. Sending an alert can include sending a push notification to a smartphone.

Several methods include configuring the doorbell system to send a picture of a third visitor to the remote computing device in response to determining that the third visitor is located inside of the first detection zone as defined based on the first image. The first detection zone can be a two-dimensional zone rather than a three-dimensional area of the physical world. Thus, the detection zone can be decoupled from proximity.

Some method embodiments include enabling audio and/or video communication between a visitor and the user of the remote computing device in response to detecting at least one indication of the visitor in at least two of the sections and/or in at least ten of the sections. In some embodiments, the sections with the detected indications must be adjacent to each other.

Some embodiments include selecting the first detection zone within the first image by prompting the user of the remote computing device to indicate a first area by touching the first area on the electronic display of the remote computing device; recording the first area; and excluding the first area from the first detection zone. Methods can include ignoring a visitor in response to the visitor being located in the first area. The user can select areas for exclusion from the detection zone and can select areas for inclusion in the detection zone.

Doorbells can comprise a motion sensor. Some embodiments include an infrared motion sensor. Methods can comprise ignoring the second visitor in response to disabling the motion sensor during a predetermined time period. The predetermined time period can be during certain hours of the day or night. The time period can be when the user is home or away from home (e.g., where the doorbell is mechanically coupled to the home). As used herein, "home" can include any type of stationary structure configured to shelter people (e.g., an office building).

Several embodiments include using a doorbell system to detect at least one visitor. Methods can include configuring the camera of the doorbell such that the camera comprises a field of view and using the camera of the doorbell to take a first image to calibrate the doorbell system by establishing a baseline of an entryway. The baseline can be used to define a state without any visitors. Methods can include sending the first image from the doorbell to the remote computing device and displaying the first image on an electronic display of the remote computing device.

Some methods include prompting a user of the remote computing device to select a first detection zone within the first image. The first detection zone can comprise a portion of the first image. The first detection zone can include a two-dimensional representation of an area in which the doorbell system is configured to respond to motion detection. Several embodiments include displaying a grid pattern on the first image on the electronic display of the remote computing device such that the first image is divided into at least six sections by lines that cross each other. The system can be configured to identify the first detection zone within the first image by the user choosing at least a first subset of the sections on the electronic display of the remote computing device. Choosing the first subset can cause the first subset to be included in the first detection zone.

Several methods include configuring the doorbell system to ignore a second visitor located within the field of view but located outside of the first detection zone. Some embodiments include configuring the doorbell system to send a picture of a third visitor to the remote computing device in response to at least some of the following factors: (1) determining that the third visitor is located inside of the first detection zone as defined based on the first image, (2) determining that at least a predetermined percentage (e.g., thirty percent) of the first detection zone includes motion or visitors indicators, and (3) determining that the first detection zone has included the indicators for at least a predetermined amount of time (e.g., three seconds).

Some methods include automatically excluding an area from a detection zone. Automatic exclusion can occur without the user excluding a specific area (even if the user configures settings that later lead to automatic exclusions). In some embodiments, indications indicative of motorized vehicles (e.g., cars, trucks, vans) are automatically excluded from a detection zone. These automatic calibration innovations can take many forms. Several methods include automatically excluding an area from a detection zone in response to detecting an object (e.g., a motorized vehicle) moving through the first detection zone at more than twenty-five miles per hour. Some methods include automatically excluding an area in response to detecting an infrared signal indicative of a motorized vehicle.

Some embodiments include automatically excluding an area from the first detection zone in response to at least some of the following items: (1) detecting an indication of a visitor in a detection zone; (2) enabling audio communication between the doorbell and the remote computing device in response to detecting the indication of the visitor; and (3) using the doorbell to detect an absence of sound indicative of speaking. The area that is excluded can be the area in which the indication was detected.

The disclosure includes methods for using a doorbell that is configurable to wirelessly communicate with a remotely located computing device. Methods can include obtaining the doorbell that comprises a speaker, a microphone, a camera, and a button, wherein the doorbell is configurable to enable a visitor to sound a chime. Methods can also include sending a wireless notification from the doorbell to the remotely located computing device regarding a presence of the visitor. As well, methods can include entering a network connection mode prior to sending the wireless notification, wherein the network connection mode comprises using the remotely located computing device to scan a barcode.

In some embodiments, the network connection mode comprises detecting a first wireless network having a name and a password, wherein the barcode represents a doorbell identification code that is associated with the doorbell, and wherein the network connection mode further comprises using the doorbell identification code to verify whether the remotely located computing device is authorized to communicate with the doorbell, wherein the network connection mode comprises creating a second wireless network, and the network connection mode comprises transmitting the name and the password of the first wireless network directly from the remotely located computing device to the doorbell via the second wireless network to enable the doorbell to communicate with the remotely located computing device via the first wireless network, wherein the method comprises the doorbell directly communicating with the remotely located computing device via the second wireless network prior to the doorbell indirectly communicating with the remotely located computing device via the first wireless network.

In some embodiments, the barcode comprises a Quick Response Code. In some embodiments, the second wireless network is created by the doorbell. In some embodiments, the second wireless network is created by the remotely located computing device.

Some methods include communicatively coupling the remotely located computing device to a WiFi router and the doorbell via the first wireless network.

Some methods include detecting multiple wireless networks and automatically selecting the first wireless network for communicating between the doorbell and the remotely located computing device, wherein prior to the automatic selection the remotely located computing device is connected to the first wireless network; and receiving authorization to use the remotely located computing device to communicate with the doorbell in response to pressing the button for a predetermined amount of time. In some embodiments the predetermined amount of time is at least twenty seconds.

Several embodiments include obtaining the doorbell that comprises a speaker, a microphone, a camera, and/or a button (e.g., wherein the doorbell is configurable to enable a visitor to sound a chime); receiving a wireless notification from the doorbell with the remotely located computing device regarding a presence of the visitor; and/or entering a network connection mode prior to receiving the wireless notification. The network connection mode can comprise using the remotely located computing device to scan a barcode.

In some embodiments, the network connection mode comprises detecting a first wireless network having a name and a password. Scanning the barcode can comprise using the remotely located computing device to take a picture of the barcode, and then using the remotely located computing device to analyze the barcode to extract a doorbell identification code from the barcode. Embodiments can comprise transmitting the doorbell identification code from the remotely located computing device to a remote computer, and receiving authorization from the remote computer for the remotely located computing device to configure the doorbell. In some embodiments, receiving authorization from the remote computer for the remotely located computing device to configure the doorbell can then occur in response to the remote computer receiving the doorbell identification code from the remotely located computing device. Configuring the doorbell can comprise transmitting the password of the first wireless network from the remotely located computing device to the doorbell.

The disclosure also includes methods for using a doorbell that is configurable to wirelessly communicate with a remotely located computing device. Methods can include obtaining the doorbell that comprises a speaker, a microphone, a camera, and a button, wherein the doorbell is configurable to enable a visitor to sound a chime. Methods can also include sending a wireless notification from the doorbell to the remotely located computing device regarding a presence of the visitor. As well, methods can include entering a network connection mode prior to sending the wireless notification, wherein the network connection mode comprises using the remotely located computing device to scan a Quick Response Code.

In some embodiments, the network connection mode comprises detecting a first wireless network having a name and a password, wherein the Quick Response Code represents a doorbell identification code that is associated with the doorbell, and wherein the network connection mode further comprises using the doorbell identification code to verify whether the remotely located computing device is authorized to communicate with the doorbell.

Methods can include scanning the Quick Response Code via a camera on the remotely located computing device, wherein the doorbell is obtained from a package, and wherein the Quick Response Code is located along one of a surface of the package and along a surface of the doorbell.

In some embodiments the network connection mode comprises communicatively coupling the remotely located computing device with the doorbell, and the network connection mode further comprises transmitting the name and the password of the first wireless network directly from the remotely located computing device to the doorbell to enable the doorbell to communicate with the remotely located computing device via the first wireless network, wherein the method comprises the doorbell directly communicating with the remotely located computing device prior to the doorbell indirectly communicating with the remotely located computing device via the first wireless network.

In some embodiments communicatively coupling the remotely located computing device with the doorbell comprises communicatively coupling the remotely located computing device with the doorbell via a cable.

Some methods include receiving authorization to use the remotely located computing device to communicate with the doorbell in response to pressing the button for a predetermined amount of time.

Methods can include scanning the Quick Response Code via a camera on the remotely located computing device, wherein the doorbell is obtained from a package, and wherein the Quick Response Code is located along a surface of the package.

As well, methods can include scanning the Quick Response Code via a camera on the remotely located computing device, wherein the Quick Response Code is located along a surface of the doorbell. In some embodiments, the doorbell identification code comprises at least 24 characters.

Furthermore, the disclosure includes methods for using a doorbell that is configurable to wirelessly communicate with a remotely located computing device. Methods include obtaining the doorbell that comprises a speaker, a microphone, a camera, and a button, wherein the doorbell is configurable to enable a visitor to sound a chime. Methods can also include sending a wireless notification from the doorbell to the remotely located computing device regarding a presence of the visitor. As well, methods can include entering a network connection mode prior to sending the wireless notification, wherein the network connection mode comprises detecting a first wireless network having a name and a password.

In some embodiments, the network connection mode further includes after detecting the first wireless network, then using the remotely located computing device to scan a barcode, wherein the barcode represents a doorbell identification code that is associated with the doorbell; after using the remotely located computing device to scan the barcode, then using the doorbell identification code to verify whether the remotely located computing device is authorized to communicate with the doorbell; after using the doorbell identification code to verify whether the remotely located computing device is authorized to communicate with the doorbell, then communicatively coupling the remotely located computing device with the doorbell; after communicatively coupling the remotely located computing device with the doorbell, then transmitting the name and the password of the first wireless network directly from the remotely located computing device to the doorbell to enable the doorbell to communicate with the remotely located computing device via the first wireless network; and communicating directly with the remotely located computing device prior to the doorbell indirectly communicating with the remotely located computing device via the first wireless network.

Methods can further include, after communicating with the remotely located computing device, detecting multiple wireless networks and automatically selecting the first wireless network for communicating between the doorbell and the remotely located computing device, wherein prior to the automatic selection the remotely located computing device is connected to the first wireless network.

In some embodiments detecting the first wireless network having the name and the password occurs in response to pressing the button for a predetermined amount of time, the method further comprising, after pressing the button for a predetermined amount of time, then receiving authorization to use the remotely located computing device to communicate with the doorbell.

In some embodiments the remotely located computing device is communicatively coupled with the doorbell via a second wireless network that is created by the doorbell. As well, in some embodiments the remotely located computing device is communicatively coupled with the doorbell via a second wireless network that is created by the remotely located computing device.

In some embodiments the network connection mode comprises detecting a first wireless network having a name and a password, wherein the barcode represents a doorbell identification code that is associated with the doorbell, and wherein the network connection mode further comprises using the doorbell identification code to verify whether the remotely located computing device is authorized to communicate with the doorbell, and the network connection mode comprises transmitting the name and the password of the first wireless network directly from the remotely located computing device to the doorbell to enable the doorbell to communicate with the remotely located computing device via the first wireless network.

The disclosure also includes a doorbell system comprising a doorbell; a button coupled to the doorbell; and a temperature sensor coupled to the doorbell. In some embodiments, the doorbell system further includes a wireless temperature communication emitted by the doorbell; a remote computing device communicatively coupled to the doorbell; and a temperature indication displayed by the remote computing device in response to the wireless temperature communication being emitted by the doorbell.

In some embodiments, the doorbell system further includes a speaker coupled to the doorbell; a microphone coupled to the doorbell; and a printed circuit board electrically coupled to the temperature sensor and located at least partially inside the doorbell. In embodiments, the temperature sensor can comprise an infrared thermometer.

As well, some embodiments can further include a memory coupled to the printed circuit board. The memory can comprise a first temperature data and a second temperature data. The memory can store at least one of the first temperature data and the second temperature data for at least a predetermined time.

Furthermore, some embodiments can include a camera coupled to the doorbell, and a video displayed by the remote computing device. The video can be taken by the camera. In some embodiments, the system can further include a visitor notification received by the remote computing device. The visitor notification can include the temperature indication.

As well, some embodiments can include a heating element coupled to the doorbell. The heating element can heat an interior portion of the doorbell in response to a temperature measurement of the temperature sensor being below a temperature threshold.

In some embodiments, the doorbell system can a humidity sensor coupled to the doorbell. As well, some embodiments can include a wireless humidity communication emitted by the doorbell; a remote computing device communicatively coupled to the doorbell; and a humidity indication displayed by the remote computing device in response to the wireless humidity communication being emitted by the doorbell.

The disclosure also includes a doorbell system comprising a doorbell; a button coupled to the doorbell; and a heating element coupled to the doorbell. Some embodiments can include a remote computing device communicatively coupled to the doorbell.

In some embodiments, the doorbell system can further include a wireless command emitted by the remote computing device. The heating element can activate in response to the remote computing device emitting the wireless command. The heating element can be located within an interior portion of the doorbell. As well, in some embodiments, the heating element can activate in response to a temperature of the interior portion of the doorbell being less than a predetermined temperature.

Furthermore, some embodiments can include an electrical power system of the building electrically coupled to the heating element to provide primary power to the heating element. As well, some embodiments can include a battery electrically coupled to the heating element to provide backup power to the heating element when the electrical power system is disabled.

In some embodiments, the heating element comprises an electrical resistor that generates heat by passing electric current through a conductive path. The heating element can comprise nickel and chromium. The conductive path can pass through ceramic.

Some embodiments of the doorbell system can further include a fan coupled to the doorbell. The fan can activate in response to a temperature of the interior portion of the doorbell being greater than a predetermined temperature.

The disclosure also includes a method of using a doorbell system to regulate temperature of a doorbell. The doorbell system can comprise a temperature sensor coupled to the doorbell, and a heating element coupled to the doorbell. The method can include determining, by the doorbell, a first temperature of an inside portion of the doorbell; and heating, by the heating element, the inside portion of the doorbell in response to the first temperature being less than a first predetermined temperature.

The first predetermined temperature can comprise at least one of a second predetermined temperature and a third predetermined temperature that is less than the second predetermined temperature. Methods can further include heating, by the heating element, the inside portion of the doorbell in response to both the first temperature being less than the second predetermined temperature and the doorbell being electrically coupled to an electrical power system of a building; and heating, by the heating element, the inside portion of the doorbell in response to both the first temperature being less than the third predetermined temperature and the doorbell being electrically coupled to a battery. Methods can also include determining, by the doorbell, a second temperature of the inside portion of the doorbell; and deactivating the heating element in response to determining the second temperature is greater than a second predetermined temperature that is greater than the first predetermined temperature.

As well, methods can include continuing to heat, by the heating element, the inside portion of the doorbell in response to determining the second temperature is less than the second predetermined temperature. The second predetermined temperature can comprise at least one of a third predetermined temperature and a fourth predetermined temperature that is less than the third predetermined temperature. Furthermore, methods can also further include deactivating the heating element in response to both the second temperature being greater than the third predetermined temperature and the doorbell being electrically coupled to an electrical power system of a building; and deactivating the heating element in response to both the second temperature being greater than the fourth predetermined temperature and the doorbell being electrically coupled to a battery.

In embodiments, the doorbell system comprises a remote computing device that is communicatively coupled to the doorbell. Methods can further include heating the inside portion of the doorbell in response to the remote computing device receiving an input.

Methods can also include receiving a second temperature with the remote computing device, wherein the second temperature is retrieved from a third party database not associated with the doorbell system; and heating, by the heating element, the inside portion of the doorbell in response to the second temperature being less than the first predetermined temperature.

The doorbell system can include an infrared sensor electrically coupled to the doorbell. Methods can include determining, by the doorbell, a body temperature of a visitor; determining, by the doorbell, a second temperature of an exterior location relative to the doorbell; and heating, by the heating element, the inside portion of the doorbell in response to a difference between body temperature and the second temperature being greater than a predetermined differential.

The doorbell system can also include a fan coupled to the doorbell. Accordingly, methods can include cooling, by the fan, the inside portion of the doorbell in response to the first temperature being greater than a second predetermined temperature that is greater than the first predetermined temperature.

The disclosure also includes a method of using a doorbell system to determine a temperature. The doorbell system can comprise a doorbell and a temperature sensor coupled to the doorbell. Methods can include determining, by the doorbell, a first temperature of an exterior location relative to the doorbell; and initiating a communication session with a remote computing device that is communicatively coupled to the doorbell. The communication session can comprise a first indication of the first temperature.

Methods can include emitting an audible notification with a speaker of a chime that is communicatively coupled to the doorbell. The audible notification can comprise an audible indication of the first temperature.

In embodiments, emitting the audible notification with the speaker of the chime occurs in response to the remote computing device receiving an input. Methods can also include storing, by the doorbell, the first temperature of the exterior location at a first time, and storing, by the doorbell, a second temperature of the exterior location at a second time that occurs after the first time.

As well, methods can include sending the first and second temperatures from the doorbell to the remote computing device in response to receiving, by the doorbell, a request from the remote computing device. Furthermore, methods can include determining, by the doorbell, a second temperature of an inside portion of the doorbell.

The first temperature can be indicative of a temperature of the exterior location at a first previous time and the second temperature can be indicative of a temperature of the inside portion at a second previous time. The first temperature and the second temperature can be stored within a memory of the doorbell for a predetermined time period. Methods can also include determining, by the doorbell, a third temperature of the exterior location at a first present time. The first previous time can occur prior to the first present time. Methods can also include determining, by the doorbell, a fourth temperature of the inside portion of the doorbell at a second present time. The second previous time can occur prior to the second present time.

As well, methods can include receiving an audible input with the remote computing device, wherein the audible input is spoken by a user and the audible input comprises a request for at least one of the first temperature and the second temperature; determining whether at least one of the first temperature and the second temperature is stored within the memory in response to receiving the audible input; and emitting an audible response with the remote computing device in response to determining that at least one of the first temperature and the second temperature is stored within the memory. In some embodiments, the audible response comprises at least one of the first temperature and the second temperature.

Furthermore, methods can include receiving, by the doorbell system, a temperature notification parameter from the remote computing device; and initiating the communication session with the remote computing device in response to the doorbell system determining that the temperature notification parameter has been met. Some methods can include initiating the communication session with the remote computing device in response to the doorbell system determining that one of a predetermined time of day and a predetermined temperature has been met. Some methods can include initiating the communication session with the remote computing device in response to the doorbell system determining that a predetermined location of the remote computing device has been met.

Methods can also include initiating the communication session with the remote computing device in response to the doorbell system determining that the first temperature is one of equal to or greater than a first predetermined temperature and equal to or less than a second predetermined temperature. The communication session can comprise at least one of a first alert that the first temperature is equal to or greater than the first predetermined temperature and a second alert that the first temperature is equal to or less than the second predetermined temperature.

As well, methods can include receiving an audible input with the doorbell system. In some embodiments, the audible input is spoken by a user. Methods can also include emitting an audible response with the doorbell system in response to receiving the audible input. In some embodiments, the audible response comprises an audible indication of the temperature.

In some embodiments, receiving the audible input with the doorbell system comprises receiving the audible input with a microphone of the remote computing device. As well, in some embodiments, emitting the audible response with the doorbell system comprises emitting the audible response with a speaker of the remote computing device.

In some embodiments, the doorbell system comprises a microphone coupled to the doorbell, a speaker coupled to the doorbell, and a button coupled to the doorbell. As well, in some embodiments, receiving the audible input with the doorbell system comprises receiving the audible input with the microphone in response to receiving an indication of a button press of the button. Furthermore, in some embodiments, emitting the audible response with the doorbell system comprises emitting the audible response with the speaker.

In some embodiments, the doorbell system comprises a humidity sensor coupled to the doorbell. Accordingly, methods can include determining, by the doorbell, a humidity that comprises at least one of a first humidity of an exterior location relative to the doorbell and a second humidity of an inside portion of the doorbell. The communication session can comprise a second indication of the humidity.

Several embodiments include methods to communicate with electronic devices via electrical power lines. Electrical power lines can be embedded within walls of buildings to supply electricity to power outlets. Users can plug various devices into power outlets to enable the devices to receive electricity from the electrical power lines. The electrical power lines can be electrically coupled to a power supply such as a public utility system. Although electrical power lines are often designed primarily to supply electricity, electrical power lines can also be configured to communicate data between electronic devices. In some cases, systems can provide Internet access via electrical power lines. Electrical power lines can include cables, wires, and conductors. Electrical power lines can be made of a conductive metal.

Several methods for communicating with an electronic device comprise obtaining a first network receiver module. The first network receiver module can be configured to communicate with a network connection module through electrical power lines. The electrical power lines can be configured to couple a first power outlet and a second power outlet. Electrical power lines can couple many different power outlets in a building with a power supply. The network connection module can be coupled to the first power outlet to electrically couple the network connection module to the electrical power lines. The network connection module can be configured to connect to the Internet (e.g., to enable electronic devices that are plugged into power outlets to communicate with remote computing devices such as computers, tablets, and smartphones).

Some embodiments include coupling the first network receiver module to the second power outlet to electrically couple the first network receiver module to the electrical power lines. Methods can include communicating between the network connection module and the first network receiver module via the electrical power lines. Several methods include coupling the first network receiver module to a first electronic device such that the first electronic device is configured to receive a first data via the electrical power lines.

In several embodiments, the first electronic device comprises a camera. Methods can include recording a video using the camera and sending the video from the first electronic device to the first network receiver module. Then, methods can include sending the video from the first network receiver module to the network connection module via the electrical power lines. Then, some methods comprise sending the video from the network connection module to at least one of the Internet and a telecommunication network. Many different types of telecommunications networks can be used, including cellular networks to enable communicating wirelessly with smartphones.

Power outlet standards can vary from country to country. Many different types of power outlets can be used. Power outlets can enable connecting to an alternating current (AC) power supply in a building. In some embodiments, the second power outlet comprises a light socket, and the method further comprises screwing the first electronic device into the light socket such that the first electronic device is capable of receiving electricity and the first data from the light socket.

In several embodiments, the second power outlet comprises a first wire and a second wire that protrude outside of a building (e.g., such as doorbell wires). Methods can further comprise electrically coupling the first electronic device to the first wire and the second wire such that the first electronic device is capable of receiving electricity and the first data from the first wire and the second wire. The first electronic device can comprise a doorbell configured to detect a visitor.

Methods can include using a doorbell to detect a visitor. Several methods include sending a digital notification regarding the visitor from the first network receiver module to the network connection module via the electrical power lines. Some methods include sending the digital notification regarding the visitor from the network connection module to a remote computing device via the Internet. The remote computing device can be any type of computer or phone (e.g., a laptop, a tablet, a smartphone).

Several embodiments include more than one network receiver module. The network receiver modules can communicate with each other (e.g., in a peer to peer format). Data from one network receiver module can influence the behavior of an electronic device coupled to another network receiver module. For example, if a first electronic device detects that a door is unlocked, a second electronic device can turn on a light and initiate temperature modification. Data can be transmitted between network receiver modules via the electrical power lines.

In some embodiments, the network connection module acts as a smart hub to coordinate and/or control the behavior of multiple electronic devices that are coupled to network receiver module. Thus, a smart hub can control multiple electronic devices that communicate with the smart hub via electrical power lines.

In some embodiments, simply plugging a network receiver module into a power outlet is sufficient to enable a network connection module to communicate with the network receiver via the electrical power lines. This "plug and play" system can reduce installation difficulty and time.

In several embodiments, each network receiver module can act as a repeater to strengthen the building's network (e.g., by increasing the effective range of the network).

Encryption can be used to increase the security of the communication system. Encryption can be particularly helpful if the building is used by unrelated parties (such as is typically the case in an apartment building).

Some methods include obtaining a second network receiver module. The second network receiver module can be configured to communicate with the network connection module through the electrical power lines. Methods can include coupling the second network receiver module to a third power outlet to electrically couple the second network receiver module to the electrical power lines. Methods can include coupling the second network receiver module to a second electronic device such that the second electronic device is capable of communicating with the network connection module.

Many different types of electronic devices can be used with the methods described herein. The first electronic device and/or the second electronic device can comprise at least one of a light, a doorbell, a refrigerator, a door lock, a sprinkler, an air conditioner, and a heater. Some methods include sending the first data through the electrical power lines from the first electronic device to the network connection module. Methods can include sending a second data through the electrical power lines from the second electronic device to the network connection module. Electronic devices can include printed circuit boards (PCBs).

Several methods include updating a first setting of the first electronic device based on the second data from the second electrical device. Settings can include the brightness of a light, a notification setting of a doorbell, a temperature of a refrigerator, a lock/unlock status of a lock, the water output of a sprinkler, a watering time of a sprinkler, the cooling behavior of an air conditioner, and/or the heating behavior of a heater.

Some embodiments include using the network connection module to send a first signal through the electrical power lines. Methods can also include using the first network receiver module to check for the first signal from the network connection module in response to at least one of the first network receiver module and the first electronic device detecting electricity from the electrical power lines. Several embodiments include establishing communication between the network connection module and the first network receiver module in response to the first network receiver module detecting the first signal. Some embodiments include using the first network receiver module to emit a second signal through the electrical power lines.

In some embodiments, methods include using the second network receiver module to detect the second signal, and then automatically establishing communication between the second network receiver module and the first network receiver module through the electrical power lines in response to the second network receiver module detecting the second signal. Several embodiments include transmitting a second data between the first network receiver module and the second network receiver module, and then altering a behavior of at least one of the first network receiver module and the second network receiver module in response to the second data.

The disclosure includes a doorbell system comprising a doorbell, a button coupled to the doorbell, and a pressure sensor coupled to the doorbell. In some embodiments, the doorbell system includes a weather detection system coupled to the doorbell, the weather detection system comprising at least one of a camera and a microphone. As well, in some embodiments, the doorbell system includes a printed circuit board electrically coupled to the pressure sensor and located at least partially inside the doorbell.

Even still, the doorbell system can include a communication device communicatively coupled to the doorbell and a wireless weather communication emitted by the doorbell in response to at least one of the pressure sensor, camera, and microphone detecting a weather event.

In some embodiments, the communication device comprises a home automation hub. Accordingly, embodiments of the doorbell system can further include a weather notification received by the home automation hub in response to the wireless weather communication being emitted by the doorbell.

As well, in some embodiments, the communication device includes a remote computing device. As such, the doorbell system can further include a weather indication displayed by the remote computing device in response to the wireless weather communication being emitted by the doorbell.

In some embodiments, the doorbell system further includes a memory coupled to the printed circuit board. The memory can include weather data that is stored for at least a predetermined time.

Even still, in some embodiments, the doorbell system further includes at least one of a weather video captured by the camera and a weather sound captured by the microphone.

As well, in some embodiments, the doorbell system further includes a meteorology sensor coupled to the doorbell. The meteorology sensor can include at least one of a humidity sensor, a precipitation sensor, a temperature sensor, a thunder and lightning sensor, a wind speed sensor, and a wind direction sensor.

The disclosure also includes a method of using a doorbell system to detect a weather event. The doorbell system can comprise a weather sensor coupled to a doorbell. Methods can include determining, by the doorbell system, an occurrence of a weather event. Methods can also include transmitting, by the doorbell system, weather data to a remote server that is remotely located with respect to the doorbell system in response to the doorbell system determining the occurrence of the weather event, wherein the weather data is associated with the weather event.

The doorbell system can comprise a weather detection system coupled to the doorbell. The weather detection system can comprise at least one of a camera and a microphone. Methods can also include recording, by the weather detection system, at least one of audio and video associated with the weather event in response to the doorbell system determining the occurrence of the weather event.

In some embodiments, transmitting, by the doorbell system, the weather data to the remote server can comprise transmitting, by the doorbell system, at least one of the audio and the video to the remote server in response to the weather detection system recording at least one of the audio and the video. In some embodiments, the weather data is used by the remote server to confirm the occurrence of the weather event.

Methods can also include initiating a communication session with a remote computing device that is communicatively coupled to the doorbell. The communication session can comprise an indication of the weather event.

The disclosure also includes a method of using a doorbell system to receive an indication of a weather event. The doorbell system can comprise a doorbell coupled to a building. Methods can include receiving, by the doorbell system, weather data from a third party source communicatively coupled to the doorbell system and remotely located with respect to the building. As well, methods can include activating an alert communication system of the doorbell in response to receiving the weather data from the third party source.

The alert communication system can comprise a speaker coupled to the doorbell. As well, activating the alert communication system can comprise emitting, from the speaker, an audible notification of the indication of the weather event.

Even still, the alert communication system can comprise a light coupled to the doorbell. In some embodiments, activating the alert communication system can comprise illuminating the light.

As well, the alert communication system can comprise a communication device communicatively coupled to the doorbell and located within the building. In some embodiments, activating the alert communication system can comprise at least one of illuminating a light of the communication device and emitting an audible notification of the weather event from the communication device.

The disclosure also includes a method of using a doorbell system to receive an indication of a weather event. The doorbell system can comprise a doorbell coupled to a building. Methods can include receiving, by the doorbell system, weather data from a third party source communicatively coupled to the doorbell system and remotely located with respect to the building. As well, methods can include transmitting, by the doorbell system, a first indication of the weather data to a communication device that is communicatively coupled to the doorbell.

In some embodiments, the communication device comprises a home automation hub located within the building. Methods can include transmitting a second indication of the weather data to a peripheral device that is communicatively coupled to the home automation hub in response to the doorbell system transmitting the first indication of the weather data to the communication device.

Methods can also include emitting, by the communication device, at least one of an audible alert and a visual alert. In some embodiments, transmitting, by the doorbell system, the first indication of the weather data to the communication device comprises initiating a communication session with a remote computing device that is communicatively coupled to the doorbell. The communication session can comprise an indication of the weather event.

The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

FIG. 13 illustrates a perspective view of the outer housing from FIG. 5, according to some embodiments.

FIG. 14 illustrates a front view of a mounting bracket coupled to a wall, according to some embodiments.

FIG. 15 illustrates a partial, side view of the mounting bracket, according to some embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

The following patent is incorporated herein by reference: U.S. Pat. No. 7,583,191, entitled SECURITY SYSTEM AND METHOD FOR USE OF SAME, and filed Nov. 14, 2006.

Introduction

Communication systems can provide a secure and convenient way for a remotely located individual to communicate with a person who is approaching a sensor, such as a proximity sensor or motion sensor, or with a person who rings a doorbell, which can be located in a doorway, near an entrance, or within 15 feet of a door. Some communication systems allow an individual to hear, see, and talk with visitors who approach at least a portion of the communication system and/or press a button such as a doorbell's button. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include iPhone, iPad, iMac, MacBook Air, and MacBook Pro made by Apple Inc. Communication between a remotely located person and a visitor can occur via the Internet, cellular networks, telecommunication networks, and wireless networks.

Figure 1:
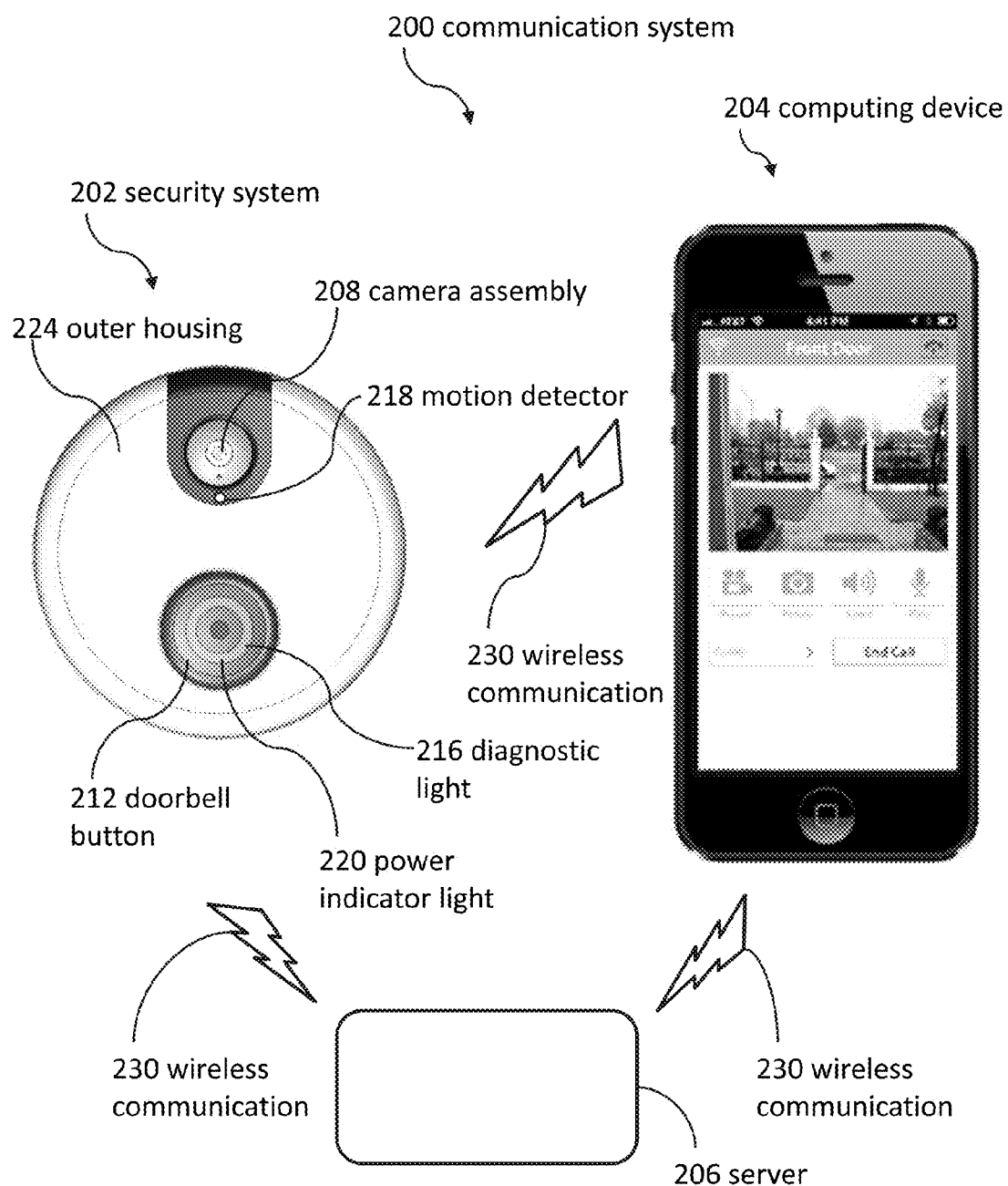
FIG. 1 illustrates a front view of a communication system, according to some embodiments.

FIG. 1 illustrates a front view of a communication system embodiment. The communication system 200 can include a security system 202 (e.g., a doorbell) and a computing device 204. Although the illustrated security system 202 includes many components in one housing, several security system embodiments include components in separate housings. The security system 202 can include a camera assembly 208 and a doorbell button 212. The camera assembly 208 can be a video camera, which in some embodiments, is a webcam. The security system 202 can include a diagnostic light 216 and a power indicator light 220. In some embodiments, the diagnostic light 216 is a first color (e.g., blue) if the security system 202 and/or the communication system 200 is connected to a wireless internet network and is a second color (e.g., red) if the security system 202 and/or the communication system 200 is not connected to a wireless internet network. In some embodiments, the power indicator 220 is a first color if the security system 202 is connected to a power source. The power source can be power supplied by the building to which the security system 202 is attached. In some embodiments, the power indicator 220 is a second color or does not emit light if the security system 202 is not connected to the power source.

While the figures show the camera assembly 208 as structurally integral to the security system 202, it should be appreciated that the camera assembly 208 can be structurally separate or remotely located from the security system 202. In this regard, the security system 202 can be implemented with or without a camera assembly 208 and the security system 202 can thereby be further communicatively coupled to another camera assembly that is remotely located to the security system 202. In this regard, the security system 202 can be communicatively coupled to other security systems 202 or other remote camera assemblies 208.

The security system 202 (e.g., a doorbell) can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals can be used to make the outer housing 224 water resistant or waterproof. The security system 202 can be electrically coupled to a power source, such as wires electrically connected to a building's electrical power system. In some embodiments, the security system 202 includes a battery for backup and/or primary power.

Wireless communication 230 can enable the security system 202 (e.g., a doorbell) to communicate with the computing device 204. Some embodiments enable communication via cellular and WiFi networks. Some embodiments enable communication via the Internet. Several embodiments enable wired communication between the security system 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202 can initiate voice calls or send text messages to a computing device 204.

Software

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

The computing device 204 can run software with a graphical user interface. The user interface can include icons or buttons. In some embodiments, the software is configured for use with a touch-screen computing device such as a smartphone or tablet.

Figure 2:
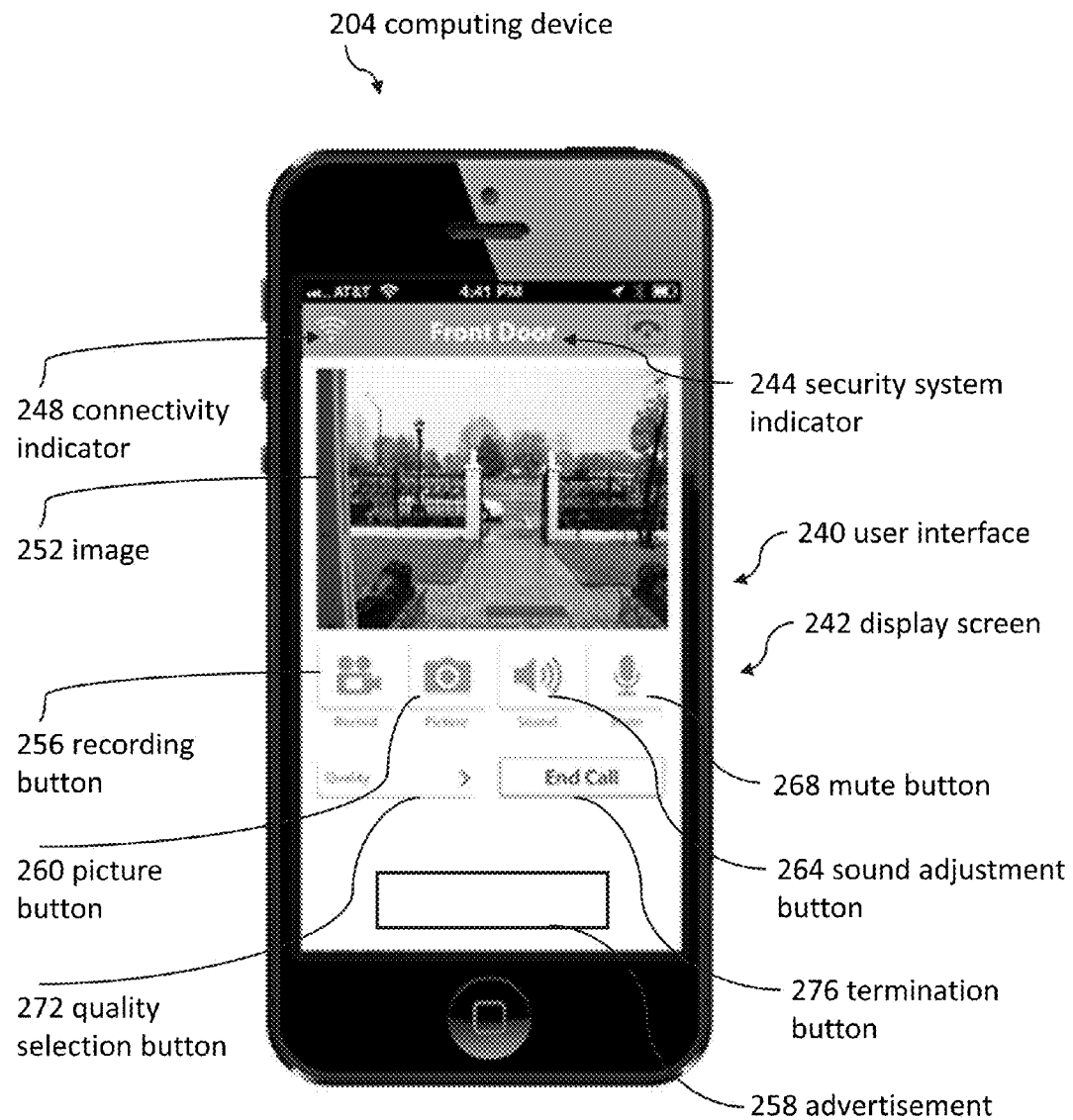
FIG. 2 illustrates a computing device running software, according to some embodiments.

FIG. 2 illustrates a computing device 204 running software. The computing device 204 in FIG. 2 is a cellular telephone, but embodiments can use diverse types of computing devices. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the internet, and/or a cellular network. The connectivity indicator 248 can alert the user if the computing device 204 has lost its connection with the security system 202; the security system 202 has been damaged; the security system 202 has been stolen; the security system 202 has been removed from its mounting location; the security system 202 lost electrical power; and/or if the computing device 204 cannot communicate with the security system 202. In some embodiments, the connectivity indicator 248 alerts the user of the computing device 204 by flashing, emitting a sound, displaying a message, and/or displaying a symbol.

In some embodiments, if the security system 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the security system 202 and the computing device. In some embodiments, information from the security system 202 is stored by the remote server 206. In several embodiments, information from the security system 202 is stored by the remote server 206 until the information can be sent to the computing device 204, uploaded to the computing device 204, and/or displayed to the remotely located person via the computing device 204. The remote server 206 can be a computing device that stores information from the security system 202 and/or from the computing device 204. In some embodiments, the remote server 206 is located in a data center.

In some embodiments, the server 206 is a remote computer. The remote computer can be located remotely relative to the computing device 204. A company that makes security systems 202 can control the remote computer in order to authorize remote computing devices 204 to configure security systems 202 (e.g., doorbells, camera assemblies). Configuring security systems 202 can include helping security systems 202 connect to wireless networks.

In some embodiments, the computing device 204 and/or the remote server 206 attempts to communicate with the security system 202. If the computing device 204 and/or the remote server 206 is unable to communicate with the security system 202, the computing device 204 and/or the remote server 206 alerts the remotely located person via the software, phone, text, a displayed message, and/or a website. In some embodiments, the computing device 204 and/or the remote server 206 attempts to communicate with the security system 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the security system 202. In several embodiments, the server 206 can initiate, control, and/or block communication between the computing device 204 and the security system 202.

In several embodiments, a user can log into an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

In some embodiments, the user interface 240 displays an image 252 such as a still image or a video of an area near and/or in front of the security system 202. The image 252 can be taken by the camera assembly 208 and stored by the security system 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system 202. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202 to enable the camera assembly 208 to provide sufficient visibility (even at night).

In some embodiments, buttons include diverse means of selecting various options, features, and functions. Buttons can be selected by mouse clicks, keyboard commands, and touching a touch screen. Many embodiments include buttons that can be selected without touch screens.

In some embodiments, the user interface 240 includes a quality selection button, which can allow a user to select the quality and/or amount of the data transmitted from the security system 202 to the computing device 204 and/or from the computing device 204 to the security system 202. For example, if the data transmission capability of the wireless communication is insufficient to transmit high-resolution video from the security system 202 to the computing device 204, the user might select a lower resolution video setting. In some cases, the user might select a still image rather than video or a single still image every period of time where the period of time can be more than 0.1 seconds and/or less than 60 seconds; more than 0.5 seconds and/or less than 30 seconds; or more than 1 second and/or less than 15 seconds. In some cases, the security system 202 might only send a single still image to the computing device 204.

Some embodiments include facial recognition such that the camera assembly 208 waits until the camera assembly 208 has a good view of the person located near the security system 202 and then captures an image of the person's face. Facial recognition can be used to establish a visitor's identity.

Several embodiments can establish a visitor's identity by detecting a signal from a device associated with the visitor. Examples of such a signal include Bluetooth, WiFi, RFID, NFC, and/or cellular telephone transmissions.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include a termination button 276 to end communication between the security system 202 and the computing device 204. In some embodiments, the termination button 276 ends the ability of the person located near the security system 202 (i.e., the visitor) to hear and/or see the user of the computing device 204, but does not end the ability of the user of the computing device 204 to hear and/or see the person located near the security system 202.

In some embodiments, a button 276 is both an answer button (to accept a communication request from a visitor) and is a termination button (to end communication between the security system 202 and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system detects a visitor (e.g., senses indications of a visitor). Once the user interface 240 opens, the user can see and/or hear the visitor even before "answering" or otherwise accepting two-way communication, in several embodiments.

Some method embodiments include detecting a visitor with a security system. The methods can include causing the user interface to display on a remote computing device 204 due to the detection of the visitor (e.g., with or without user interaction). The methods can include displaying video from the security system and/or audio from the security system before the user accepts two-way communication with the visitor. The methods can include displaying video from the security system and/or audio from the security system before the user accepts the visitor's communication request. The methods can include the computing device simultaneously asking the user if the user wants to accept (e.g., answer) the communication request and displaying audio and/or video of the visitor. For example, in some embodiments, the user can see and hear the visitor via the security system before opening a means of two-way communication with the visitor.

In some embodiments, the software includes means to start the video feed on demand. For example, a user of the computing device might wonder what is happening near the security system 202. The user can open the software application on the computing device 204 and instruct the application to show live video and/or audio from the security device 202 even if no event near the security system 202 has triggered the communication.

In several embodiments, the security device 202 can be configured to record when the security device 202 detects movement and/or the presence of a person. The user of the computing device 204 can later review all video and/or audio records when the security device 202 detected movement and/or the presence of a person.

Some embodiments include a media roll or other means to record a certain amount of data and then record over some of the data, such as the oldest data or low-priority data. For example, some systems record over data that is older than seven days, 14 days, or one month. Some security systems can be configured to continuously record video and/or audio to a media roll, which can be viewed on a remotely located computing device.

Figure 3:
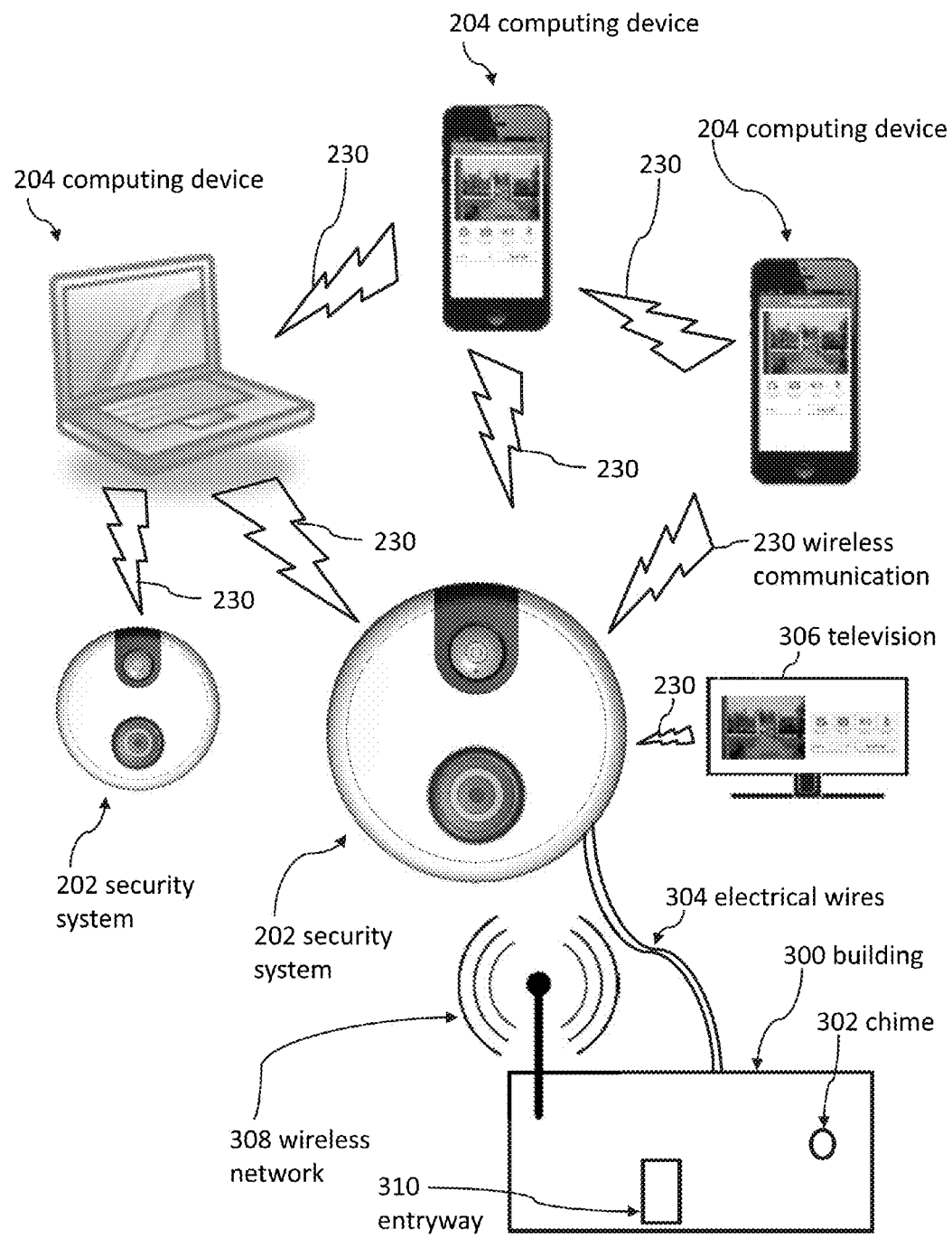
FIG. 3 illustrates an embodiment in which a security system is connected to a building, according to some embodiments.

In several embodiments, the system (e.g., software, computing device 204, security system 202 in FIG. 1) can be configured to allow user customization of where, when, and/or how notifications (e.g., doorbell communication requests) are received on one or more computing devices (e.g., 204 in FIG. 3). In some embodiments, the system can be configured to only notify a user's smartphone at certain times of day or night. In some embodiments, the system can be configured to only notify a user's smartphone when the smartphone is in a predetermined proximity to the building (e.g., within 10 feet, within 50 feet, within 100 feet). In some embodiments, the system can be configured to only notify a user's smartphone when the smartphone is at or near a specified location. In some embodiments, the system can be configured to only notify a user's smartphone when the smartphone is connected to a home network. In some embodiments, the system can be configured to only notify a first user's smartphone when a second user's smartphone is present or absent. In some embodiments, the system can be configured to send only text messages at certain times of day (rather than sending other types of notifications, such as launching an app and then displaying an image). In some embodiments, the system can be configured to send one-way audio or one-way video (rather than two-way audio and/or two-way video) if the user is away from home. In some embodiments, the system can be configured to block notifications during certain times, when the user is in certain places (e.g., in a meeting, in the building to which the security system is attached), and/or if the user prefers not to receive notifications.

Referring now to FIGS. 1 and 2, in several embodiments, software, the computing device 204, and/or the user interface 240 enables a user to control the doorbell's features and functions. In some embodiments, the software, the computing device 204, and/or the user interface 240 enables a user to turn the security system 202 off and/or turn the ringing function off such that pressing the doorbell button 212 will not emit a sound, such as a chime, inside the building. Example chimes include sounds emitted from door chimes made by HeathCo LLC under the brand Heath Zenith. Turning the security system 202 off and/or turning the ringing function off can be helpful when the user does not want people inside the building to be bothered by doorbell sounds (e.g., chimes). For example, people might be sleeping inside the home.

The user interface 240 can include a button to silence the doorbell sound and to place the security system 202 in Silent Mode. In some embodiments of Silent Mode, pressing the doorbell button 212 will not send a signal to a chime located inside the building for the chime to emit a sound. In some embodiments, the chime is a speaker (such as a speaker made by Bose Corporation) located inside of the building, which can be a home, office, warehouse, or other structure.

In some embodiments, a security system 202 and/or a computing device 204 communicates with a baby monitor. If the baby monitor detects indicators that a baby is sleeping (e.g., the presence of a baby that is not moving, as sensed by an IR motion detector) the communication system can disable the doorbell sound to avoid disturbing the baby's sleep. Some embodiments work the same way except that the baby is replaced by a person, such as an adult.

Several embodiments include a motion detector 218. The motion detector 218 can sense whether a visitor is located near an entryway.

Several embodiments include sending a notification to the user regarding the presence of the visitor even if the visitor has not pressed the doorbell button 212 to "ring" the doorbell (e.g., to sound a chime inside of the building). In several embodiments, if motion is detected by the doorbell for five seconds and the doorbell button 212 has not been pressed (e.g., within the last five seconds, within the last 30 seconds, within the last 60 seconds), then the doorbell automatically sends a notification to the user regarding the presence of the visitor. The notification can be sent to a remotely located computing device 204 and/or via a chime 302 (shown in FIG. 3).

In several embodiments, if the doorbell button 212 has been pressed (e.g., within the last 5 seconds, within the last 30 seconds, within the last 60 seconds), then motion alerts are canceled for three minutes. For example, methods can include blocking notifications based on motion detection for three minutes (or for at least 60 seconds, at least three minutes, and/or less than ten minutes) from the time the doorbell button 212 has been pressed.

In some embodiments, the user interface 240 has a button to make the doorbell ring (e.g., make the chime emit a sound inside of the building). The user can ring the doorbell by pressing a button on the computing device 204.

Some embodiments include administrative privileges. These privileges can include administrative abilities and the ability to alter settings. The administrative privileges can be password protected. The administrator can add and remove notification recipients and/or computing devices 204. For example, a user who sets up the communication system 200 by initially pairing a computing device 204 with a security system 202 can be given administrative privileges and the highest priority (as explained herein). This administrative user can give permissions and priorities to other users and computing devices 204 (e.g., as explained in the context of FIG. 17). This administrative user can choose settings (e.g., as explained in the context of FIG. 18). This administrative user can give or transfer administrative rights to another user and/or computing device 204.

Several embodiments include a mode to address overly frequent notifications. This mode is called Peaceful Mode. For example, on Halloween, the security system 202 may sense doorbell button 212 presses, motion, proximity, and/or sound more frequently than the user wants to be notified. Some embodiments include a maximum notification setting (e.g., the maximum number of notifications that will be communicated to the user per unit of time). If the maximum number of notifications is exceeded, then the system can enter Peaceful Mode. In several embodiments, the maximum number of notifications is three notifications per hour; four notifications per hour; five notifications per hour; seven notifications per hour; ten notifications per hour; four notifications per day; seven notifications per day; seven notifications per 24 hours; or fifteen notifications per 24 hours. In some embodiments, the user can set the maximum number of notifications and/or the time period over which the notifications are counted towards a maximum number. In some embodiments, the user can set the maximum number of notifications via the software, a website configured to communicate with the server 206, and/or a user interface 240.

In some embodiments of Peaceful Mode, the system stops alerting the user via the computing device 204. For example, a visitor pressing the doorbell button 212 could cause a sound (e.g., a chime) to be emitted inside or near the building but would not cause the computing device 204 to notify the user.

In some embodiments of Peaceful Mode, the system stops alerting the user via the chime located inside of the building. For example, a visitor pressing the doorbell button 212 could cause the computing device 204 to notify the user, but would not cause a sound (e.g., a chime) to be emitted inside or near the building.

In some embodiments of Peaceful Mode, the system stops alerting the user via the chime located inside of the building and via the computing device 204. For example, a visitor pressing the doorbell button 212 would not cause a sound (e.g., a chime) to be emitted inside or near the building and would not cause the computing device 204 to notify the user.

In some embodiments of Peaceful Mode, the system does not automatically stop alerting the user via the computing device and does not automatically stop alerting the user via the chime, but instead, once the maximum number of notifications is exceeded, the software, computing device 240, and/or user interface 240 asks the user if the user wants to enter Peaceful Mode, turn off notifications via the computing device 240, and/or turn off notifications via the sounds emitted inside and/or near the building (e.g., chimes). In several embodiments, the software, computing device 240, and/or user interface 240 asks the user how long the user wants to turn off notifications via the computing device 240, and/or turn off notifications via the sounds emitted inside and/or near the building. In some embodiments, notifications are turned off for at least 15 minutes and/or less than 4 hours; at least 5 minutes and/or less than one hour; or at least 30 minutes and/or less than 24 hours.

In some embodiments of Peaceful Mode, Peaceful Mode does not turn off notifications, but instead reduces the volume, frequency, and/or intensity of notifications. In some embodiments of Peaceful Mode, the chime volume can be reduced by at least 30 percent, at least 50 percent, or at least 70 percent. In some embodiments of Peaceful Mode, the alerts to the computing device 204 switch to Non-auditory Mode such that the computing device 204 does not ring or send auditory alerts, but instead sends alerts such as vibrations (with little or no sound) and/or visual alerts (e.g., messages on the user interface 240).

Referring now to FIG. 2, in several embodiments, software of the computing device includes a snapshot feature, which enables a user to take an image or short video (e.g., less than five seconds, less than 10 seconds) of the visitor. The image and/or short video is stored in the computing device 204 and/or in a remote location and is retrievable by the computing device.

In some embodiments, an image and/or video of each visitor is automatically stored in a visitor log retrievable by the user. The image and/or video of each visitor can be automatically triggered by the security system detecting a visitor.

Data sent between a security system and a computing device can be secured via encryption, transport layer security, secure sockets layer, and/or cryptographic protocols. Data regarding a security system that is sent from one computing device to another computing device can be secured via encryption, transport layer security, secure sockets layer, and/or cryptographic protocols.

Many security system embodiments and method embodiments are configured to work with any computing device (e.g., a cellular phone, tablet, laptop, desktop computer). Software applications can be configured to work with particular operating systems. In some cases, making software applications compatible with all operating systems and computing devices can be challenging. Some embodiments open a website (e.g., on the display screen 242 shown in FIG. 2) in response to a user accepting a push notification (e.g., regarding the presence of a visitor detected by a doorbell).

A simple software application can be used to launch the website in response to the user accepting a push notification. Many diverse computing devices are capable of opening websites, which can enable a website-based system to be compatible with a broad range of computing devices.

Website-based systems can be used for pool monitoring and elderly monitoring applications. For example, a security system 202 can be used to monitor a pool 5030 (shown in FIG. 50). An unwanted visitor into the pool 5030 (or into a zone 5034 around the pool 5030) can trigger a push notification to a computing device 204 (shown in FIG. 51). The user can respond to the push notification by accepting communication with the security system 202, which can result in opening a website in response to the user accepting the push notification. The website 5558 can show an image taken by a camera of the security system 202 and can be configured to enable the user to hear the visitor and talk with the visitor.

Server Interaction

Referring now to FIG. 1, in some embodiments, the server 206 controls communication between the computing device 204 and the security system 202, which can be a doorbell with a camera, a microphone, and a speaker. In several embodiments, the server 206 does not control communication between the computing device 204 and the security system 202.

Server 206 control can prevent unwanted communication between the computing device 204 and the security system 202. For example, if the computing device 204 is stolen from a user, the user can contact a server administrator to block communication between the security system 202 and the computing device 204. The user can provide an authentication means, such as a password or user information, so the server administrator knows the user is in fact authorized to make changes. In some embodiments, the server 206 can update any of the settings and options described herein. In some embodiments, the user can update any of the settings and options described herein via a website. The server 206 can be used to register users and update settings of the computing device 204, the security system 202, and/or the communication system 200.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the security system 202 can store information and statistics regarding visitors and usage.

In some embodiments, this information can be transferred, forwarded, and/or sent to other computing devices and/or servers. A user can record a communication (e.g., video and audio) with a visitor and then can forward the communication to another person. The forwarded information can include additional information from the user such as a recorded message and/or a text message. For example, if one user talks with a visitor via a security system 202, the user can forward the conversation to the person that the visitor was seeking.

High-Level System Overview

FIG. 3 illustrates an embodiment in which a security system 202 is connected to a building 300, which can include an entryway 310. Electrical wires 304 can electrically couple the security system 202 to the electrical system of the building 300 such that the security 202 can receive electrical power from the building 300.

A wireless network 308 can allow devices to wirelessly access the internet. The security system 202 can access the internet via the wireless network 308. The wireless network 308 can transmit data from the security system 202 to the internet, which can transmit the data to remotely located computing devices 204. The internet and wireless networks can transmit data from remotely located computing devices 204 to the security system 202. In some embodiments, a security system 202 connects to a home's WiFi.

As illustrated in FIG. 3, one computing device 204 (e.g., a laptop, a smartphone, a mobile computing device, a television) can communicate with multiple security systems 202. In some embodiments, multiple computing devices 204 can communicate with one security system 202.

In some embodiments, the security system 202 can communicate (e.g., wirelessly 230) with a television 306, which can be a smart television. The television 306 can display any of the items shown in FIGS. 28 to 38, although many other types of computing devices (e.g., smart phones, tablets, laptops) can also display any of the items shown in FIGS. 28 to 38. Users can view the television 306 to see a visitor and/or talk with the visitor.

Joining a Wireless Network

Although some security system embodiments include using electricity from electrical wires 304 of a building 300, many security system embodiments communicate with computing devices 204 via a wireless network 308 that allows security systems 202 to connect to a regional and sometimes global communications network. In some embodiments, the security system 202 communicates via a wireless network 308 with a router that enables communication with the Internet, which can enable communication via diverse means including telecommunication networks. In this way, a security system 202 can communicate with computing devices 204 that are desktop computers, automobiles, laptop computers, tablet computers, cellular phones, mobile devices, and smart phones.

In some embodiments, a security system (e.g., a doorbell) needs to know which wireless network to join and needs to know the wireless network's password. A computing device, such as a smartphone, can provide this information to the security system.

The following method is used in some embodiments. (Some embodiments include orders that are different from the following order.) First, the computing device (e.g., a smartphone) creates an ad hoc wireless network. Second, the user opens software (such as an app) on the computing device. When the security system is in Setup Mode, the security system can automatically join the computing device's ad hoc network. Third, the user can utilize the software to select the wireless network that the security system should join and to provide the password of the wireless network (e.g., of the router) to the security system.

Diverse methods can be used to connect a security system (e.g., a doorbell) to a wireless network (such as a wireless network of a home). Several embodiments include transmitting an identifier (e.g., a name) to a security system, wherein the identifier enables the security system to identify the wireless network to which the security system should connect. Several embodiments include transmitting a password of the wireless network to the security system, wherein the password enables the security system to connect to the network. In some embodiments, a computing device (e.g., a smartphone) transmits the identifier and password.

In several embodiments, methods of connecting a security system (e.g., a doorbell) to a wireless network (e.g., a wireless network of a home or building) can include placing the security system in Setup Mode. Some security systems automatically go into Setup Mode upon first use, first receiving electrical power, first receiving electrical power after a reset button is pushed, first receiving electrical power after being reset, and/or when a reset button is pushed.

In some embodiments, a Setup Mode comprises a Network Connection Mode. Methods can comprise entering the Network Connection Mode in response to pressing the button for at least eight seconds. The Network Connection Mode can comprise detecting a first wireless network having a name and a password. The Network Connection Mode can comprise inputting a doorbell identification code into the remotely located computing device. The doorbell identification code can be associated with the doorbell. The Network Connection Mode can comprise using the doorbell identification code to verify whether the remotely located computing device is authorized to communicate with the doorbell. The Network Connection Mode can comprise the remotely located computing device creating a second wireless network (e.g., that emanates from the remotely located computing device). The Network Connection Mode can comprise transmitting the name and the password of the first wireless network directly from the remotely located computing device to the doorbell via the second wireless network to enable the doorbell to communicate with the remotely located computing device via the first wireless network. Methods can comprise the remotely located computing device directly communicating with the doorbell via the second wireless network prior to the doorbell indirectly communicating with the remotely located computing device via the first wireless network. For example, the wireless communication from the remotely located computing device can travel through the air directly to the doorbell. The wireless communication from the remotely located computing device can travel indirectly to the doorbell via a third electronic device such as a server.

Figure 51:
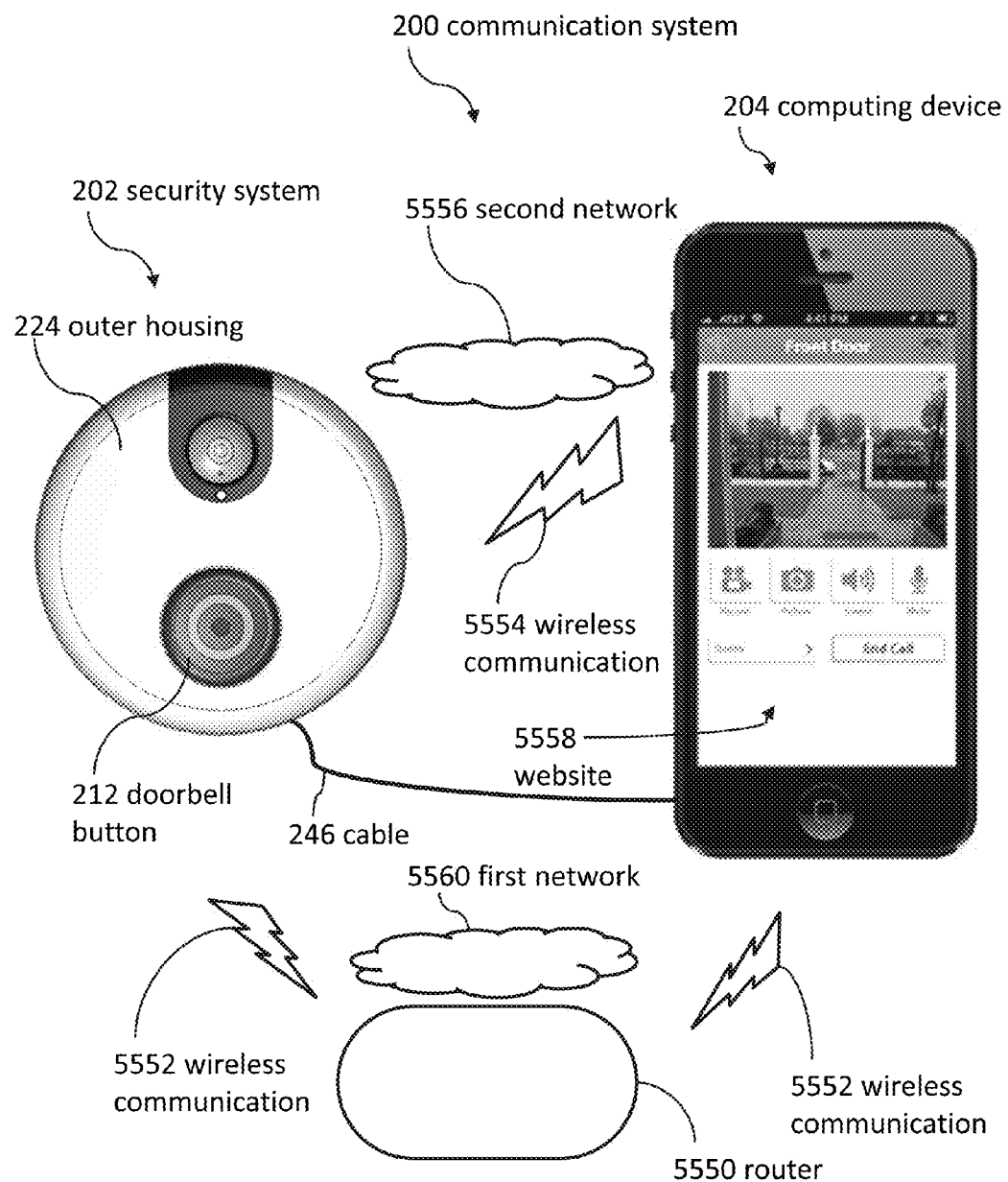
FIG. 51 illustrates a communication system with two wireless networks, according to some embodiments.

FIG. 51 illustrates a communication system with two wireless networks 5556, 5560. The first wireless network 5560 can emanate from a router 5550. The second wireless network can emanate from the computing device 204 (e.g., a cellular telephone). The first wireless network 5560 can enable indirect wireless communication 5552 between the computing device 204 and the security system 202 via the router 5550 or via a server 206 (shown in FIG. 1). The second wireless network 5556 can enable direct wireless communication 5554 between the computing device 204 and the security system 202. The computing device 204 can send a password and a name of the first wireless network 5560 to the security system 202 via the second wireless network 5556. In some embodiments, the second wireless network 5556 does not require a password.

In some embodiments, a security system creates its own wireless network (e.g., WiFi network) with a recognizable network name (e.g., a service set identifier). Software can provide setup instructions to the user via a computing device, in some cases, upon detecting a new wireless network with the recognizable network name. The instructions can inform the user how to temporarily join the security system's wireless network with the computing device. The user can select and/or transmit the name and password of a target wireless network to the security system from the computing device. The security system can join the target wireless network (e.g., the wireless network of the building to which the security system is attached) and can terminate its own wireless network.

In some cases, the computing device can capture the name and password of the target network before joining the network of the security system. In some cases, the user enters the name and password of the target network into the computing device to enable the computing device to provide the name and password of the target network to the security system.

In some cases, the computing device recognizes the name of the network of the security system, automatically joins the network of the security system, and transmits the name and password of the target network to the security system. In some cases, these steps are preceded by launching software (on the computing device) configured to perform these steps and/or capable of performing these steps.

Methods can include the security system trying to joint an ad hoc network (or other wireless network) with a fixed network name or a network name based on an identifier of the security system (e.g., the serial number of the security system, the model number of the security system). The computing device can provide instructions to the user to temporarily setup the network (e.g., the ad hoc network) via the computing device. The network can have the fixed network name or the name based on the identifier. The security system can recognize the name and join the network. The computing device can use the network to transmit the name and password of a target network (e.g., the wireless network of the building to which the security system will be coupled) to the security system. The security system can use the name and password of the target network to join the target network.

In some embodiments, the computing device displays an image (e.g., a quick response code) that contains or communicates the name and password of the target network. The security system can use its camera and onboard software to scan and decode the image (to determine the name and password of the target network). The security system can use the name and password of the target network to join the target network.

The computing device can generate and display pulses of light (e.g., by flashing black and white images on the screen of the computing device). The security system can use its camera and software to analyze and decode the pulses of light. The pulses of light can contain the name and/or password of the wireless network. The security system can use the name and password of the target network to join the target network.

In some embodiments, only the password of the target network is given to the security system. The security system can use the password to test each detected wireless network until it identifies a wireless network to which it can connect using the password.

The computing device can generate and emit an audio signal that corresponds to the name and/or password of the target network. The security system can use its microphone and software to analyze and decode the audio signal to receive the name and/or password of the target network. The security system can use the name and password of the target network to join the target network.

In some embodiments, the computing device transmits the name and password of the target network to the security system via Morse code (e.g., using the doorbell button, using light pulses, using sound pulses).

In some embodiments, the security system can pair with the computing device via Bluetooth. The computing device can transmit the name and password of the target network to the security system (e.g., via Bluetooth). The security system can use the name and password of the target network to join the target network.

In several embodiments, the computing device transmits the name and/or password of the target network via infrared ("IR") communication (e.g., IR light) to the security system. The computing device can emit the IR communication via IR LEDs or IR display emissions. An infrared emission device (e.g., with an IR LED) can be electrically coupled to the computing device to enable the computing device to send IR communications. The security system can detect the IR communication via IR sensors. The security system can use the name and password of the target network to join the target network.

The remotely located computing device 204 can be placed very close to the doorbell (e.g., security system 202) to configure the doorbell 202, but then can communicate with the doorbell 202 from remote locations (e.g., from another portion of the building to which the doorbell is attached, from across a city, from across a country, from across the globe). In some embodiments, the remotely located computing device 204 is communicatively coupled to the doorbell 202 via a wire to enable the remotely located computing device 204 to help configure the doorbell. In several embodiments, the remotely located computing device 204 creates a wireless network 5556 to help configure the doorbell 202 while the doorbell 202 is within a communication range of the wireless network 5556. Once the doorbell 202 is configured, the wireless network 5556 created by the remotely located computing device 204 may no longer be necessary because the doorbell 202 can communicate with the remotely located computing device 204 via another wireless network 5560, which can include the Internet and cellular networks.

Some embodiments include using a doorbell 202 that is configurable to wirelessly communicate with a remotely located computing device 204. Embodiments can include obtaining the doorbell 202 that comprises a speaker, a microphone, a camera, and a button. The doorbell 202 can be configurable to enable a visitor to sound a chime. Several embodiments include detecting a first indication of the visitor; using the doorbell 202 to send a wireless notification to the remotely located computing device 204 regarding the visitor; and entering a network connection mode prior to sending the wireless notification. The first indication (and other indications) can be detected using the doorbell (e.g., via a sensor of the doorbell, via data sent to the doorbell).

In several embodiments, the network connection mode comprises using the doorbell 202 to detect a first wireless network 5560. Using the doorbell 202 to detect the first wireless network 5556 can include the doorbell 202 sensing the first wireless network (e.g., by searching for wireless networks that are within range of the doorbell). The doorbell 202 can also detect the first wireless network 5560 via data sent to the doorbell 202 (e.g., from the remotely located computing device 204). In some embodiments, the doorbell 202 detects the first wireless network 5556 when the doorbell 202 connects to the first wireless network 5560. Thus, the term "detect" is used herein in a very broad sense and can include direct detection and indirect detection (e.g., via another computer).

The first wireless network 5560 can comprise a first name and a first password. The network connection mode can comprise the remotely located computing device 204 creating a second wireless network 5556. In some embodiments, the network connection mode comprises the remotely located computing device 204 transmitting the first password of the first wireless network 5560 directly from the remotely located computing device 204 to the doorbell 202 via the second wireless network 5556 to enable the doorbell 202 to communicate with the remotely located computing device 204 via the first wireless network 5560. The doorbell 202 can directly communicate with the remotely located computing device 204 via the second wireless network 5556 prior to the doorbell 202 indirectly communicating with the remotely located computing device 204 via the first wireless network 5560. In some embodiments, the doorbell 202 indirectly communicates with the remotely located computing device 204 via a server, the Internet, a cellular communication network, and/or a wireless router 5550 that is not physically coupled to the doorbell or to the remotely located computing device.

Some embodiments include using the doorbell 202 to detect a proximity indication of the remotely located computing device 204; determining if the proximity indication meets a predetermined proximity threshold such that the proximity indication indicates that the remotely located computing device 204 is sufficiently close to the doorbell 202; and connecting the doorbell 202 to the second wireless network 5556 in response to the proximity indication meeting the predetermined proximity threshold. The proximity threshold can be a certain value or characteristic. In several embodiments, a proximity indication can meet a predetermined proximity threshold if the remotely located computing device 204 is within a predetermined distance of the doorbell 202. The distance can be 100 feet, 50 feet, 20 feet, 10 feet, and/or 5 feet.

Referring now to FIG. 51, in several embodiments, the remote computing device 204 is connected via a cable 246 (shown in FIG. 1) to the security system 202. For example, a user can plug the cable 246 into the back or side of the security system 202 to setup the security system 202. Once connected by the cable 246, the remote computing device 204 can provide a password for the first wireless network 5560 to the security system 202 and/or can perform the functions described herein in the context of the second wireless network 5556. For example, in several embodiments, the data transmission via the cable 246 replaces the second wireless network 5556.

Initiating Communication

Referring now to FIG. 3, in some embodiments, multiple computing devices are candidates to receive information from a security system. For example, a person might initiate a communication request by pressing the doorbell button 212 (shown in FIG. 1) or triggering a motion or proximity sensor. The security system can notify multiple remotely located computing devices at once. The security system might simultaneously notify a smartphone of a first homeowner, a tablet of a housekeeper, and a laptop located inside the building to which the security system is connected. In some embodiments, once the doorbell ring is answered by one computing device, communication between the security system and the other computing devices is terminated, maintained, or kept open so another user can also participate in the communication. For example, if a housekeeper answers the communication request initiated by the doorbell ring, the homeowner might be unable to join the communication because communication with her computing device was terminated or might have the option to join the communication. In some embodiments, computing devices are assigned a priority and computing devices with a higher priority can terminate the communication of lower priority devices. For example, the homeowner could answer the communication request later than the housekeeper, but the homeowner could terminate the communication between the security device and the housekeeper's computing device. In some embodiments, users can forward communication requests from one computing device to another computing device.

In some embodiments, multiple computing devices are notified in series regarding a communication request. For example, the communication request might initially go to a first remote computing device, but if the communication request is not answered within a certain period of time, the communication request might go to a second remote computing device. If the communication request is not answered, the communication request might go to a third remote computing device.

Figure 4:
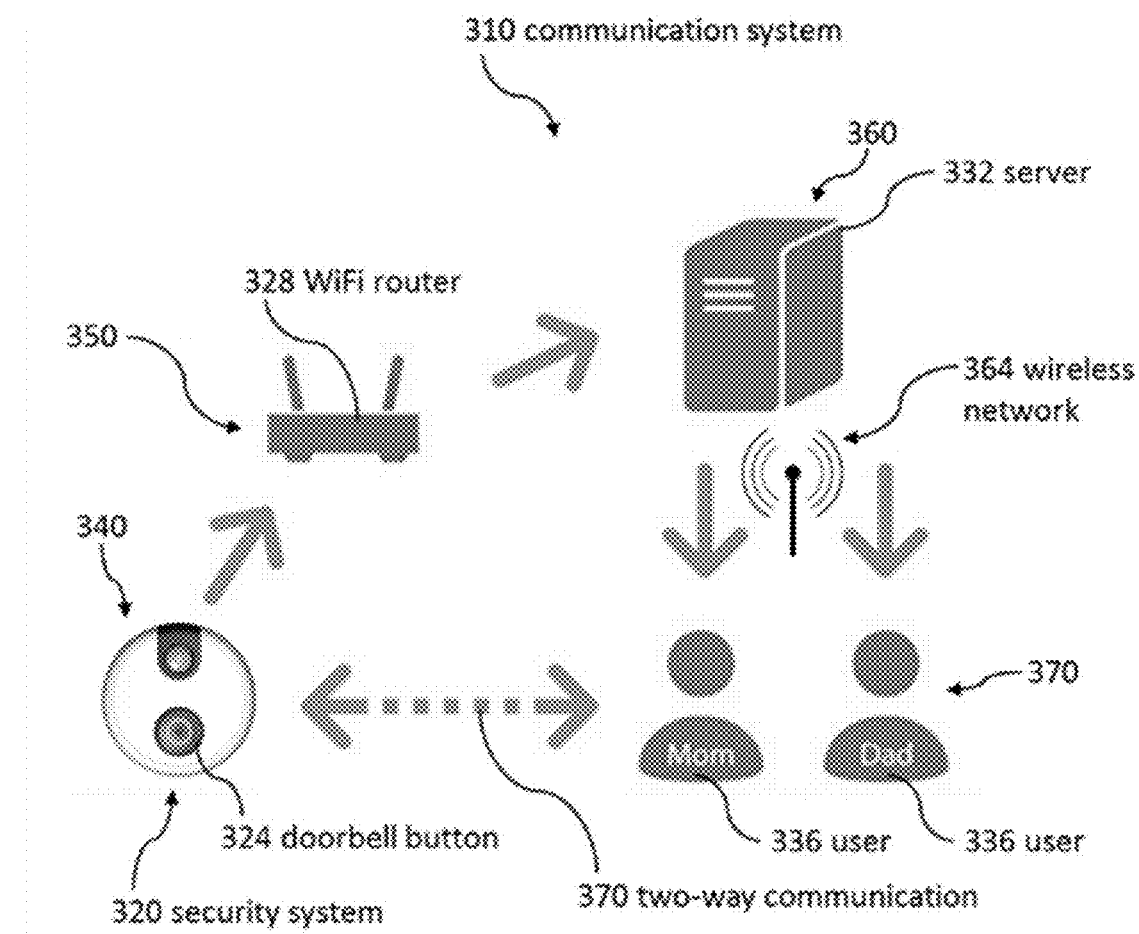
FIG. 4 illustrates a communication system that includes a security system, a doorbell button, a wireless router, a server, and users, according to some embodiments.

FIG. 4 illustrates a communication system 310 that includes a security system 320, a doorbell button 324, a WiFi router 328, a server 332, and users 336. In step 340, a visitor initiates a communication request by pressing the doorbell button 324 or triggering a motion or proximity sensor. The visitor can trigger the motion or proximity sensor by approaching the security system 320. In step 350, the security system 320 connects or otherwise communicates with a home WiFi router 328. In step 360, the server 332 receives a signal from the WiFi router 328 and sends video and/or audio to the users 336 via a wireless network 364. In step 370, the users see the visitor, hear the visitor, and talk with the visitor. Step 370 can include using a software application to see, hear, and/or talk with the visitor. The visitor and users 336 can engage in two-way communication 374 via the internet or other wireless communication system even when the visitor and the users 336 are located far away from each other. Some embodiments enable users to receive communication requests and communicate with visitors via diverse mobile communication standards including third generation ("3G"), fourth generation ("4G"), long term evolution ("LTE"), worldwide interoperability for microwave access ("WiMAX"), and WiFi.

In some cases, the users 336 utilize the communication system 310 to communicate with visitors who are in close proximity to the users 336. For example, a user 336 located inside her home can communicate with a visitor located just outside the home via the communication system 310.

Referring now to FIG. 3, some embodiments include a location detection system (e.g., GPS) to determine if the computing device 204 is located inside the home, near the home, within 100 feet of the home, within 100 feet of the security system 202, within 50 feet of the home, and/or within 50 feet of the security system 202, in which case the computing device 204 is considered in Close Mode. In some embodiments, the computing device 204 is considered in Close Mode if the computing device 204 is connected to a wireless network 308 of the building to which the security system 202 is coupled. In several embodiments, the computing device 204 is considered in Close Mode if the computing device 204 and the security system 202 are connected to the same wireless network 308. If the computing device 204 is not in Off Mode and not in Close Mode, then the computing device 204 is in Away Mode, in which the computing device 204 is considered to be located remotely from the building 300.

In several embodiments, the computing device 204 can behave differently in Close Mode than in Away Mode. In some embodiments, the computing device 204 will not notify the user of visitors if the computing device 204 is in Close Mode. In several embodiments, Close Mode silences alerts, which can include precluding and/or eliminating the alerts. Instead, the user might have to listen for typical indications of a visitor such as the ring of a traditional doorbell. Once the computing device 204 enters Away Mode, the computing device 204 can notify the user of the visitor. In some embodiments, the computing device 204 notifies the user regarding the visitor if the computing device 204 is in Close Mode or Away Mode.

In several embodiments, the building's 300 doorbell chime is silenced when the computing device 204 is configured to alert the user. In some embodiments, the building's 300 doorbell chime emits sound and the computing device 204 is configured to alert the user.

In several embodiments, the user can decline a communication request by selecting via the user interface 240 a pre-recorded message to be played by the security system 202. The pre-recorded message can include audio and/or video content. Some embodiments can provide the user with options for playing a pre-recorded message on demand, and/or automatically playing a pre-recorded message under user-specified conditions. Examples of conditions that can be specified include time of day, user location, facial recognition or non-recognition of visitors, and/or number of recent visitors. In some embodiments, a pre-recorded message can interrupt two-way communications, which can resume after delivery of the message. In some embodiments, a pre-recorded message can be delivered without interrupting two-way communications.

Figure 11:
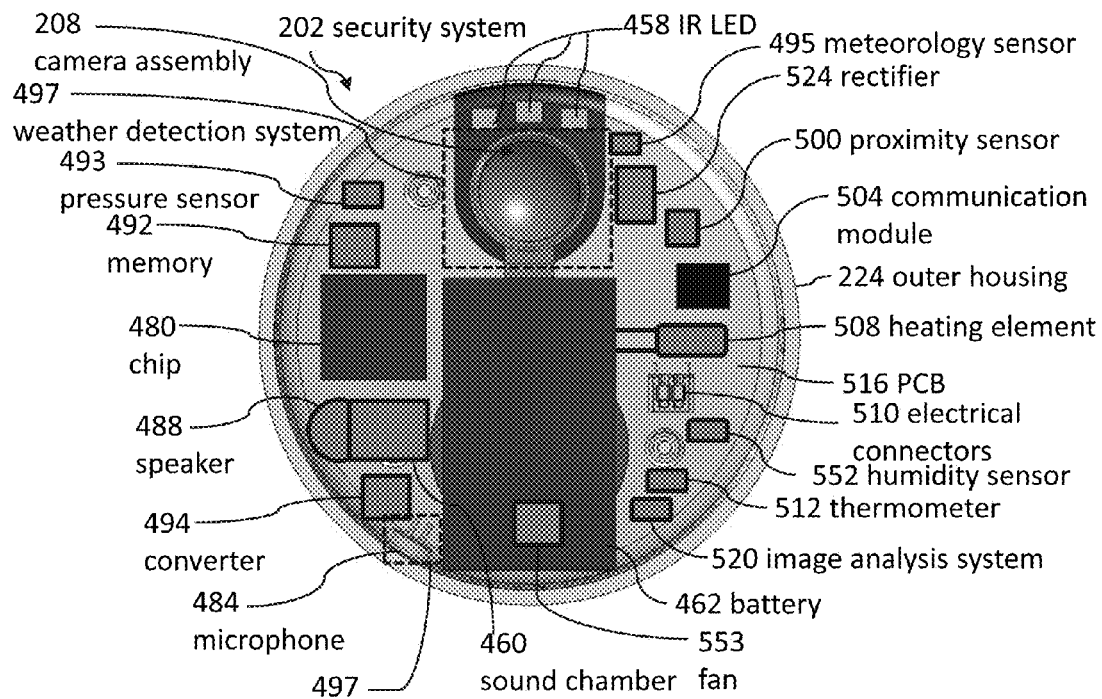
FIG. 11 illustrates a back view of the security system from FIG. 5 without a mounting bracket, according to some embodiments.

In some embodiments, the security system 202 includes a memory 492 (shown in FIG. 11). If the security system 202 cannot communicate with the computing device 204 and/or with the server 206 (shown in FIG. 1), the memory 492 of the security system 202 can store a recorded message and/or video from the visitor. Once the security system 202 can communicate with the computing device 204 and/or the server 206, the security system 202 can communicate the recorded message and/or video to the computing device 204 and/or the server 206.

In several embodiments, the security system 202 can ask a visitor to record a message and/or can record pictures (e.g., video, still pictures) when the security system 202 cannot communicate via the wireless network 308. The security system 202 can include a Network Enabled Mode and a Network Disabled Mode. In the Network Enabled Mode, the security system 202 can communicate via the wireless network 308 with a remote server and/or computing device 204. In the Network Disabled Mode, the security system 202 cannot communicate via the wireless network 308 with a remote server and/or computing device 204.

In the Network Enabled Mode, the security system 202 can send video and/or audio from the visitor to the user instantaneously; nearly instantaneously; immediately; within 15 seconds of capturing the video and/or audio; and/or within 60 seconds of capturing the video and/or audio. In the Network Enabled Mode, the security system 202 can preferentially send data (e.g., video, audio, traits, identification) regarding the visitor to the computing device 204 rather than storing the data in the memory of the security system 202. In the Network Disabled Mode, the security system 202 can act as a typical doorbell by, for example, causing a chime inside the building 300 to emit a sound. In some embodiments of the Network Disabled Mode, the security system 202 emits a visible error signal (e.g., flashing light, red light); records images and audio to the security system's memory; asks the visitor to leave a message for the user; and/or alerts the user regarding the lack of wireless communication.

In some embodiments, the security system 202 can maintain a visitor log, which can capture information such as the date, time, audio, video, and/or images of the visitor. The user interface 240 can display this information in a "guest book" format; as a timeline or calendar; as a series of images, videos, and/or audio files; or as a log file.

Several embodiments include the ability to automatically record every visitor who comes to the door (e.g., even if the visitors do not "ring" the doorbell). Each visitor can be logged and "time stamped." Visitor information can be stored in the cloud (e.g., a 15 second video of each visit can be stored remotely). The stored visitor information can also include recorded conversations and whether the visitor notification was "answered" by the user. Some methods include charging a periodic (e.g., monthly) subscription fee for storing and retrieving visitor history information. The visitor history information can include statistical analyzes and other high-level visitor metrics (e.g., average visits per month, average age of visitors, average visit duration, percentage of notifications that were answered, percentage of welcome visitors, percentage of solicitors).

The user can accept or decline a communication request from a visitor. In some embodiments, the user can push a button (e.g., 276) on the user interface 240 (shown in FIG. 2) to decline a communication request or accept a communication request. The user can decline a communication request without the visitor knowing that the user received the communication request. Prior to accepting a communication request, the computing device 204 can allow the user to click a button, such as an icon on a graphical user interface on a touch screen, to see and/or hear the visitor. In some embodiments, accepting a communication request includes opening a two-way line of communication (e.g., audio and/or video) between the visitor and the user to enable the user to speak with the visitor.

A visitor can initiate a communication request by ringing the doorbell of the security system 202, triggering a motion sensor of the security system 202, triggering a proximity sensor of the security system 202, and/or triggering an audio alarm of the security system 202. In some embodiments, the audio alarm includes the microphone of the security system 202. The security system 202 can determine if sounds sensed by the microphone are from a knocking sound, a stepping sound, and/or from a human in close proximity to the security system 202. The security system 202 can detect important sounds such as knocking, talking, and footsteps by recording the sounds and then computing features that can be used for classification. Each sound class (e.g., knocking) has features that enable the security system 202 to accurately identify the sound as knocking, talking, stepping, or extraneous noise. Features can be analyzed using a decision tree to classify each sound. For example, in some embodiments, a visitor can trigger an audio alarm (and thus, initiate a communication request) by knocking on a door located within hearing range of a microphone of the security system 202. In several embodiments, a visitor can trigger an audio alarm (and thus, initiate a communication request) by stepping and/or talking within hearing range of a microphone of the security system 202.

Hardware

Figure 5:
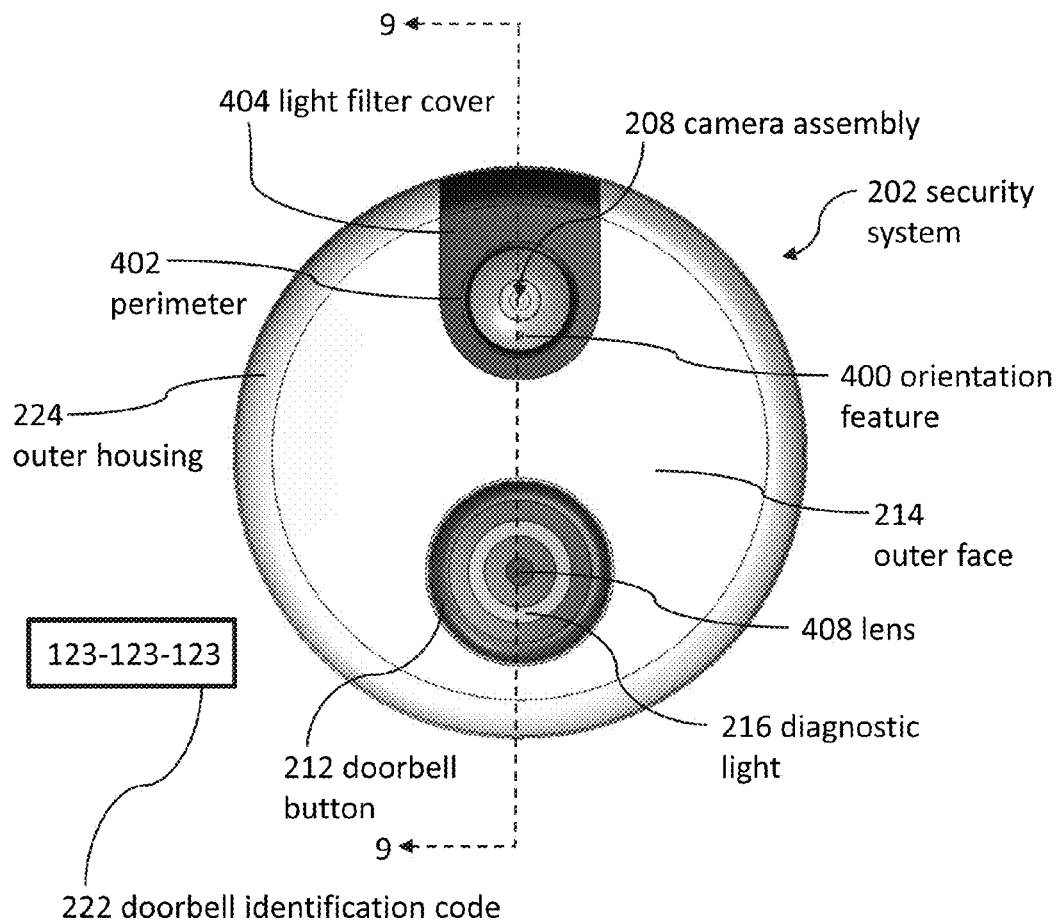
FIG. 5 illustrates a front view of a security system, according to some embodiments.

FIG. 5 illustrates a front view of the security system 202, according to some embodiments. The security system 202 can include a camera assembly 208, which can be a fisheye camera and/or a camera located inside of a dome or spherical holder. The camera assembly 208 can be configured to allow the user or installer to adjust the orientation of the camera assembly 208 by moving an orientation feature 400. Adjusting the orientation of the camera assembly 208 can include inserting a manipulation tool, such as a pin, paperclip, or needle, into an orientation feature 400, which can be a hole, a cylindrical hole, a lumen, and/or a shaft. Once the manipulation tool is coupled to the orientation feature 400, the user or installer can move the camera assembly 208 like an eye can move in an eye socket.

A doorbell identification code 222 can be associated with the security system 202 (e.g., a doorbell) such that the code 222 is correlated with the doorbell. The code 222 can be used as an electronic key to unlock access to the doorbell. A Network Connection Mode can comprise using the doorbell identification code 222 to verify whether a computing device 204 (shown in FIG. 2) is authorized to communicate with the doorbell.

Figure 6:
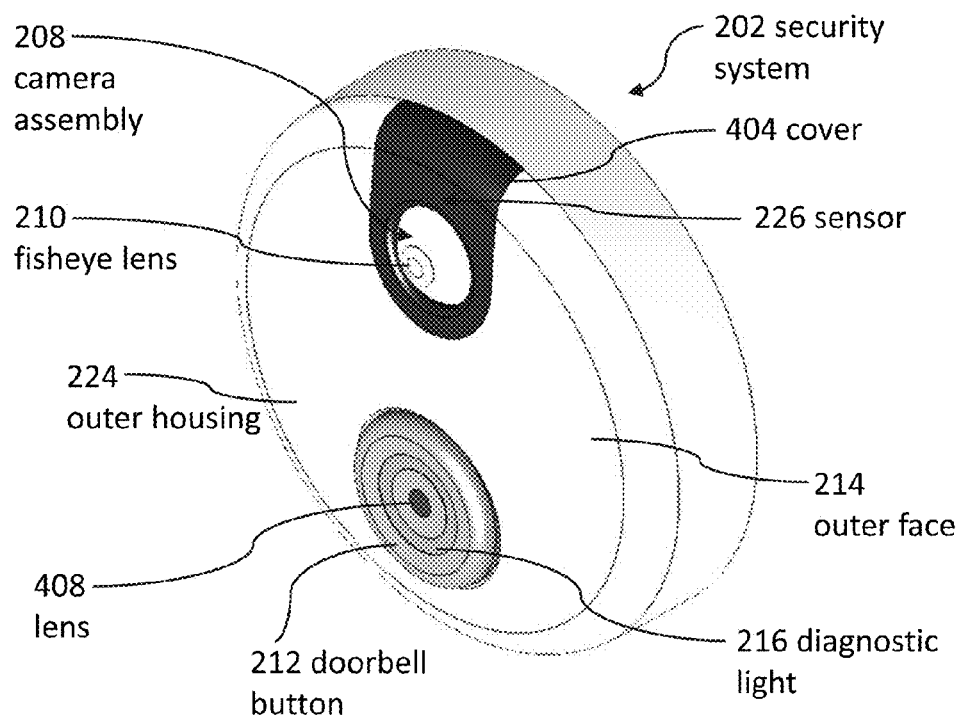
FIG. 6 illustrates a perspective view of the security system from FIG. 5, according to some embodiments.

FIG. 6 illustrates a perspective view of the security system 202 from FIG. 5. The camera assembly 208 can include a fisheye lens 210, which can produce a visual distortion to create a wide panoramic or hemispherical image. The fisheye lens 210 can create a broader field of view than would be possible without a fisheye lens.

In some embodiments, a sensor 226 is hidden under the cover 404 (e.g., a light filter). The sensor 226 can be a motion sensor. In several embodiments, the sensor 226 is a proximity sensor. A light 1042 (e.g., a laser system), shown in FIG. 53, can be hidden under the cover 404.

Figure 7:
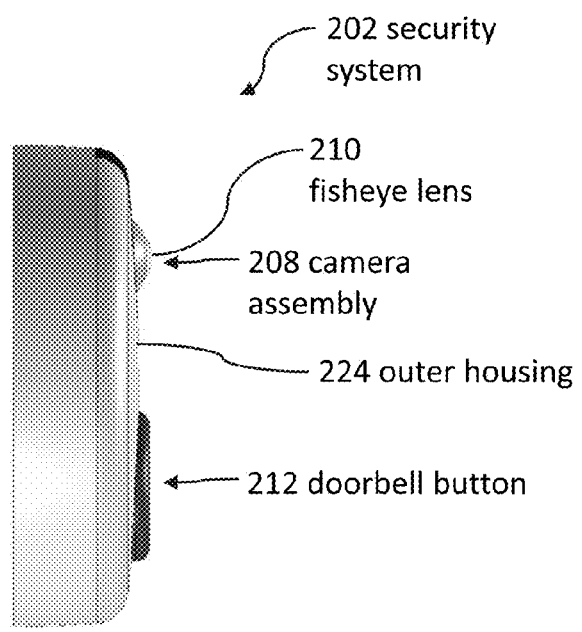
FIG. 7 illustrates a side view of the security system from FIG. 5, according to some embodiments.

In some embodiments, the camera assembly 208 is not configured to rotate and is not spherical. In several embodiments, the fisheye lens 210 can provide a sufficient field of view without moving the camera assembly 208. The fisheye lens 210 can be oriented directly outward from the outer housing 224 (e.g., perpendicular to an outward face of the outer housing 224) as shown in FIG. 7.

Figure 56:
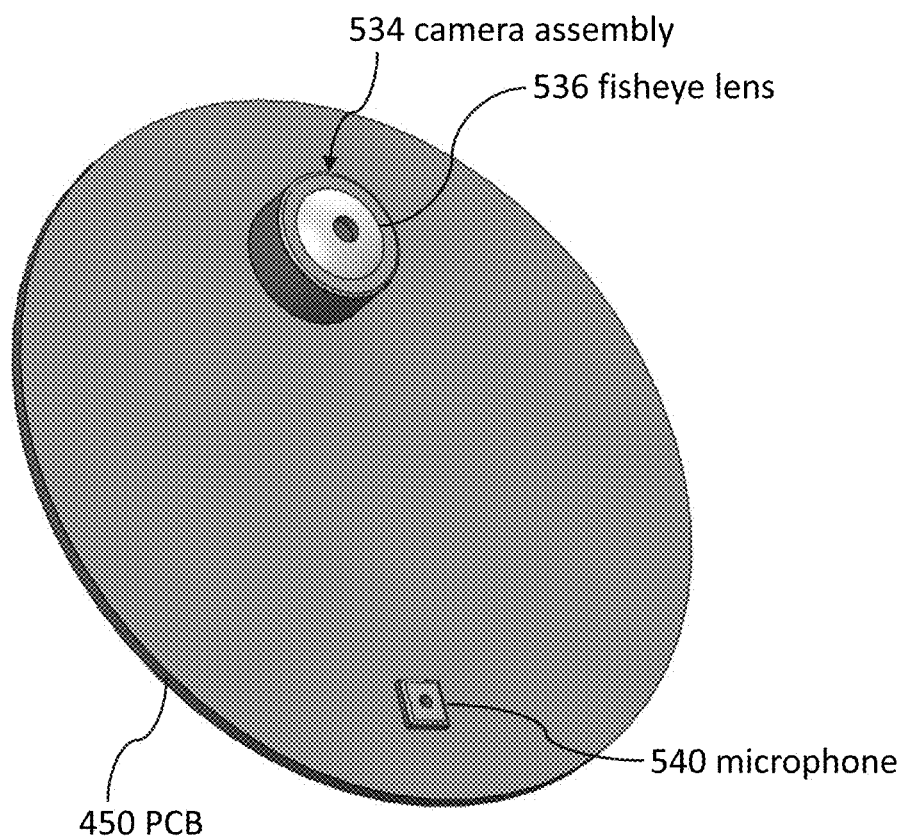
FIG. 56 illustrates a perspective view of a camera assembly coupled directly to a printed circuit board, according to some embodiments.

FIG. 56 illustrates a perspective view of a camera assembly 534 coupled directly to the PCB 450. Flexible conductors 438 (shown in FIG. 9) are not used to couple the camera assembly 534 to the PCB 450 in the embodiment illustrated in FIG. 56. The camera assembly 534 does not include a ball shape (e.g., a spherical shape) but can be cylindrical. The cylinder can include a front side that comprises a fisheye lens 536. The cylinder can include a backside that is coupled to the PCB.

The fisheye lens 536 can be a wide-angle lens configured to create a wider field of view than would result from a flat lens. The fisheye lens 536 can include a convex outer surface. The fisheye lens 536 can include a focal length of 2 millimeters to 16 millimeters. The fisheye lens 536 can include a horizontal field of view and/or a vertical field of view of at least 90 degrees, at least 100 degrees, at least 130 degrees, at least 160 degrees, and/or less than 190 degrees. In some embodiments, the fisheye lens 536 can include a horizontal field of view and/or a vertical field of view of at least 180 degrees. In several embodiments, the horizontal field of view is at least 30 degrees greater than the vertical field of view.

The PCB 450 can include a microphone 540, which can be mounted on a lower section of the PCB 450. In some embodiments, the PCB 450 includes an upper half that comprises the camera assembly 534, and the PCB 450 includes a lower half that comprises the microphone 540.

FIG. 7 illustrates a side view of the security system 202 from FIG. 5. The domed shape of the camera assembly 208 is visible in FIG. 7, although some embodiments include non-domed camera assemblies. The security system 202 can be a doorbell with a camera, microphone, speaker, and/or doorbell button coupled together in a single unit (e.g., at least partially inside an outer housing 224).

Figure 8:
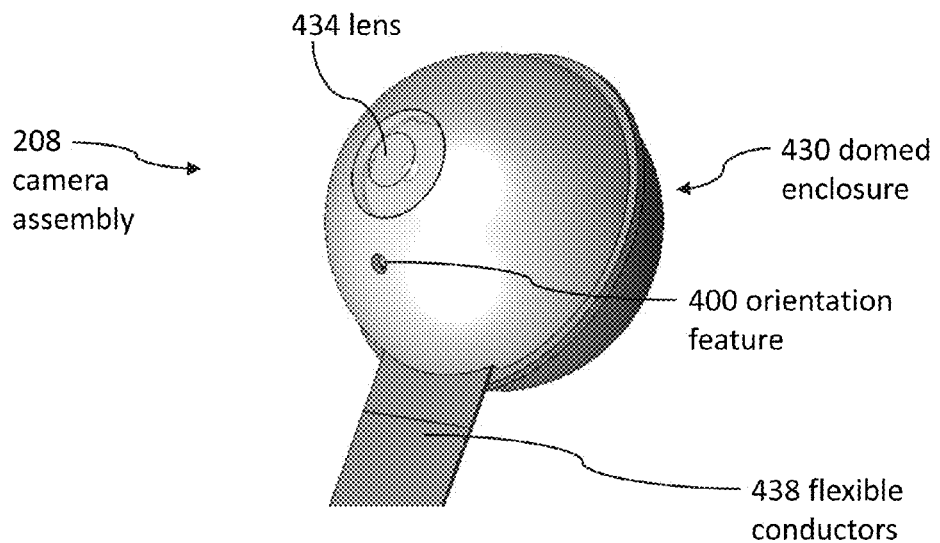
FIG. 8 illustrates a perspective view of a camera assembly, according to some embodiments.

FIG. 8 illustrates a perspective view of the camera assembly 208. The camera assembly 208 can include a domed enclosure 430 and the orientation feature 400, which can be a hole. The camera assembly 208 can also include a lens 434, which can be transparent and/or translucent glass or plastic. The camera assembly 208 can be electrically coupled to other parts of the security system 202 by a flex circuit, wires, cables and/or flexible conductors 438. In some embodiments, the camera assembly 208 can be mounted directly to the PCB 450 (shown in FIG. 9) such that flexible conductors 438 are not used to electrically couple the camera assembly 208 to the PCB 450.

Figure 9:
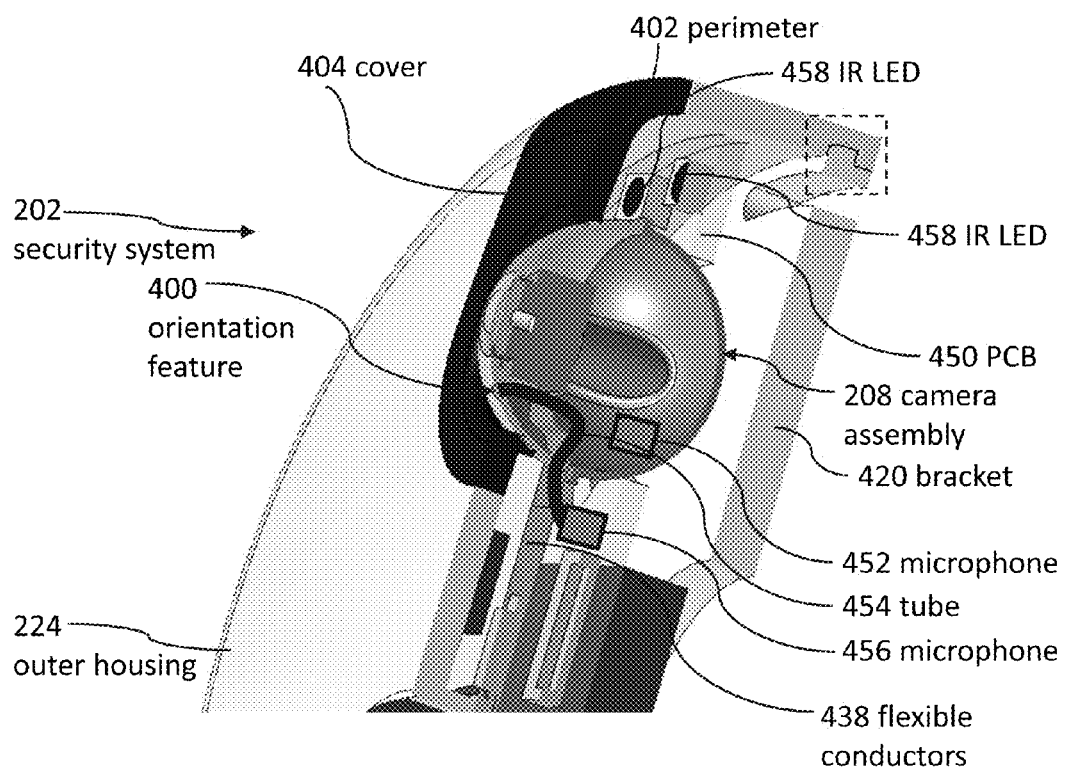
FIG. 9 illustrates a partial, perspective, cross-sectional view along line 9-9 from FIG. 5, according to some embodiments.

FIG. 9 illustrates a partial, perspective, cross-sectional view along line 9-9 from FIG. 5. The camera assembly 208 is secured between a cover 404 and a printed circuit board ("PCB") 450. A front portion of the camera assembly 208 fits in a hole in the cover 404 and a back portion of the camera assembly 208 fits in a hole in the PCB 450. In some embodiments, a remote computing device can adjust the camera's viewing angle and zoom settings.

In some embodiments, the cover 404 (e.g., a light filter) is translucent to allow infrared ("IR") light from IR light emitting diodes 458 ("LED") to exit the security system 202 to illuminate visitors to enable nighttime video. In several embodiments, the cover 404 appears opaque or semi-opaque, but allows IR light to pass. In some embodiments, the cover 404 has a visible light transmission of at least 10% and/or less than 90%; at least 25% and/or less than 80%, or at least 35% and/or less than 75%. In some embodiments, the cover 404 has an IR light transmission of at least 30% and a visible light transmission of less than 90%; an IR light transmission of at least 40% and a visible light transmission of less than 80%; or an IR light transmission of at least 50% and a visible light transmission of less than 50%. In some embodiments, the cover 404 allows IR light to exit the security system but does not allow people to view into the security system in normal lighting conditions (i.e., 50 foot-candles).

Light sources, such as IR LEDs 458, can be located in an interior portion of a security system. The light sources can be oriented to within 30 degrees of the viewing orientation of the camera assembly 208 such that the light sources are configured to illuminate the camera's field of view and/or objects located in front of the camera assembly 208. The translucent or semi-translucent cover 404 can be located between the light sources and objects in front of the camera assembly 208. The cover 404 can be configured to obscure visibility into the interior portion of the security system 202. The cover 404 can be configured to enable light from the light sources to illuminate the camera's field of view and/or objects located in front of the camera assembly 208.

In some embodiments, a security system includes an outer housing and the outer housing includes a translucent or semi-translucent cover 404 configured to allow light from light sources to travel from an interior portion of the security system to an area in front of the security system (e.g., to an area outside of the security system). Light sources can be located beneath the cover 404 and can be oriented to emit light through the cover 404. In some embodiments, the cover 404 couples a camera assembly with the outer housing.

In some embodiments, a tube 454 leads from the orientation feature 400 (e.g., a hole in the outer surface of the camera assembly dome) to a microphone 452, 456 located inside of the security system 202 (e.g., on a printed circuit board). The microphone 456 can be located outside of the camera assembly on a printed circuit board. The microphone 452 can be located inside of the camera assembly (e.g., inside of the spherical assembly that houses at least a portion of the camera). The tube 454 can be configured to conduct sound and/or direct sound to a microphone 452, 456 located inside of the security system 202. The tube 454; microphones 452,456; and the orientation feature 400 are not included and/or indicated in some figures in the interest of clarity.

Figure 10:
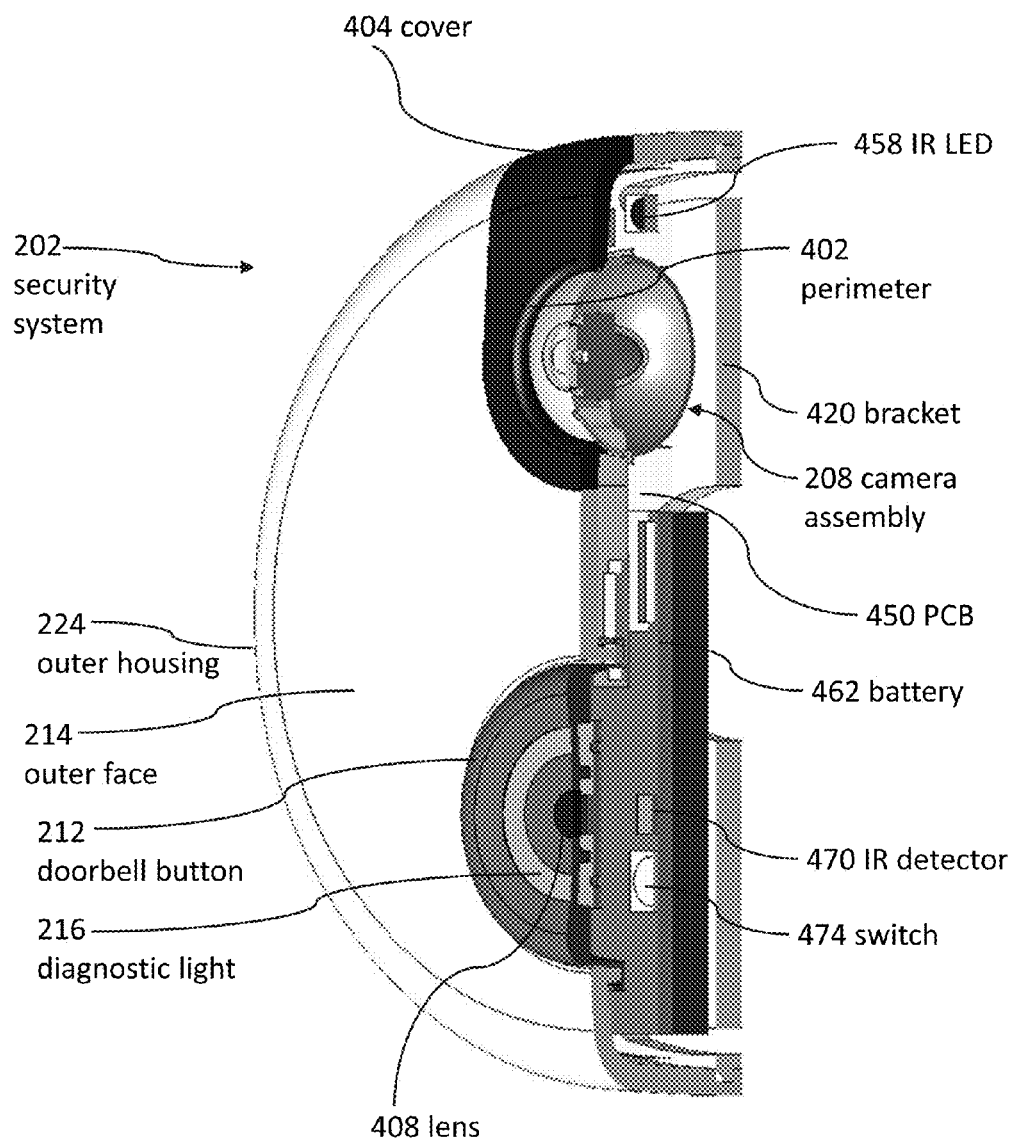
FIG. 10 illustrates a perspective, cross-sectional view along line 9-9 from FIG. 5, according to some embodiments.

FIG. 10 illustrates a perspective, cross-sectional view along line 9-9 from FIG. 5. The security system 202 can include a battery 462, which can be rechargeable. Some embodiments include alkaline or lithium batteries. In some embodiments, the battery 462 can be a 3,500 mAh battery and/or a battery between 1,000 mAh and 5,000 mAh.

The lens 408 can allow light, such as IR light, to enter the security system 202 to enable an IR detector 470 to sense and/or detect the IR light. Several embodiments include the IR detector 470. The IR detector 470 can be used to determine if a visitor is near the security system 202 due to the unique IR signature and/or characteristics of people compared to non-living objects. The IR detector 470 can be a thermal or photonic IR detector. The system (e.g., 200 in FIG. 1) can be configured to distinguish between the IR characteristics of people and background IR characteristics. Thus, the system can determine if a visitor is in an entryway (e.g., in front of a door). The IR detector 470 can be a motion sensor.

In several embodiments, the IR detector 470 is a light detector, which can be used to distinguish day (i.e., light hours) from night (i.e., dark hours). In some embodiments, day versus night is distinguished based on time rather than light. The communication system 200 can have a Day Mode and a Night Mode, wherein Night Mode reduces, alters, or precludes alerts to the user.

Pressing the doorbell button 212 can activate a switch 474, which can cause a chime inside the building to emit a sound and/or can initiate a communication request to the user. In some embodiments, pressing the doorbell button 212 can trigger the system to record a fingerprint of the visitor. The lens 408 can be large enough to enable the security system 202 to take a picture (e.g., an IR image) of the visitor's finger. In some embodiments, the fingerprint is compared against a database of fingerprints to identify the visitor and/or to classify the visitor. Visitors in a welcome class (e.g., family, a person with permission to enter) can cause a door to open (e.g., the security system can unlock the door). In some embodiments, the button 212 is a fingerprint reader that can optically scan fingerprints when visitors touch a glass imaging window.

FIG. 11 illustrates a back view of the security system 202 from FIG. 5 without a mounting bracket 420. Security systems 202 can include a chip 480 (e.g., integrated circuits, microprocessor, computer) and a memory 492. Security systems 202 can also include a microphone 484 and a speaker 488. The speaker 488 can comprise a flat speaker and a sound chamber 460 configured to amplify an emitted sound. The flat speaker can be located in the sound chamber. Some security system embodiments include a proximity sensor 500. In several embodiments, security systems 202 include a wireless communication module 504, such as a WiFi module. The communication module 504 can have an integrated antenna. In some embodiments, an antenna is contained within the outer housing 224.

Figure 12:
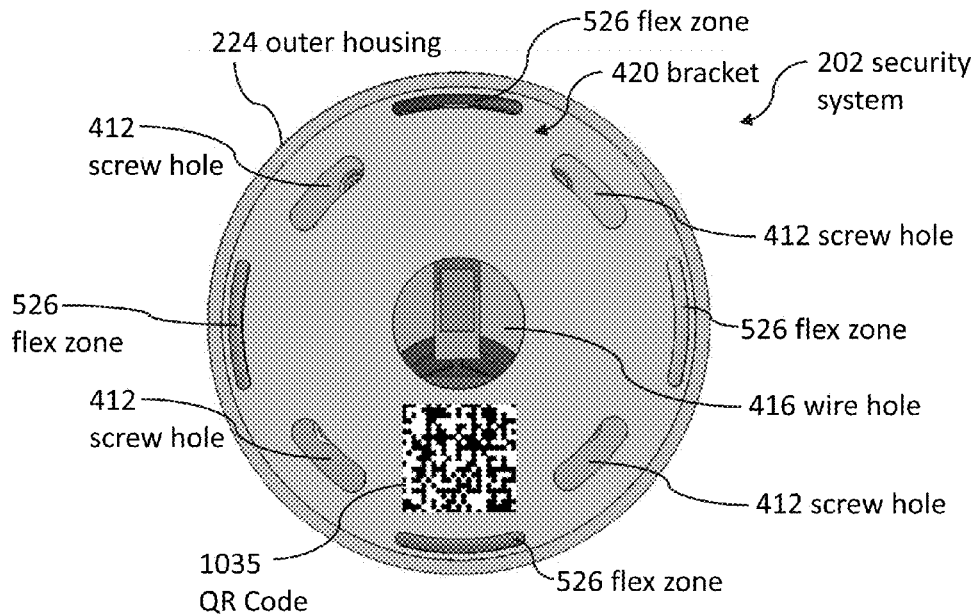
FIG. 12 illustrates a back view of the security system from FIG. 5 with a mounting bracket, according to some embodiments.

FIG. 12 illustrates a back view of the security system 202 from FIG. 5 with a mounting bracket 420. In some embodiments, the mounting bracket 420 is molded from plastic or machined from metal, such as aluminum. The mounting bracket 420 can include screw holes 412, which can be slots configured to allow a threaded portion of a screw to pass, but not allow the head of the screw to pass. A wire hole 416 can be located in the center of the mounting bracket 420. Referring now to FIGS. 3 and 12, electrical wires 304 from the building 300 can pass through the wire hole 416 and couple to electrical connectors 510 (shown in FIG. 11).

FIG. 13 illustrates a perspective view of the outer housing 224 from FIG. 5. The outer housing 224 can include grooves 514 that extend radially outward from the central axis of the outer housing 224. The grooves 514 can be located on an inner diameter and/or inner surface of the outer housing 224, which can be part of a doorbell. Some embodiments include one continuous groove along an inner surface while other embodiments include separate grooves (such as the grooves illustrated in FIG. 13). Separate grooves can help control the angular orientation of the doorbell when it is mounted to a wall.

FIG. 14 illustrates a front view of the mounting bracket 420 coupled (e.g., screwed) to a wall. Screws 522 can be used to couple the mounting bracket 420 to a wall of a building, structure, and/or enclosure.

The mounting bracket 420 can have protrusions 518 that can extend radially outward from the mounting bracket 420. The protrusions 518 can be configured to fit inside the grooves 514 as shown in the dashed box of FIG. 9. Flex zones 526 (e.g., holes, open areas, slots, flexible material) can be located radially inward from the protrusions 518. The flex zones 526 can allow the protrusions 518 to moves radially inward as the outer housing 224 is pushed onto the bracket 420 (e.g., when the bracket is mounted to a wall).

Referring now to FIGS. 13 and 14, moving radially inward can help the protrusions 518 clear lips 530 associated with the grooves 514. The lips 530 can be located closer to the back side of the outer housing 224 or doorbell than the grooves 514 such that, in some embodiments, the lip 530 moves past the protrusion 518 before the protrusion 518 reaches the groove 514. The lips 530 can extend further radially inward than the grooves 514. In some embodiments, the outer housing 224 is configured to flex radially outward (e.g., at least in areas within 1 centimeter of the lips 530 and/or grooves 514) to enable the lips 530 to clear (e.g., snap over, move beyond) the protrusions 518.

FIG. 15 illustrates a partial, side view of the mounting bracket 420. The protrusions 518 can have a first side 550, which can be a front side (i.e., configured to be mounted facing away from a wall of a building). The protrusions 518 can have a second side 554, which can be a back side (i.e., configured to be mounted facing towards a wall of a building). In some embodiments, the first side 550 of the protrusion 518 includes a rounded or chamfered edge to facilitate pushing the outer housing 224 onto the bracket 420 to create a snap fit.

In some embodiments, the outer housing 224 includes protrusions that extend radially inward and the bracket 420 includes grooves and/or indentations that extend radially inward to capture the protrusions of the outer housing 224. In some embodiments, the outer housing 224 snaps onto the bracket 420. In several embodiments, the outer housing 224 is coupled to the bracket by threads (e.g., screws with threads, threads along the outer perimeter of the bracket).

Referring now to FIGS. 13-15, the outer housing 224 can lock onto the bracket 420 to reduce the likelihood of theft. The outer housing 224 and bracket 420 can be configured such that mounting means (e.g., protrusions 518, screws 522) are hidden when the outer housing 224 is coupled to the bracket 420. In some embodiments, the outer housing 224 covers coupling members (e.g., protrusions 518, screws 522) when the outer housing 224 is coupled to the bracket 420.

Methods of Use

Figure 16:
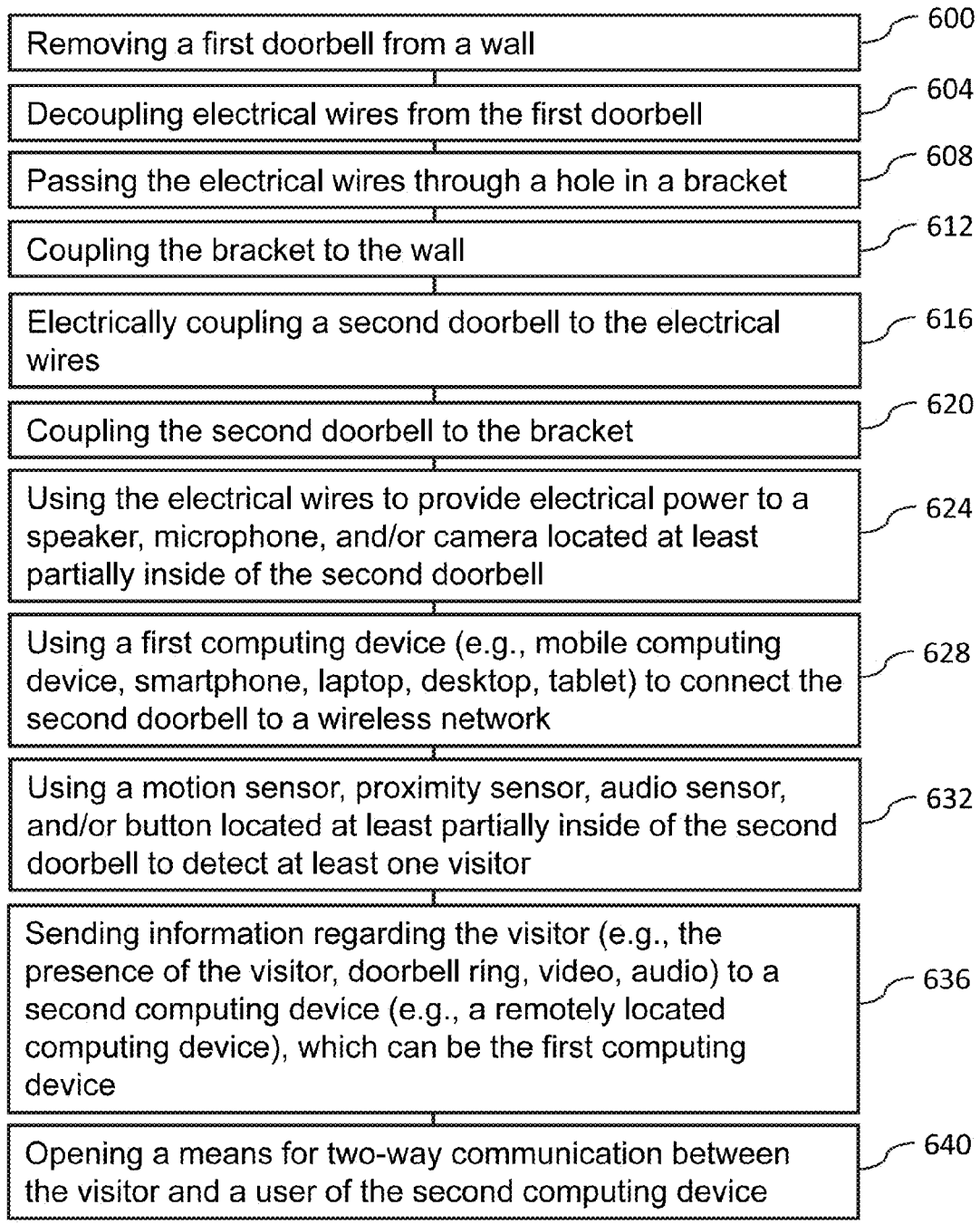
FIGS. 16 and 17 illustrate methods of using a security system, according to some embodiments.

FIG. 16 illustrates a method of using a security system, according to some embodiments. The illustrated method includes optional steps. In some embodiments, the steps can be performed in orders different than the order illustrated. In at least one embodiment, at least some of the steps are performed in the order illustrated in FIG. 16.

Step 600 can include removing a first doorbell from a wall (e.g., the wall of a building). The first doorbell can be a traditional doorbell without a camera. Step 604 can include decoupling electrical wires (e.g., 304 in FIG. 3) from the first doorbell. Step 608 can include passing the electrical wires through a hole (e.g., 416 in FIG. 14) in a bracket or mounting device. Step 612 can include coupling (e.g., screwing, fastening) the bracket to the wall. Step 616 can include electrically coupling a second doorbell (e.g., 202 in FIG. 1) to the electrical wires. The second doorbell can be a security system, such as a security system 202 illustrated in FIG. 3. The second doorbell can include a camera (such as a video camera), a speaker, a microphone, and/or a wireless communication assembly. Step 620 can include coupling the second doorbell to the bracket.

Step 624 can include using the electrical wires to provide electrical power to a speaker, microphone, and/or camera located at least partially inside of the second doorbell. Step 628 can include using a first computing device (e.g., mobile computing device, smartphone, laptop, desktop, tablet) to connect the second doorbell to a wireless network. Step 632 can include using a motion sensor, proximity sensor, audio sensor, and/or button located at least partially inside of the second doorbell to detect at least one visitor. The visitor can be a person who approaches the second doorbell and/or rings the second doorbell.

Step 636 can include sending information regarding the visitor (e.g., the presence of the visitor, doorbell ring, video, audio) to a second computing device (e.g., a remotely located computing device), which can be the first computing device. Step 640 can include opening a means for two-way communication between the visitor and a user of the second computing device. The means for two-way communication can enable the user to talk with the visitor and/or see the visitor via a wireless network, a cellular network, and/or the Internet.

Modes of Operation

Figure 17:
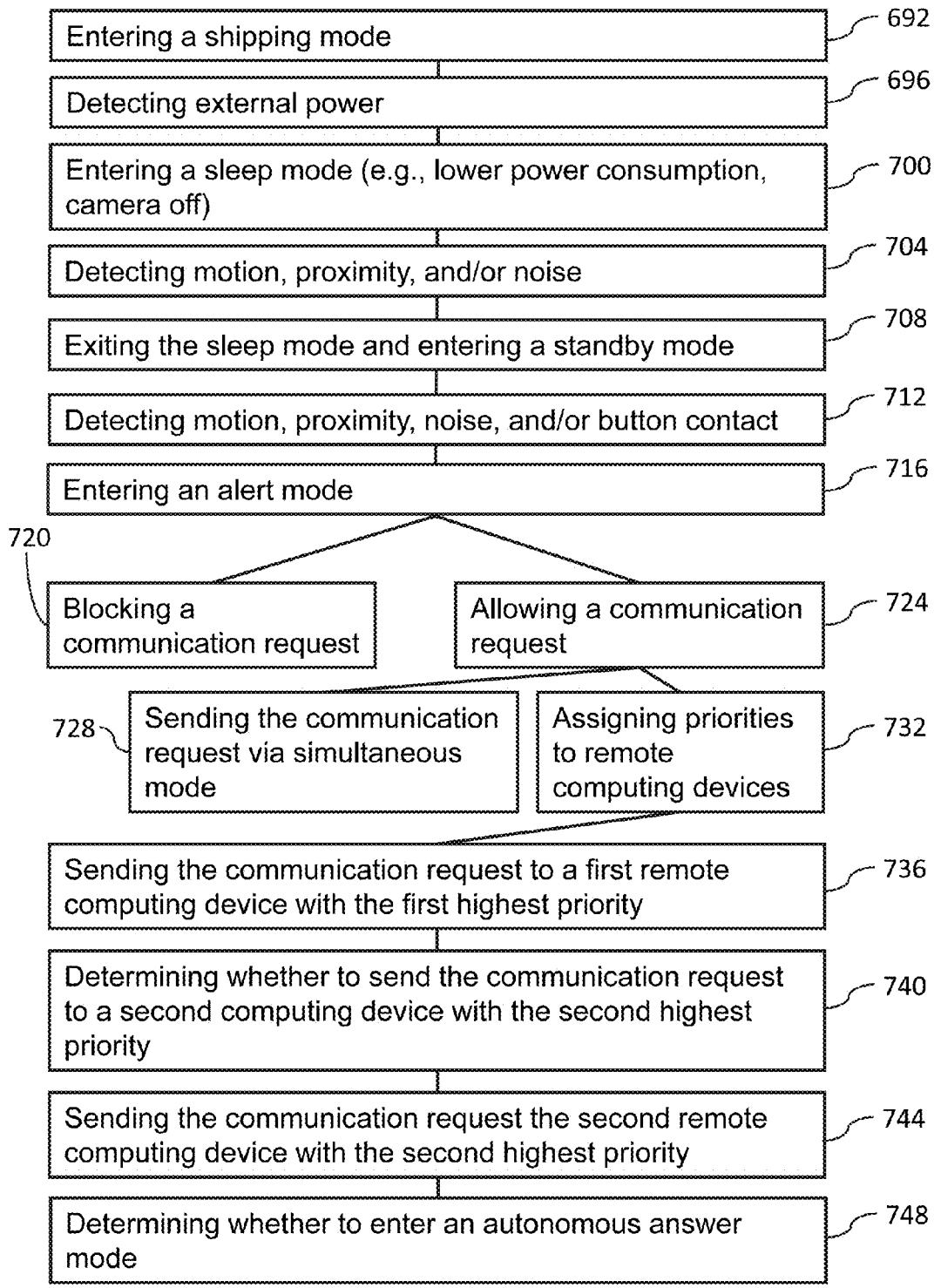

FIG. 17 illustrates methods of using a security system, according to some embodiments. The steps can be performed by a security system and/or by a remotely located server and/or computer. In some embodiments, all of the steps shown in FIG. 17 are performed by a security system (e.g., a doorbell). In some embodiments, Steps 700, 704, 708, 712, 716, 720, and/or 724 are performed by a security system (e.g., a doorbell). In some embodiments, Steps 720, 724, 728, 732, 736, 740, 744, and/or 748 are performed by at least one remote server and/or at least one remote computing system. The steps can be performed in many different orders.

Some embodiments include a Shipping Mode, which can be an ultra-low power mode (e.g., can use even less power than a Sleep Mode). Wireless communication (e.g., WiFi communication, communication module 504 in FIG. 11) can be disabled during Shipping Mode. The camera, motion detector, sound detector, microphone, infrared sensors, infrared lights, infrared components, thermometer, heating element, and/or proximity sensor can be disabled during Shipping Mode. During Shipping Mode, the security system (e.g., 202 in FIG. 11) can be configured to detect whether the security system is electrically coupled to an external power source (e.g., electricity from a building or home). If the security system detects that the security system is electrically coupled to an external power source, then the security system can be configured to exit Shipping Mode and enter another mode (e.g., Sleep Mode, Standby Mode, Detection Mode, Alert Mode). In some embodiments, a security system enters Sleep Mode once the security system exits Shipping Mode. Step 692 can include entering a Shipping Mode. Step 696 can include detecting external power. Methods can include exiting a Shipping Mode and/or entering a Sleep Mode in response to detecting external power (e.g., power from outside of the security system).

Step 700 can include entering a Sleep Mode. In some embodiments, Sleep Mode has lower power consumption than Standby Mode and/or Alert Mode. In several embodiments, Sleep Mode turns off, powers down, and/or reduces the activity of one or more components and/or assemblies. In some embodiments, the camera is off, not recording, and/or in Low Power Mode while the system is in Sleep Mode. In some embodiments, the speaker is off, not recording, and/or in Low Power Mode while the system is in Sleep Mode. In several embodiments, the microphone is off, not recording, and/or in Low Power Mode while the system is in Sleep Mode.

Step 704 can include detecting motion, proximity, and/or noise. Step 708 can include exiting the Sleep Mode and entering a Standby Mode. Step 712 can include detecting motion, proximity, noise, and/or button contact. Step 716 can include entering an Alert Mode.

In some embodiments, thresholds necessary to exit the Sleep Mode and enter a Standby Mode are less than thresholds necessary to exit the Standby Mode and enter an Alert Mode. In several embodiments, greater motion, closer proximity, and/or louder noise are necessary to enter an Alert Mode than are necessary to exit the Sleep Mode and enter a Standby Mode. In some embodiments, button contact is necessary to enter an Alert Mode. In some embodiments, a system will exit the Sleep Mode and enter a Standby Mode upon detecting motion, detecting motion within 10 feet, or detecting motion within 20 feet. In some embodiments, a system will exit the Sleep Mode and enter a Standby Mode upon detecting sound, upon detecting sound louder than 10 decibels, upon detecting sound louder than 25 decibels, upon detecting sound louder than 50 decibels, upon detecting sound louder than 80 decibels, or upon detecting sound louder than 90 decibels.

In several embodiments, Standby Mode turns on, powers up, and/or increases the activity (e.g., electrical activity, detection activity, detecting) of one or more components and/or assemblies (relative to Sleep Mode). In some embodiments, the camera is on, recording, and/or in an Intermediate Power Mode while the system is in Standby Mode. In some embodiments of Standby Mode, the camera is configured to quickly start recording, but is not recording. In several embodiments of Standby Mode, the microphone is on, in Detection Mode, and/or detecting sounds to help the system determine if it should change to Alert Mode.

In several embodiments, the system takes a picture when the system enters Standby Mode. In some embodiments, the system takes a picture each time a visitor is detected even if the visitor does not ring the doorbell.

In some embodiments of Alert Mode, the system has determined that a visitor is present and/or attempting to contact a person in the building (e.g., the visitor is ringing a doorbell, waiting by the doorbell, knocking on a door). Some embodiments go into Alert Mode even if the visitor is not trying to contact a person in the building (e.g., the visitor could be a person trying to break into the building). The system can be configured to enter Alert Mode if the system detects a visitor within 20 feet, within 10 feet, or within five feet. The system can be configured to enter Alert Mode if the system detects a sound greater than 50 decibels, 80 decibels, and/or 90 decibels. The system can be configured to enter Alert Mode if a visitor presses a doorbell button and/or triggers a proximity sensor.

The system can be configured to block or allow a communication request (as shown in Steps 720 and 724). The user might want to block communication requests because she is busy or asleep. The user can configure the system to autonomously and/or automatically block communication requests (e.g., a visitor ringing the doorbell would not initiate a communication request to the user). In several embodiments, the system that blocks or allows a communication request can be the doorbell (e.g., 202 in FIG. 1), a computing device (e.g., 204 in FIG. 1), or a remote server (e.g., 206 in FIG. 1).

If the communication request is allowed, the system can send the communication request via Simultaneous Mode as illustrated in Step 728. Simultaneous Mode can include sending the communication request simultaneously to at least two computing devices (e.g., computing devices 204 in FIG. 3). The request can be sent simultaneously even if the communication requests are not initiated at the same moment as long as the communication requests overlap in at least one moment of time. In some embodiments, if a first user does not respond to a first communication request to a first computing device, the system can send a second communication request to a second computing device while the first communication request is still underway. As a result, the system starts by sending the communication request to the first user, but then simultaneously sends communication requests to both the first user and a second user.

Step 732 can include assigning priorities to remote computing devices. In some embodiments, a computing device with a higher priority will receive a communication request before a computing device with a lower priority. In several embodiments, a computing device and/or user with higher priority will have privileges that are not available to a computing device and/or user with a lower priority. These privileges can include administrative abilities and the ability to alter settings.

Step 736 can include sending the communication request to a first remote computing device with the first highest priority. Step 740 can include determining whether to send the communication request to a second computing device with the second highest priority. Step 744 can include sending the communication request to the second remote computing device with the second highest priority.

Step 748 can include determining whether to enter an Autonomous Answer Mode. Autonomous Answer Mode can include methods of the security system, server, and/or remote computing device interacting with the visitor without user action. For example, if a user does not respond to a communication request, the system can play a recorded message, provide pre-recorded instructions from the user to the visitor, and/or request the visitor to leave a message for the user (e.g., an audio message, a video message).

A notification regarding the presence of a visitor can be sent (e.g., simultaneously) to multiple remote computing devices that have been authorized to communicate with a security system 202 (shown in FIG. 1). A first user can answer a push notification regarding the presence of a visitor to start two-way communication with the visitor at door (e.g. located near the security system 202). Then, another user (who also received the push notification regarding the visitor) can also join the conversation (e.g., without any interaction from the first person). Thus, all three parties can talk simultaneously, and the two users can simultaneously see the visitor. This three-way communication can be enabled via administrative settings by authorizing multiple, specific remote computing devices 204 to communicate with one security system 202. In some embodiments, the users who can join the communication are limited to the users of remote computing devices on the account associated with the security system 202.

In some embodiments, the Autonomous Answer Mode includes sending the communication request to an answering service such as a call center. An operator at the answering service can speak with the visitor, provide instructions to the visitor, and/or take a message from the visitor.

In several embodiments, the user can select a pre-recorded message for the security system to play for the visitor. The security system can play the pre-recorded message for the visitor by emitting the audio message from the speaker. Once the visitor has responded to the pre-recorded message, the user can initiate two-way communication with the visitor. In one embodiment, the pre-recorded message asks the visitor to identify herself and/or to describe her reason for being at the building. The user can listen to the visitor's response before opening two-way communication with the visitor and/or letting the visitor know that the user is listening to the visitor and/or watching the visitor.

Figure 52:
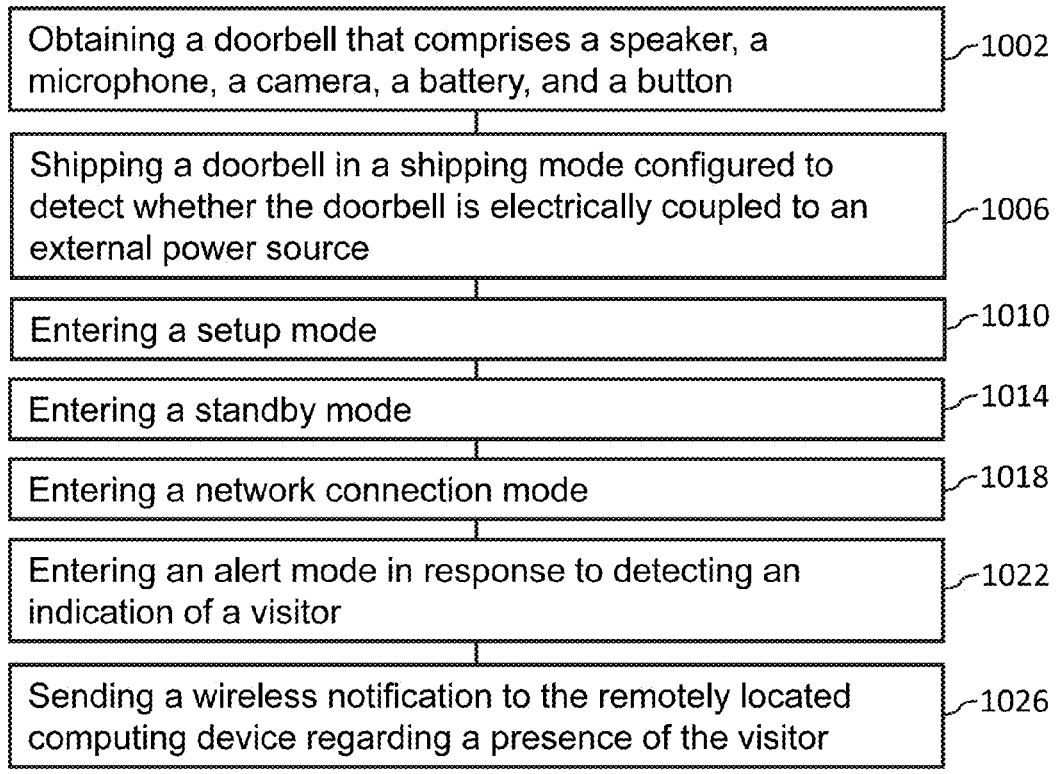
FIG. 52 illustrates methods of using a security system, according to some embodiments.

FIG. 52 illustrates methods of using a security system (e.g., a doorbell), according to some embodiments. Step 1002 can include obtaining a doorbell that comprises a speaker, a microphone, a camera, a battery, and a button. Step 1006 can include shipping a doorbell in a Shipping Mode. The Shipping Mode can be configured to detect whether the doorbell is electrically coupled to an external power source. Step 1010 can include entering a Setup Mode. Some methods include entering a Setup Mode in response to detecting electricity from an external power source. Step 1014 can include entering a Standby Mode. Several methods include entering a Standby Mode in response to detecting electricity from an external power source. Step 1018 can include entering a Network Connection Mode. Some methods include entering a Network Connection Mode in response to pressing a button of the doorbell for a period of time. Some methods include entering a Network Connection Mode in response to detecting electricity from an external power source. Step 1022 can include entering an Alert Mode. Several methods include entering an Alert Mode in response to detecting an indication of a visitor. Step 1026 can include sending a wireless notification to the remotely located computing device regarding a presence of the visitor. FIG. 52 includes optional steps and steps that can be combined with portions of other methods. The steps can be performed in many different orders.

Methods can include using a doorbell that is configurable to wirelessly communicate with a remotely located computing device, such as a cellular telephone, laptop, or tablet. Some embodiments include obtaining a doorbell that comprises a speaker, a microphone, a camera, and a button. The button can be configurable to enable a visitor to sound a chime (e.g., a speaker or another sound emission device located inside of a building). Several embodiments include shipping the doorbell in a Shipping Mode that consumes power. In the Shipping Mode, the doorbell can detect whether the doorbell is electrically coupled to an external power source (e.g., the electricity of a building to which the doorbell is attached). Methods can then include entering a Network Connection Mode in response to detecting electricity from the external power source. The Shipping Mode can consume less power than the Network Connection Mode. The Network Connection Mode can comprise detecting a wireless network (e.g., a wireless network emitted by a router). Several methods include detecting a first indication of the visitor using the doorbell.

Methods for using a doorbell that is configurable to wirelessly communicate with a remotely located computing device can include obtaining the doorbell that comprises a speaker, a microphone, a camera, and a button. The button can be configured to enable a visitor to sound a chime. Some methods include shipping the doorbell in a Shipping Mode that consumes power. During the Shipping Mode, the doorbell can be configured to detect whether the doorbell is electrically coupled to an external power source. Methods can include entering a Setup Mode in response to detecting electricity from the external power source. The Shipping Mode can consume less power than the Setup Mode. The Setup Mode can increase electrical activities of the doorbell relative to the Shipping Mode. Some embodiments include increasing the electrical activities of the communication module, circuit board, battery, microphone, speaker, and/or camera. Some embodiments include detecting a first indication of the visitor. The first indication can be detected using the doorbell.

The remotely located computing device can be a cellular telephone having a display screen. Methods can comprise sending an image of the visitor from the doorbell to the cellular telephone and displaying the image of the visitor on the display screen of the cellular telephone.

Some embodiments comprise detecting a second indication of the visitor, wherein the second indication is detected using the doorbell. Several methods comprise sending a wireless notification to the remotely located computing device regarding a presence of the visitor in response to detecting both the first indication and the second indication.

In some embodiments, detecting the first indication comprises detecting a signal indicative of the visitor above a first threshold and detecting the second indication comprises detecting the signal indicative of the visitor above a second threshold. In some embodiments, the second threshold is greater than the first threshold. The doorbell can comprise a first sensor. The signal indicative of the visitor can be sensed by the first sensor of the doorbell.

In several embodiments, the first sensor of the doorbell comprises a motion sensor and the signal is related to motion. The camera, the speaker, and/or the microphone can be disabled during the Setup Mode.

The first sensor of the doorbell can comprise a proximity sensor. The signal can be related to proximity of the visitor.

The first sensor of the doorbell can comprise a microphone. The signal can be related to sound. In some embodiments, detecting the second indication comprises detecting a knocking sound.

In several embodiments, a doorbell comprises a first sensor and a second sensor. The first indication can be detected using the first sensor and the second indication can be detected using the second sensor. The first sensor can be a different type of sensor than the second sensor.

In some embodiments, the first sensor of the doorbell comprises a motion sensor. The second sensor can comprise the microphone. Methods can comprise using the microphone to detect a knocking sound to verify the presence of the visitor detected by the motion sensor.

In several embodiments, the first sensor of the doorbell can comprise an infrared detector and the second sensor can comprise the camera.

In some embodiments, the doorbell comprises a battery. The Setup Mode can comprise automatically charging the battery in response to detecting the electricity from the external power source.

In some embodiments, the Setup Mode comprises automatically replenishing at least a portion of electrical energy consumed from the battery by the doorbell during the Shipping Mode. Methods can comprise precluding wireless communication by the doorbell until after replenishing the portion of the electrical energy and then entering a Network Connection Mode in response to pressing the button for at least eight seconds. Pressing the button for at least eight seconds can help the doorbell distinguish between when the user just wants to sound the chime and when the user wants the doorbell to enter the Network Connection Mode. The Network Connection Mode can comprise detecting a wireless network.

In several embodiments, the doorbell comprises a battery and the Setup Mode comprises using the electricity from the external power source to charge the battery before enabling communication between the doorbell and the remotely located computing device.

In some embodiments, the Setup Mode comprises a Network Connection Mode, and the method comprises entering the Network Connection Mode in response to pressing the button for at least eight seconds. The Network Connection Mode can comprise detecting a wireless network and inputting a doorbell identification code into the remotely located computing device. In some embodiments, inputting the doorbell identification code includes typing letters, numbers, words, and/or symbols on the remotely located computing device. Inputting the doorbell identification code can include speaking letters, numbers, words, and/or symbols such that the remotely located computing device hears the information and captures the information.

The doorbell identification code can be associated with the doorbell such that the code is correlated with at least one doorbell. The code can be used as an electronic key to unlock access to the doorbell. The Network Connection Mode can comprise using the doorbell identification code to verify whether the remotely located computing device is authorized to communicate with the doorbell. For example, the code can prevent an unauthorized computing device from hacking into the doorbell and receiving visitor alerts from the doorbell.

In several embodiments, the Network Connection Mode comprises enabling communication from the remotely located computing device to the doorbell in response to pressing the button for at least eight seconds and inputting the doorbell identification code into the remotely located computing device. Pressing the button for at least eight seconds can help the doorbell distinguish between when the user just wants to sound the chime and when the user wants to enable communication from the remotely located computing device to the doorbell.

In some embodiments, the remotely located computing device is connected to the wireless network such that the remotely located computing device is configured to transmit data via the wireless network. The wireless network can comprise a name and a password. The name can identify the wireless network to entities searching for wireless networks. The password can enable an electronic device to connect to the wireless network. The wireless network can enable electronic devices to connect to the Internet.

The communication from the remotely located computing device to the doorbell can comprise the name and the password of the wireless network to which the remotely located computing device is connected. The Network Connection Mode can comprise connecting the doorbell to the wireless network to which the remotely located computing device is connected such that the doorbell can send an alert regarding a presence of the visitor to the remotely located computing device via the wireless network.

Some embodiments include using the doorbell to detect multiple wireless networks. The wireless network to which the remotely located computing device is connected can be one of the multiple wireless networks. Methods can comprise automatically selecting the wireless network to which the remotely located computing device is connected. For example, the system can choose which wireless network to connect the doorbell without asking a person which wireless network the system should choose.

In some embodiments, a Setup Mode comprises a Network Connection Mode. Methods can comprise entering the Network Connection Mode in response to pressing the button for at least eight seconds. The Network Connection Mode can comprise detecting a first wireless network having a name and a password. The Network Connection Mode can comprise inputting a doorbell identification code into the remotely located computing device. The doorbell identification code can be associated with the doorbell. The Network Connection Mode can comprise using the doorbell identification code to verify whether the remotely located computing device is authorized to communicate with the doorbell. The Network Connection Mode can comprise the remotely located computing device creating a second wireless network (e.g., that emanates from the remotely located computing device). The Network Connection Mode can comprise transmitting the name and the password of the first wireless network directly from the remotely located computing device to the doorbell via the second wireless network to enable the doorbell to communicate with the remotely located computing device via the first wireless network. Methods can comprise the remotely located computing device directly communicating with the doorbell via the second wireless network prior to the doorbell indirectly communicating with the remotely located computing device via the first wireless network. For example, the wireless communication from the remotely located computing device can travel through the air directly to the doorbell. The wireless communication from the remotely located computing device can travel indirectly to the doorbell via a third electronic device such as a server.

A remotely located computing device can be located near a doorbell. For example, during setup some users will hold a cellular phone within a couple of feet from the doorbell to input a doorbell identification code into the cellular phone to verify that the phone is authorized to communicate with the doorbell and to help the doorbell connect to a wireless network. The phone is located remotely from the doorbell because it is not physically attached to the doorbell.

Several methods include using a doorbell that is configurable to wirelessly communicate with a remotely located computing device. Methods can include shipping the doorbell in a Shipping Mode that consumes power. During some Shipping Mode embodiments, the doorbell is configured to detect whether the doorbell is electrically coupled to an external power source. Several embodiments include entering a Standby Mode in response to detecting electricity from the external power source. The Shipping Mode can consume less power than the Standby Mode. The speaker and the microphone can be disabled during the Standby Mode.

Some embodiments include exiting the Standby Mode and entering an Alert Mode in response to detecting a first indication of the visitor. The first indication can be detected using the doorbell. Several embodiments include sending a wireless notification to the remotely located computing device regarding a presence of the visitor in response to entering the Alert Mode.

Some embodiments comprise detecting multiple wireless networks and automatically selecting a first wireless network for communicating between the doorbell and the remotely located computing device. Prior to the automatic selection, the remotely located computing device can be connected to the first wireless network. Methods can further comprise authorizing the doorbell to communicate with the remotely located computing device by pressing the button for at least eight seconds and inputting a doorbell identification code into the remotely located computing device. The doorbell identification code can be associated with the doorbell. The first wireless network can comprise a name and a password. Methods can further comprise wirelessly communicating the name and the password from the remotely located computing device to the doorbell.

Several methods include entering a Network Connection Mode prior to sending the wireless notification. The Network Connection Mode can comprise detecting a first wireless network having a name and a password. The Network Connection Mode can comprise inputting a doorbell identification code into the remotely located computing device. The doorbell identification code can be associated with the doorbell. The Network Connection Mode can further comprise using the doorbell identification code to verify whether the remotely located computing device is authorized to communicate with the doorbell. The Network Connection Mode can comprise the remotely located computing device creating a second wireless network. The Network Connection Mode can comprise transmitting the name and the password of the first wireless network directly from the remotely located computing device to the doorbell via the second wireless network to enable the doorbell to communicate with the remotely located computing device via the first wireless network. Methods can comprise the doorbell directly communicating with the remotely located computing device via the second wireless network prior to the doorbell indirectly communicating with the remotely located computing device via the first wireless network.

The doorbell identification code 222 can be any number of characters, such as 9 characters or at least 24 characters in length. Therefore, entering the doorbell's identification code 222 via typing can be cumbersome and prone to user error. Each security system 202 (or any other type of smart device) can come with a barcode 1035 (e.g., a matrix barcode such as a Quick Response Code).

The barcode 1035 can be packaged with the security system 202. For example, the barcode 1035 can be located on a box or inside of a box that contains the security system 202 such that a person who buys the security system 202 will have access to the barcode 1035 when she is ready to install the security system 202.

Figure 63:
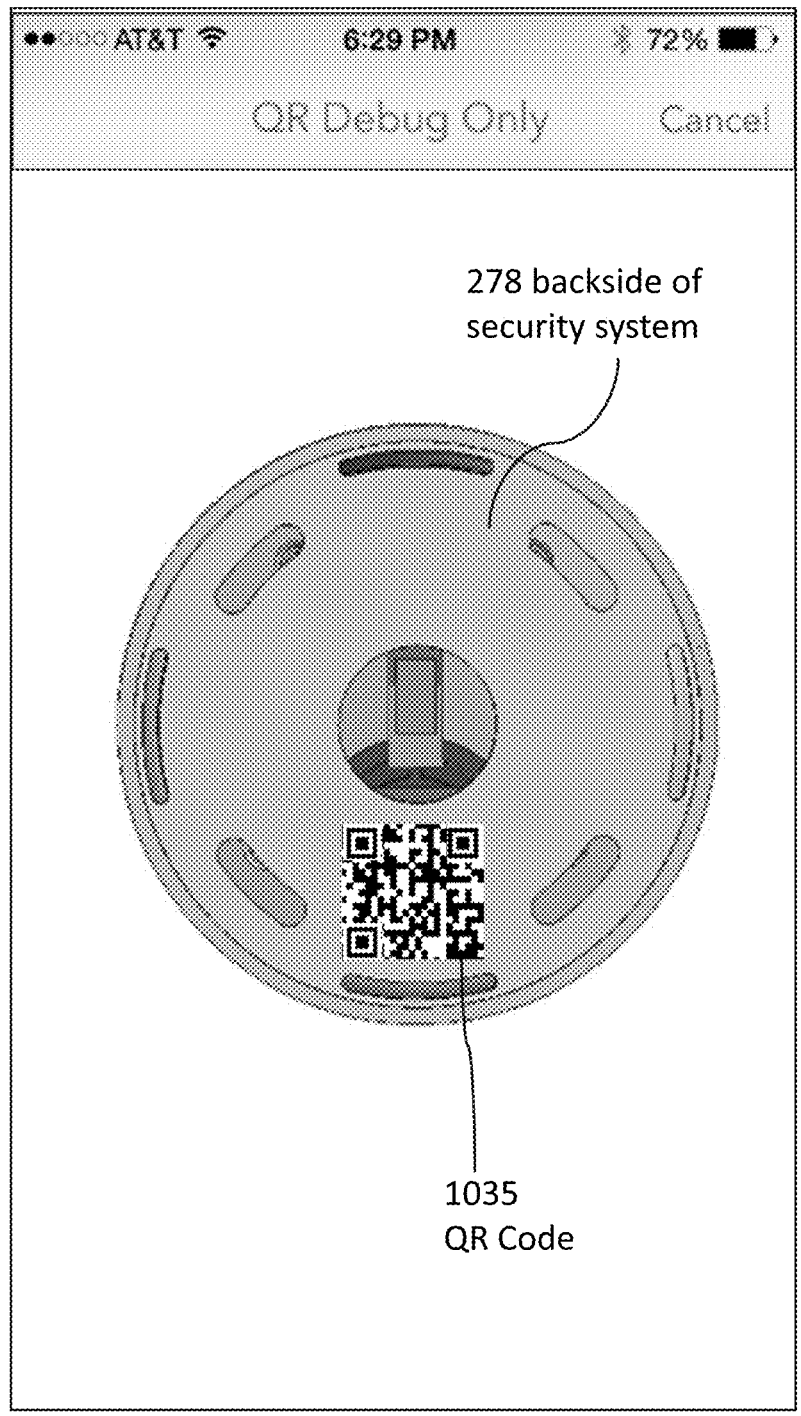

The barcode 1035 can be on a sticker on the security system 202 (e.g., on the backside of the security system 278, as shown in FIG. 63), can be laser etched onto device, and/or can be included in materials shipped with the security system 202 (e.g., in an instruction manual or on a surface of a packaging in which the security system 202 is shipped in). The remote computing device 204 (e.g., shown in FIG. 1) can include software (e.g., an "app") configured to scan the barcode to receive the doorbell identification code 222 and/or other setup data.

Figure 62:
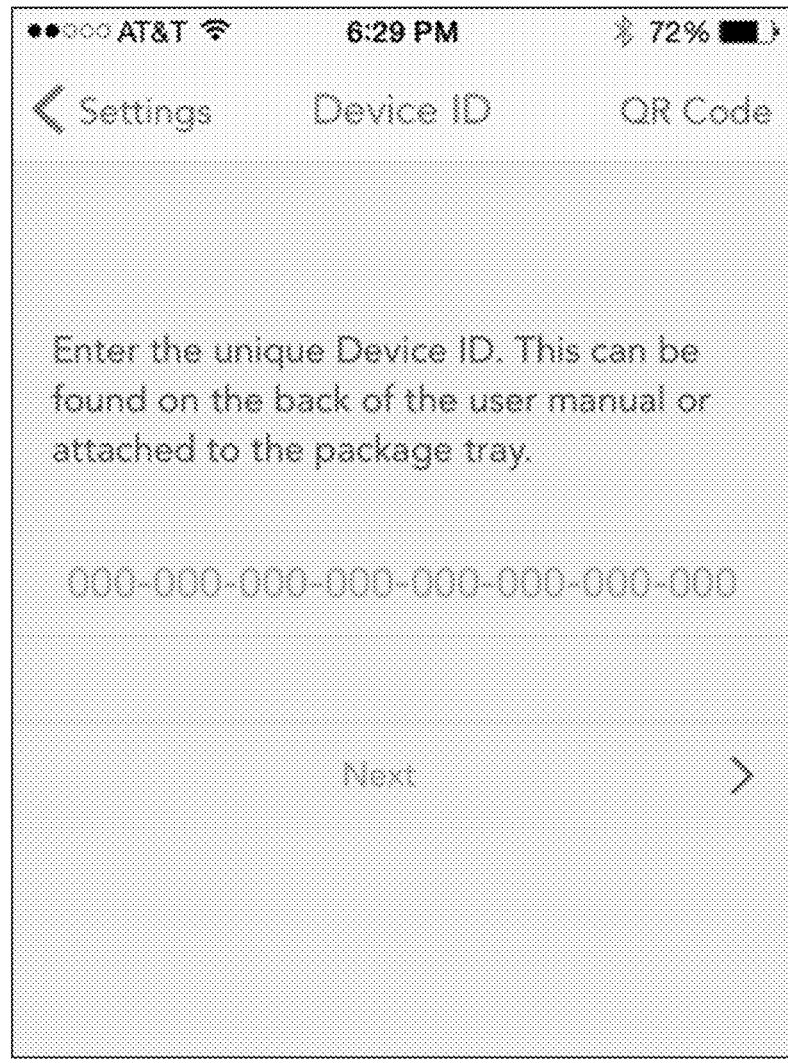

The remote computing device 204 can be configured to receive the barcode 1035. In some embodiments the remote computing device 204 can prompt a user to retrieve the barcode 1035 through various display screens, as shown in FIGS. 61-64. For example, as illustrated in FIG. 62, when the app prompts the user to enter the doorbell identification code 222 (e.g. an activation code), the remote computing device 204 may automatically enable the camera on the user's remote computing device 204 to take a picture (e.g. scan) the barcode 1035.

Figure 64:
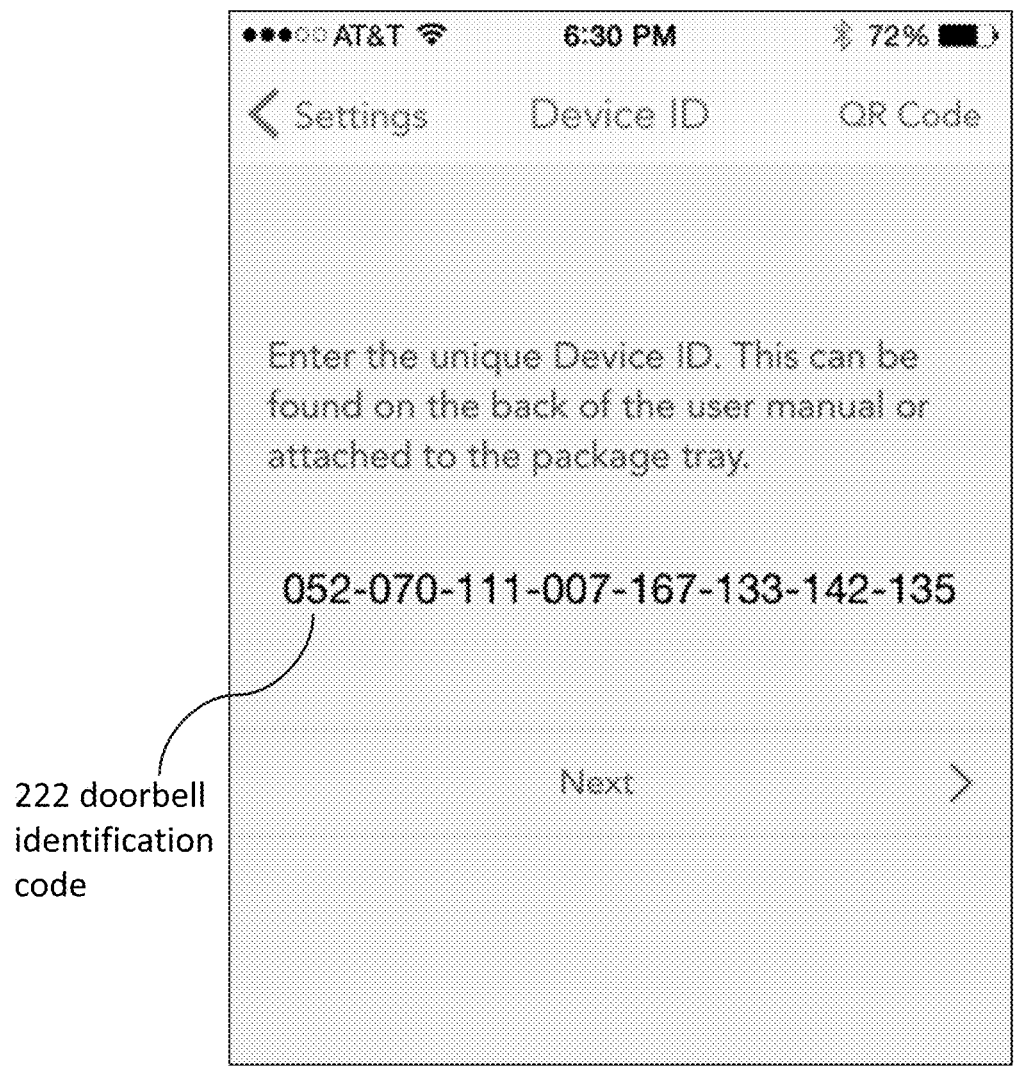

Upon scanning or taking a picture of the barcode 1035, the activation code 222, which can be embedded within the barcode 1035, can be received by the remote computing device 204 and can thereby be displayed on the display screen as shown in FIG. 64. By receiving the activation code 222 (or doorbell identification code), this transaction can authorize the remote computing device 204 to communicate with the security system 202, via a second wireless network that can be created by either the remote computing device 204 or the security system 202. In some embodiments, the remote computing device 204 is communicatively coupled with the security system 202 via any type of wired connection, such as a cable that connects the remote computing device 204 to the security system 202.

In some embodiments the remote computing device 204 must be authorized before the security system 202 can communicate with the remote computing device 204. In some embodiments, this authorization is initiated by pressing the button 212 of the security system 202 for a predetermined amount of time. The predetermined amount of time may be one second, two seconds, three seconds, eight seconds, at least twenty seconds, and the like. Generally, it should be appreciated that the predetermined amount of time may be any amount of time.

In some embodiments, the barcode or other image configured to be scanned has limited data transmission ability. For example, some barcodes only communicate a number. In some embodiments, the remote computing device contacts a remote computer (e.g., a server) and provides information from the barcode to the remote computer. Then, the remote computer can use the information from the barcode to authorize providing more detailed information to the remote computing device. In some embodiments, the remote computer uses a database to find information associated with the information from the barcode. In several embodiments, the remote computer can pass the more detailed information to the remote computing device in response to the remote computing device providing data from the barcode or other image located on the security system (e.g., a doorbell).

In several embodiments, the barcode or other image on the security system can replace the doorbell identification code 222. For example the barcode or other image can be used to determine that the remote computing device is authorized to setup and/or control features, functions, and/or communications of the security system.

In some embodiments, the barcode communicates the doorbell identification code 222 to the remote computing device. The remote computing device can use its camera to take a picture of the barcode. The remote computing device can then analyze the picture to "read" the barcode.

In some cases, barcodes include information helpful to connect security systems and/or remote computing devices to Wi-Fi networks. For example, network passwords and names can be embedded in images (e.g., barcodes).

Network Congestion

In some cases, communication networks might be unable to transmit data at sufficient rates between a security system 202 and a remote computing device 204. Network congestion can occur when a link or node is carrying too much data, which can result in the deterioration of the quality of communication services. Several embodiments include methods to address network congestion and low data transmission rates.

Figure 18:
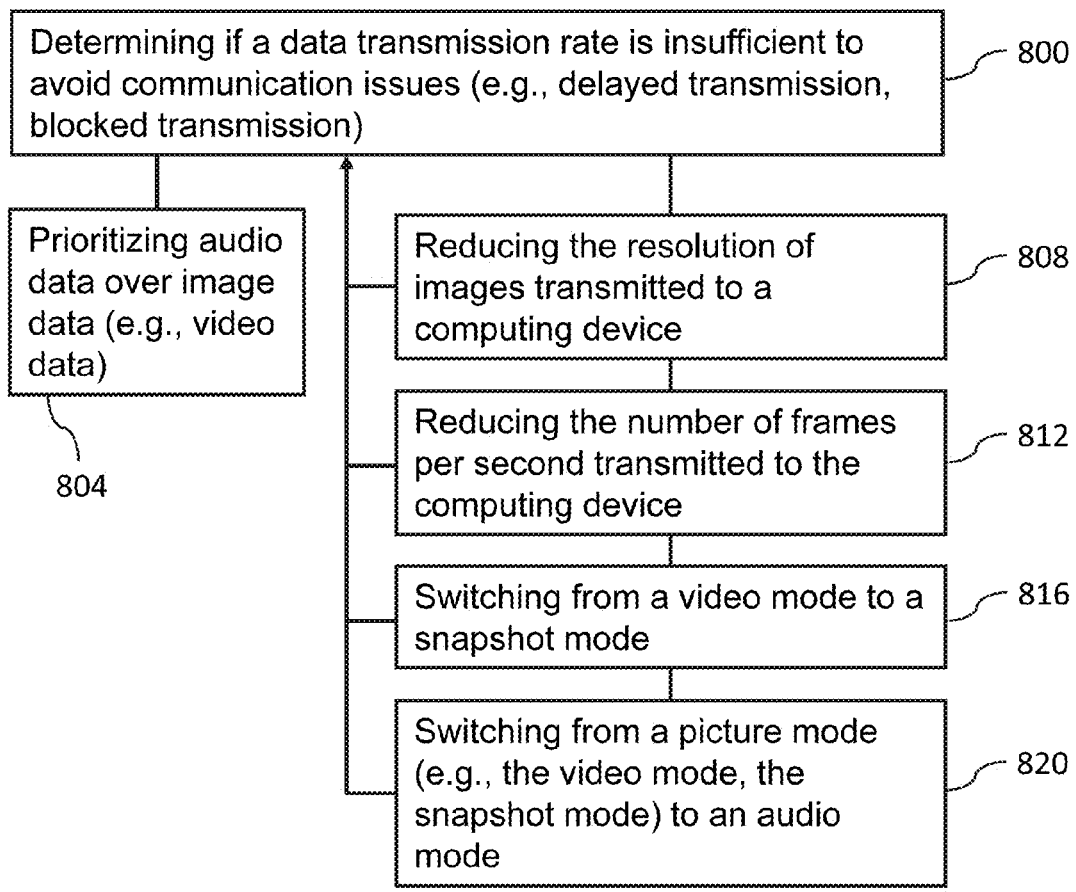
FIG. 18 illustrates data prioritization methods, according to some embodiments.

FIG. 18 illustrates a data prioritization method, according to some embodiments. FIG. 18 includes optional steps and steps that can be performed in any order. Step 800 can include determining if a data transmission rate is insufficient to avoid communication issues (e.g., delayed transmission, blocked transmission). For example, a data transmission rate between a security system 202 and a computing device 204 can be insufficient if audio and/or video is not transmitted reliably, is transmitted intermittently, and/or the video data is transmitted more than 0.2 seconds after the audio data. If the data transmission rate is insufficient, the method can include means to address the problem, and then can include determining if the means to address the problem resolved the insufficiency. If the insufficiency is not resolved, the method can include using another means to address the problem, and then can include determining if the second means to address the problem resolved the insufficiency. The method can include using additional means to address the insufficiency until the data transmission rate is sufficient to avoid communication issues.

Several embodiments include prioritizing audio data over image data (e.g., video data), which is included in FIG. 18 as Step 804. Methods can include determining if a data transmission rate is insufficient to avoid communication issues. If the data transmission rate is insufficient to avoid communication issues, the method can include adding and/or using priority information (e.g., control information, header information) regarding the type of service (e.g., quality of service) to audio data and/or video data (e.g., payload data). The method can also include making the priority information for audio data higher than the priority information for video data.

Some embodiments include making the priority information for a picture (e.g., a still image) of the visitor higher than the priority information for a video of the visitor. Some embodiments include making the priority information for audio of the visitor higher than the priority information for the picture of the visitor and/or higher than the priority information for the video of the visitor. Some embodiments include making the priority information for audio of the user (e.g., the user of the computing device 204 in FIG. 1) higher than the priority information for the audio of the visitor.

Step 808 can include reducing the resolution of images transmitted to a computing device. Step 812 can include reducing the number of frames per second transmitted to the computing device. Step 816 can include switching from a Video Mode to a Snapshot Mode. The Snapshot Mode includes sending at least one still image (not more than every 0.3 seconds). Step 820 can include switching from a Picture Mode (e.g., the Video Mode, the Snapshot Mode) to an Audio Mode. In the Audio Mode, no videos or pictures are sent to the computing device (e.g., 204 in FIG. 1).

Following Mode

Referring now to FIGS. 2 and 5, in some embodiments, allowing the user to see the visitor can be important to facilitate quality interaction with the visitor or to identify the visitor. In some embodiments, the camera assembly 208 moves to point towards the visitor (e.g., moves towards the center the motion detected by the motion detector, moves towards the center of an IR signal indicative of a human temperature, moves as controlled by the user via a computing device 204).

Figure 19:
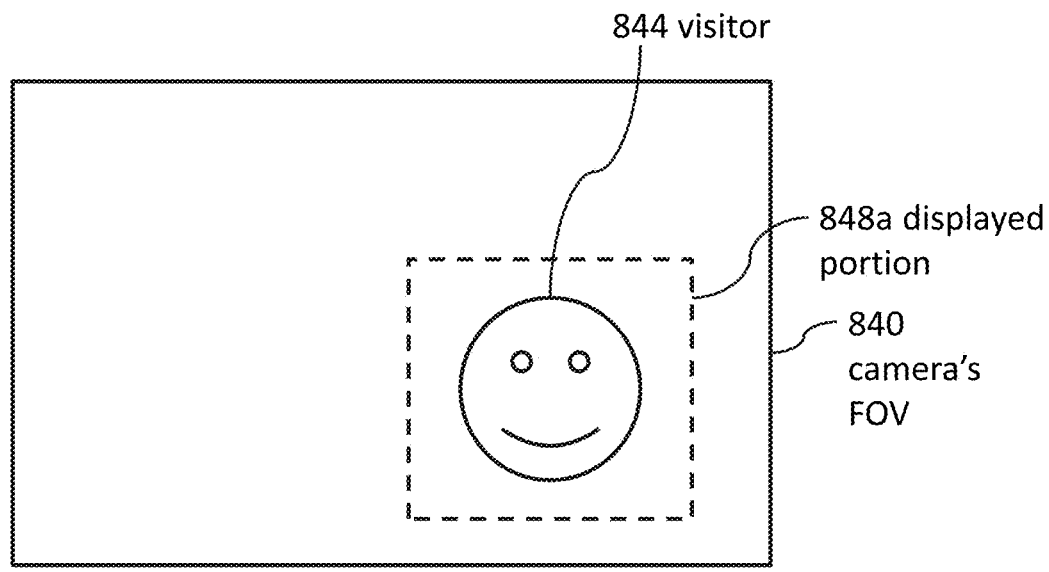
FIGS. 19 and 20 illustrate a visitor in two locations within a camera's field of view, according to some embodiments.
Figure 20:
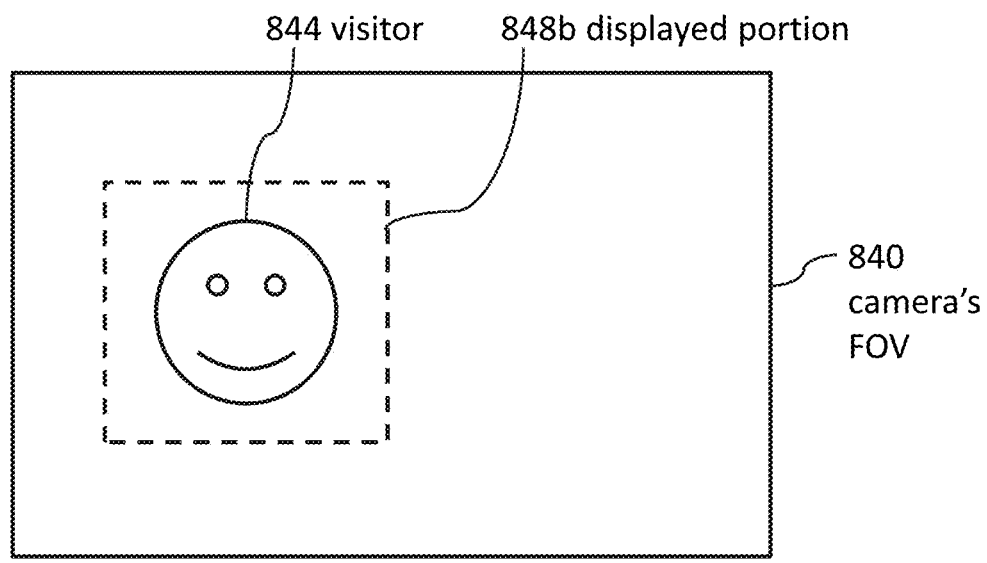

In several embodiments, the image 252 is a portion of the image captured by the camera assembly 208. The image captured by the camera assembly 208 is the camera's field of view ("FOV") 840 (as shown in FIGS. 19 and 20). The image 252 can be a portion of the camera's FOV 840 that includes the visitor (as detected by the motion sensor, IR sensor, machine vision, and/or facial recognition software).

Referring now to FIGS. 2, 19, and 20, the portion of the camera's FOV 840 that is shown on the computing device 204 (e.g., in the image 252) is the displayed portion 848a,b. The communication system can be configured such that the displayed portion 848*a,b* includes the visitor 844 even when the visitor 844 moves from a first position (as illustrated in FIG. 19) to a second position (as illustrated in FIG. 20) within the camera's FOV 840. In some embodiments, the camera's FOV 840 is maintained (i.e., doesn't change) even though the displayed portion 848*a,b* changes. The method of displaying a portion that includes a visitor is called Following Mode.

In some embodiments, the user can select characteristics of the portion of the camera's FOV 840 that is shown on the computing device 204. These characteristics can include a Face Mode, wherein the displayed portion 848*a,b* includes less than 90% of the FOV 840 but at least 40% of the displayed portion 848*a,b* shows the visitor's head, at least 30% of the displayed portion 848*a,b* shows the visitor's head, or at least 15% of the displayed portion 848*a,b* shows the visitor's head. These characteristics can include a Body Mode wherein the image 252 includes less than the entire FOV 840 or less than 80% of the FOV 840 but includes at least 80% of the body of the visitor, at least 50% of the body of the visitor, or at least 30% of the body of the visitor. These characteristics can include a Group Mode wherein the image 252 includes less than the entire FOV 840 or less than 80% of the FOV 840 but includes at least a portion of each of two visitors (if present), at least a portion of each of three visitors (if present), at least at portion of the majority of each of the visitors, at least 30% of all of the visitors, or at least the heads of all of the visitors. Once the user sets Face Mode, Body Mode, or Group Mode, the system automatically shows the portion of the FOV 840 described above in the image 252 without the user having to manually zoom.

Figure 21:
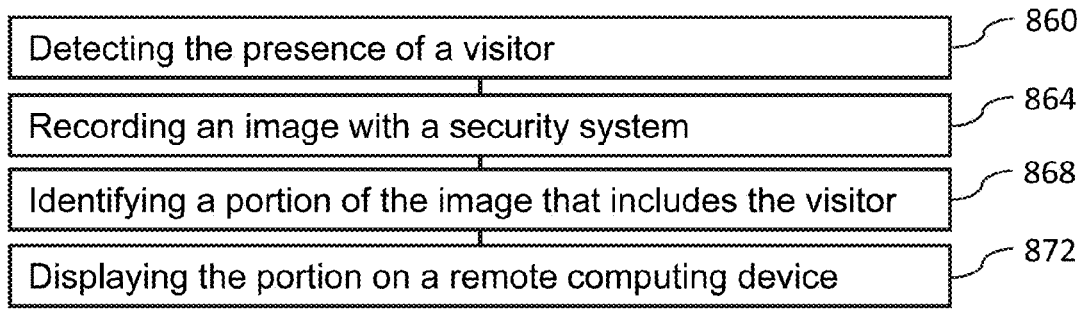
FIGS. 21 and 22 illustrate methods of displaying a visitor, according to some embodiments.

FIG. 21 illustrates a method of displaying a visitor, according to some embodiments of Following Mode. Step 860 can include detecting the presence of a visitor. Step 864 can include recording an image with a security system. Step 868 can include identifying a portion of the image that includes the visitor. Step 872 can include displaying the portion on a remote computing device.

Figure 22:
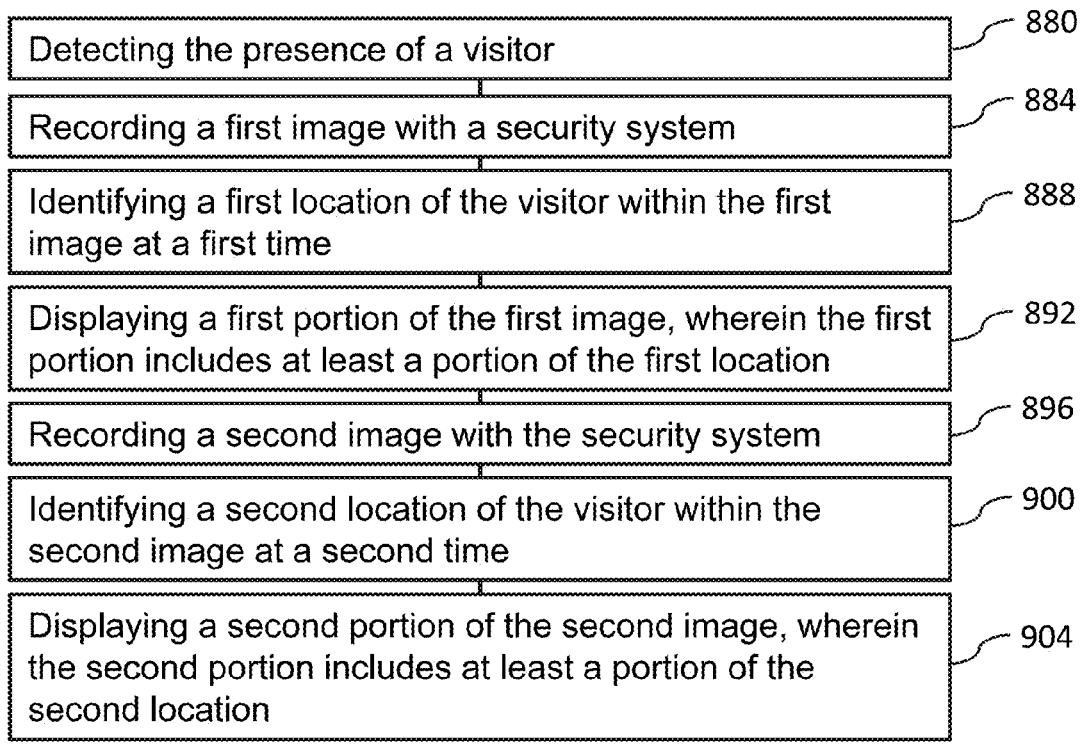

FIG. 22 illustrates a method of displaying a visitor, according to some embodiments of Following Mode. Step 880 can include detecting the presence of a visitor. Step 884 can include recording (e.g., filming, taking, sensing even if not stored in memory) a first image with a security system. Step 888 can include identifying a first location of the visitor within the first image at a first time. Step 892 can include displaying a first portion of the first image, wherein the first portion includes at least a portion of the first location. Step 896 can include recording a second image with the security system. Step 900 can include identifying a second location of the visitor within the second image at a second time. In some embodiments, the first image and the second image have the same FOV. Some methods include maintaining the camera's field of view between the first image and the second image. Step 904 can include displaying a second portion of the second image, wherein the second portion includes at least a portion of the second location. Displaying can include displaying an image on a computing device (e.g., 204 in FIG. 2).

Additional Devices

Communication systems can include additional devices, can work in conjunction with additional devices, and/or can communicate with additional devices. In some embodiments, the additional devices (e.g., chimes as described previously) are part of the communication system. In some embodiments, the additional devices are not part of the communication system.

Figure 23:
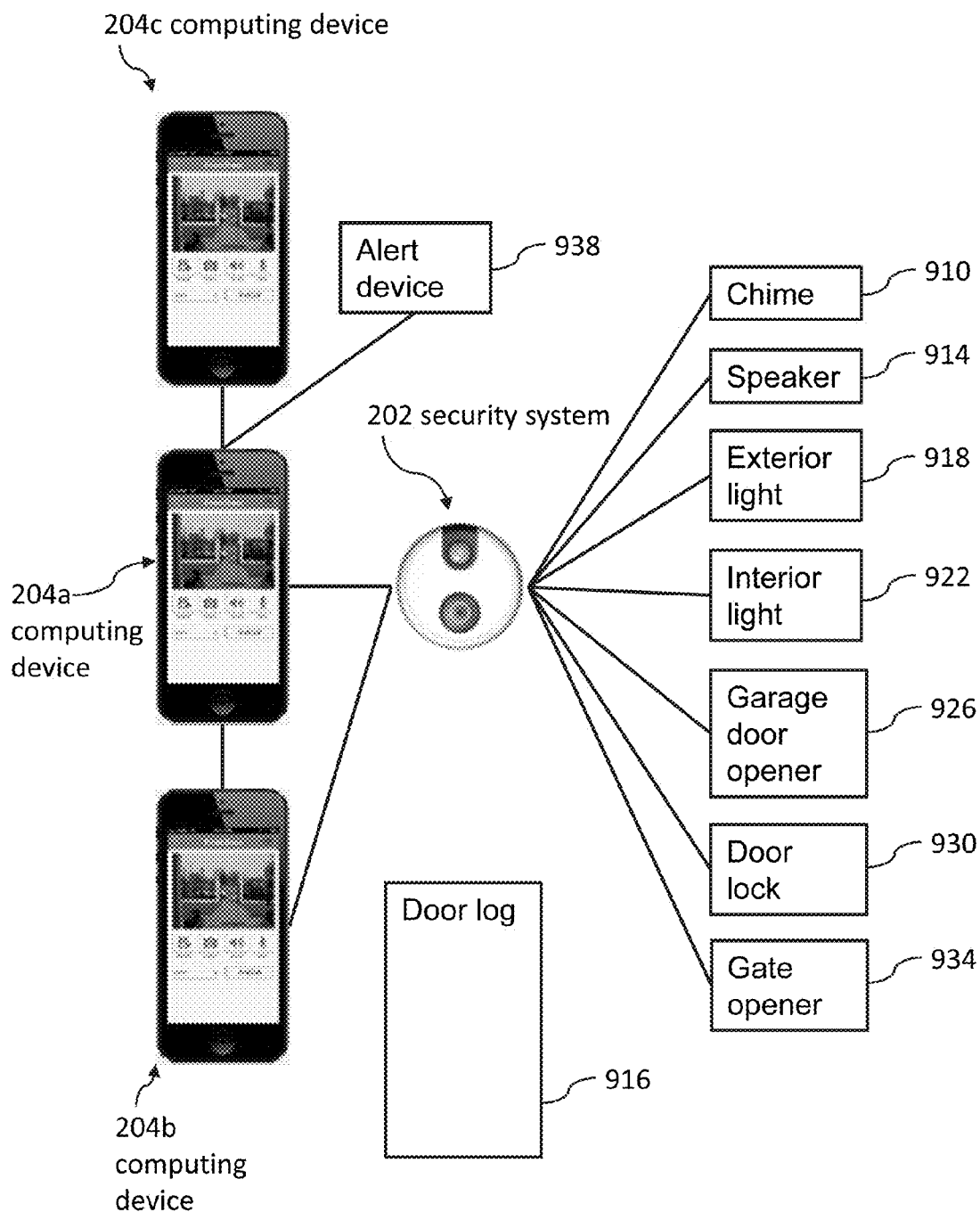
FIG. 23 illustrates several devices that can communicate with a security system, according to some embodiments.

Referring now to FIG. 23, additional devices can include chimes 910, speakers 914, and lights 918, 922. In some embodiments, a communication system causes an exterior light 918 (e.g., a porch light) and/or an interior light 922 (e.g., a lamp, overhead lights inside of a home) to illuminate when the security system 202 detects a visitor (e.g., when a visitor pushes the doorbell button).

Some embodiments include a speaker 914 located inside of the building. The user's voice can be emitted from the speaker 914 located inside of the building to make the visitor believe the user is speaking from inside the building (even when the user is located far away from the building and speaking into a remote computing device such as a smartphone). The security system 202 can transmit the user's audio information to the speaker 914 located inside of the building via wireless communication means such as Bluetooth.

In some embodiments, the security system 202 wirelessly communicates with a chime 910 located inside of the building. In some embodiments, the security system sends information or signals to a chime 910 via wires.

In several embodiments, the security system 202 wirelessly communicates with a garage door opener 926, which can be located inside of the building and configured to open a garage door of the building. The user can instruct the garage door to open via a user interface on a remote computing device 204*a*. The remote computing device 204*a* can communicate with the security system 202, which can wirelessly communicate the command to the garage door and/or garage door opener 926.

In several embodiments, the security system 202 communicates with a door lock 930 (e.g., a deadbolt). The user can instruct the door lock 930 to open via a user interface on a remote computing device 204*a*. The remote computing device 204*a* can communicate with the security system 202, which can communicate the command to the door lock 930. In some embodiments, the user can "buzz" someone into an apartment complex via an app on a computing device such as a smartphone.

In several embodiments, the security system 202 communicates with a gate opener 934 (e.g., an electric or robotic gate opener configured to unlock and/or open a gate, such as a gate to an apartment complex or a gate that blocks an entrance to a driveway).

As illustrated in FIG. 23, a first remote computing device 204*a* can send commands to and/or receive information from devices (e.g., chimes 910, speakers 914, exterior lights 918, interior lights 922, garage door openers 926, door locks 930) via a security system 202, which can include a doorbell. The security system 202 can communicate with a second remote computing device 204*b*.

In some embodiments, the first remote computing device 204*a* can communicate information regarding the security system 202 with the second remote computing device 204*b*. The information regarding the security system 202 communicated between remote computing devices can be any of the information described herein.

In several embodiments, the first remote computing device 204*a* forwards information from the security system 202 to a third remote computing device 204*c* and/or to an alert device 938. The alert device 938 can be any device configured to alert a user or person. In some embodiments, the alert device 938 is a watch that vibrates or displays a message to a user. In some embodiments, the alert device 938 is an alarm system.

In some embodiments, the software and/or user interface of a first computing device 204*a* allows the user to forward the communication request to a second computing device 204*b* and/or to a third computing device 204*c*. For example, a user might see that the visitor is a friend of the user's child. The user can then forward the communication request to the child's computing device with or without answering the communication request. In some embodiments, once a communication request is forwarded to another computing device, the security system plays a pre-recorded message, which can be a message that instructs the visitor to standby, wait, and/or have patience while the communication request is forwarded to another user.

Some embodiments include one security system 202 that can communicate with many computing devices. For example, one security system 202 can be placed at the entrance of an apartment complex that includes 100 individual homes. The security system 202 can be configured to properly route a communication request to the appropriate user. Some multi-home buildings include a call box near a central entryway. The security system 202 can listen to the sounds (e.g., tones) a visitor types in the call box to identify the home (and thus, the user) the visitor seeks. The security system 202 can listen to the user name the visitor requests (e.g., states) to identify the user the visitor seeks. The security system 202 can use a microphone and/or sound recognition software listen and recognize sounds. In some embodiments, the security system 202 identifies that a visitor is making a communication request by listening for a sound (e.g., a buzz of an intercom system). The security system 202 can then respond appropriately.

Figure 24:
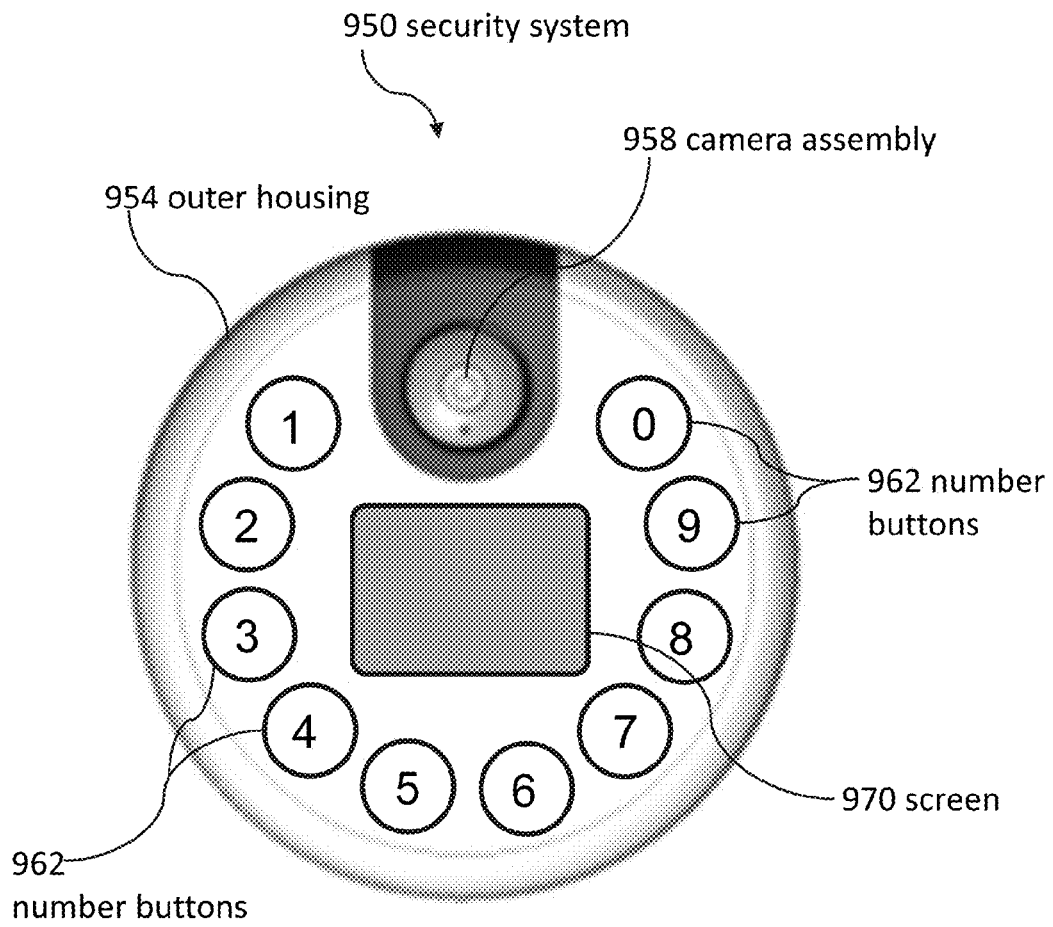
FIG. 24 illustrates an embodiment of a security system with multiple buttons, according to some embodiments.

FIG. 24 illustrates an embodiment of a security system 950 (e.g., a doorbell) with an outer housing 954 and a camera assembly 958. The security system 950 can have buttons 962, which can be number and/or letter buttons configured to enable a visitor to select and/or dial a specific house, apartment, office, and/or person. Not all of the buttons 962 are labeled in FIG. 24 in the interest of clarity. The buttons 962 are illustrated as circles. The security system 950 can be placed near an entryway of a building in which many people are located. For example, a visitor might want to contact home number "204." The visitor can type "204" into the security system 950, which can cause the security system to initiate contact with a computing device of a user who lives in home number "204."

The security system 950 can enable two-way audio. A microphone inside the security system 950 can detect a visitor's sounds and a speaker in a computing device can deliver the visitor's sounds to the user. A microphone in the computing device can detect a user's sounds and a speaker in the security system 950 can deliver the user's sounds. The security system 950 can enable two-way video. A video camera of the security system 950 can detect images of the visitor and a screen of the computing device can display the images of the visitor. A video camera of the computing device can detect images of the user and a screen 970 of the security system 950 can display the images of the user. The screen 970 can be a light emitting diode display, a liquid crystal display, a plasma display, or any other display that can show images.

Some security system embodiments allow users and/or visitors to enter information (e.g., a password) with the buttons 962 to cause certain actions and/or enable certain features (e.g., unlock a door, open a garage, open a gate, turn an alarm system off, turn an alarm system on, call a particular person, enter a network password, enter a network name, enter any of the modes described herein, exit any of the modes described herein).

Select System Embodiments

Figure 25:
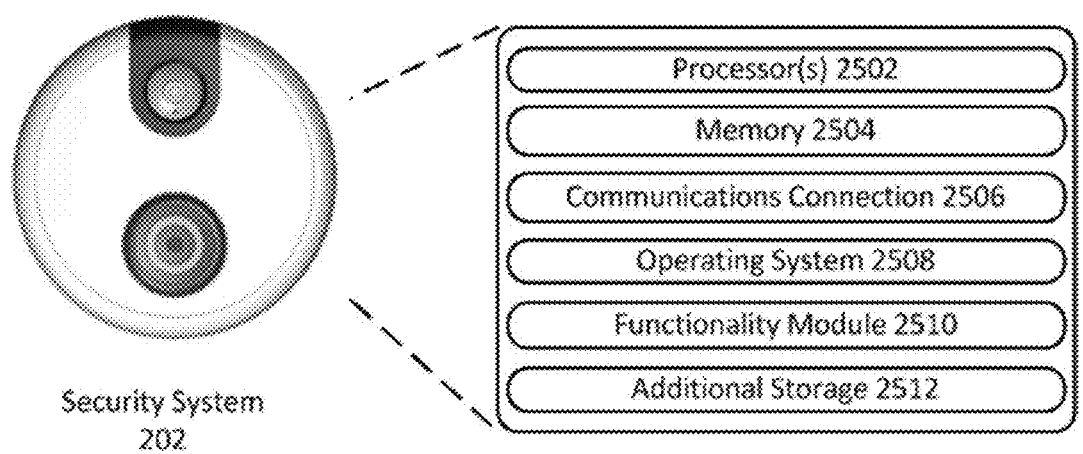
FIG. 25 depicts an illustrative embodiment of a security system with hardware and software components, according to some embodiments.

FIG. 25 depicts an illustrative embodiment of a security system 202. The security system 202 may include at least one processing unit (or processor(s)) 2502 and at least one memory 2504. The processor(s) 2502 may be implemented as appropriate in hardware, computer-executable instructions, firmware or combinations thereof. Computer-executable instruction or firmware implementations of the processor(s) 2502 may include computer-executable or machine-executable instructions written in any suitable programming language to perform the various functions described. The security system 202 may also contain communications connection(s) 2506 that allow the security system 202 to communicate with a wireless router, another computing device or server, user terminals, and/or other devices.

The processor 2502 described herein can be hardware circuitry or at least one computer system. As used herein "microprocessor" and "processor" can refer to circuitry, hardware circuitry, a computer, a computer system, and/or one or more computer systems. As used herein, "module" can refer to a portion of a security system, a portion of a computer, hardware circuitry, and/or software.

In some implementations, the memory 2504 may include different types of memory, such as static random access memory ("SRAM"), dynamic random access memory ("DRAM") or read only memory ("ROM"). Turning to the contents of the memory 2504 in more detail, the memory 2504 may include an operating system 2508 and at least one application program or service for implementing the features disclosed herein including at least a functionality module 2510. The functionality module 2510 can refer to software and/or a computer. The memory 2504 may further include additional storage 2512 that is capable of storing recorded data.

Figure 26:
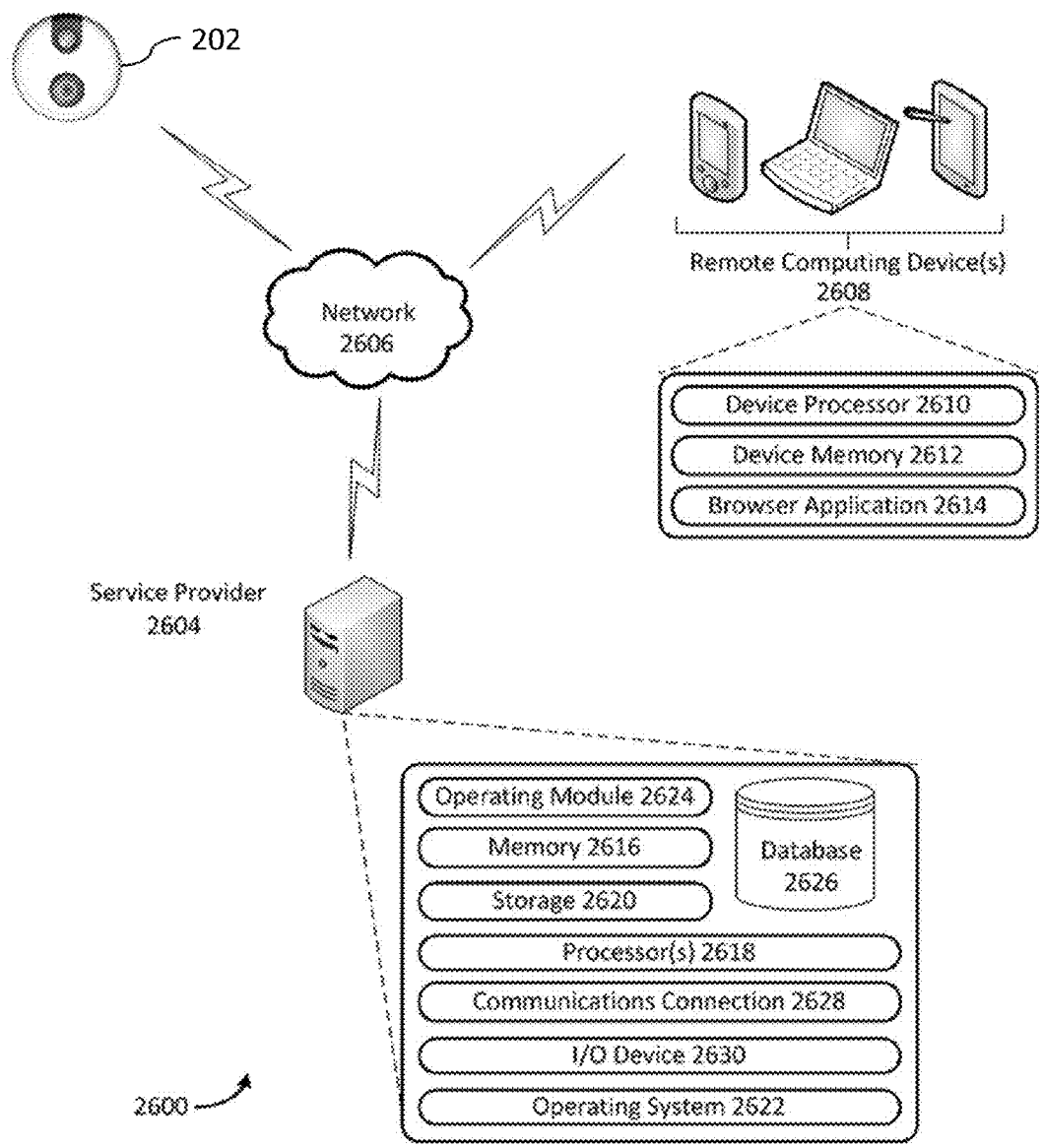
FIG. 26 depicts an illustrative embodiment of a system or architecture 2600 in which a security system for allowing communication may be implemented, according to some embodiments.

FIG. 26 depicts an illustrative embodiment of a system or architecture 2600 in which a security system may be implemented. In some embodiments of this architecture 2600, at least one security system 202 may be in communication with a service provider 2604 via a network 2606. The security system 202 may provide notifications or recorded data to the service provider 2604.

The remote computing devices 2608 may be any type of computing device such as, but not limited to, a mobile phone, a smart phone, a personal digital assistant ("PDA"), a laptop computer, a desktop computer, a server computer, a thin-client device, a tablet PC, etc. The remote computing device 2608 may include at least one device processor 2610 capable of processing data recorded by the security system 202. Data may be stored in the remote computing device's 2608 device memory 2612 or it may be streamed over the network 2606. Where the data is streamed over the network 2606, it may be displayed using a browser application 2614. The device processor 2610 described herein can be hardware circuitry.

In some embodiments, the networks 2606 may include any one or a combination of many different types of networks, such as cable networks, the Internet, wireless networks, cellular networks, and other private and/or public networks. While the illustrated embodiment represents the users accessing the browser application 2614 over the networks 2606, the described techniques may equally apply in instances where the users interact with a service provider computer 2604 via the remote computing device 2608 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

As described briefly above, the browser application 2614 may allow the users to interact with a service provider computer 2604, such as to store, access, and/or manage data, develop and/or deploy computer applications, and/or host web content. The at least one service provider computer 2604, perhaps arranged in a cluster of servers or as a server farm, may host the browser application 2614. These servers may be configured to host a website (or combination of websites) viewable via the remote computing device 2608 or a web browser accessible by a user. Other server architectures may also be used to host the browser application 2614. The browser application 2614 may be capable of handling requests from many users and serving, in response, various user interfaces that can be rendered at the remote computing device 2608 such as, but not limited to, a web site. The browser application 2614 can be any type of website that supports user interaction, including social networking sites, electronic retailers, informational sites, blog sites, search engine sites, news and entertainment sites, and so forth. As discussed above, the described techniques can similarly be implemented outside of the browser application 2614, such as with other applications running on the remote computing device.

The service provider computers 2604 may be any type of computing device such as, but not limited to, a mobile phone, a smart phone, a personal digital assistant ("PDA"), a laptop computer, a desktop computer, a server computer, a thin-client device, a tablet PC, etc. The service provider computers 2604 may be the server 206 depicted in FIG. 1. Additionally, it should be noted that in some embodiments, the service provider computers 2604 may be executed by at least one virtual machine implemented in a hosted computing environment. The hosted computing environment may include at least one rapidly provisioned and released computing resource, which may include computing, networking, and/or storage devices. A hosted computing environment may also be referred to as a cloud-computing environment.

In one illustrative configuration, the service provider computers 2604 may include at least one memory 2616 and at least one processing unit (or processor(s)) 2618. The processor(s) 2618 may be implemented as appropriate in hardware, computer-executable instructions, firmware or combinations thereof. Computer-executable instructions or firmware implementations of the processor(s) 2618 may include computer-executable or machine-executable instructions written in any suitable programming language to perform the various functions described. The processor 2618 described herein can be hardware circuitry.

The memory 2616 may store program instructions that are loadable and executable on the processor(s) 2618, as well as data generated during the execution of these programs. Depending on the configuration and type of service provider computers 2604, the memory 2616 may be volatile, such as random access memory ("RAM"), and/or non-volatile, such as read-only memory ("ROM") or flash memory. The service provider computers 2604 may also include additional storage 2620, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 2616 may include multiple different types of memory, such as static random access memory ("SRAM"), dynamic random access memory ("DRAM") or ROM. Turning to the contents of the memory 2616 in more detail, the memory 2616 may include an operating system 2622 and at least one application program or service for implementing the features disclosed herein including at least one operating module 2624. The memory 2616 may further include a database 2626 with information related to contacts or people. The database 2626 may also be a third-party database. One illustrative example of this element is a social networking website database or a criminal database. The operating module 2624 can be a computer, hardware circuitry, and/or software.

The memory 2616 and the additional storage 2620, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the remote computing device 2608 or the service provider computers 2604. The service provider computers 2604 may also contain communications connection(s) 2628 that allow the service provider computers 2604 to communicate with a stored database, another computing device or server, user terminals, and/or other devices on the networks 2606. The service provider computers 2604 may also include input/output ("I/O") device(s) and/or ports 2630, such as for enabling connection with a keyboard, a mouse, a pen, a voice input device, a touch input device, a display, speakers, a printer, etc.

Turning to the contents of the memory 2616 in more detail, the memory 2616 may include an operating system 2622, a database containing contact data 2626 and the at least one application program or service for implementing the features disclosed herein including an operating module 2626.

Some or all aspects of the operating module 2624 may be implemented on a remote computing device 2608, such as in a mobile application. There are many methods of implementing the following features. For example, the following features could be implemented by installing a mobile application on a remote computing device 2608 or by accessing a service provider 2604 via a web browser application 2614 on a remote computing device 2608. The operating module 2624 may be configured to process data received from at least one remote computing device 2608 and/or the security system 202. The operating module 2624 may also be configured to convey messages between the remote computing device 2608 and the security system 202. Additionally, the operating module 2624 may provide a user of the remote computing device 2608 with the ability to control settings or functions of the security system 202.

In some embodiments, the operating module 2624 may have facial recognition functionality capable of identifying a potential visitor. There are multiple methods of implementing such a system. For example, some social networking sites, such as Facebook.com, have facial recognition functionality. It is envisioned that the operating module 2624 may communicate with such a site to receive a visitor's identity. Alternatively, the service provider 2604 may provide the functionality itself based on contacts stored in a database 2626. Facial recognition may also be used to determine if a human is present. For example, if a motion detector on the security system 202 detects movement, the operating module 2624 may use facial recognition to determine whether a person is present before notifying a remote computing device 2608.

The operating module 2624 may be configured to communicate and interact with the functionality module 2510 of the security system 202, as well as the remote computing device 2608. This communication and interaction can be achieved in a variety of ways. It is envisioned that the operating module 2624 will be able to provide a user of the remote computing device 2608 with the ability to perform several types of functions in conjunction with the security system 202.

Temperature and Humidity Embodiments

Referring now to FIG. 11, the security system 202 can be configured to measure temperature and/or humidity. As well, embodiments of the security system 202 may also be configured to regulate temperature within the security system 202.

Users of the security system 202 may desire to know the temperature of the outside environment adjacent the security system 202. Accordingly, the security system 202 can include a thermometer 512 (e.g. a temperature sensor) coupled to the security system 202. The temperature sensor 512 can enable the system to determine the temperature inside a portion of the security system 202 and/or outside of the security system 202. In some embodiments, a remote computing device 204, a server, a service provider, and/or the security system 202 is the portion of the system that determines the temperature based on data from the thermometer 512.

In some embodiments, the thermometer 512 comprises any type of temperature sensor such as, but not limited to an infrared sensor, thermometer, thermistor, thermocouple, resistance thermometer, and the like. The thermometer 512 can be electrically coupled to a printed circuit board 516, which can be located at least partially inside the security system 202.

In addition to detecting temperature, the system can also include a humidity sensor 552 coupled to the security system 202. The humidity sensor 552 can measure and/or detect humidity inside the security system 202 and/or outside of the security system 202. In some embodiments, the humidity sensor 552 is a psychrometer and/or a hygrometer. In some embodiments, a remote computing device 204, a server, a service provider, and/or the security system 202 is the portion of the system that determines the humidity based on data from the humidity sensor 552 or a humidity sensor not associated with the system.

The security system 202 can also include a memory 492 which can be coupled to the printed circuit board 516. The memory 492 can store various temperature and/or humidity data such as, for example, a first temperature data and a second temperature data. In some embodiments, the memory 492 can be configured to store the temperature and humidity data for predetermined amounts of time, for example 1 hour, 1 day, 1 week, or even 1 year. In the event the memory 492 becomes full, the temperature and humidity data can be backed up and stored on a remote computer, such as a remote server.

The security system 202 can be configured to transmit the temperature and/or humidity data to a remote computing device 204, such as a smart phone. In some embodiments, the system can include a wireless temperature communication and/or a wireless humidity communication emitted by the security system 202.

Accordingly, embodiments can include the remote computing device 204 which can be communicatively coupled to the security system 202. Embodiments may also include a temperature indication displayed by the remote computing device 204 in response to the wireless temperature communication being emitted by the security system 202. The remote computing device 204 can also receive a visitor notification from the security system 202. The visitor notification can comprise various information such as an indication of the temperature.

Accordingly, systems configured to detect humidity can also include a humidity indication that can be displayed by the remote computing device 204. It should be appreciated that the humidity indication can be displayed by the remote computing device 204 in response to the wireless humidity communication being emitted by the security system 202.

Figure 74:
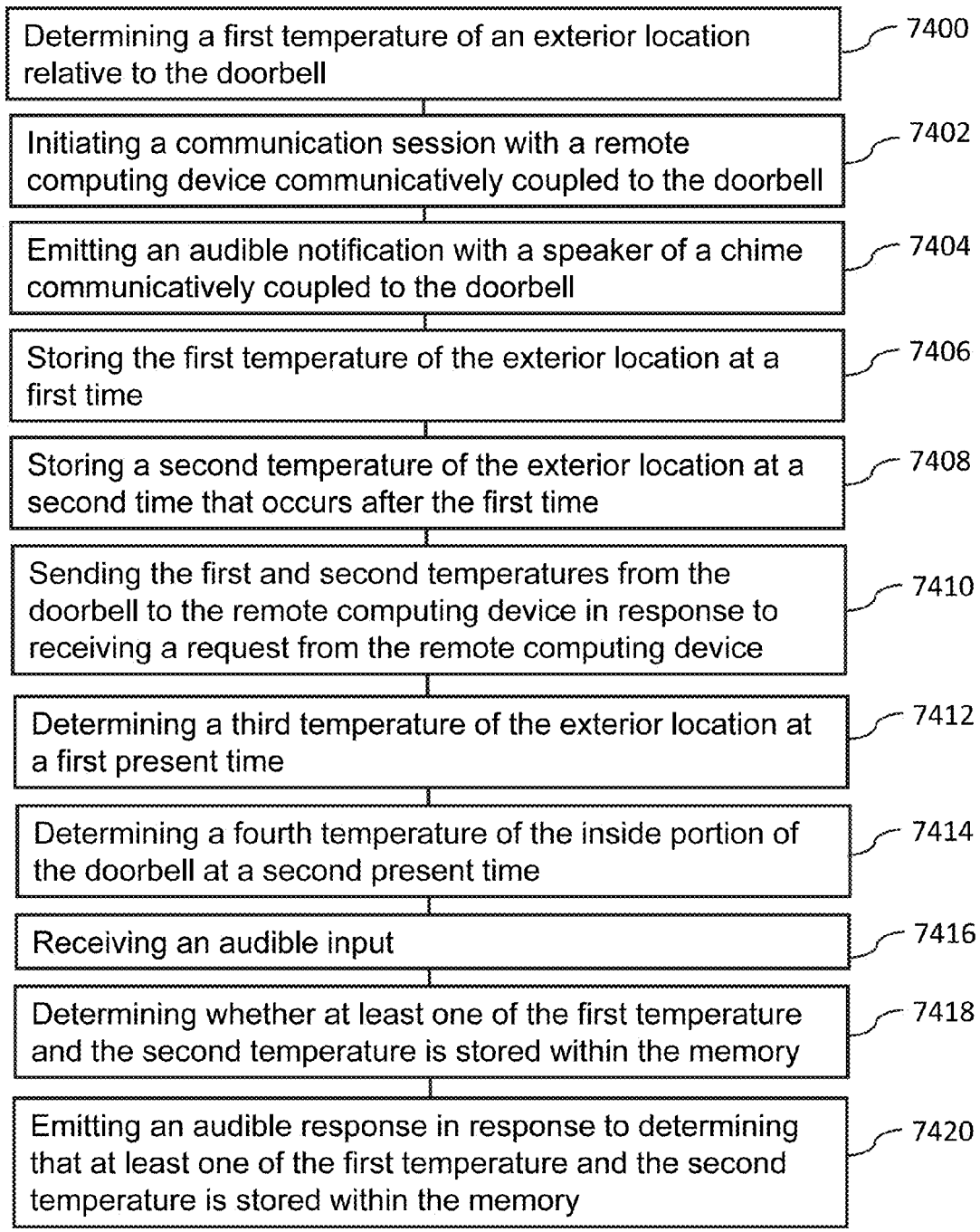
Figure 75:
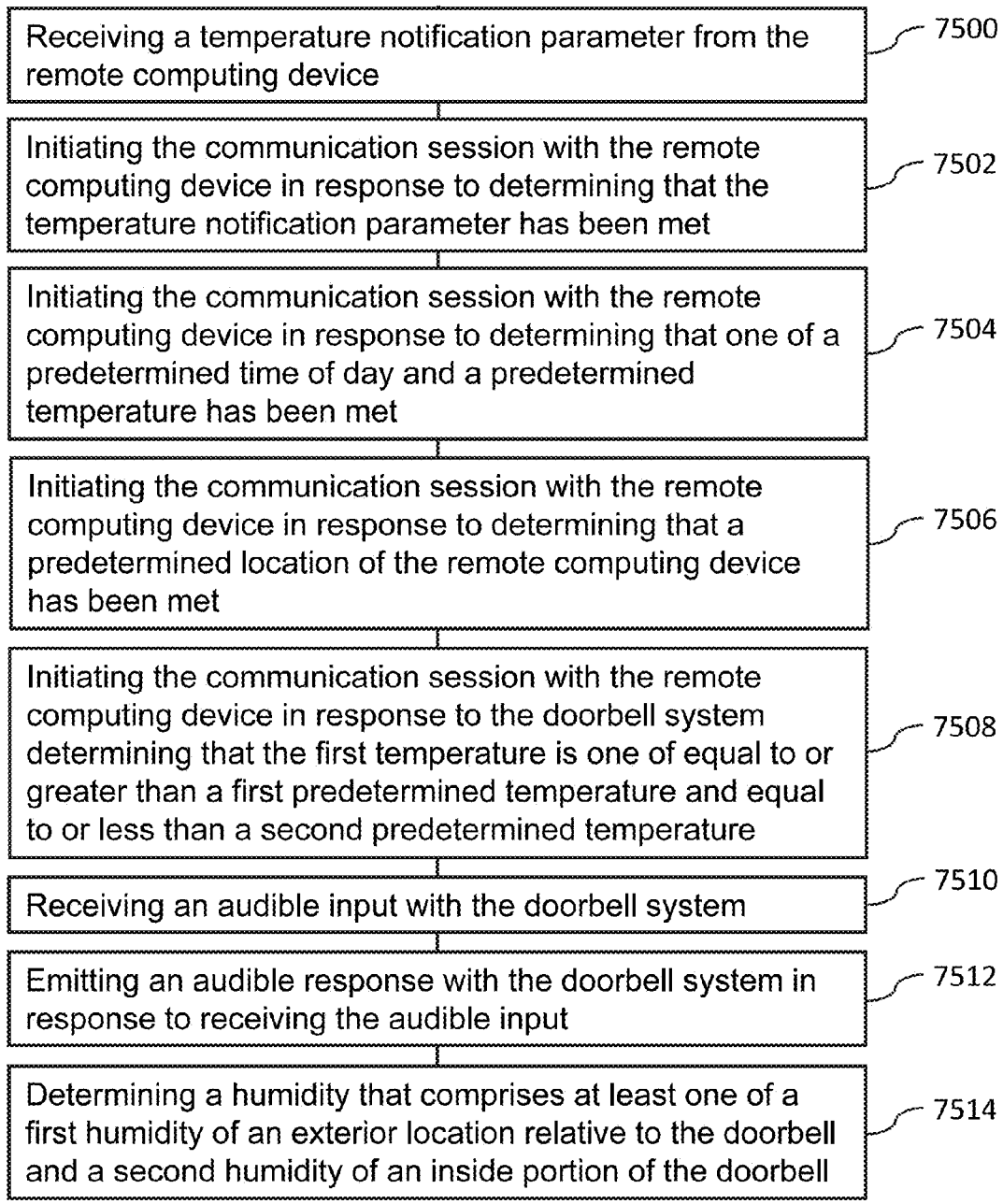

The disclosure also includes various methods of using the embodiments as described above. FIGS. 74 and 75 illustrate methods of using a doorbell system. The illustrated methods include optional steps. In some embodiments, the steps can be performed in orders different than the order illustrated. In at least one embodiment, at least some of the steps are performed in the order illustrated in FIGS. 74 and 75.

Now with reference to FIG. 74, the disclosure includes methods of using a doorbell system to determine a temperature. As such, step 7400 can include determining, by the doorbell 202, a first temperature of an exterior location relative to the doorbell 202. Step 7402 can include initiating a communication session with a remote computing device 204 that is communicatively coupled to the doorbell 202. In some embodiments, the communication session comprises a first indication of the first temperature. The communication session can also include additional indications, such as a sun, a moon, clouds, raindrops, and anything to indicate the type of weather associated with the temperature.

Step 7404 can include emitting an audible notification with a speaker of a chime 910 that is communicatively coupled to the doorbell 202. The audible notification can comprise an audible indication of the first temperature. Emitting the audible notification with the speaker of the chime 910 can occur in response to a variety of events, such as the remote computing device 204 receiving an input.

The system 200 can also be configured to store temperatures occurring at different times and even at different locations. The stored temperatures can later be recalled in the event that a user wants to determine historical conditions. Step 7406 can include storing, by the doorbell 202, the first temperature of the exterior location at a first time. As well, step 7408 can include storing, by the doorbell 202, a second temperature of the exterior location at a second time that occurs after the first time. Furthermore, step 7410 can include sending the first and second temperatures from the doorbell 202 to the remote computing device 204 in response to receiving, by the doorbell 202, a request from the remote computing device 204. In some embodiments, a remote server may generate the request. For example, the remote computing device 204 might receive two temperatures (e.g. a morning temperature and an afternoon temperature) in response to the server's action rather than in response to an input from the user or the remote computing device 204.

In some embodiments, temperature and humidity data can be sent via an application programming interface ("API"). An API is a software intermediary that makes it possible for application programs to interact with each other and share data. The API can be an implementation of a Representational State Transfer ("REST") software architecture style, which can expose specific software functionality while protecting the rest of the application.

The first temperature and the second temperature can be stored within a memory 492 of the doorbell 202 for a predetermined time period. In some embodiments, the first temperature is indicative of temperature of the exterior location (relative to the doorbell 202) at a first previous time and the second temperature is indicative of temperature of the inside portion of the doorbell 202 at a second previous time. In some embodiments, methods can further include determining, by the doorbell 202, a third temperature of the exterior location at a first present time (at step 7412). In this regard, the first previous time can occur prior to the first present time. As well, methods can include determining, by the doorbell 202, a fourth temperature of the inside portion of the doorbell 202 at a second present time (at step 7414). It should be appreciated that the second previous time can occur prior to the second present time.

Embodiments may also be configured to receive an audible input from a user. For example, step 7416 can include receiving an audible input with the remote computing device 204. The audible input can be spoken by a user. As well, the audible input can comprise a request for at least one of the first temperature and the second temperature. In accordance, step 7418 can include determining whether at least one of the first temperature and the second temperature is stored within the memory 492 in response to receiving the audible input. Accordingly, step 7420 can include emitting an audible response with the remote computing device 204 in response to determining that at least one of the first temperature and the second temperature is stored within the memory 492. It should be appreciated that the audible response can comprise at least one of the first temperature and the second temperature.

As illustrated in FIG. 75, a communication session can be initiated with a remote computing device 204 in response to a variety of events occurring such as, but not limited to a predetermined temperature being met, a predetermined time occurring, a predetermined location of the remote computing device being met, and the like. Accordingly, step 7500 can include receiving, by the doorbell system 200, a temperature notification parameter from the remote computing device 204. Step 7502 can thereby include initiating the communication session with the remote computing device 204 in response to the doorbell system 200 determining that the temperature notification parameter has been met.

As well, step 7504 can include initiating the communication session with the remote computing device 204 in response to the doorbell system 200 determining that one of a predetermined time of day and a predetermined temperature has been met. Step 7506 can include initiating the communication session with the remote computing device 204 in response to the doorbell system 200 determining that a predetermined location of the remote computing device 204 has been met.

Even still, in some embodiments the method can include initiating the communication session with the remote computing device 204 in response to the doorbell system 200 determining that the first temperature is equal to or greater than a first predetermined temperature and/or equal to or less than a second predetermined temperature (at step 7508). The communication session can comprise at least one of a first alert that the first temperature is equal to or greater than the first predetermined temperature and a second alert that the first temperature is equal to or less than the second predetermined temperature.

The system 200 can also audibly interact with a user. Accordingly, step 7510 can include receiving an audible input with the doorbell system 200. In some embodiments, the audible input is spoken by a user. As well, step 7512 can include emitting an audible response with the doorbell system 200 in response to receiving the audible input. In some embodiments, the audible response comprises an audible indication of the temperature.

In some embodiments, receiving the audible input with the doorbell system 200 comprises receiving the audible input with a microphone of the remote computing device 204. As well, in some embodiments, emitting the audible response with the doorbell system 200 comprises emitting the audible response with a speaker of the remote computing device 204. Even still, in some embodiments, receiving the audible input with the doorbell system 200 comprises receiving the audible input with the microphone of the doorbell 202 in response to receiving an indication of a button press of the button 212 of the doorbell 202. Furthermore, in some embodiments, emitting the audible response with the doorbell system 200 comprises emitting the audible response with the speaker of the doorbell 202.

As previously mentioned, embodiments of the system 200 can include a humidity sensor 552 coupled to the doorbell 202. Accordingly, methods can include determining, by the doorbell 202 (e.g. the humidity sensor 552), humidity. In some embodiments, the humidity comprises various humidity data, such as a first humidity of an exterior location relative to the doorbell and/or a second humidity of an inside portion of the doorbell. As well, in some embodiments, the communication session comprises a second indication of the humidity.

Heat Management Embodiments

Because security systems 202 can be used in very cold environments, such as in Alaska, security systems 202 may include components to regulate the temperature of the security system 202. For example, systems can include one or more heating elements 508 configured to regulate the temperature of the security system 202. The heating element 508 can be used in various methods to protect temperature sensitive portions of the security system 202 from cold weather.

In some embodiments, the security system 202 can include the heating element 508 coupled to the security system 202. The heating element 508 can comprise an electrical resistor, whereby the heating element 508 can generate heat by passing electric current through a conductive path with high resistance. This process can convert electricity to heat. The conductive path with relatively high resistance can be straight, coiled, or oriented in a curved path. Heating elements can use wire, ribbon, or strips made from nickel and chromium (e.g. 80% nickel and 20% chromium). Some heating elements use iron-chromium-aluminum alloys or copper-nickel alloys. Some heating elements use a conductive path made from ceramics such as molybdenum disilicide, molybdenum silicide, or molybdenum disilicide doped with aluminum. Some heating elements use a conductive path made from PCT ceramic with a positive thermal coefficient of resistance. Some heating elements use screen printed metal and/or ceramic tracks deposited on ceramic insulated metal plates.

In some embodiments, the heating element 508 produces heat when a temperature inside of the security system 202 falls below a first threshold. In some embodiments, the first threshold that causes the heating element 508 to produce heat is less than 50 degrees Fahrenheit ("F") and/or greater than negative 20 degrees F.; less than 35 degrees F. and/or greater than negative 10 degrees F.; less than 32 degrees F. and/or greater than 0 degrees F.; or less than 10 degrees F. In some embodiments, the heating element 508 stops producing heat when the temperature inside of the security system 202 rises above a second threshold. In several embodiments, the second threshold that causes the heating element 508 to stop producing heat is less than 50 degrees F. and/or greater than negative 20 degrees F.; less than 35 degrees F. and/or greater than negative 10 degrees F.; less than 32 degrees F. and/or greater than 0 degrees F.; or less than 10 degrees F.

In some embodiments, the first threshold is equal to the second threshold, although in several embodiments, the first threshold is not equal to the second threshold. In some embodiments, the second threshold is at least 5 degrees F., at least 10 degrees F., or at least 15 degrees F. greater than the first threshold. In an example embodiment, the heating element 508 starts generating heat when the temperature inside of the security system 202 falls below 35 degrees F. and the heating element 508 continues to generate heat until the temperature inside of the security system 202 rises above 45 degrees F.

Referring now to FIGS. 10 and 11, some embodiments include stopping the generation of heat from the heating element 508 before the doorbell button 212 and/or the outer housing 224 reaches a temperature of greater than 50 degrees F., 65 degrees F., or 80 degrees F. The IR detector 470 can face towards (or at least partially towards) the outer face 214 of the outer housing 224 and/or towards (or at least partially towards) the doorbell button 212. The IR detector 470 can be used to collect data indicative of an outer temperature (e.g., the temperature of the outer housing 224, the outer face 214, and/or the doorbell button 212). Although this indicative data may actually be the temperature of an inner surface of the outer housing 224, the outer face 214, and/or the doorbell button 212, the indicative data can be used to determine whether to stop generating heat (e.g., via the heating element 508).

The heating element 508 can also be activated in response to a command from a user. In some embodiments, the heating element 508 is activated in response to a wireless command emitted by the remote computing device 204. In some embodiments, the heating element 508 activates in response to audible an command from a user spoken into the security system 202 and/or the remote computing device 204. Even still, in some embodiments, the heating element 508 is activated in response to security system 202 detecting a predetermined motion.

Thus, some embodiments include collecting data indicative of temperature using the IR detector 470 and/or the thermometer 512; analyzing the data to determine whether to start generating heat (e.g., when a temperature falls below a threshold); generating heat inside a portion of a security system (e.g., doorbell) by running electrical current through a heating element; collecting data indicative of temperature using the IR detector 470 and/or thermometer 512; analyzing the data to determine whether to stop generating heat; and/or stopping the flow of electrical current to a heating element (e.g., when a temperature rises above a threshold).

Some heating embodiments include power management methods. In some embodiments, the first and second thresholds are lower when the security system 202 is relying on internal power (e.g., from a battery 462) than when the security system 202 is relying on external power (e.g., from a building's electrical system). In some embodiments, the first threshold and/or the second threshold are at least 10 degrees F. lower, at least 20 degrees F. lower, or at least 30 degrees F. lower when the security system 202 is relying on internal power than when the security system 202 is relying on external power. In some embodiments, the security system 202 is configured to provide heat via the heating element 508 when the security system 202 has access to external power and when a temperature (inside or outside of the security system 202) falls below a threshold. In some embodiments, the security system 202 is configured not to provide heat via the heating element 508 when the security system does not have access to external power (e.g., to conserve battery power).

While protecting the security system 202 from cold weather can be important in some embodiments, protecting visitors from excessive heat can also be important in some embodiments. Excessive heat could burn visitors as they "ring" the doorbell (e.g., press the doorbell button 212 shown in FIG. 10). Accordingly, some embodiments may include a fan 553 coupled to the security system 202. The fan 553 can activate in response to a temperature of the button 212 and/or interior portion of the security system 202 being greater than a predetermined temperature. In this regard, the fan 553 can be activated to cool the button 212 to a safe temperature so as not to burn visitors when they contact the button 212. As well, the fan 553 can be activated to reduce the temperature of heat sensitive components within the security system 202.

Figure 72:
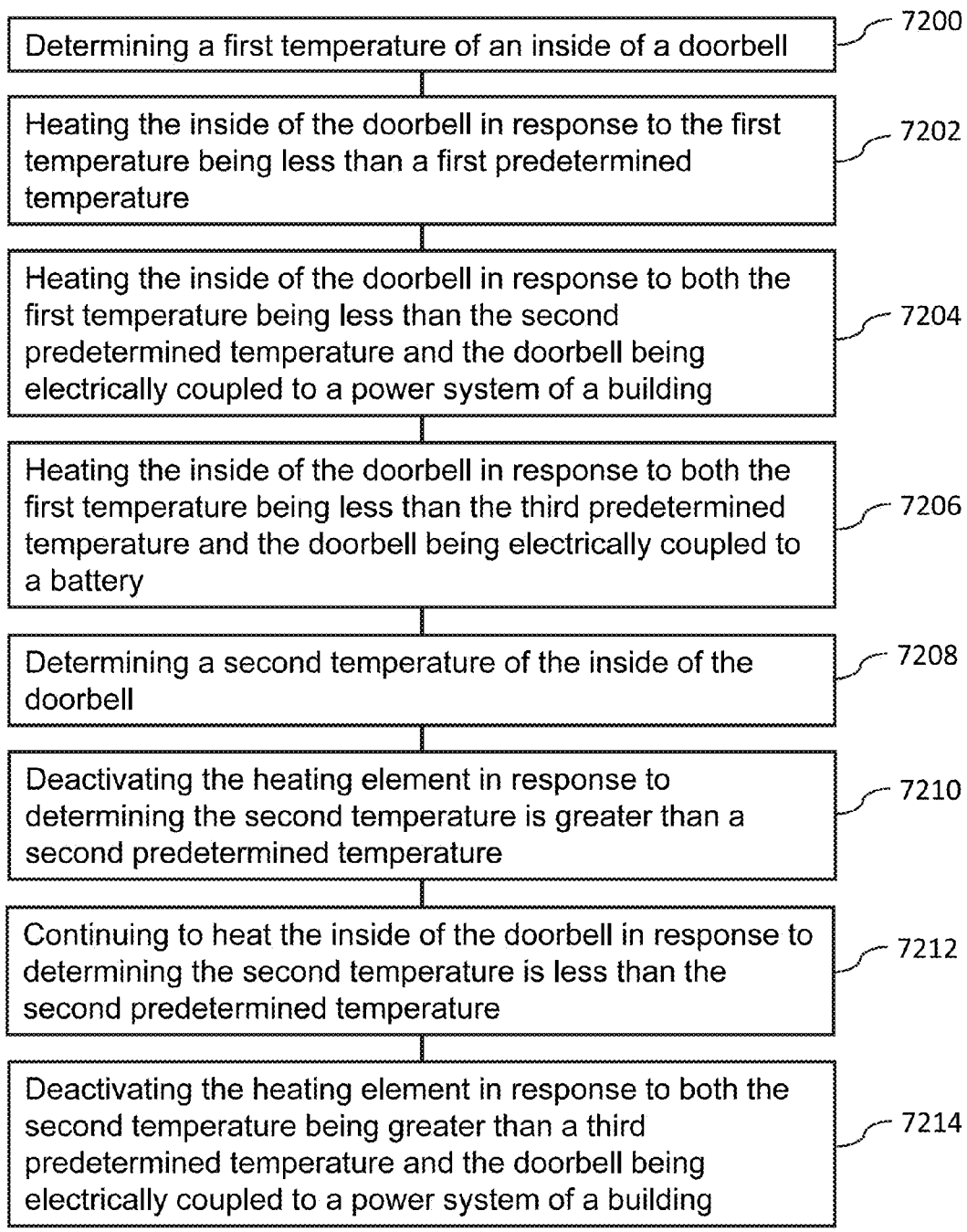
FIGS. 72, 73, 74 and 75 illustrate methods of using a security system, according to some embodiments.
Figure 73:
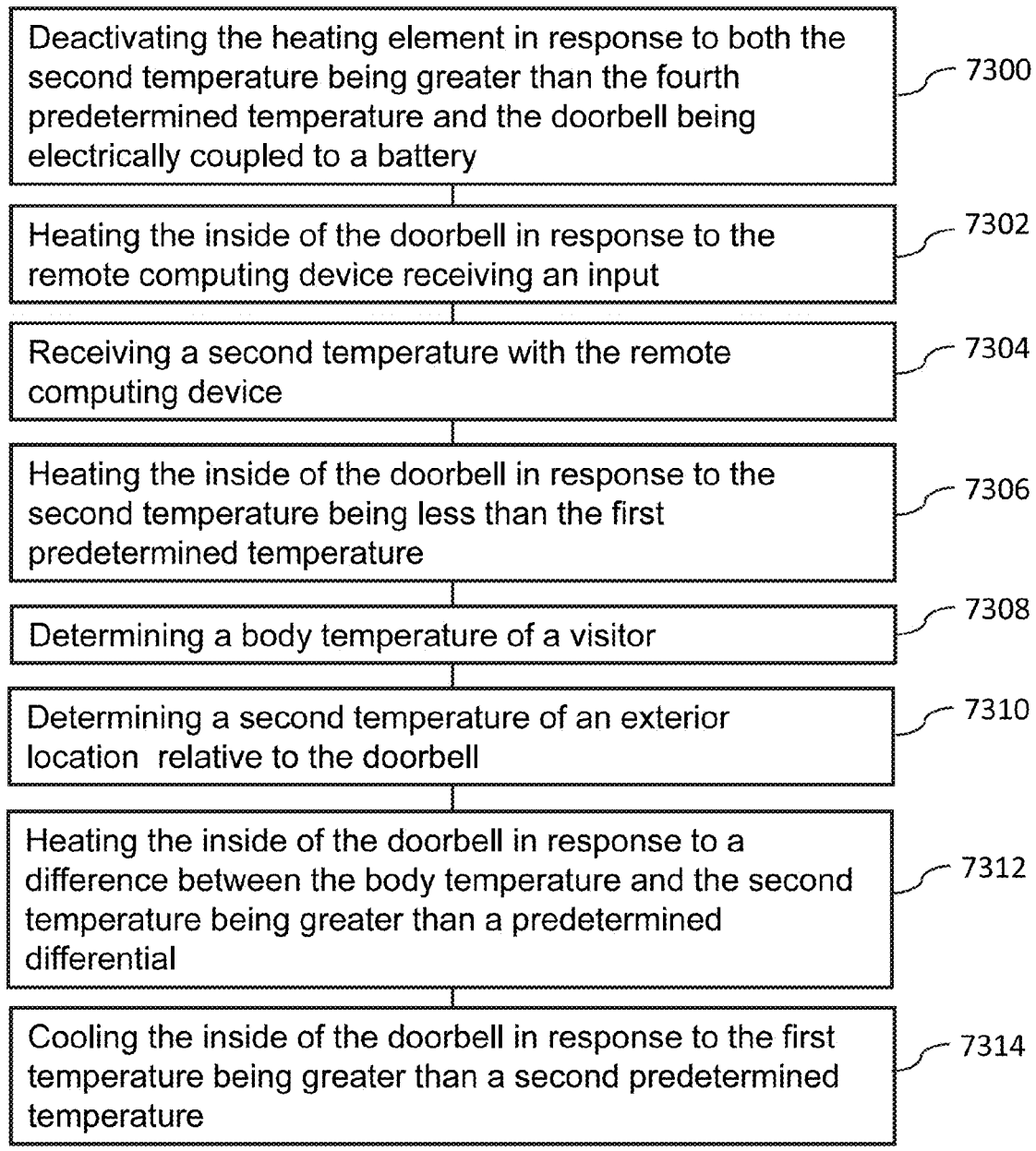

The disclosure also includes various methods of using the embodiments as described above. FIGS. 72 and 73 illustrate methods of using a doorbell system. The illustrated methods include optional steps. In some embodiments, the steps can be performed in orders different than the order illustrated. In at least one embodiment, at least some of the steps are performed in the order illustrated in FIGS. 72 and 73.

Now with reference to FIG. 72, the illustration shows a method of using a doorbell system 200 to regulate temperature of a doorbell 202. The doorbell system 200 can comprise a temperature sensor 512 coupled to the doorbell 202, and a heating element 508 coupled to the doorbell 202. Step 7200 can include determining, by the doorbell 202, a first temperature of an inside portion of the doorbell 202. Step 7202 can include heating, by the heating element 508, the inside portion of the doorbell 202 in response to the first temperature being less than a first predetermined temperature.

The heating element 508 can also be configured to activate and thereby heat the inside portion of the doorbell 202 according to various situations. In this regard, the first predetermined temperature can comprise at least one of a second predetermined temperature and a third predetermined temperature that is less than the second predetermined temperature. Step 7204 can include heating, by the heating element 508, the inside portion of the doorbell 202 in response to both the first temperature being less than the second predetermined temperature and the doorbell 202 being electrically coupled to an electrical power system of a building 300. As well, step 7206 can include heating, by the heating element 508, the inside portion of the doorbell 202 in response to both the first temperature being less than the third predetermined temperature and the doorbell 202 being electrically coupled to a battery 462.

Furthermore, step 7208 can include determining, by the doorbell 202, a second temperature of the inside portion of the doorbell 202. Accordingly, step 7210 can include deactivating the heating element 508 in response to determining the second temperature is greater than a second predetermined temperature that is greater than the first predetermined temperature. As such, step 7212 can include continuing to heat, by the heating element 508, the inside portion of the doorbell 202 in response to determining the second temperature is less than the second predetermined temperature.

In some embodiments, the second predetermined temperature comprises at least one of a third predetermined temperature and a fourth predetermined temperature that is less than the third predetermined temperature. Accordingly, step 7214 can include deactivating the heating element 508 in response to both the second temperature being greater than the third predetermined temperature and the doorbell 202 being electrically coupled to an electrical power system of a building 300. In some situations the doorbell 202 may not draw power from the electrical power system of the building 300.

Accordingly, the doorbell 202 draws power from the battery 462 and step 7300 can include deactivating the heating element 508 in response to both the second temperature being greater than the fourth predetermined temperature and the doorbell 202 being electrically coupled to a battery 462.

The system 200 can comprise a remote computing device 204 that is communicatively coupled to the doorbell 202. Accordingly, step 7302 can include heating the inside portion of the doorbell 202 in response to the remote computing device 204 receiving an input, such as pressing a button on a display of the remote computing device 204.

The heating element 508 can also be activated in response to receiving a temperature from an outside database not affiliated with the system 200. For example, step 7304 can include receiving a second temperature with the remote computing device 204, wherein the second temperature is retrieved from a third party database not associated with the doorbell system 200. Accordingly, step 7306 can include heating, by the heating element 508, the inside portion of the doorbell 202 in response to the second temperature being less than the first predetermined temperature.

In some embodiments, the doorbell system 200 comprises a temperature sensor 512 (e.g. an infrared sensor) electrically coupled to the doorbell 202. Step 7308 can thereby include determining a body temperature of a visitor. Step 7310 can include determining a second temperature of an exterior location relative to the doorbell. The body temperature and the second temperature can be determined by the doorbell 202, and more specifically, in some embodiments the infrared sensor. Step 7312 can include heating, by the heating element 508, the inside portion of the doorbell 202 in response to a difference between body temperature and the second temperature being greater than a predetermined differential. It should be appreciated that the exterior location can be any location that is outside of the doorbell 202. As well, an inside location, an inside portion, interior location, and/or interior portion can thereby refer to any location that is inside the doorbell 202.

In some embodiments the doorbell system 200 further comprises a fan 553 coupled to the doorbell 202. Step 7314 can include cooling, by the fan 553, the inside portion of the doorbell 202 in response to the first temperature being greater than a second predetermined temperature that is greater than the first predetermined temperature.

Weather Detection

Security systems 200 can detect weather events, and/or receive indications of weather events from third party sources. In order to detect weather events, the security system 200 can include one or more various weather sensors coupled to the doorbell 202, such as a pressure sensor 493, a meteorology sensor 495, and the like. The pressure sensor 493 can detect atmospheric pressure, which can be interpreted by the security system 200 to be associated with various types of weather events. In some embodiments, the pressure sensor 493 comprises a barometric pressure sensor.

The security system 200 can also comprise a weather detection system 497 coupled to the doorbell 202. In some embodiments, the weather detection system 497 includes a camera 208 and/or a microphone 484. As well, the security system 200 can include a printed circuit board (PCB) 516 electrically coupled to both the pressure sensor 493 and the weather detection system 497. The PCB 516 can be located at least partially inside the doorbell 202.

Figure 85:
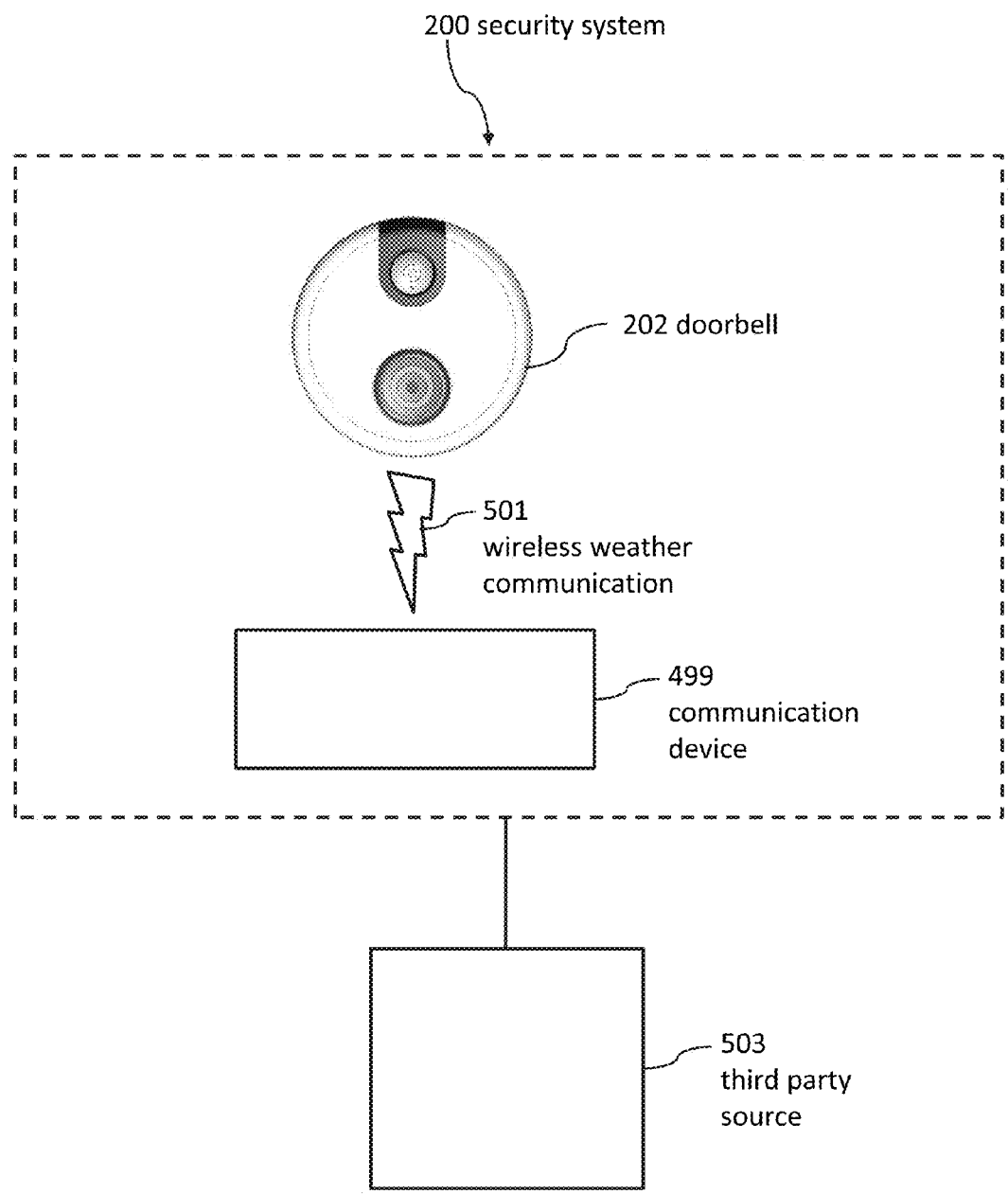
FIG. 85 illustrates an embodiment in which a security system is connected to a third party source, according to some embodiments.

As shown in FIG. 85, the security system 200 is communicatively coupled to a third party source 503, such as a remote database contained on a remote server. The third party source 503 can be any entity that tracks weather data and/or damage resulting from storms. In some embodiments the third party source 503 comprises the National Storm Damage Center (NSDC), an insurance company, and/or any other entity that tracks and reports weather conditions.

In some embodiments, the security system 200 also includes a wireless weather communication 501 emitted by the doorbell 202 in response to at least one of the pressure sensor 493, camera 208, and microphone 484 detecting a weather event. The wireless weather communication 501 can include weather data including, but not limited to atmospheric data, a video of a weather event (as captured by the camera 208), a sound of a weather event (as captured by the microphone 484), any data associated with a weather event, and the like. In some embodiments, the security system 200 can further include a weather indication displayed by the remote computing device 204 in response to the wireless weather communication 501 being emitted by the doorbell 202.

In some embodiments, the security system 200 includes a communication device 499 communicatively coupled to the doorbell 202. In some embodiments, the communication device 499 comprises a hub device (e.g. home automation hub, smart home hub, etc.) and/or a remote computing device 204. The security system 202 can further include a weather notification, such as a communication session and/or weather data, received by the home automation hub and/or the remote computing device 204 in response to the wireless weather communication 501 being emitted by the doorbell 202.

With reference to FIG. 11, embodiments of the security system 200 can also include a memory 492 coupled to the PCB 516. In some embodiments, the memory 492 can store weather data for at least a predetermined time. The predetermined amount of time can be any amount of time, such as 1 minute, 10 minutes, 1 hour, 10 hours, 10 days, 1 year, 10 years, and any amount of time in between.

In some embodiments, the security system 200 includes one or more meteorology sensors 495 coupled to the doorbell 202. The meteorology sensor 495 can include any various type of sensor configured to detect weather events. Accordingly, the meteorology sensor 495 can include one or more of the following, including: a humidity sensor, a precipitation sensor, a temperature sensor, a thunder and lightning sensor, a wind speed sensor, and a wind direction sensor.

Figure 86:
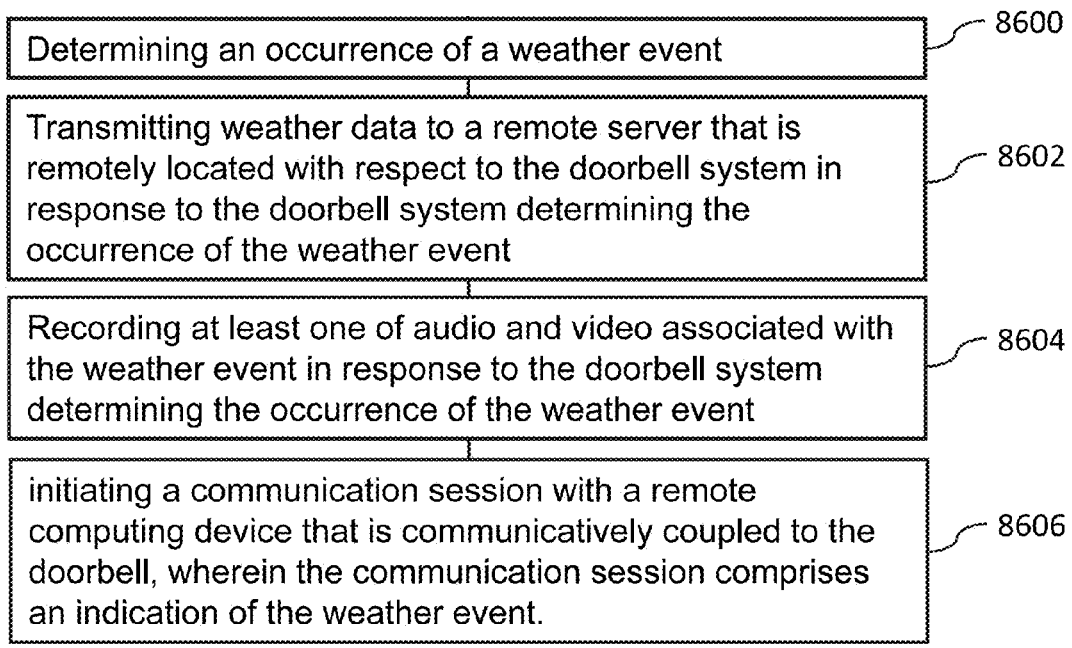
FIGS. 86, 87, and 88 depict flow diagrams showing methods of operating doorbell systems, according to some embodiments.
Figure 87:
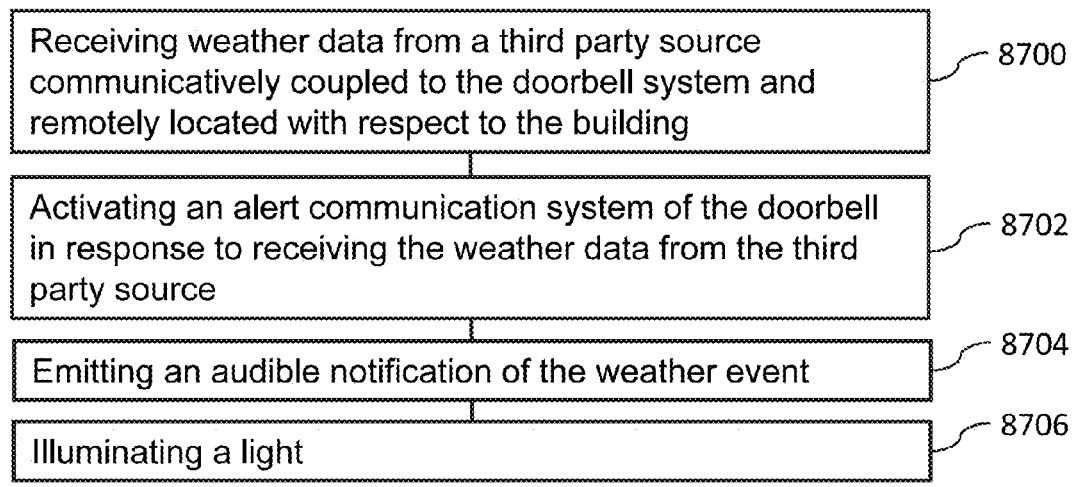
Figure 88:
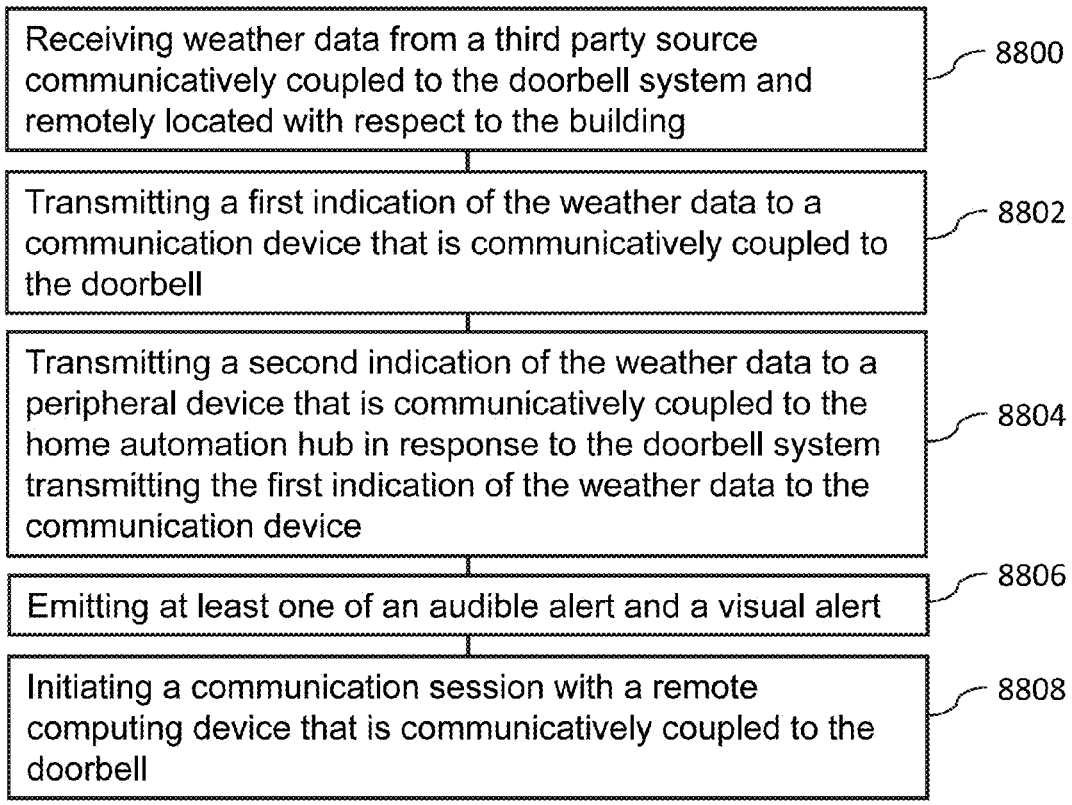

The disclosure also includes various methods of using embodiments as described throughout. Accordingly, FIGS. 86-88 illustrate methods of using a doorbell system. The illustrated methods include optional steps. In some embodiments, the steps can be performed in orders different than the order illustrated. In at least one embodiment, at least some of the steps are performed in the order illustrated in FIGS. 86-88.

FIG. 86 illustrates a method of using a doorbell system 200 to detect a weather event. Step 8600 includes determining, by the doorbell system 200, an occurrence of a weather event. As well, step 8602 includes transmitting, by the doorbell system 200, weather data to a remote server, such as server 206, that is remotely located with respect to the doorbell system 200, and in some embodiments, is remotely located with respect to the building 300. It should be appreciated that step 8602 can occur in response to the doorbell system 200 determining the occurrence of the weather event. As well, it should be appreciated that the weather data is associated with the weather event.

As well, step 8604 can include recording, by the weather detection system 497, at least one of audio and video associated with the weather event in response to the doorbell system 200 determining the occurrence of the weather event. It should be appreciated that the weather data can include various data, such as audio and/or video of the weather event. Accordingly, in some embodiments, transmitting, by the doorbell system 200, weather data to the remote server can include transmitting, by the doorbell system 200, at least one of the audio and the video to the remote server in response to the weather detection system 497 recording at least one of the audio and the video.

In some embodiments, the weather data can be used by the remote server to confirm the occurrence of the weather event.

For example, an insurance company may use the weather data to confirm that a hail storm struck the building 300 to thereby verify a claim of hail damage to the building 300. As well, news agencies may also use the weather data to confirm that a weather event occurred in a certain area. In some embodiments, a plurality of security systems 200 can be networked together and can report how weather events move through a specific area. This network of security systems 200 could be used to bolster and even replace, much more costly meteorology equipment, such as expensive radar systems, and the like.

Methods can also include step 8606 that includes initiating a communication session with a remote computing device 204 that is communicatively coupled to the doorbell 202. It should be appreciated that the communication session can include an indication of the weather event. The communication session may include an indication of the weather event, such as a picture depicting the type of weather event and any written message to convey additional information, such as how long the weather event may last, and the like.

As well, the doorbell system 200 can also be used to receive an indication of a weather event. As shown in FIG. 87, methods can include step 8700 that includes receiving, by the doorbell system 200, weather data from a third party source 503 communicatively coupled to the doorbell system 200 and remotely located with respect to the building 300.

Accordingly, methods can also include step 8702 that comprises activating an alert communication system of the doorbell 202 in response to receiving the weather data from the third party source 503. The alert communication system can be coupled to the doorbell 202. As well, the alert communication system can include any one of a speaker 488, a light (such as light 216), and/or a communication device 499. Accordingly, in some embodiments, activating the alert communication system can include emitting, from the speaker 488, an audible notification of the indication of the weather event (at step 8704). For example, the doorbell 202 may receive a tornado warning from the third party source 503, and the speaker 488 may emit a message, "A tornado warning is in effect until 8:00 pm tonight. Please seek shelter immediately."

As well, in some embodiments, activating the alert communication system can comprise illuminating the light (at step 8706) to also notify people of the occurrence of a weather event. Illuminating the light may comprise any type of illumination, such as rapidly flashing the light, slowly dimming and brightening the light, and the like.

The doorbell system 200 can also be used to relay information related to the weather data to other devices that are communicatively coupled to the doorbell system 200. Step 8800 can include receiving, by the doorbell system 200, weather data from a third party source 503 communicatively coupled to the doorbell system 200 and remotely located with respect to the building 300. As well, step 8802 can include transmitting, by the doorbell system 200, a first indication of the weather data to a communication device 499 that is communicatively coupled to the doorbell 202.

In some embodiments, the communication device 499 comprises a home automation hub located within the building. Accordingly, methods can also include step 8804, which includes transmitting a second indication of the weather data to a peripheral device that is communicatively coupled to the home automation hub in response to the doorbell system 200 transmitting the first indication of the weather data to the communication device 499.

In some embodiments, the communication device 499 may be configured to alert users located near the communication device 499. Accordingly, some methods may include step 8806 that includes emitting, by the communication device 499, at least one of an audible alert and a visual alert. The audible and/or visual alerts may be configured to notify the user of a weather event. For example, if a severe thunderstorm is occurring, the audible alert may sound a warning stating, "Warning. A severe thunderstorm warning is in effect for the area."

As well, the warnings may be relayed to a remote computing device 204 that is communicatively coupled to the doorbell 202. In some embodiments, transmitting, by the doorbell system 200, the first indication of the weather data to the communication device 499 can include step 8808 that includes initiating a communication session with the remote computing device 204. As previously stated, the communication session may include an indication of the weather event, such as a picture depicting the type of weather event and any written message to convey additional information, such as how long the weather event may last, and the like.

Silent Modes

Various embodiments include many different means of alerting users and visitors. In some embodiments, certain means of alerting users and/or visitors are silenced based on settings selected by a user (e.g., an administrator, the user of the primary computing device). Referring now to FIGS. 2 and 3, software with a user interface 240 can be used to allow a user to silence one or more of the following items: a chime 302 (e.g., a speaker, a sound output device) located inside of a building 300, a remote computing device 204, and a security system 202 (e.g., the speaker 488 shown in FIG. 11). The user interface 240 can include a button to silence the doorbell sound and to place the security system 202 in Silent Mode.

In some embodiments of Silent Mode, pressing the doorbell button 212 will not send a signal (e.g., from the security system 202) to a chime located inside the building. As a result, the chime will not emit a sound. In some embodiments, the chime is a speaker (such as a speaker made by Bose Corporation) located inside of the building, which can be a home, office, warehouse, or other structure. For example, a visitor pressing the doorbell button 212 could cause the computing device 204 to notify the user, but would not cause a sound (e.g., a chime) to be emitted inside and/or near the building. In several embodiments, the security system 202 is configured to emit a sound even when the chime (e.g., speaker) located inside of the building is silenced. This configuration can notify the visitor that the security system 202 has detected the communication request of the visitor without disturbing people inside of the building.

In several embodiments, the security system 202 is silenced such that pressing the doorbell button 212 will not cause the security system 202 to emit a sound from the security system 202 (e.g., the speaker 488 in FIG. 11 will not emit a sound). When the security system 202 is silenced, the chime located inside of the building can optionally notify people inside of the building and/or the remote computing device 204 can optionally notify a user. In some embodiments, both the security system 202 and the chime inside of the building are silenced, but the computing device is not silenced. In some embodiments, the entire system is silenced. For example, the security system 202, the chime inside of the building, and the computing device can be silenced.

In some embodiments, the remote computing devices 204 are silenced such that they do not emit a sound to notify users of the remote computing devices 204. In several embodiments, the remote computing devices 204 provide no real-time audio alert, no real-time alert, or no real-time notification to users but store information (e.g., pictures of the visitor, videos of the visitor, sound from the visitors) for later review by the users of the remote computing devices 204. As used herein, "real-time alert" refers to an alert provided to a user while the visitor is located by the security system 202.

A user interface can enable users to select the types of alerts provided by the computing devices 204. Example types of alerts include sounds, images, and haptic notifications (e.g., vibrations).

Emergency Responses

In some embodiments, the operating module 2624 and/or the remote computing device 2608 may be configured to provide emergency responses, behaviors, and functions. The user of a remote computing device 2608 may be provided with the ability to dial an emergency number while still in communication with the security system 202 and/or without exiting the application software used to control the security system 202. For example, a user of the remote computing device 2608 may use the security system 202 to identify a threatening individual at the entryway to his residence. The user may then be provided with the ability to dial 911 without disconnecting communication with the security system 202, which can allow the user to continue to observe the threatening individual (e.g., a potentially harmful or destructive visitor).

Figure 28:
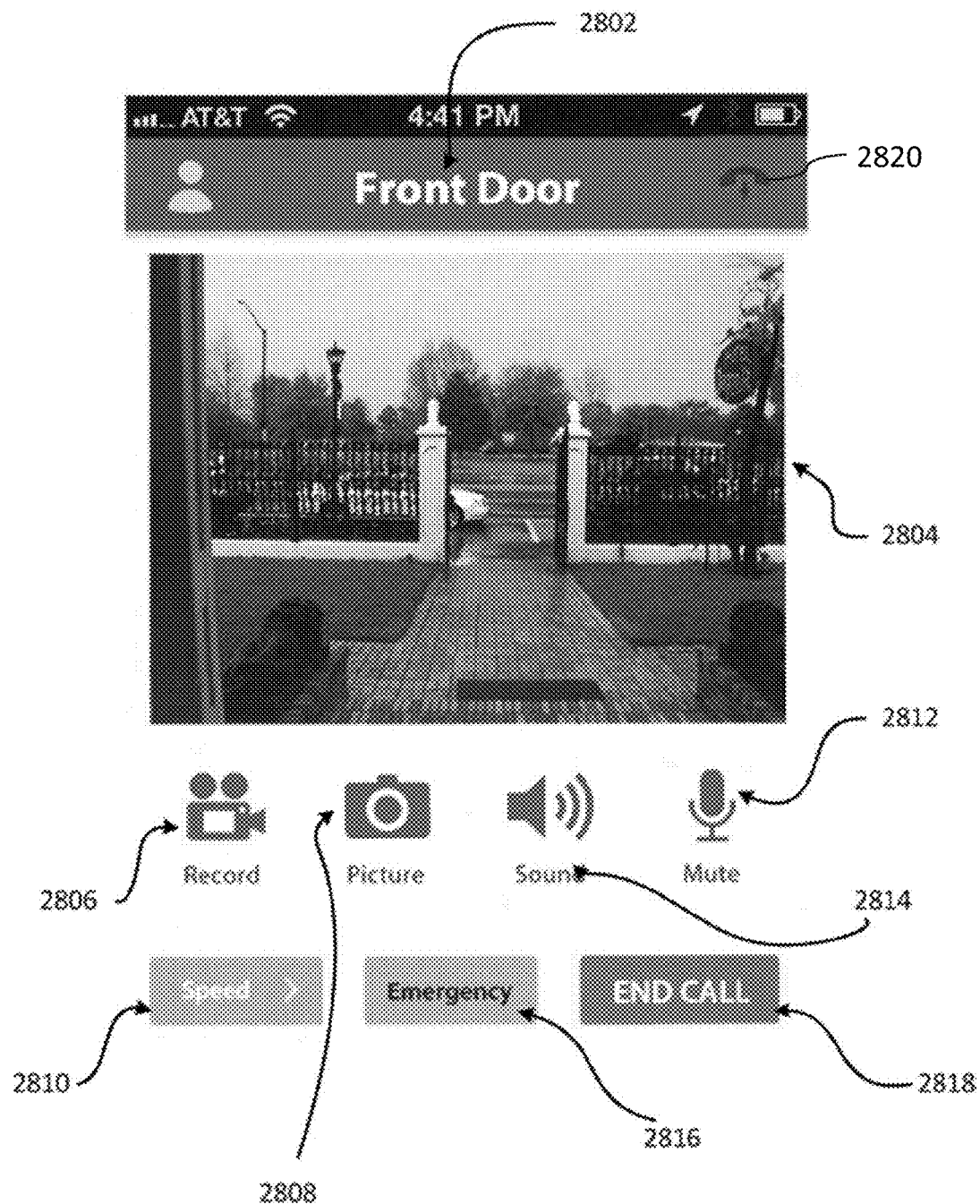
FIG. 28 depicts an illustrative embodiment of several features that can be implemented in a mobile application, according to some embodiments.
Figure 30:
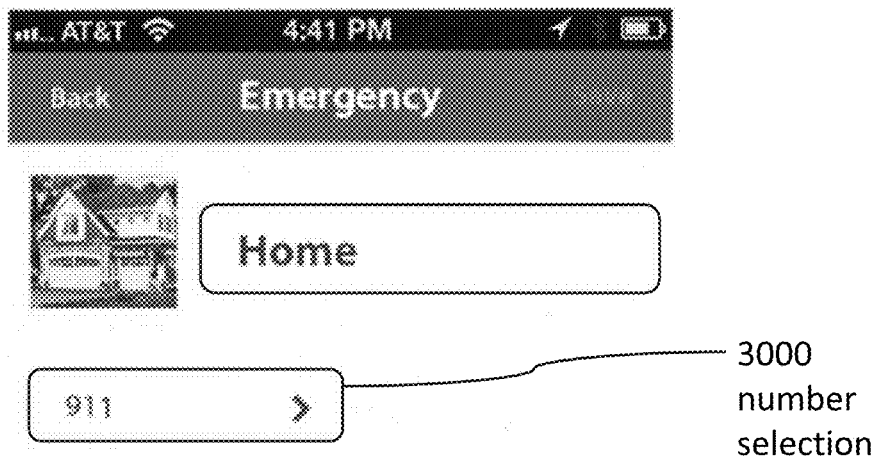
FIG. 30 depicts an illustrative embodiment of emergency functionality, according to some embodiments.
Figure 37:
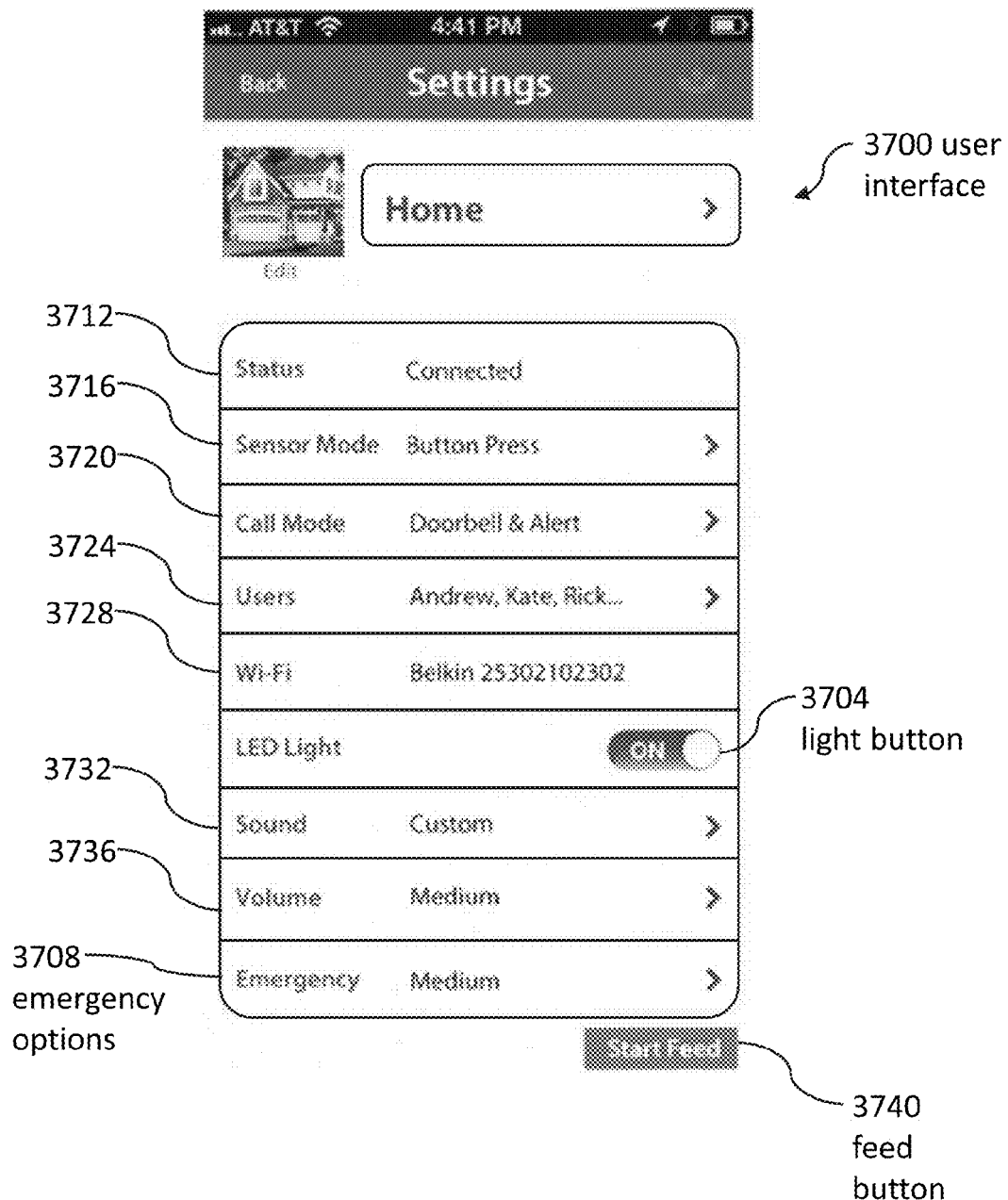
FIG. 37 depicts an illustrative embodiment of a menu for viewing settings of the security system, according to some embodiments.

FIG. 37 illustrates an emergency options selection button 3708. The user can change the phone number or other notification means that the communication system calls in the event of an emergency. For example, some users might want to call the police in the event of an emergency while other users might want to call a neighbor. FIG. 30 illustrates a button 3000 that allows a user to select which phone number is called in an emergency. FIG. 28 illustrates an emergency button 2816 that can allow for quick notification of emergency personnel or another person. Pressing the emergency button 2816 can cause the computing device 2608 to call the selected emergency number and/or send an emergency notification. The user can press the emergency button 2816 without exiting the communication system's software application running on the computing device 2608. As a result, users can more easily call emergency personnel. In addition, users can continue to watch the visitor via the user interface while they wait for emergency personnel to arrive.

Several embodiments reduce the likelihood of inadvertently selecting the emergency button 2816. In one embodiment, the emergency button 2816 must be continuously selected (e.g., pressed or contacted) for more than a threshold amount of time (e.g., at least 2 seconds, at least 3 seconds, at least 5 seconds) before the system will trigger an emergency response (e.g., notify emergency personnel or another emergency contact person). In another embodiment, the user must select the emergency button 2816 and then confirm the emergency selection and/or the presence of an emergency (e.g., by pressing a confirmation button) before the system will trigger an emergency response (e.g., notify emergency personnel or another emergency contact person). In some embodiments, the system will notify the user that the system will call emergency response personnel (e.g., will call 911) unless the user cancels the request (e.g., within a particular timeframe such as within 5 seconds or within 10 seconds). The emergency response can be that the system calls 911, provides location information to emergency response personnel, and/or provides circumstantial information to emergency response personnel (e.g., the nature of the emergency, the identity of the user).

In several embodiments, when a user indicates there is an emergency (e.g., by pressing the emergency button 2816), the security system takes a picture or a video (e.g., of the visitor). The picture or video taken in response to the user indicating there is an emergency can be stored on a server 206, on a computing device 204 (e.g., the computing device that the user utilizes to indicate there is an emergency or another computing device), and/or on the security system 202 (shown in FIG. 1). Referring now to FIG. 26, the picture or video taken in response to the user indicating there is an emergency can be stored by a network 2606, by a service provider 2604, and/or by one or more remote computing devices 2608.

The user can indicate there is an emergency by any of the means described herein including by pressing a button and/or by making a noise indicative of an emergency (e.g., screaming). Referring now to FIG. 1, the security system 202 can automatically take a picture and/or a video (e.g., of the visitor) when there is a triggering event, such as an emergency, breaking glass sounds, the presence of an unwanted visitor, an unwanted visitor entering the building, and/or any other event that the user configures to trigger automatically taking a picture and/or video. In some embodiments, the user can configure the security system 202 to automatically take a picture and/or video at time increments, at particular times, when a visitor is present, when a particular type (e.g., classification) of visitor is present, and/or when there is an emergency.

Some embodiments include detecting the presence of a visitor; sending an image or video of the visitor to a remote computing device; displaying the image or video of the visitor on a display of the remote computing device; detecting an emergency indicator (e.g., detecting a user indicating there is an emergency via the remote computing device); taking a picture (or recording a video) of the visitor in response to the emergency indicator; saving the picture or video of the visitor that was taken in response to the emergency indicator; and/or sending the picture or video taken in response to the emergency indicator to a third party (e.g., the police, a central monitoring company, monitoring personnel, security personnel, a remote server, a person located remotely from the user and the visitor).

In some embodiments, the system enables the user to allow the visitor to hear the emergency response personnel (e.g., the 911 operator) to scare the visitor away (e.g., the call to the emergency personnel is emitted through a speaker of the security system). As soon as the user presses the emergency button 2816, the security system 202 can emit a sound, which can be an alert sound such as a siren sound.

In several embodiments, the user can hear the visitor and can hear a contact person of the emergency response personnel (e.g., the 911 operator). In some embodiments, the user can hear a contact person of the emergency response personnel and can see the visitor, but the visitor cannot hear the contact person of the emergency response personnel.

In some embodiments, the software application of the communication system provides information regarding the emergency to the emergency personnel. For example, the communication system can communicate at least some of the following information to the emergency personnel: the address of the security system, the name of the user, information regarding the unwanted visitor, a video of the visitor, a picture of the visitor, audio of the visitor, and audio of the user.

In some embodiments, the operating module 2624 and/or the remote computing device 2608 may be configured to contact emergency personnel if the remote computing device 2608 is shaken, if several keys or buttons are pressed, or if the remote computing device 2608 detects noises indicative of potential panic or harm (e.g., screams). In several embodiments, the communication system will enter a Potential Emergency Mode if the communication system determines there is a potential emergency. The communication system can determine there is a potential emergency by the security system 202 and/or the computing device 2608 detecting screams, loud noises, breaking glass, and/or tampering with the security system 202 (e.g., removed from building). In some embodiments, the computing device 2608 will call emergency response personnel (e.g., the police) if the user does not intervene within a predetermined time period. The predetermined time period can be at least 3 seconds and/or less than 60 seconds or at least 10 seconds and/or less than 120 seconds. The user can intervene by instructing the computing device 2608 not to call emergency response personnel (e.g., by selecting a button on a user interface to preclude the call).

In some embodiments, the operating module 2624 and/or the security system 202 may be configured to contact emergency personnel automatically. For example, a user may have a restraining order or a no-contact order against a particular visitor. The operating module 2624 may be configured to identify a potential visitor as the particular individual (such as through facial recognition or fingerprint matching) and send an alert to law enforcement. In some embodiments, the operating module 2624 may send a notification to at least one remote computing device 2608 with the option to notify law enforcement.

In some embodiments, the operating module 2624 and/or the security system 202 may be configured to contact law enforcement if someone other than a resident attempts to use the entryway. For example, the security system 202 may be configured to detect that an entry attempt has been made, such as a deadbolt has been released and/or that a door has been opened. In this embodiment, the operating module 2624 may be configured to send a notification to law enforcement and/or a remote computing device 2608 if the individual is not identified as being granted access. In some embodiments, a user may be able to indicate to the operating module 2624 that he is away from the business or residence. In this embodiment, the operating module 2624 may be configured to contact law enforcement if the security system 202 detects that an entry attempt has been made, such as a deadbolt has been released or that a door has been opened.

In some embodiments, the operating module 2624 and/or the security system 202 may be configured to check potential visitors against a criminal database. The operating module 2624 may send a notification to a remote computing device 2608 and/or emergency personnel. The user of the remote computing device 2608 may additionally be given information related to the criminal history of the potential visitor. For example, the operating module 2624 may identify a potential visitor as a registered sex offender. In some embodiments, the operating module 2624 may be configured to contact law enforcement if the potential visitor has a criminal background. For example, a user may configure the operating module 2624 to contact law enforcement when the home is unoccupied and a potential visitor has a history of burglary.

In several embodiments, the communication system 200 uses facial recognition to identify a visitor. The communication system 200 can then find information regarding the visitor. The communication system 200 can then send information regarding the visitor to the computing device 204 (e.g., while the computing device 204 is displaying a picture or video of the visitor). The information regarding the visitor can include name, age, occupation, number of previous visits to the security system, criminal background, social media profile (e.g., Facebook profile, LinkedIn profile), and/or purpose of the visit. In some embodiments, the computing device 204 displays a category or classification that applies to the visitor. Example categories and classifications include friend, family, acquaintance, sales person, worker, service provider, and unknown.

Custom Messages

In some embodiments, the operating module 2624 may be configured to provide personal messaging. The security system 202 may be provided with pre-recorded messages that can be chosen by a user. In some embodiments, the user may be able to record a message. Where the user is able to record a message, the user may be able to record the message on the security system 202 directly, or the user may be able to use a remote computing device 2608 to record a message. Messages recorded on the security system 202 and/or the remote computing device 2608 may be stored on the security system 202, on the remote computing device 2608, and/or at the service provider 2604.

In some embodiments, the security system 202 and/or the operating module 2624 may be configured to play a specific message for a specific visiting individual, and/or it may be configured to play a specific message when a potential visitor is identified as a specific person or is included in a list of specific people.

In some embodiments, the security system 202 and/or the operating module 2624 may be configured to play a specific message if the potential visitor is not included in a list. For example, where a potential visitor is not included in a list of the resident's contacts, the security system 202 and/or operating module 2624 may be configured to indicate that the resident does not accept solicitors and/or request the visitor to provide identifying information or describe the purpose of the visit.

In some embodiments, the security system 202 and/or the operating module 2624 may be configured to play a specific message if the potential visitor has a criminal background. For example, a user may configure the security system 202 and/or the operating module 2624 to play a specific message where a potential visitor is a registered sex offender.

In some embodiments, the security system 202 may be configured to receive messages. In these embodiments, a visitor may be able to leave a message for one or more occupants. For example, where a user has chosen not to answer the door (or where the security system is set to block communication requests) the visitor may be prompted to leave a message, which may be delivered to at least one remote computing device 2608.

Security System Control

In some embodiments, the operating module 2624 may be configured to provide system control functionality. In these embodiments, the user may be capable of controlling settings, features, and/or functionality of the security system 202 through a remote computing device 2608. The operating module 2624 may be configured to provide a user with the ability to activate or deactivate any or all of the modes of operation mentioned herein. The operating module 2624 can be configured to enable the user to see available security systems and connected computing devices.

In some embodiments, the operating module 2624 may be configured to provide security system control functionality through a secure login. In some embodiments, the remote computing device 2608 may be specific to one or more security systems 202. In some embodiments, a user may be given the ability to change settings for all associated security system(s) 202. For example, where a user has one security system 202 for his home and one security system 202 for his office building, he may be provided with the ability to control both security systems 202 from a single device. Where a user login is needed, the user may be provided with control over multiple security systems 202 within the same login session.

In some embodiments, a user may be able to use a mobile device to pan a camera located on the security system 202 in order to change the FOV. The user may be able to select (or silence) the doorbell speaker sound (the sound heard outside by the visitor). The user may be able to select (or silence) the inside chime (the sound heard inside the building). The user may be able to change notification settings, indicate which remote computing devices 2608 will receive notifications, or turn off notifications entirely.

In some embodiments, a user of a remote computing device 2608 may be able to turn on/off the LED light(s) on the security system 202. For example, a user interface 3700 can include a button 3704 (shown in FIG. 37) configured to turn at least one or all of the visible lights of the security system 202 off. For example, the button 3704 can turn off the power indicator light 220 and the diagnostic light 216 (shown in FIG. 1). When the security system 202 has access to power, but does not emit any visible light, the security system 202 is in Dark Mode. Dark Mode can include emitting infrared light to enable a camera to see at night.

In some embodiments, the operating module 2624 may be configured to provide a user with the ability to change settings of the security system 202 via a remote computing device. The operating module 2624 may be configured to provide a user with the ability to set security settings as previously discussed. For example, the user may be able to indicate that he is "away" from his home and that all attempts to enter his home should result in a notification to law enforcement. The operating module 2624 may be configured to provide a user with the ability to indicate which messages should be played in accordance with the personal messaging functionality previously discussed.

Figure 27:
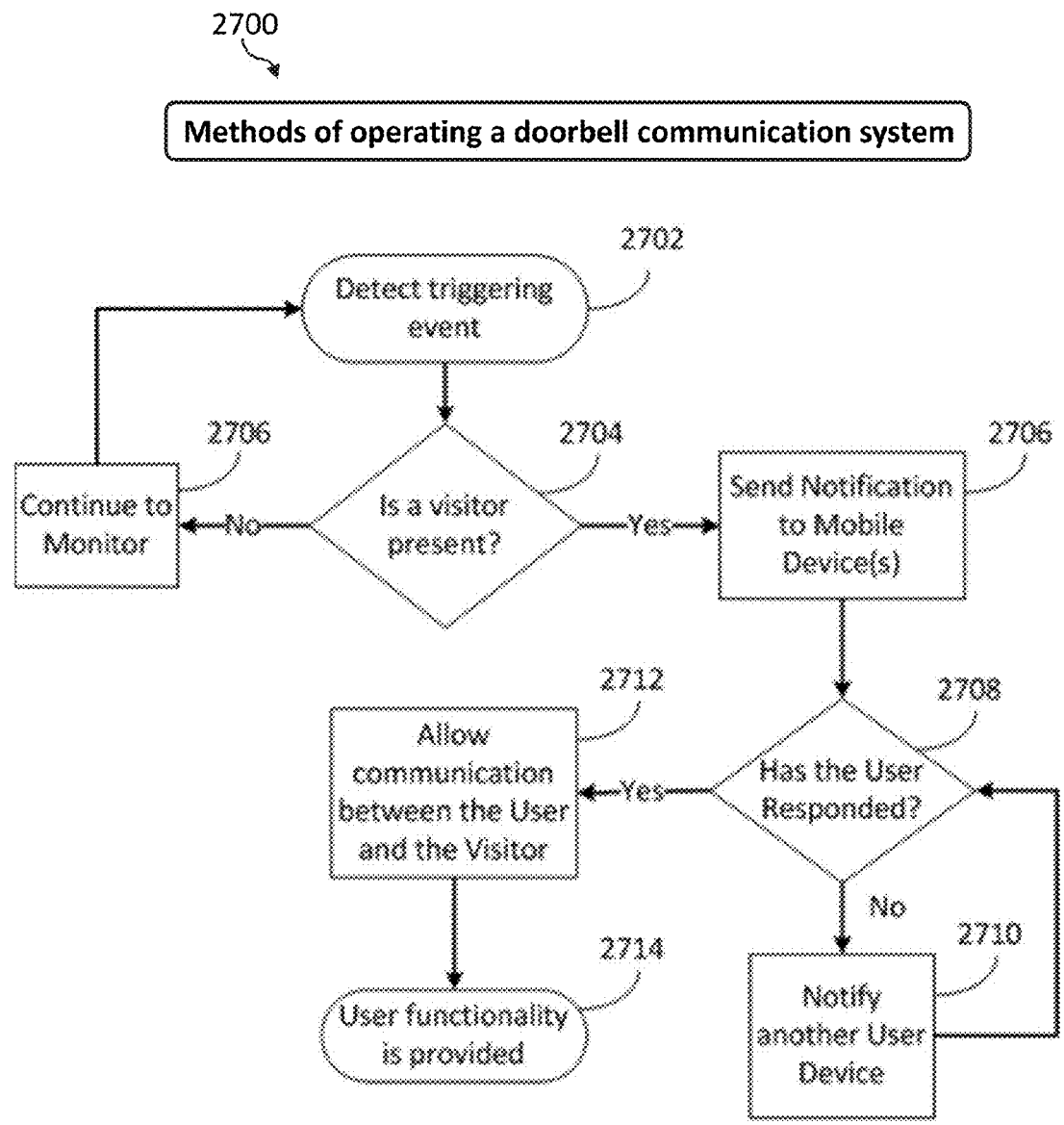
FIG. 27 depicts a flow diagram showing methods of operating a doorbell communication system, according to some embodiments.

FIG. 27 depicts a flow diagram embodiment 2700 showing methods of operating a doorbell communication system. Portions of FIG. 27 illustrate a process for providing a user of a remote computing device with functionality related to a visitor. Some or all of the process 2700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, hardware circuitry, a computer system, one or more computer systems, a network, hardware, or combinations thereof. The code may be stored on a computer-readable storage medium, for example, in the form of a computer program comprising a plurality of instructions executable by one or more processors. The computer-readable storage medium may be non-transitory. The one or more service provider computers 2604 (e.g., utilizing at least the operating module 2624) shown in FIG. 26 and/or the security system 202 from FIG. 25 may perform the process 2700 of FIG. 27.

In process 2700, the security system 202 may detect a triggering event at 2702. A triggering event is any event that indicates that a potential visitor may be present. Some non-limiting examples of a triggering event may be the ringing of a doorbell on the security system 202, activation of a motion sensor, or detection of a sound. In order to prevent excessive notifications, it may be necessary to determine whether a person is actually present at 2704. This may be done by comparing the triggering event against a threshold (such as only identifying that a visitor is present when a motion is within a given distance or a sound is over a given decibel level) or by using a specified technique. For example, the service provider 2604 may determine through facial recognition and/or computer vision that a person is present. If no visitor is detected, then the security system 202 may continue to monitor for a triggering event at 2706.

U.S. patent application Ser. No. 14/463,548, filed Aug. 19, 2014, describes various image analysis systems and methods. U.S. patent application Ser. No. 14/463,548 is incorporated by reference herein.

If a visitor is detected at 2704, then the service provider 2604 may, at 2706, send a notification to one or more remote computing devices 2608, or mobile devices, based on current settings. At 2708, the process 2700 will determine whether a user of a particular remote computing device 2608 has responded to the notification. If there has been no response, then the process, at 2710, may send a notification to a second device. If a user has responded, then communication may be allowed between the user of the remote computing device 2608 and the potential visitor at 2712. The user may be granted some or all of the functional features previously discussed in this disclosure during the communication at 2714 (or at any other time). Some of this functionality is further described in the following figures.

FIG. 28 depicts an illustrative embodiment of several features that can be implemented in a mobile application. This embodiment is illustrative of some features implemented on a remote computing device. In this embodiment, the security system 202 is identified at 2802 so the user knows which security system 202 the user is utilizing. This may be desired where more than one security system 202 is associated with a particular user or remote computing device 2608. In this embodiment, the FOV of the security system 202 is shown at 2804. In some embodiments, it may be possible to pan, or zoom with the camera in order to change the FOV.

A record button 2806 provides a user with the capability to take video recordings of the FOV. A picture button 2808 provides a user with the capability to take still pictures of the FOV. The videos and pictures may be stored on the security system 202, the remote computing device 2608, and/or the service provider 2604. Where a user wishes to watch a previously recorded video, the user may be given the ability to select the playback speed.

A speed button 2810 enables the user to select video settings related to the displayed video 2804 or image. For example, a user experiencing a slow data transmission rate may choose a lower speed, lower resolution, or still images. In some embodiments, the user can select to view still images or videos images of the FOV. In some embodiments, the user can adjust the resolution of the displayed video or images.

A mute button 2812 can allow a user to prevent a visitor from hearing the user. In some embodiments, the mute button 2812 prevents the user from hearing the visitor (e.g., if the sound recorded by the security system is bothering the user). A sound button 2814 allows the user to adjust the speaker volume to help the visitor hear better (e.g., adjust the sound level of the speaker 488 shown in FIG. 11).

An emergency button 2816 can allow for a quick notification of emergency personnel without the need to disconnect communication between the security system 202 and the remote computing device 2608. The "end call" button 2818 allows for disconnection of communication between the security system 202 and the remote computing device 2608.

Several embodiments include "on-demand" service. For example, a user can initiate communicate via a doorbell and/or can initiate live video from the doorbell by pressing a button (e.g., on demand 2820) on a user interface. Pressing the on-demand button again can terminate the communication and/or the live video.

Figure 29:
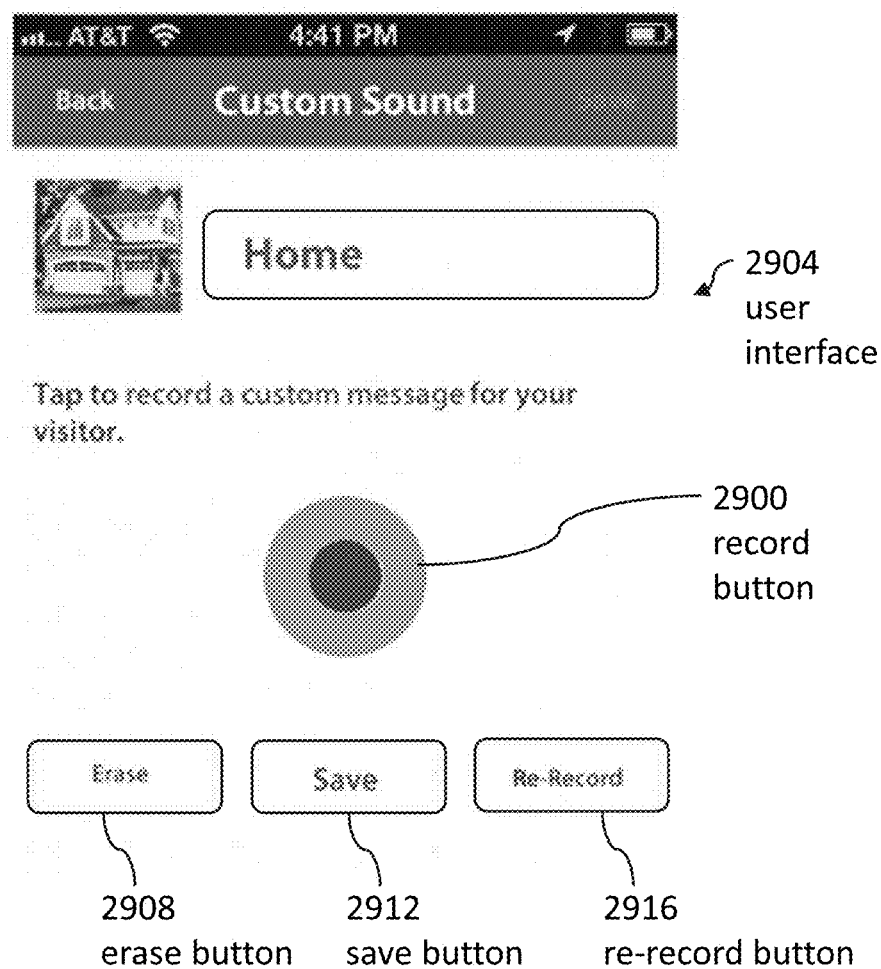
FIG. 29 depicts an illustrative embodiment of a user being provided with the ability to record a message via a remote computing device, according to some embodiments.

FIG. 29 depicts an illustrative embodiment of a user being provided with the ability to record a message via a remote computing device. In some embodiments, a user is able to save the message to the security system 202 and/or the service provider 2604. The user may then be able to select if and under what conditions each message is played. In some embodiments, the user can press the custom message button 2900 to record a message. The user can instruct the system to play the message in particular circumstances. In some embodiments, the recorded message is played each time a visitor presses the doorbell button and/or each time the security system detects a visitor. The user interface 2904 can include an erase button 2908 to erase the previously recorded message, a save button 2912 to save the previously recorded message, and/or a re-record button 2916 to record a new message. In several embodiments, a user can record a first message for use in a first set of circumstances and can record a second message for use in a second set of circumstances. For example, the first message can be used when the user wants the visitor to record a message to the user and the second message can be used to tell the visitor to go to a location (e.g., to the backyard, to leave the property).

Figure 31:
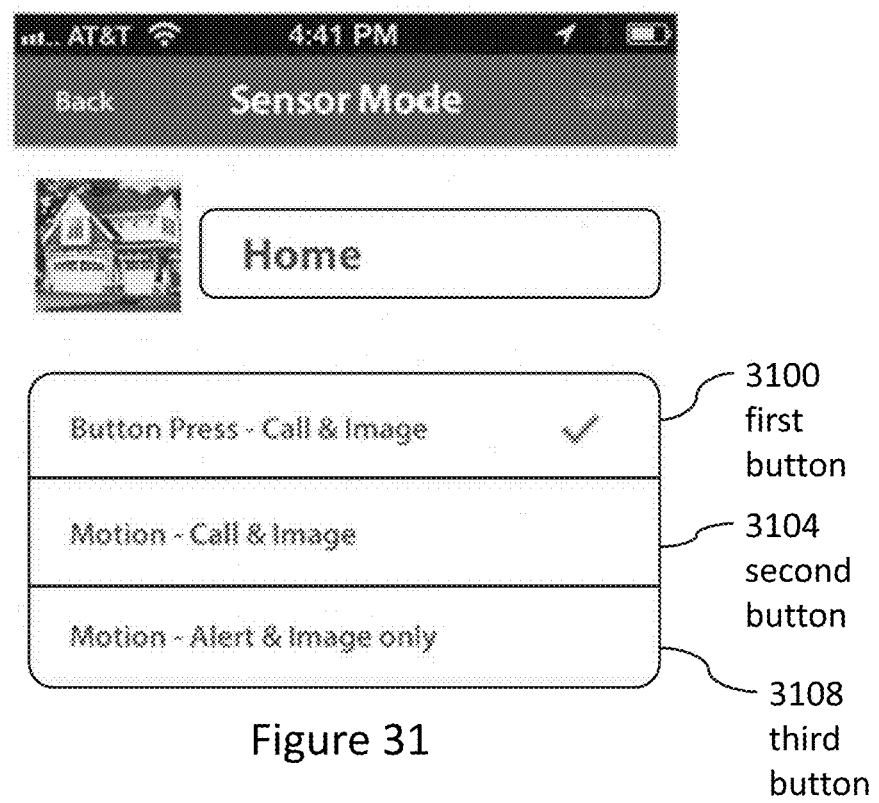
FIG. 31 depicts an illustrative embodiment of a menu for selecting notification settings, according to some embodiments.

FIG. 31 depicts an illustrative embodiment of a menu for selecting notification settings. As depicted in this embodiment, the operating module 2624 may be configured to allow a user to control what notification level is provided. In this embodiment, the settings may be saved at the security system 202, at the remote computing device 2608, and/or at the service provider 2604. A first button 3100 allows the user to select that pressing the doorbell button 212 (shown in FIG. 5) results in the communication system calling the computing device and sending an image of the FOV to the computing device. In other embodiments, the first button 3100 allows the user to select that pressing the doorbell button 212 (shown in FIG. 5) results in the communication system calling the computing device and sending a video of the FOV to the computing device. A second button 3104 allows the user to configure the communication system such that when the security system detects motion (e.g., of a visitor) the security system will call the user and send an image of the FOV. A third button 3108 allows the user to configure the communication system such that when the security system detects motion (e.g., of a visitor) the security system will alert the user and send an image of the FOV. The alert is different from the call because the alert does not include a live feed upon motion detection.

In several embodiments, detection of a visitor (e.g., by the doorbell) results in a static image of the visitor being sent to the remote computing device of at least one user. Once the user selects to accept the communication request from the doorbell (e.g., from the visitor), the system can show a video (rather than a static image) of the visitor on the remote computing device. If the communication request is sent to multiple users' computing devices, each computing device can display the static image of the visitor. Once one of the users "answers" the communication request (e.g., selects to communicate with the visitor), the computing device of the user who "answers" the communication request can display a video of the visitor. In some embodiments, detection of a visitor results in a video (rather than a static image) of the visitor being sent to at least one remote computing device to enable users to "answer" the communication request.

Figure 32:
FIG. 32 depicts an illustrative embodiment of a menu for selecting volume settings for a security system, according to some embodiments.

FIG. 32 depicts an illustrative embodiment of a menu for selecting volume settings for the security system 202. As depicted in this embodiment, the operating module 2624 may be configured to allow a user to control the volume of a speaker that will be heard from the security system. For example, a speaker volume selection interface can have three settings: low 3200, medium 3204, and high 3208. The settings can control the volume of the speaker 488 shown in FIG. 11. In this example, the settings may be saved at the security system 202, at the remote computing device 2608, and/or at the service provider 2604.

Figure 33:
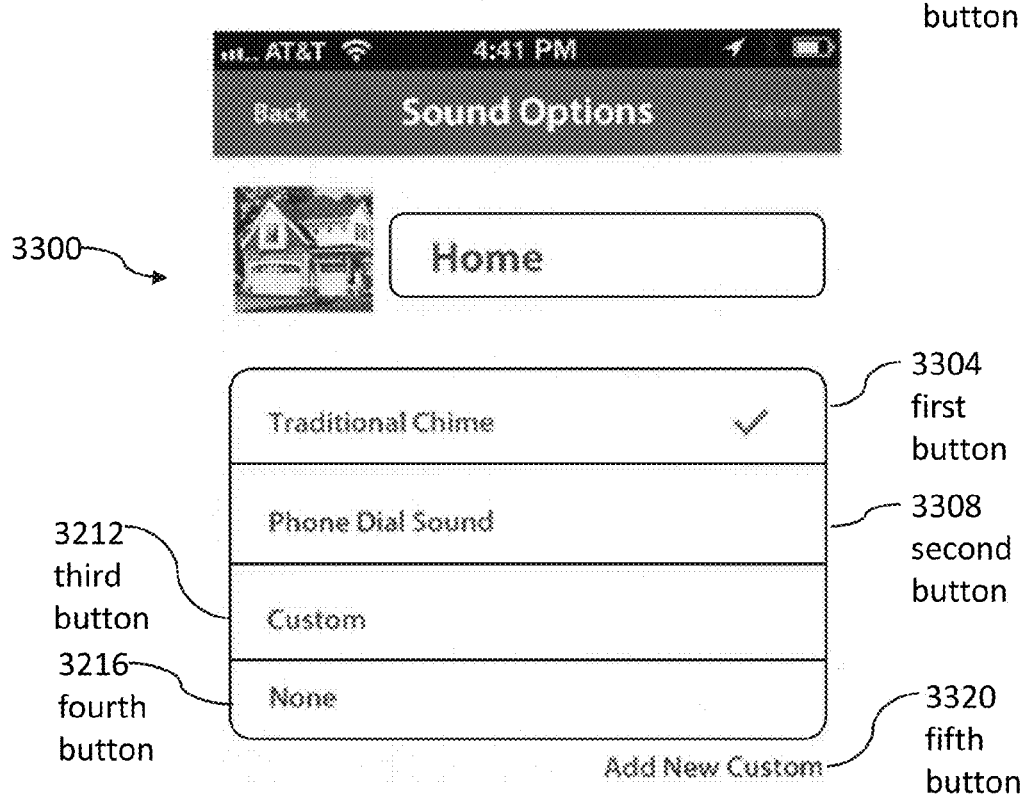
FIG. 33 depicts an illustrative embodiment of a menu for selecting sound settings for the security system, according to some embodiments.

FIG. 33 depicts an illustrative embodiment of a menu for selecting sound settings for the security system 202. As depicted in this embodiment, the operating module 2624 may be configured to allow a user to control what sounds are played by the security system 202 when a user presses a doorbell button and/or triggers a sensor of the security system. The user may be able to select (or silence) the sound heard outside by the visitor.

In some embodiments, a user interface is configured to enable a user to select what sound a visitor hears from the security system (e.g., when the visitor "rings" the doorbell). Selecting a first button 3304 can configure the security system to emit a traditional chime sound when a visitor presses a doorbell button. Selecting a second button 3308 can configure the security system to emit a dial tone sound or ringing sound when a visitor presses a doorbell button. Selecting a third button 3312 can configure the security system to emit a custom sound when a visitor presses a doorbell button (e.g., a sound recorded as described in the context of FIG. 29). Selecting a fourth button 3316 can configure the security system to not emit sound from a speaker when a visitor presses a doorbell button. Selecting a fifth button 3320 can enable the user to record a new custom sound (as described previously), select another sound from a list, or download a sound. The new custom sound can then become the custom sound emitted due to selecting the third button 3212. In this example, the settings may be saved at the security system 202, at the remote computing device 2608, and/or at the service provider 2604.

In some embodiments, the user can use the remote computing device to select a sound emitted by the chime located inside of the building or silence the chime located inside of the building. Several embodiments include many different sounds that the inside chime can emit when someone rings the doorbell.

Figure 34:
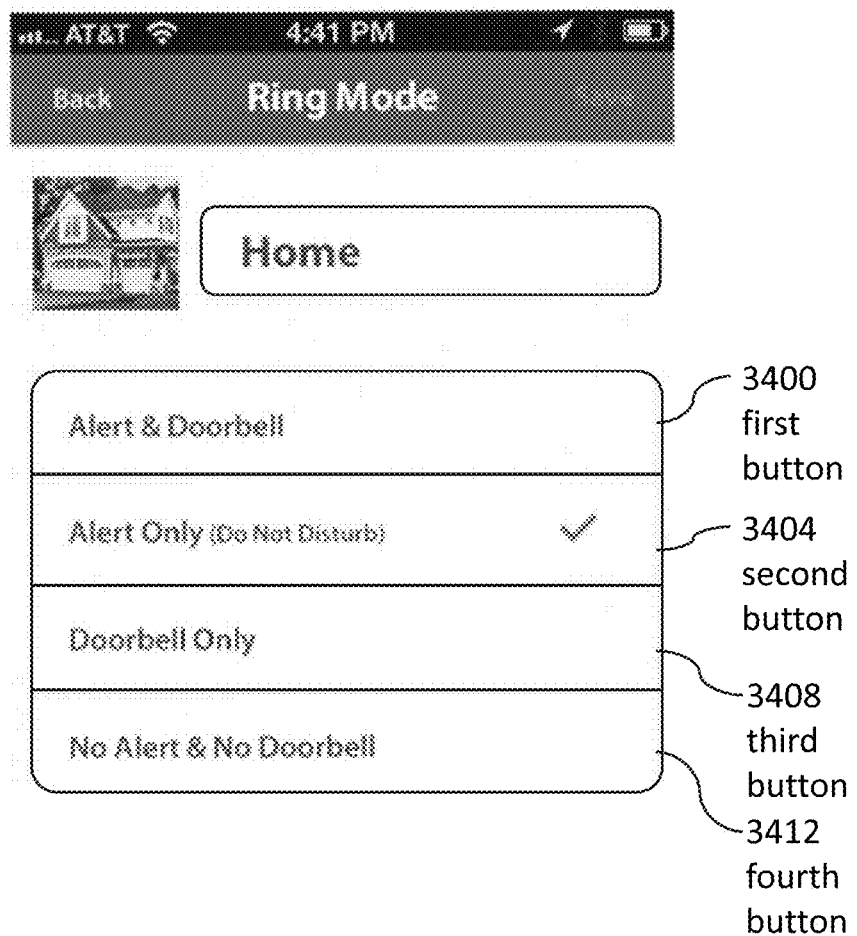
FIG. 34 depicts an illustrative embodiment of a menu for selecting notification settings for the security system, according to some embodiments.

FIG. 34 depicts a user interface with a menu for selecting alert settings (e.g., Ring Modes) for the security system 202. As depicted in this example, the operating module 2624 may be configured to allow a user to control whether the chime is active and whether alerts are sent to at least one remote device. Selecting a first button 3400 can configure the communication system to send an alert to the computing device and emit a sound from a chime (e.g., a speaker) located inside of the building to which the security system is attached. Selecting a second button 3404 can configure the communication system to send an alert to the computing device, but not emit a sound from a chime (e.g., a speaker) located inside of the building to which the security system is attached. Selecting a third button 3408 can configure the communication system to emit a sound from a chime (e.g., a speaker) located inside of the building but not send an alert to the computing device. Selecting a fourth button 3412 can configure the communication system to not send an alert to the computing device and not emit a sound from a chime (e.g., a speaker) located inside of the building to which the security system is attached. In this example, the settings may be saved at the security system 202, at the remote computing device 2608, and/or at the service provider 2604.

Figure 35:
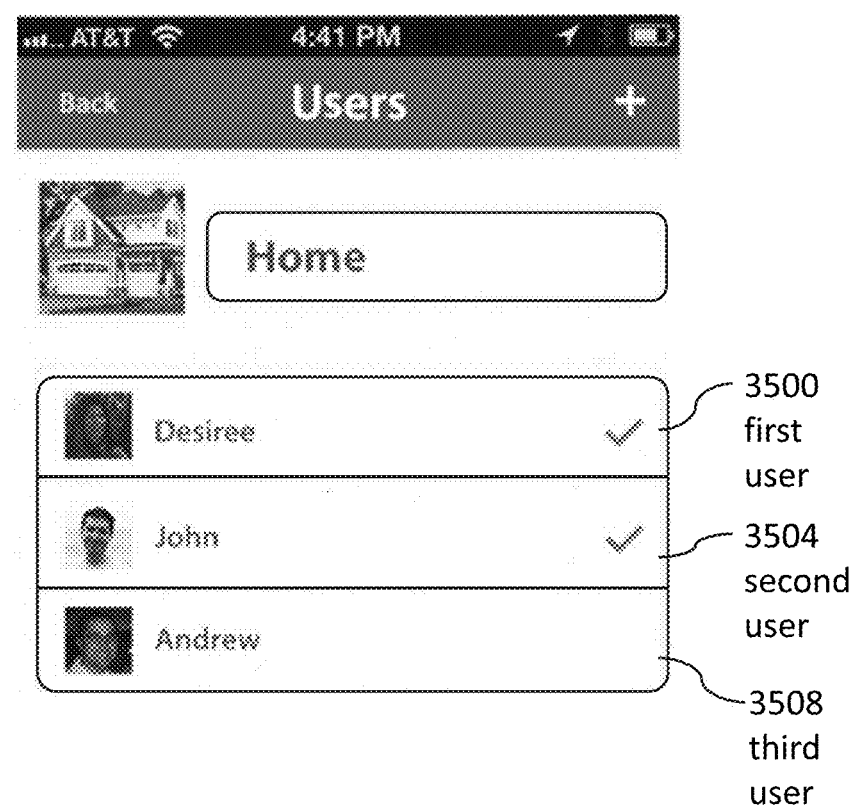
FIG. 35 depicts an illustrative embodiment of a menu for selecting which users receive notifications for the security system, according to some embodiments.

FIG. 35 depicts an illustrative embodiment of a menu for selecting which users receive notifications for the security system 202. As depicted in this embodiment, the operating module 2624 may be configured to allow a user to control what users are provided with notifications and/or in what order notifications are provided. In the illustrated example, a first user 3500 is the administrator and will receive notifications from the security system. The second user 3504 can have subordinate rights granted by the administrator to receive notifications from the security system. The third user 3508 will not receive notifications from the security system because the administrator has not selected the third user 3508 (as indicated by the lack of a check mark). In this example, the settings may be saved at the security system 202, at the remote computing device 2608, and/or at the service provider 2604.

Figure 36:
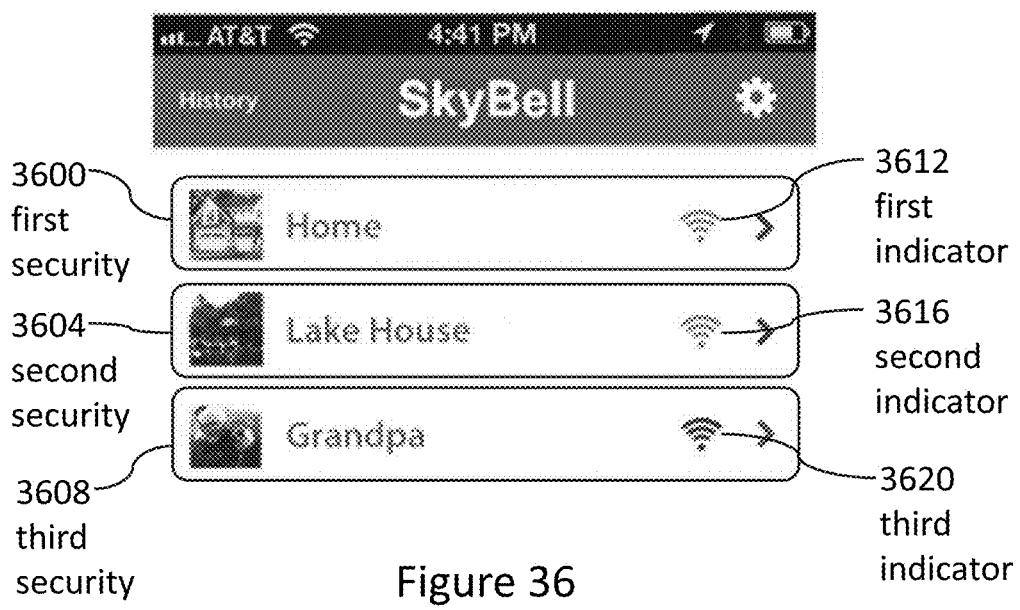
FIG. 36 depicts an illustrative embodiment of a menu for viewing multiple security systems, according to some embodiments.

FIG. 36 depicts an embodiment of a menu for selecting between multiple security systems 202. As depicted in this embodiment, the operating module 2624 may be configured to allow a user to select from multiple security systems 202 associated with the same remote computing device 2608. In some embodiments, a user may be given the ability to change settings for all associated security systems 202. For example, where a user has one security system 202 for his home and one security system 202 for his office building, the user may be provided with the ability to control both security systems 202 from a single computing device. Where a user login is needed, the user may be provided with control over multiple security systems 202 within the same login session. In this example, the settings may be saved at the security system 202, at the remote computing device 2608, and/or at the service provider 2604.

Each security system 3600, 3604, 3608 can include a status indicator 3612, 3616, 3620 to indicate the strength of the wireless connection that each security system 3600, 3604, 3608 is using to communicate with the computing device. The third status indicator 3620 indicates that the third security system 3608 is not connected to a network and cannot communicate with the computing device. The third status indicator 3620 can have a different visual appearance than the first status indicator 3612 and the second status indicator 3616 to indicate that the third security system 3608 is not connected to a wireless network and cannot communicate with the computing device. The different visual appearance can include a different color, a different icon, and/or a flashing icon. Selecting a security system button in FIG. 36 can cause the computing device to display a user interface regarding the selected security system (e.g., the user interface shown in FIG. 37). In some embodiments, security systems (or communication systems) continuously or intermittently monitor communication status (e.g., to evaluate if the security system is ready to send a communication request to a user and/or enable remote communication between a visitor and a user).

FIG. 37 depicts an embodiment for viewing and selecting settings for the security system 202. The settings interface illustrated in FIG. 37 summarizes several of the settings configured on other user interfaces illustrated in other figures. As depicted in this embodiment, the operating module 2624 may be configured to allow a user to select several settings for the security system 202. In this example, the settings may be saved at the security system 202, at the remote computing device 2608, and/or at the service provider 2604.

A status indicator 3712 can indicate whether the security system is connected to a wireless network. A sensor mode indicator 3716 can indicate how the security system will respond to the triggering of various sensors (see FIG. 31). A call mode indicator 3720 can indicate how users will be notified regarding communication requests (see FIG. 34). A user indicator 3724 can indicate which users will be notified via computing devices (see FIG. 35). A wireless network indicator 3728 can indicate the wireless network to which the security device is connected. A sound indicator 3732 can indicate the sound that will be emitted by the security system (see FIG. 33). A volume indicator 3736 can indicate the volume level at which sound will be emitted by the security system (see FIG. 32). Selecting the feed button 3740 can start a video stream of the FOV, display a picture of the FOV, initiate an audio stream from the security system to the computing device, and/or initiate an audio stream from the computing device to the security system.

Image Delivery Methods and Systems

Methods to address network congestion (e.g., in the context of FIG. 18) and methods of selecting video settings (e.g., in the context of FIG. 28) are taught herein. Optimizing the delivery of videos to the computing device can be important because increasing video resolution can cause the amount of data that must be delivered to the computing device to grow exponentially. In addition, some computing devices (e.g., smartphones) have such small screens that high-resolution video is not necessary in order to provide a satisfying viewing experience to a user. Sending high-resolution videos from security systems to computing devices (e.g., as shown in FIG. 1) can lead to inconsistent, intermittent, or choppy video delivery.

As described previously, some embodiments include delivering still images rather than videos. Some embodiments include delivering still images at less than 50 frames per second ("FPS") and/or greater than 25 FPS; less than 25 FPS and/or greater than 5 FPS; less than 10 FPS and/or greater than 0.2 FPS; or less than 5 FPS and/or greater than 0.1 FPS.

Some embodiments include delivering a single still image of the visitor taken when the visitor presses the doorbell button. Some embodiments include delivering more than one still image, but include delivering an image of the visitor pressing the doorbell button to help the user determine if the user wants to answer the communication request. To avoid the visitor's hand being in the way, and thus blocking a clear view of the visitor's face, some embodiments include delivering an image of the visitor taken at least 1 second and/or less than 25 seconds after the visitor presses the doorbell button; at least 2 seconds and/or less than 10 seconds after the visitor presses the doorbell button; or at least 1 second and/or less than 5 seconds after the visitor presses the doorbell button.

Some embodiments include delivering a video taken of the visitor to the user. In several embodiments, the video can have a resolution of less than or equal to 640 pixels wide by less than or equal to 480 pixels high. In several embodiments, the video can have a resolution of less than or equal to 320 pixels wide by less than or equal to 240 pixels high. In some embodiments, the delivered video is at least 30 pixels in width and/or less than 400 pixels in width; at least 80 pixels in width and/or less than 250 pixels in width; or at least 100 pixels in width and/or less than 200 pixels in width. Some embodiments include very high-resolution video (e.g., 2560×2048).

In several embodiments, video of a user is delivered to a screen 970 of a security system 950 (shown in FIG. 24). The video of the user can be taken via a camera of a remote computing device.

Remote Camera Adjustments

Referring now to FIGS. 8-10, the camera assembly 208 has a field of view ("FOV"). Sometimes the FOV is inadequate because it does not include a desired area (e.g., outside of a building). For example, a user might want to adjust the FOV to better see a particularly tall or short visitor. A user might want to move the FOV to see other activities near the security system 202, such as the progress of a lawn care crew. If the user is not at home or if the user wants to adjust the FOV without going outside (e.g., where a visitor might be present), the user might want to adjust the FOV remotely.

Figure 38:
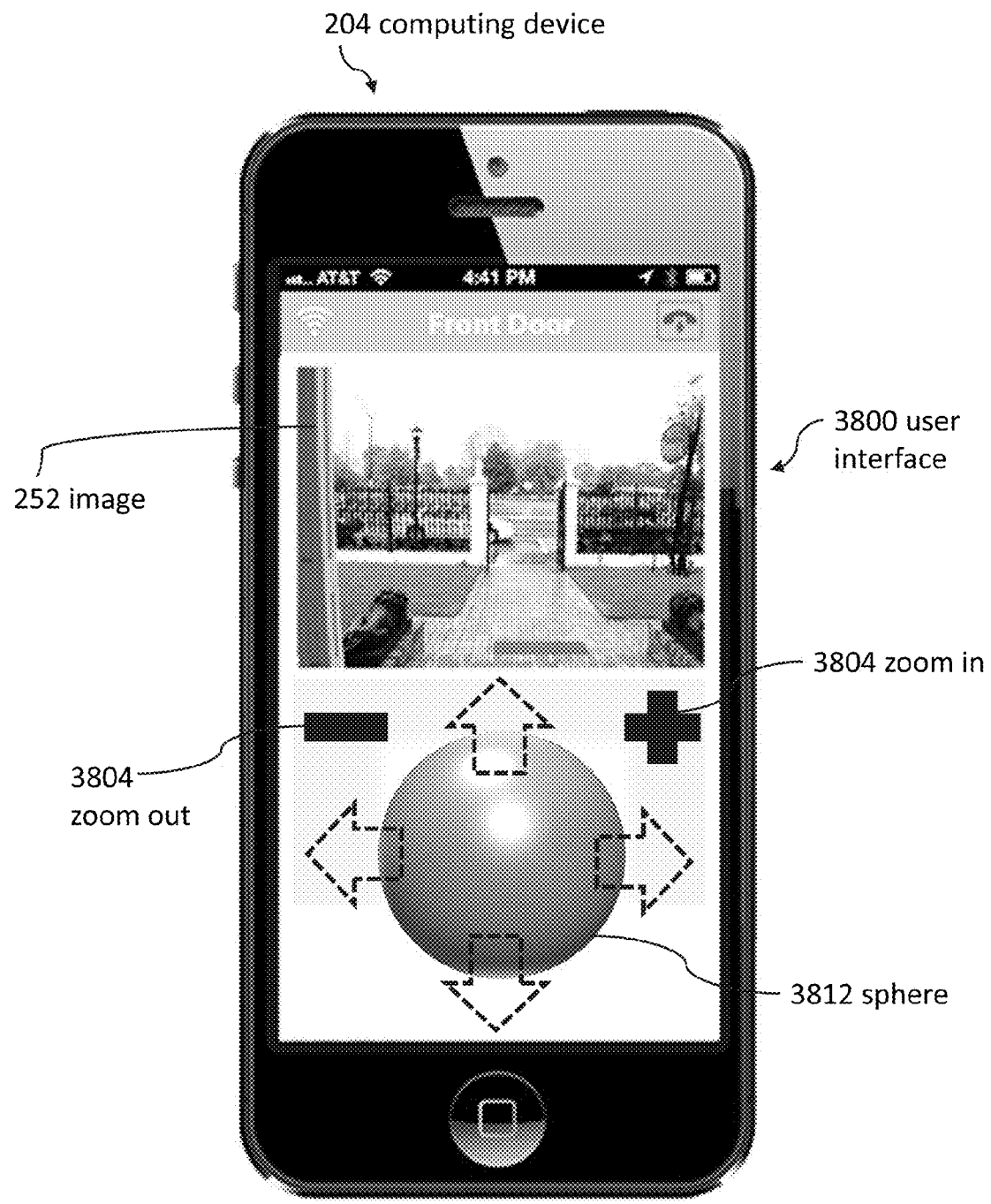
FIG. 38 illustrates a user interface configured to enable a user to adjust the field of view of a camera, according to some embodiments.

FIG. 38 illustrates a user interface 3800 configured to enable a user to adjust the FOV of an image 252 displayed on a computing device 204. The user interface 3800 can include zoom buttons 3804, 3808. One zoom button 3804 can zoom in (i.e., decrease the FOV and make items in the FOV appear larger). Another zoom button 3808 can zoom out (i.e., increase the FOV and make items in the FOV appear smaller).

In some embodiments, the user interface illustrated in FIG. 38 does not physically move a camera assembly of a security system, but instead changes the portion of the camera's FOV that is displayed in the image 252. Referring now to FIGS. 19, 20 and 38, moving the sphere 3812 or otherwise selecting a direction (e.g., the dashed arrows in FIG. 38) can cause the displayed portion 848a, 848b to change while the camera's FOV 840 remains constant. In several embodiments, the user interface illustrated in FIG. 38 is used to physically move a camera assembly of a security system to enable a user to see different areas.

In some embodiments, user interfaces are configured to enable use with touch screens, such as the screen of a smartphone or tablet. User interfaces can also be used with non-touch screens (e.g., via mouse and/or keyboard input).

Referring now to FIG. 38, the user interface 3800 can also include a means to adjust the camera's viewing angle (and thus, adjust the FOV). The user interface 3800 can include arrows (shown in dashed lines) that act as buttons to adjust the viewing angle. In some embodiments, the user interface 3800 has a virtual sphere (or circle) 3812. The user interface 3800 can be a touch screen that enables the user to manipulate the sphere 3812 in any direction (including the directions shown by the dashed arrows). Moving the sphere 3812 can cause the camera assembly 208 (shown in FIGS. 8 and 9) to move to adjust the viewing angle. In several embodiments, the camera assembly 208 moves less than 70% as far as the movement indicated by the user via the sphere 3812. For example, moving the sphere 3812 50 degrees might only cause the camera assembly 208 to move 25 degrees. In several embodiments, the camera assembly 208 moves at least 1% and/or less than 70% as far as the movement indicated by the user via the sphere 3812 and/or arrows; at least 5% and/or less than 50% as far as the movement indicated by the user via the sphere 3812 and/or arrows; or at least 10% and/or less than 30% as far as the movement indicated by the user via the sphere 3812 and/or arrows. This approach can enable the user to precisely adjust the viewing angle.

Figure 39:
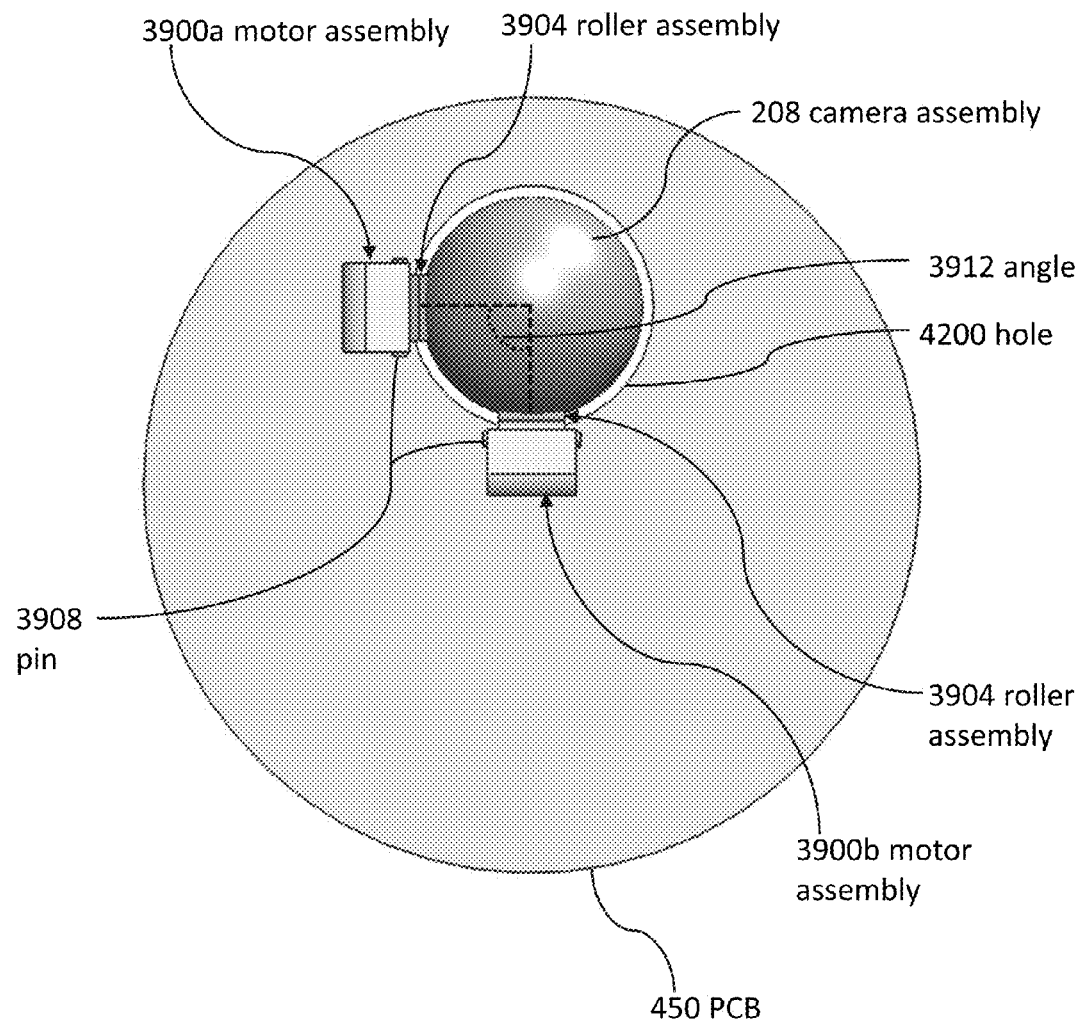
FIG. 39 illustrates a top view of a camera orientation embodiment, according to some embodiments.

FIG. 39 illustrates a top view of a camera orientation embodiment. Referring now to FIGS. 38 and 39, at least one motor assembly 3900a, 3900b can physically move the camera assembly 208 in response to user commands entered via the user interface 3800. The motor assemblies 3900a, 3900b can be coupled to the PCB 450. (Many items are not shown on the PCB 450 in the interest of clarifying particular items.) The motor assemblies 3900a, 3900b can include rollers 3904 rollably coupled to the camera assembly 208 such that rotation of the rollers 3904 can cause the camera assembly to move. In some embodiments, the roller assemblies 3904 contact (e.g., gently contact) an outer surface of the camera assembly 208, which can be a camera assembly with a spherical portion. A roller assembly 3904 can include a rubber roller secured by a pin 3908 around which the rubber roller rotates. The pins 3908 can be metal rods. Each motor assembly 3900a, 3900b can include a motor configured to rotate the rollers and powered by electricity that flows through the PCB 450.

The camera assembly 208 can be otherwise contained within a housing (e.g., the cover 404 shown in FIG. 9) to prevent the camera assembly from falling out or being inappropriately displaced. In some embodiments, the motor assemblies 3900a, 3900b are located on the side of the PCB 450 that is closest to the outer face 214 and doorbell button 212 (shown in FIG. 10).

In some embodiments, two motor assemblies 3900a, 3900b are oriented at an angle 3912 relative to each other. The angle can be approximately 90 degrees; at least 45 degrees and/or less than 135 degrees; at least 70 degrees and/or less than 110 degrees; or at least 80 degrees and/or less than 100 degrees. A first motor assembly 3900a can be configured to rotate the camera assembly 208 in a first direction and a second motor assembly can be configured to rotate the camera assembly 208 in a second direction. The second direction can be oriented approximately 90 degrees relative to the first direction; at least 45 degrees and/or less than 135 degrees relative to the first direction; at least 70 degrees and/or less than 110 degrees relative to the first direction; or at least 80 degrees and/or less than 100 degrees relative to the first direction.

Figure 40:
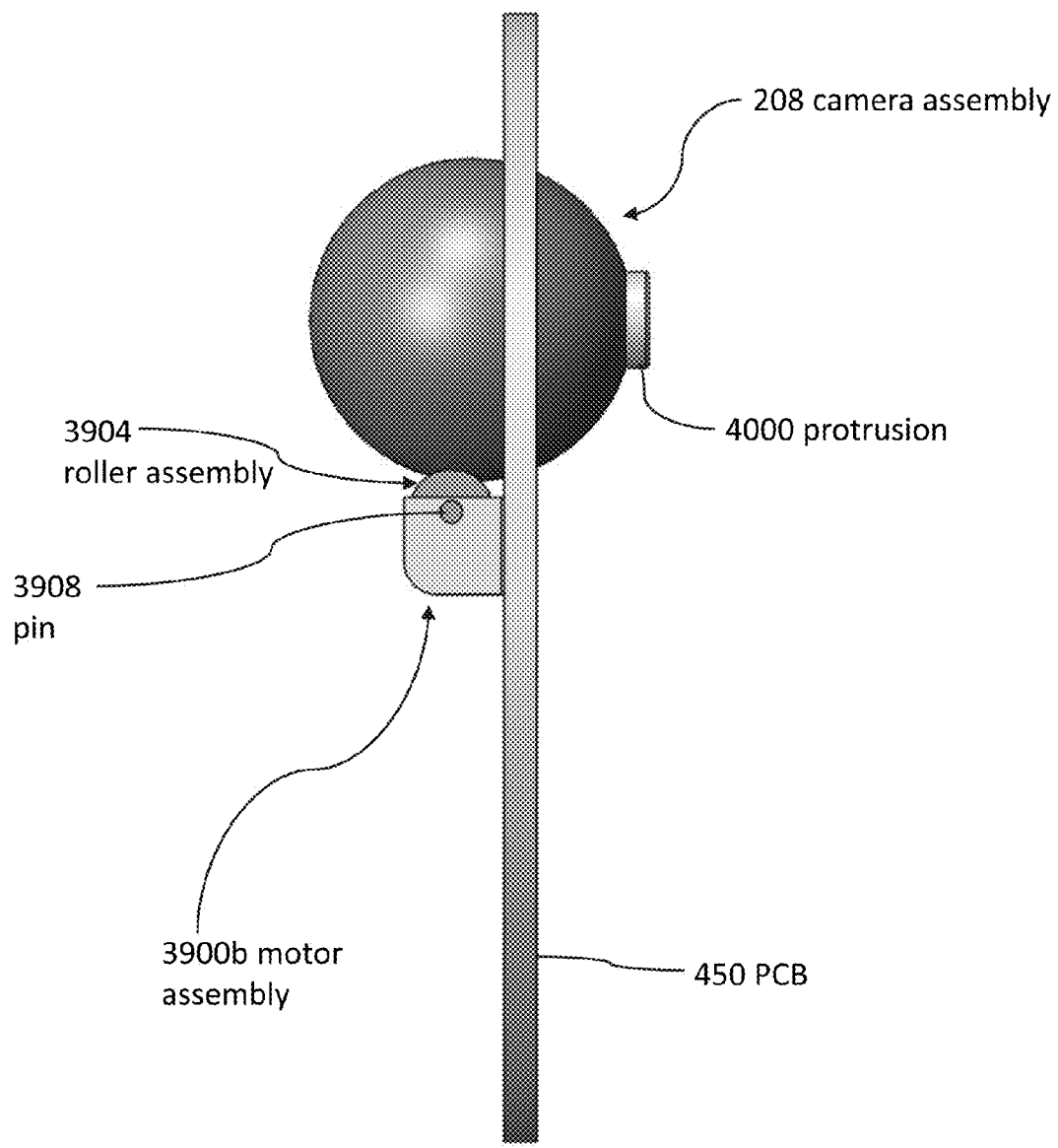
FIG. 40 illustrates a side view of the camera orientation embodiment from FIG. 39, according to some embodiments.

FIG. 40 illustrates a side view of the camera orientation embodiment from FIG. 39. Referring now to FIGS. 8, 9, and 40, the camera assembly 208 can include a protrusion 4000, which can be located around a camera lens 434 or on the opposite side from the camera lens 434. The protrusion 4000 can be configured to contact a perimeter 402 of the outer housing 224 and/or the cover 404. As a result, the protrusion 4000 can limit the travel of the camera assembly 208 because the protrusion 4000 is configured to collide with the perimeter 402 to limit the movement of the camera assembly 208. The protrusion 4000 can extend away from the rest of the camera assembly 208. In some embodiments, the motor assemblies 3900a, 3900b are stepper motors and the software is configured to limit the travel of the motor assemblies 3900a, 3900b. Some user interfaces include a warning (e.g., sound, image, icon) when a user reaches a movement limit such that the camera assembly 208 cannot move farther.

Figure 41:
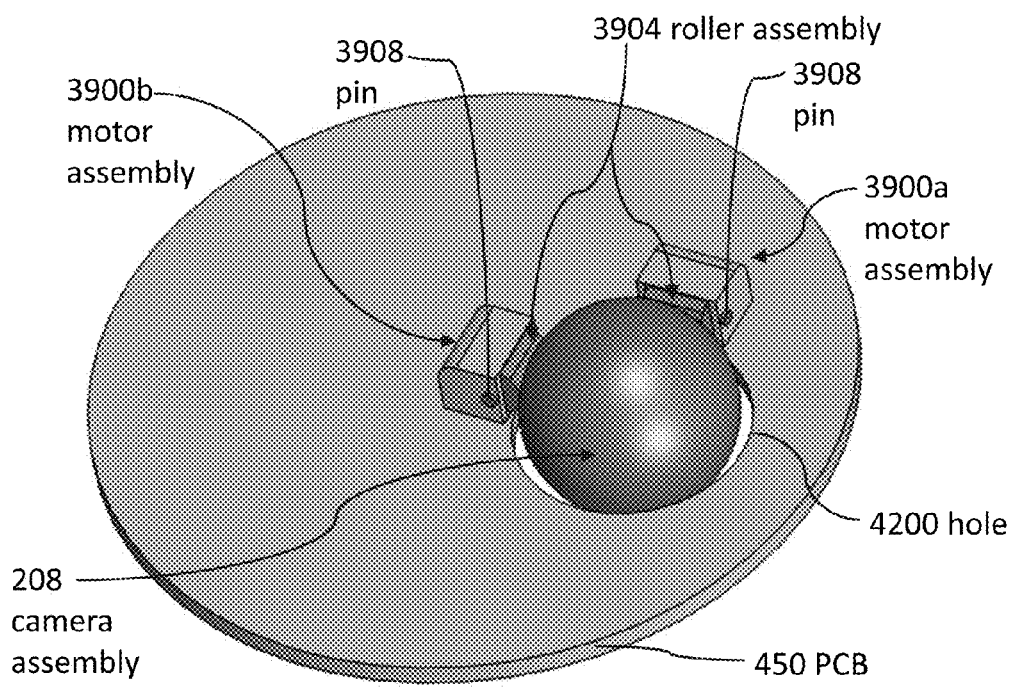
FIGS. 41 and 42 illustrate perspective views of the camera orientation embodiment from FIG. 39, according to some embodiments.
Figure 42:
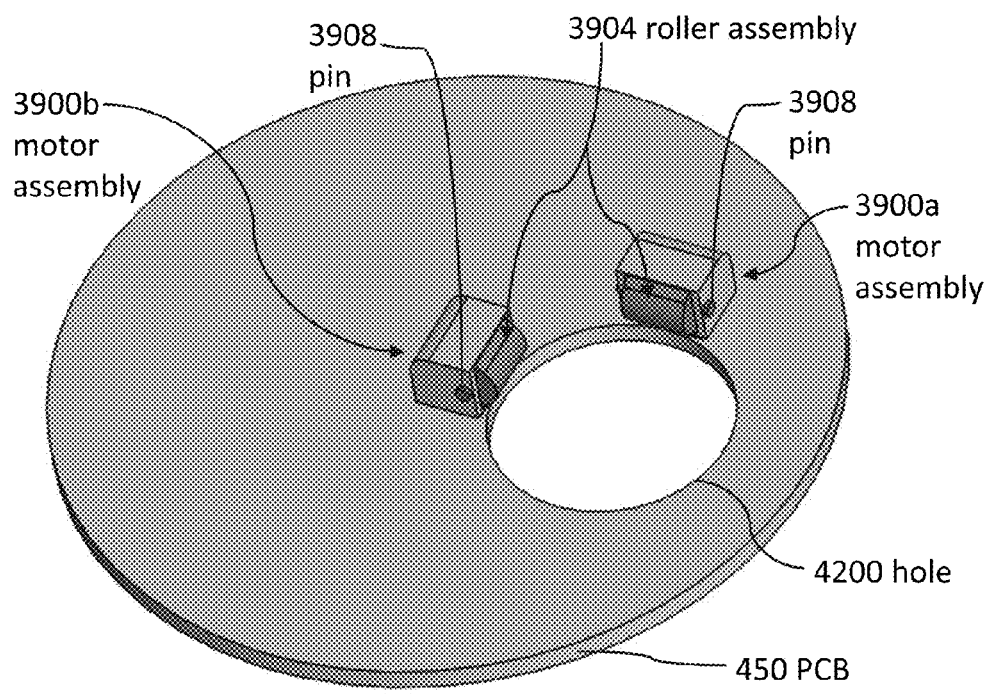

FIGS. 41 and 42 illustrate perspective views of the camera orientation embodiment from FIG. 39. The camera assembly 208 is hidden in FIG. 42. The PCB 450 can include a hole 4200 configured to limit the travel of the camera assembly 208. The camera assembly 208 can be at least partially located in the hole 4200 of the PCB 450.

Identity Scanner

Any of the embodiments described herein can also include an identity scanner, which can be configured to identify the visitor. In some embodiments, the identify scanner can classify the visitor. Classifications can include unwanted visitor, wanted visitor, family member, owner, employee, and authorized service provider. Some methods include using the identity scanner to determine if the visitor is authorized to enter the building or if the visitor is unauthorized to enter the building. If the visitor is authorized to enter the building, then the security system (e.g., 202 in FIG. 1) can enable the authorized visitor to enter the building. The user can pre-authorize certain individuals or classifications of visitors such that the security system will allow the preauthorized individuals and classifications of visitors to unlock a door, gate, or entrance (and thereby enter the building) without additional interaction with the user. For example, if a user pre-authorizes a service provider, the security system will allow the service provider to enter the building (e.g., unlock a door) without real-time input from the user. This approach enables an authorized party (e.g., an authorized visitor) to gain access to the building without disturbing the user.

Figure 43:
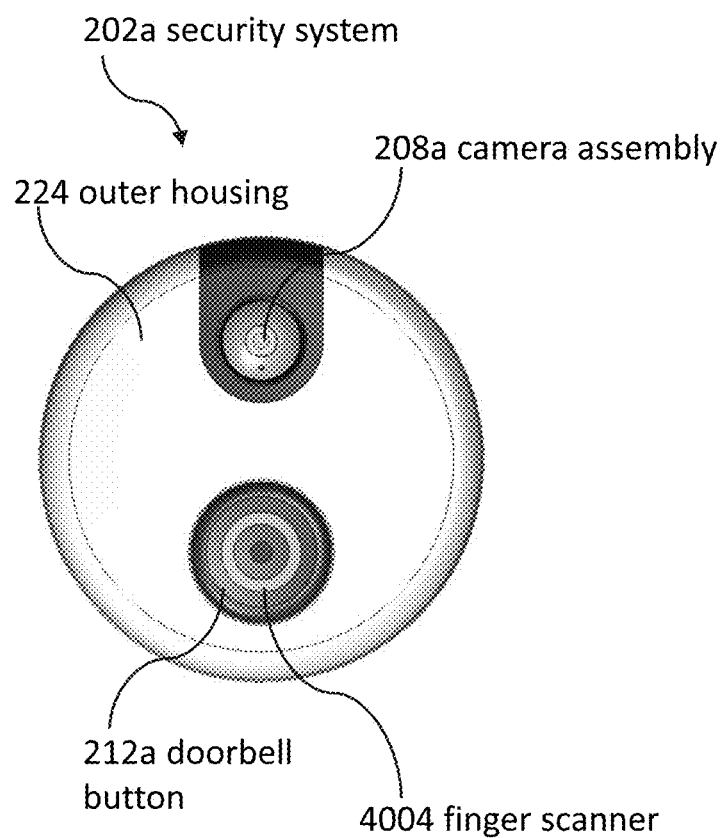
FIG. 43 illustrates a front view of a security system, according to some embodiments.

FIG. 43 illustrates a security system 202a with multiple identity scanners (e.g., 208a, 4004). The camera assembly 208a is configured to visually identify visitors through machine vision and/or image recognition. The security system 202a can include a finger scanner 4004, which can be a fingerprint reader that enables the system to compare the fingerprint of the visitor to a database of fingerprints to identify and/or classify the visitor. The database of fingerprints can be created by the user and/or can include a database of fingerprints from a law enforcement agency (e.g., a database of criminals).

The finger scanner 4004 can use any suitable algorithm including minutia and pattern algorithms. The finger scanner 4004 can analyze fingerprint patterns including arch patterns, loop patterns, and whorl patterns. The finger scanner 4004 can include any suitable fingerprint sensor including optical, ultrasonic, passive capacitance, and active capacitance sensors. The finger scanner 4004 can be integrated into the outer housing 224 of the security system 202a, which can be mounted within 7 feet of a door or entryway of a building, such as a house. In some embodiments, the security system 202a can be configured to be mounted in an entryway. Some methods include mounting a security system in an entryway of a building.

The finger scanner 4004 can be integrated into the doorbell button 212a. Pressing the doorbell button 212a can enable the finger scanner 4004 to analyze the fingerprint of the visitor. The doorbell button 212a can be used to "ring" the doorbell and house at least a portion of the finger scanner 4004.

The security system 202a and/or a remote computer can determine if the visitor is on a pre-authorized list of individuals. The security system 202a and/or a remote computer can determine if the visitor is on a list of unauthorized or screened individuals. The system can block the communication request of screened individuals and/or can call emergency response personnel in reaction to determining the identity of a screened visitor.

Figure 44A:
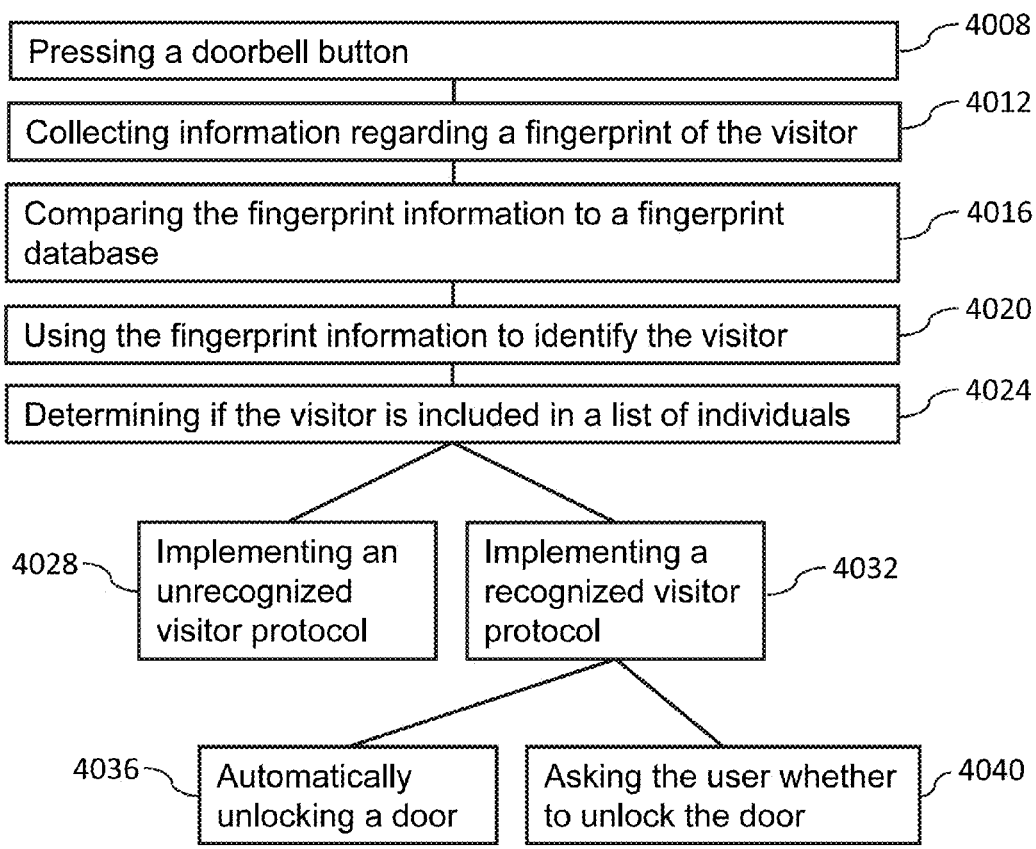
FIGS. 44A and 44B illustrate methods of using a security system, according to some embodiments.
Figure 44B:
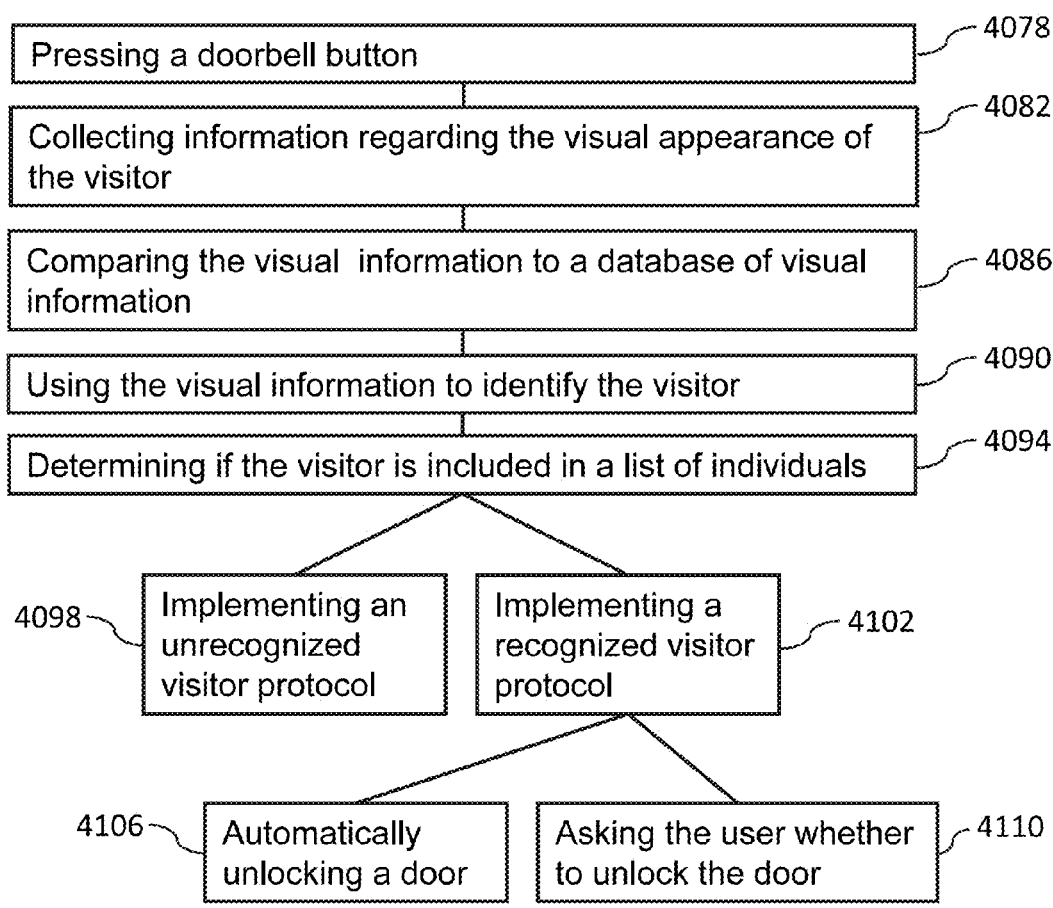

FIGS. 44A and 44B illustrate various method embodiments. Referring now to FIG. 44A, Block 4008 can include the visitor pressing the doorbell button (or placing a finger in proximity to a doorbell housing). Block 4012 can include a security system collecting information (e.g., capturing information) regarding a fingerprint of the visitor. Block 4016 can include comparing the fingerprint information to a fingerprint database. The comparison can include implementing a matching algorithm. Block 4020 can include using the fingerprint information to identify the visitor. Block 4024 can include determining if the visitor is included in a list of individuals. The list of individuals can be created by the user (e.g., the user can select which individuals to include in the list).

In some embodiments, the security system can be configured to collect fingerprint samples, the system can be configured to record the fingerprint samples, and the remote computing device can be configured to assign fingerprint samples to a list of individuals, classifications of individuals, and/or information regarding individuals. Referring now to FIG. 43, a user could use the finger scanner 4004 to collect fingerprint samples of family members, friends, and/or wanted visitors. The user could use a computing device to add the fingerprint samples to a database, assign an identity to each fingerprint sample, and/or add the fingerprint samples (or a person associated with each sample) to a list of individuals.

Referring now to FIG. 44A, Block 4028 can include implementing an unrecognized visitor protocol. Unrecognized visitor protocols can be customized by the user. Unrecognized visitor protocols can include disabling a chime, speaker, or audio output device located inside of the building during certain hours of the day (e.g., between 11:00 PM and 6:00 AM). Unrecognized visitor protocols can include directing the communication request to a particular user (e.g., an adult user rather than to a child user or a user under a certain age threshold). Unrecognized visitor protocols can include emitting a chime or sound inside of the building but not notifying a remote computing device (e.g., 204 in FIG. 1).

Block 4032 can include implementing a recognized visitor protocol, which can be different than the unrecognized visitor protocol. If the visitor is include on a list of individuals authorized to automatically enter the building, then the security system can enable the visitor to enter the building (e.g., unlock a door) without further approval by the user (e.g., by automatically unlocking a door as shown in Block 4036). As shown in Block 4040, if the visitor is recognized, but not included on a list of individuals authorized to automatically enter the building, then the communication system can wait for the user to provide authorization via a remote computing device for the visitor to enter the building (e.g., unlock the door).

As mentioned previously in the context of FIG. 43, the camera assembly 208a can be configured to visually identify visitors through machine vision and/or image recognition. For example, the camera assembly 208a can take an image of the visitor. Software run by any portion of the system can then compare select facial features from the image to a facial database. In some embodiments, the select facial features include dimensions based on facial landmarks. For example, the distance between a visitor's eyes; the triangular shape between the eyes and nose; and the width of the mouth can be used to characterize a visitor and then to compare the visitor's characterization to a database of characterization information to match the visitor's characterization to an identity (e.g., an individual's name, authorization status, and classification). Some embodiments use three-dimensional visitor identification methods.

Referring now to FIG. 44B, Block 4078 can include the visitor pressing the doorbell button (or placing a finger in proximity to a doorbell housing). Block 4082 can include a security system collecting information (e.g., capturing information such as an image) regarding a visual appearance of the visitor. Block 4086 can include comparing the visual information to a visual information database. The comparison can include implementing a matching algorithm and/or any of the image recognition methods mentioned above. Block 4090 can include using the visual information to identify the visitor. Block 4094 can include determining if the visitor is included in a list of individuals. The list of individuals can be created by the user (e.g., the user can select which individuals to include in the list).

Block 4098 can include implementing an unrecognized visitor protocol. Unrecognized visitor protocols can be customized by the user. Unrecognized visitor protocols can include disabling a chime, speaker, or audio output device located inside of the building during certain hours of the day (e.g., between 11:00 PM and 6:00 AM). Unrecognized visitor protocols can include directing the communication request to a particular user (e.g., an adult user rather than to a child user or a user under a certain age threshold). Unrecognized visitor protocols can include emitting a chime or sound inside of the building but not notifying a remote computing device (e.g., 204 in FIG. 1).

Block 4102 can include implementing a recognized visitor protocol, which can be different than the unrecognized visitor protocol. If the visitor is include on a list of individuals authorized to automatically enter the building, then the security system can enable the visitor to enter the building (e.g., unlock a door) without further approval by the user (e.g., by automatically unlocking a door as shown in Block 4106). As shown in Block 4110, if the visitor is recognized, but not included on a list of individuals authorized to automatically enter the building, then the communication system can wait for the user to provide authorization via a remote computing device for the visitor to enter the building (e.g., unlock the door).

Locking System

Figure 45:
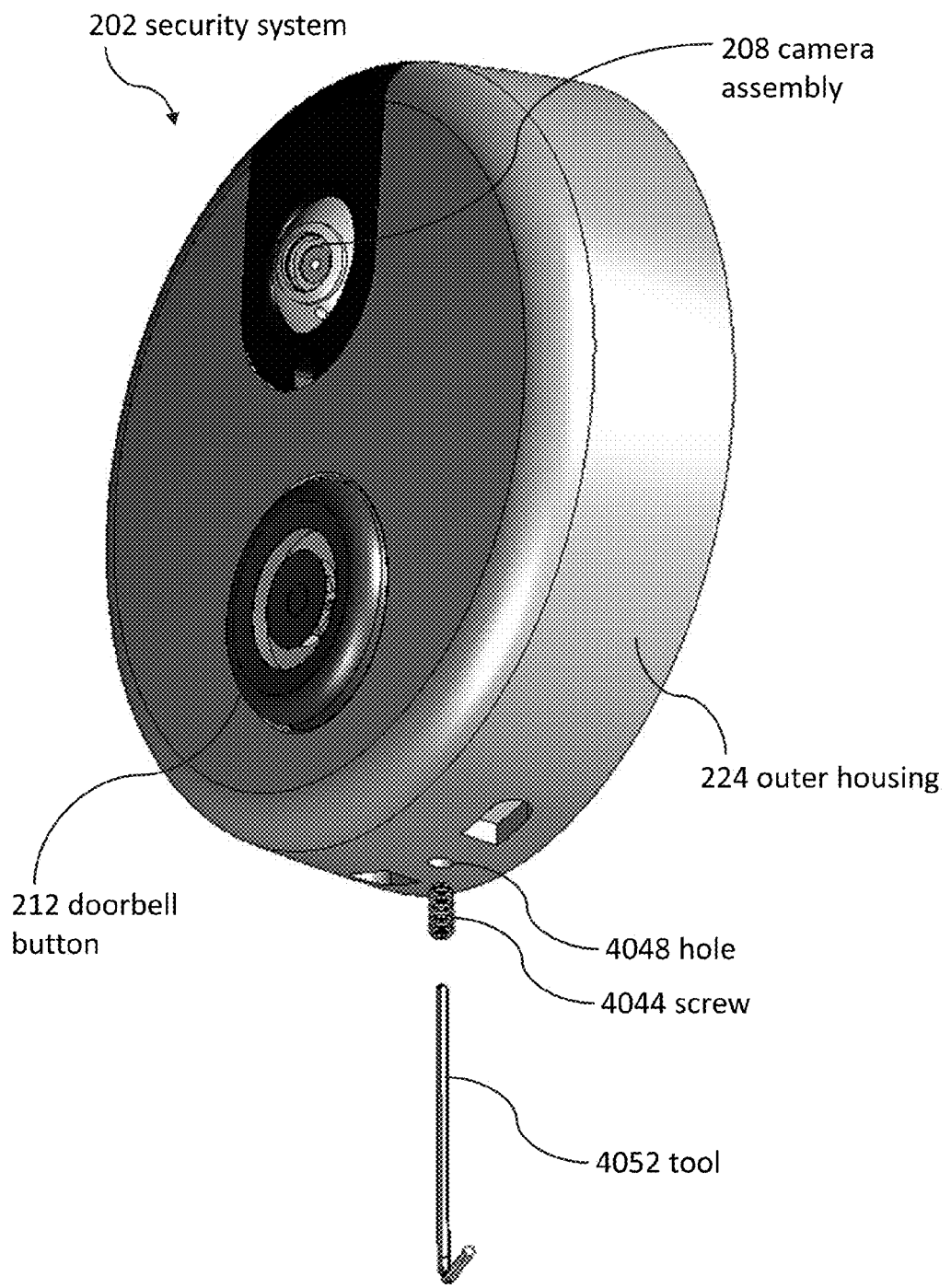
FIG. 45 illustrates a perspective view of a security system with a locking assembly, according to some embodiments.

Various mounting bracket embodiments are described herein (e.g., 420 in FIGS. 12, 14, and 15). FIG. 45 illustrates a perspective view of an embodiment that couples the mounting bracket 420 (shown in FIG. 12) to the outer housing 224. A threaded screw 4044 (e.g., a setscrew or any suitable screw) is rotated through a hole 4048 in the outer housing 224 by a tool 4052 (e.g., an allen wrench, a hex wrench, a screwdriver). The threaded screw 4044 passes at least partially through the hole 4048 and into a portion of the bracket 420 (not shown). The hole 4048 can be located at a bottom portion of the outer housing 224 and/or along an outer perimeter of the outer housing 224. In some embodiments, the outer housing 224 includes a cylindrical shape and the hole 4048 is located on an outer, curved portion of the cylindrical shape.

Figures 46A, 46B:
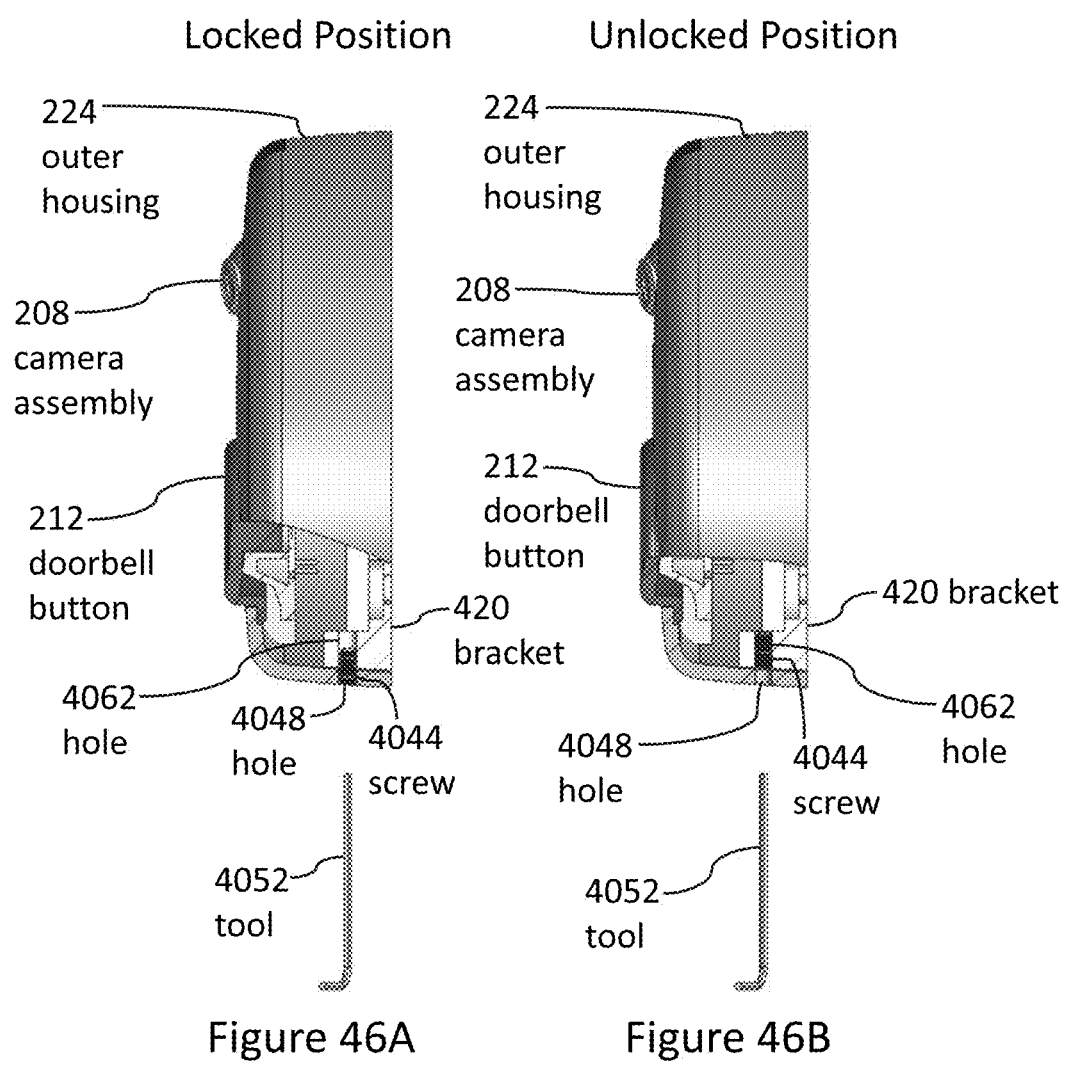
FIGS. 46A and 46B illustrate side views with a partial cross section of the locking assembly shown in FIG. 45, according to some embodiments.

FIGS. 46A and 46B illustrate side views with a partial cross section to illustrate how the screw 4044 can pass through the hole 4048 in the outer housing 224 and into a hole 4062 of the bracket 420. The hole 4062 of the bracket 420 can be threaded. FIG. 46A illustrates the outer housing 224 in a locked position (e.g., the screw 4044 is coupled to the hole 4062 in the bracket 420 and protrudes into the hole 4048 of the outer housing 224 such that the outer housing 224 is coupled to the bracket 420). FIG. 46B illustrates the outer housing 224 in an unlocked position (e.g., the screw 4044 does not protrude into the hole 4048 of the outer housing 224 such that the outer housing 224 can be removed from the bracket 420). Some embodiments include coupling the bracket 420 to a wall by screwing screws into the wall in a first direction and coupling an outer housing 224 (e.g., of a doorbell security system) to the bracket 420 by screwing a screw in a second direction, wherein the first direction is perpendicular to the plane of the wall and the second direction is angled at 90 degrees relative to the first direction (e.g., the second direction is parallel to the plane of the wall).

Auto-Ringing Doorbell

As described herein, various embodiments include the ability to detect whether a visitor is present even if the visitor does not press a doorbell button. For example, some embodiments include infrared detection of visitors, motion detection of visitors, noise detection of visitors, and/or visual recognition of visitors. If a visitor is present for more than a threshold amount of time, the system (e.g., 200 in FIG. 1) can cause a chime (e.g., 302 in FIG. 3) to emit a sound inside of the building and/or can send a notification to a user (e.g., via a remote computing device). The threshold amount of time can be at least 3 seconds, at least 5 seconds, at least ten seconds, and/or at least twenty seconds. The threshold amount of time can be less than 20 seconds, 15 seconds, and/or five seconds.

In some embodiments, the system can be configured to only notify a user (e.g., via a chime and/or via a remote computing device) once per detected visitor and/or once per detection episode. This approach can prevent unnecessarily redundant notifications. In several embodiments, the system will send a notification to the user when a visitor is detected (or after a threshold amount of time) but then will not send a second notification regarding the same visitor unless a second triggering event occurs. Example triggering events can include the passage of a second threshold amount of time, a second knocking episode, and/or pressing the doorbell button.

Power Management

Different parts of the world often use different types of electrical power. In addition, different houses sometimes have different wiring configurations and system installers might use different installation techniques. Several embodiments include special features that enable compatibility with any voltage, current, and wiring configuration. Some embodiments can function properly regardless of current direction or type.

Referring now to FIG. 11, several embodiments can be configured for 9 to 40 volts alternating current ("VAC") and/or 9 to 40 volts direct current ("VDC"). Some embodiments convert input electricity into direct current (DC), such as 12 VDC. Several embodiments include a converter 494 for power conversion (e.g., converting electrical energy from one form to another). The converter 494 can convert input power (e.g., from wiring in a building) to a suitable power form for the security system 202. The power conversion can convert between AC and DC, change the voltage, and/or change the frequency. The converter 494 can include a transformer and/or a voltage regulator. In several embodiments, the converter 494 can include a DC to DC converter, a voltage stabilizer, a linear regulator, a surge protector, a rectifier, a power supply unit, a switch, an inverter, and/or a voltage converter. In some embodiments, the converter 494 converts 50 Hertz ("Hz") power into 60 Hz power.

In some embodiments, the security system 202 uses a first amount of power to "ring" the chime inside of the building and a second amount of power when in Standby Mode, wherein the first amount of power is at least twice as large as the second amount of power.

Figure 47:
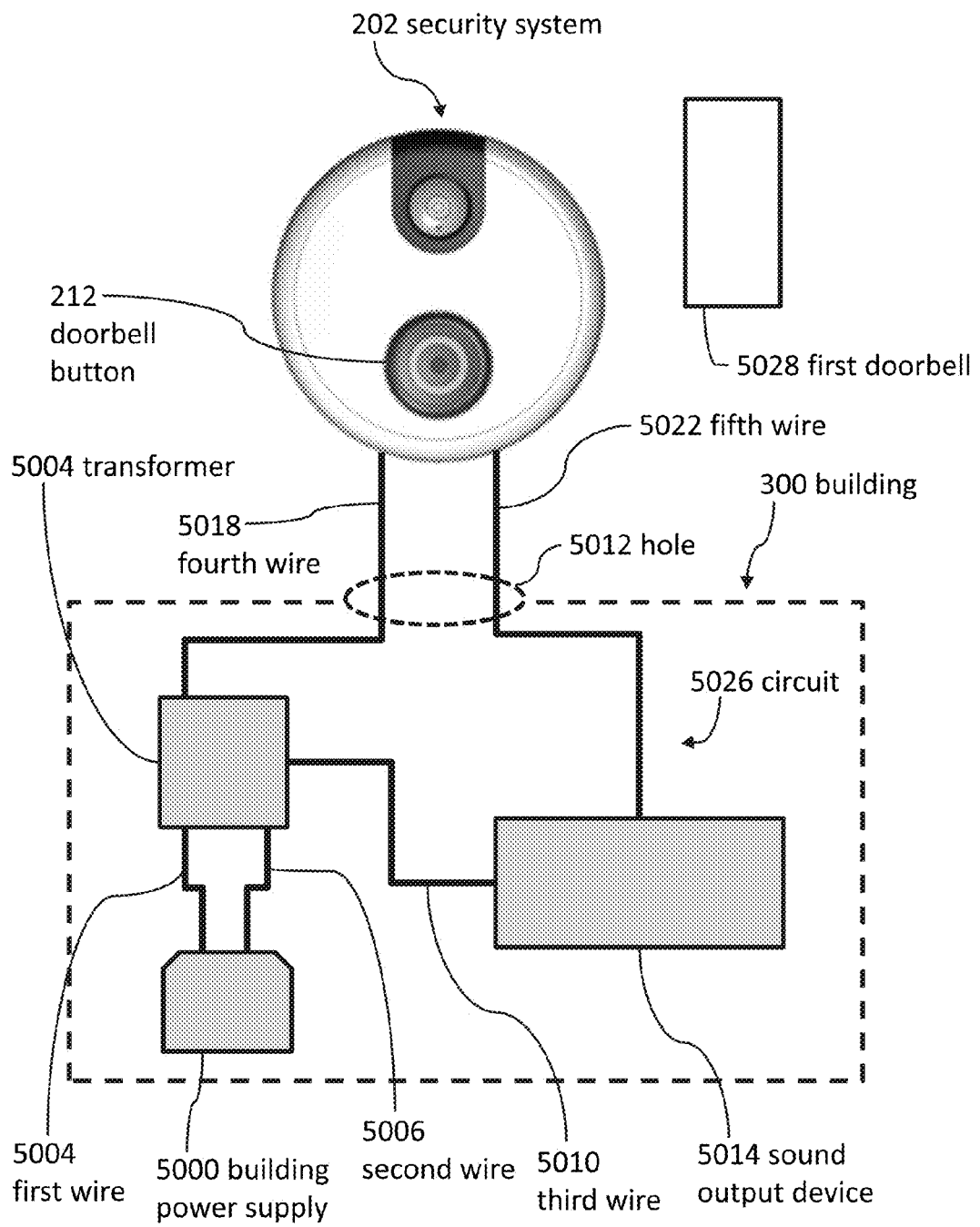
FIG. 47 illustrates a diagrammatic view of an electrical power configuration, according to some embodiments.

FIG. 47 illustrates a diagrammatic view of an electrical power configuration, according to some embodiments. The security system 202 can be located outside of a building 300 and/or coupled to a wall of the building 300. The building 300 can be a home, an office building, a government building, an enclosure, or any other type of structure configured to shelter people.

The building 300 can include a building power supply 5000, which can receive electrical power from a public utility. A transformer 5004 can be electrically coupled to the building power supply 5000 by a first wire 5004 and a second wire 5006. As used herein, "wire" can include electrical conductors such as metal cables and wires. The transformer 5004 can step down the electrical power (e.g., 120 volts AC, 240 volts AC) from the building power supply 5000 to a lower voltage (e.g., at least 10 volts and/or less than 20 volts, at least 7 volts and/or less than 25 volts).

A third wire 5010 can electrically couple the transformer 5004 to a sound output device 5014, which can be a chime, a speaker, a bell, or another device suitable to emit a sound inside of the building 300. A fourth wire 5018 can electrically couple the transformer 5004 to the security system 202 (e.g., the doorbell). A fifth wire 5022 can electrically couple the security system 202 to the sound output device 5014. As a result of this configuration, the security system 202 can control the flow of electricity to the sound output device 5014. In many embodiments, the sound output device 5014 is configured such that it cannot emit sound without a trigger power above a triggering threshold. The trigger power comes from the building power supply 5000 and flows into the transformer 5004 (via wires 5004, 5006). Thus, the transformer 5004 can supply the trigger power to a first circuit that comprises the fourth wire 5018, at least a portion of the security system 202, the fifth wire 5022, the sound output device 5014, and the third wire 5010. The fourth wire 5018 and the fifth wire 5022 can protrude from a hole 5012 in the outside of the building 300.

In some doorbell electrical power configurations, pressing a mechanical doorbell button (not shown) creates a closed electrical loop to energize a chime. In other words, the mechanical doorbell button can be a switch that is normally in an open position and is in a closed position when a person presses the button.

Some doorbell systems include a sound output device 5014 that includes a plunger configured to strike two flat metal bar resonators. The plunger can be operated by solenoids. Pressing the mechanical doorbell button can cause the solenoid to force the plunger to hit a first resonator. If a spring is included, then the spring can cause the plunger to hit a second resonator (e.g., when the mechanical doorbell button is released). The plunger hitting a resonator can cause a sound (e.g., a "ding" sound) to be emitted from the sound output device 5014.

Some sound output devices include a first solenoid and a second solenoid. The first solenoid can be configured to hit both a first metal bar and a second metal bar (e.g., to make a "ding-dong" sound). The second solenoid can be configured to hit the first metal bar, but not the second metal bar (e.g., to make a "ding" sound). In some cases, a first doorbell (e.g., a front doorbell) activates the first solenoid (e.g., to make a "ding-dong" sound) and a second doorbell (e.g., a back doorbell) activates the second solenoid (e.g., to make a "ding" sound). This approach can enable a user to distinguish between the front doorbell's sound and the back doorbell's sound (as emitted from a sound output device).

While pressing a mechanical doorbell button can close an electrical circuit to energize a chime and thereby cause a chime to emit a sound to notify a person inside of a building, the security system 202 can be configured (in some embodiments) such that pressing the doorbell button 212 does not mechanically close an electrical circuit to cause a chime to emit a sound. In several embodiments, the doorbell button 212 is not a switch that electrically couples the fourth wire 5018 to the fifth wire 5022. Instead, the fourth wire 5018 and the fifth wire 5022 can be electrically coupled to a printed circuit board ("PCB") 516 (shown in FIG. 11). The other items in FIG. 11 (e.g., 458, 524, 500, 504, 508, 510, 512, 462, 484, 494, 488, 480, 492, 208) can receive electrical power from the PCB 516.

In some embodiments, the doorbell button 212 is a press sensor (rather than the doorbell button 212 being physically coupled to a mechanical switch that can electrically close a circuit between the transformer 5004 and the sound output device 5014). The sensor can detect when a visitor presses the doorbell button 212. This "press detection" is used by software of the security system 202 or of the communication system 200 (shown in FIG. 1) to help determine whether to emit sound from the sound output device 5014 and/or whether to notify the user via a computing device (e.g., 204 in FIG. 1) based on additional parameters such as a profile and/or user settings.

Referring now to FIGS. 11 and 47, in some embodiments, the security system 202 (e.g., the PCB 516 and electrical components coupled to the PCB 516) is configured to allow alternating current ("AC") power to flow from the security system 202, to the sound output device 5014, and/or to the transformer 5004. In several embodiments, the security system 202 is configured to provide direct current ("DC") power to at least portions of the PCB 516. In some embodiments, the security system 202 is configured to provide AC power to the sound output device 5014 while providing DC power to at least portions of the PCB 516.

In several embodiments, electrical power for the sound output device 5014 and/or electrical power for the PCB 516 are routed through the security system 202 and/or through the PCB 516. Electrical power from the fourth wire 5018 can be routed through the security system 202 and/or through the PCB 516 prior to reaching the fifth wire 5022. Electrical power from the fifth wire 5022 can be routed through the security system 202 and/or through the PCB 516 prior to reaching the fourth wire 5018. Thus, electrical power for the sound output device 5014 (e.g., chime) does not need to bypass the security system 202.

In some embodiments, the security system 202 includes a Non-energizing Mode in which the security system 202 provides DC power to at least portions of the PCB 516 while draining power to the sound output device 5014, wherein the power to the sound output device is below a triggering threshold. The triggering threshold is the amount of electrical power (e.g., volts, current) necessary to cause the sound output device 5014 to emit a notification sound (e.g., a sound configured to notify a person inside of the building 300 that someone is at the door). In several embodiments, the security system 202 includes an Energizing Mode in which the security system 202 provides AC power to the sound output device above the triggering threshold. In some embodiments of the Energizing Mode, the security system 202 provides DC power to at least portions of the PCB 516.

In some embodiments of the Non-energizing Mode, the security system 202 provides less than 30%, less than 20%, less than 10%, at least 3%, at least 1%, and/or at least 0.1% of the power from the transformer 5004 to the sound output device 5014. In some embodiments of Energizing Mode, the security system 202 provides at least 70%, at least 80%, at least 90%, or at least 95% of the power from the transformer 5004 to the sound output device 5014. In several embodiments, the security system 202 charges the battery 462 during Non-energizing Mode and does not charge the battery 462 during Energizing Mode.

In some embodiments, the security system 202 includes a rectifier 524 to convert AC to DC. The rectifier 524 can comprise vacuum tube diodes, mercury-arc valves, copper and selenium oxide rectifiers, semiconductor diodes, silicone-controlled rectifiers, and/or silicone-based semiconductor switches.

Methods for using a doorbell system can include obtaining a doorbell (e.g., security system 202) that comprises a speaker, a microphone, a camera, and an outer housing; and connecting the doorbell electrically to an electrical power supply 5000 of a building 300. The electrical power supply can be provided by a utility company. In some embodiments, the electrical power supply is a transformer 5004 that is electrically connected to a building's electricity that is provided by a utility company.

In some embodiments, the doorbell can be connected electrically to a sound output device 5014 (e.g., a digital chime, a mechanical chime, a speaker) that is located remotely relative to the doorbell. For example, the doorbell can be coupled to an outside wall of a building and the sound output device can be coupled to an inside wall of the building. The building can couple the sound output device to the doorbell while the sound output device is located remotely relative to the doorbell. The doorbell can be connected communicatively to a remote computing device to enable the doorbell to communicate (e.g., wirelessly) with the remote computing device.

Methods can include receiving a first current into the doorbell (e.g., through the fourth wire 5018) from the power supply 5000 of the building 300 and using the first current to provide at least a first portion of a first electrical energy to the camera 208 and to the microphone 452 (shown in FIG. 9). Providing the first current can enable the camera and microphone to have electricity to operate.

Some methods include using the doorbell to close an electrical circuit 5026 that comprises the sound output device 5014 such that the first current flows through the sound output device 5014 and the first current provides a first electricity that is less than a triggering threshold of the sound output device 5014 such that the sound output device 5014 does not emit a notification sound in response to the first electricity.

Some embodiments comprise using the doorbell (e.g., security system 202) to detect a presence of a visitor while closing the electrical circuit 5026 such that first current provides the first electricity that is less than the triggering threshold. Then, in response to detecting the presence of the visitor, methods can include using the doorbell to close the electrical circuit 5026 to supply a second electricity to the sound output device 5014. The second electricity can be greater than the triggering threshold of the sound output device 5014 such that the sound output device emits the notification sound in response to the second electricity. Embodiments can also include sending a wireless notification to the remote computing device 204 (shown in FIG. 1) regarding the presence of the visitor (e.g., in response to the second electricity or in response to simply detecting the visitor).

In several embodiments, the electrical circuit 5026 comprises the doorbell (e.g., 202), the sound output device 5014, and a transformer 5004 (which can have an alternating current or direct current output). The transformer 5004 can electrically couple the electrical circuit 5026 to the power supply 5000 of the building 300 such that the transformer 5004 is configured to provide electrical power from the power supply 5000 to the electrical circuit 5026. The transformer 5004 can comprise an electrical output having a direct current. Receiving the first current into the doorbell (e.g., 202) from the power supply 5000 of the building 300 can comprise receiving the direct current from the transformer 5004.

Electrically connecting a doorbell to an electrical power supply can include indirectly electrically connecting the doorbell to the power supply (e.g., using the transformer 5004 to electrically couple the doorbell 202 to the power supply 5000). A wire can be electrically connected when the wire is connected such that it could conduct electricity if there was a complete circuit. A doorbell can be electrically connected to a wire if the doorbell is conductively coupled to the wire (even if a complete circuit is not present to enable an electrical current).

In several embodiments, the electrical circuit comprises the doorbell, the sound output device, and a transformer. The transformer can electrically couple the electrical circuit to the power supply of the building such that the transformer is configured to provide electrical power from the power supply to the electrical circuit. The transformer can comprise an electrical output having an alternating current. Receiving the first current into the doorbell from the power supply of the building can comprise receiving the alternating current from the transformer. Method can further comprise converting at least a second portion of the alternating current into a direct current. The converting can occur within the outer housing of the doorbell.

In some embodiments, the power supply 5000 provides the second electricity to the electrical circuit. The doorbell can be configured to control whether the doorbell system provides the first electricity or the second electricity to the sound output device.

Several embodiments include initiating a transmission of the wireless notification (e.g., 230 in FIG. 1) to the remote computing device regarding the presence of the visitor while using the doorbell to supply the second electricity to the sound output device. Then, after initiating the transmission of the wireless notification to the remote computing device, methods can include terminating the supply of the second electricity to the sound output device and using the doorbell to close the electrical circuit to provide a third electricity to the sound output device. The third electricity can be less than the triggering threshold of the sound output device such that the sound output device does not emit the notification sound in response to the third electricity.

Some embodiments comprise using the doorbell to supply the third electricity to the sound output device while continuing to transmit the wireless notification to the remote computing device.

Several embodiments comprise terminating the supply of the second electricity to the sound output device and using the doorbell to close the electrical circuit to provide a third electricity to the sound output device. The third electricity can be less than the triggering threshold of the sound output device such that the sound output device does not emit the notification sound in response to the third electricity. Embodiments can include initiating a transmission of the wireless notification from the doorbell to the remote computing after terminating the supply of the second electricity to the sound output device.

Some embodiments include using the doorbell to detect the presence of the visitor while closing the electrical circuit comprises using a motion sensor (e.g., motion detector 218 shown in FIG. 1) to detect the presence of the visitor. Methods can also include using the first current to provide at least a second portion of the first electrical energy to the motion sensor. The second portion of the first electrical energy can be greater than an operational threshold of the motion sensor such that the second portion of first electrical energy is capable of providing sufficient electrical power for the doorbell to operate the motion sensor while the first current provides the first electricity that is less than the triggering threshold of the sound output device. An operational threshold is an electrical threshold that represents the minimum electricity necessary to operate an item. The motion sensor can be replaced with a proximity sensor 500 (shown in FIG. 11) configured to detect whether a visitor is located near the doorbell. The proximity sensor can be a laser or infrared proximity sensor. The proximity sensor can also be the doorbell button 212 (that rings the chime) as shown in FIG. 6.

In several embodiments, using the doorbell to detect the presence of the visitor while closing the electrical circuit comprises using image analysis to detect the presence of the visitor. Methods can further comprise using the first current to provide at least a second portion of the first electrical energy to an image analysis system 520 (shown in FIG. 11). The second portion of the first electrical energy can be greater than an operational threshold of the image analysis system such that the second portion of first electrical energy is capable of providing sufficient electrical power for the doorbell to operate the image analysis system while the first current provides the first electricity that is less than the triggering threshold of the sound output device.

U.S. patent application Ser. No. 14/463,548, filed Aug. 19, 2014, describes various image analysis systems and methods. U.S. patent application Ser. No. 14/463,548 is incorporated by reference herein.

In some embodiments, the first current is configured such that the first portion of the first electrical energy is greater than an operational threshold of the camera while the first current is configured such that the first current provides the first electricity that is less than the triggering threshold of the sound output device.

In several embodiments, the first current is configured such that the first portion of the first electrical energy is less than an operational threshold of the camera while the first current is configured such that the first current provides the first electricity that is less than the triggering threshold of the sound output device, the method further comprising using the first portion of the first electrical energy to charge a battery located inside of the outer housing of the doorbell, and then discharging at least an electrical portion of the battery to provide a second electrical energy that is greater than the operational threshold to the camera.

In some embodiments, the doorbell comprises a wireless communication system configured to enable sending the wireless notification from the doorbell to the remote computing device. Embodiments can include using the first current to provide at least a second portion of the first electrical energy to the wireless communication system, wherein the first current is configured such that the second portion of the first electrical energy is less than an operational threshold of the wireless communication system while the first current is configured such that the first current provides the first electricity that is less than the triggering threshold of the sound output device. Methods can also include using the second portion of the first electrical energy to charge a battery located inside of the outer housing of the doorbell, and then discharging at least an electrical portion of the battery to provide a second electrical energy that is greater than the operational threshold to the wireless communication system. Then, embodiments can include using the wireless communication system to send the wireless notification to the remote computing device using the second electrical energy.

FIG. 47 illustrates a first doorbell 5028 just after the first doorbell 5028 was disconnected from the fourth wire 5018 and the fifth wire 5022. The first doorbell 5028 was replaced with a second doorbell (e.g., security system 202).

Several embodiments include methods for replacing a first doorbell with a second doorbell. The first doorbell 5028 comprises a switch configured to close an electrical circuit 5026 having a transformer 5004 and a sound output device 5014 to enable the sound output device 5014 to emit a notification sound. Methods can include detaching the first doorbell from a first wire that is electrically connected to the transformer; detaching the first doorbell from a second wire that is electrically connected to the sound output device; and obtaining the second doorbell. The second doorbell can comprise a speaker, a microphone, a camera, and an outer housing. The speaker, the microphone, and the camera can be coupled to the outer housing.

Some embodiments include connecting the second doorbell electrically to the first wire that is electrically connected to the transformer, and connecting the second doorbell electrically to the second wire that is electrically connected to the sound output device. The second doorbell can be located remotely relative to the sound output device. For example, the second doorbell can be located on an outside wall of a building while the sound output device is located inside of the building.

Several embodiments include connecting the second doorbell communicatively to a remote computing device such that the second doorbell is configured to communicate with the remote computing device. Embodiments can include receiving a first current into the second doorbell from at least one of the first wire and the second wire; using the first current to provide a first electrical energy to at least a first portion of the second doorbell; and draining the first current to at least one of the first wire and the second wire.

Some embodiments include entering a first mode in response to connecting the second doorbell electrically to the first wire that is electrically connected to the transformer, and in response to connecting the second doorbell electrically to the second wire that is electrically connected to the sound output device. During the first mode, methods can comprise using the second doorbell to close the electrical circuit that includes the transformer and the sound output device such that the first current flows through the sound output device and the first current provides a first electricity that is less than a triggering threshold of the sound output device such that the sound output device does not emit a notification sound in response to the first electricity.

Several embodiments include entering a second mode in response to using the doorbell to detect a presence of a visitor. During the second mode, the methods can comprise using the doorbell to close the electrical circuit to supply a second electricity to the sound output device. The second electricity can be greater than the triggering threshold of the sound output device such that the sound output device emits the notification sound in response to the second electricity. The second mode can also include sending a wireless notification to the remote computing device regarding the presence of the visitor.

Figure 48:
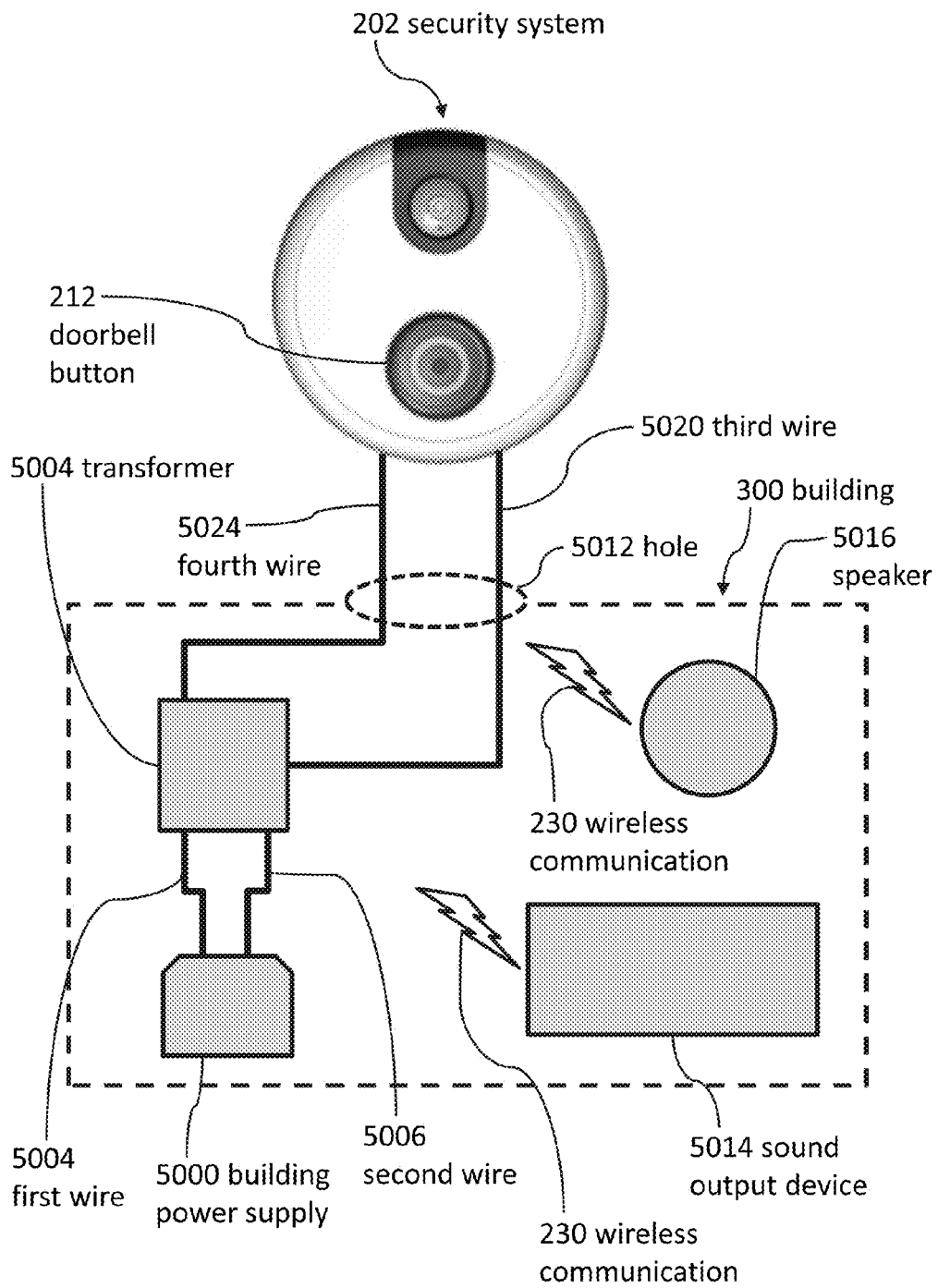
FIG. 48 illustrates a diagrammatic view of a security system configured to wirelessly communicate with a sound output device, according to some embodiments.

FIG. 48 illustrates a diagrammatic view of a security system configured to communicate wirelessly with a sound output device 5014 and/or a speaker 5016, according to some embodiments. A digital chime is one type of sound output device 5014. In some embodiments, chimes do not include solenoids configured to drive a plunger to hit a metal component to make a sound (e.g., a "ding" sound). In some embodiments, the sound output device 5014 is a speaker 5016 that can emit a digital sound such as a pre-recorded "ding" or any other sound (e.g., a song or prerecorded words).

In some embodiments, the security system 202 is connected electrically to a transformer 5004 (e.g., via a third wire 5020 and a fourth wire 5024) and/or is electrically connected to a building power supply 5000 (e.g., via a first wire 5004 and a second wire 5006). In several embodiments, the security system 202 can wirelessly communicate with the sound output device 5014 (e.g., a solenoid-based chime, a digital chime, a speaker) via any suitable means of wireless communication 230. Wireless communication 230 between the security system 202 (e.g., a doorbell) and the speaker 5016 can enable the system to emit notification sounds from the external speaker 5016, which can be located inside of the building 300 (although the speaker 5016 is external relative to the security system 202).

Inside Uses

Several embodiments can be used even in areas that are not entryways or near doors. For example, security systems (e.g., 202 in FIG. 1) can be mounted on a stand, on an interior wall, on a wheelchair, by a bed, or on another suitable object to enable a person (e.g., the visitor) to send a communication request (e.g., a notification) to a remote user. For example, an elderly person or a bedridden person can press the button 212 (shown in FIG. 1) to communicate with a user who can see and hear the elderly person or bedridden person. Some security system embodiments include a screen 907 (shown in FIG. 24) that can enable the elderly person or bedridden person to see the user (e.g., an adult child or caregiver).

Figure 49:
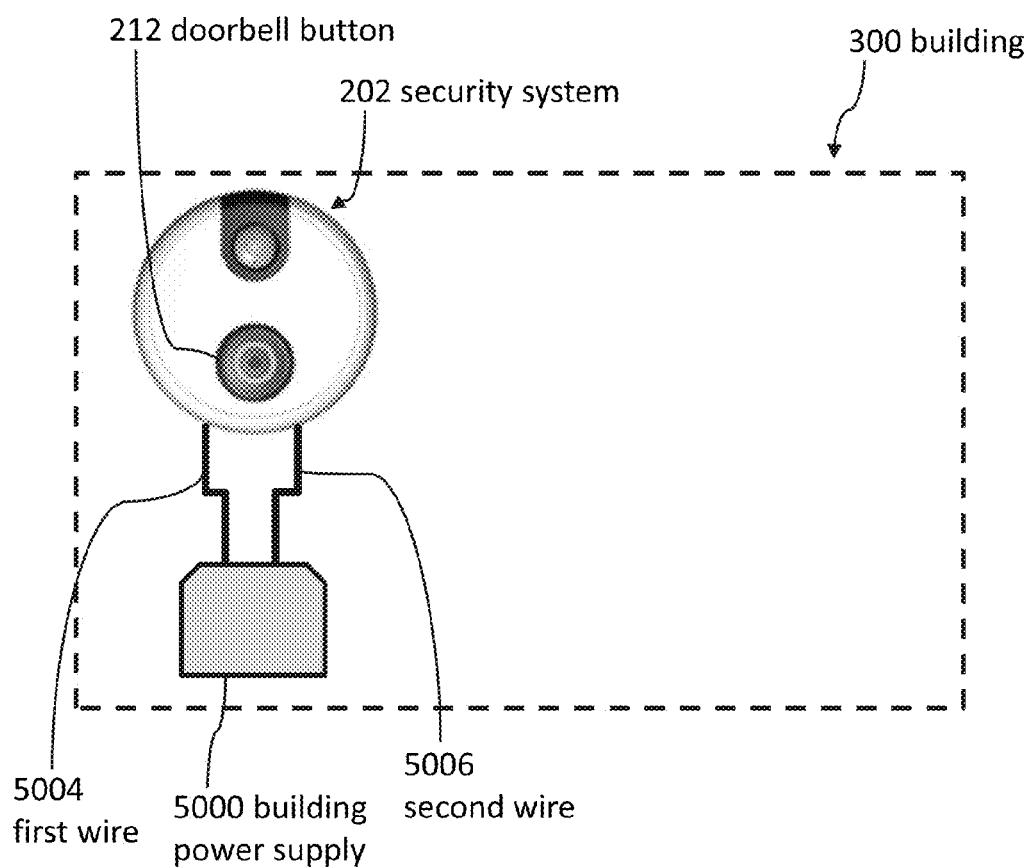
FIG. 49 illustrates a diagrammatic view of a security system located inside of a building, according to some embodiments.

FIG. 49 illustrates a diagrammatic view of a security system 202 located inside of a building 300, according to some embodiments. The security system 202 can be mounted on a stand, on an interior wall, or on another object suitable for holding the security system 202. In several embodiments, the security system 202 is not electrically connected to an external sound output device, although the security system 202 can emit sound from a speaker (e.g., speaker 488 shown in FIG. 11) coupled to the security system 202. In some embodiments, the speaker 488 is located inside of an outer housing 224 (shown in FIGS. 1 and 11).

A first wire 5004 and a second wire 5006 can electrically connect (e.g., couple) the security system 202 to a building power supply 5000 (e.g., an electrical outlet or an electrical panel). In some embodiments, the security system 202 is battery operated such that attaching the security system 202 to an external power supply (e.g., the building power supply 5000) is unnecessary. In several embodiments, the power supply 5000 provides more than 6 volts, less than 36 volts, less than 140 volts, and/or less than 260 volts. In some embodiments, electrical power from a building must be changed (e.g., different voltage, different current) prior to providing the electrical power to the security system 202 (e.g., a doorbell).

Communication Control

Referring now to FIGS. 1 and 11, in several embodiments, the user (e.g., of the computing device 204) has superior communication rights than the visitor talking into the security system 202. Sometimes, the user and the visitor might attempt to talk at the same time. This situation can lead to ineffective communication. In addition, if the microphone 484 is capturing (e.g., recording, sensing) sound while the speaker 488 is emitting sound from the user of the computing device 204, then the communication system 200 could suffer from audio feedback (e.g., the user's voice emitted by the speaker 488 could be captured by the microphone 484 and emitted by the computing device 204). At least some of these complications can be solved by various communication control embodiments.

In some embodiments, the computing device 204 has superior communication rights relative to the security system 202. As a result, if the speaker 488 is emitting sound, then the microphone 488 can be disabled. In several embodiment, the microphone 488 is disabled (e.g., prevented from capturing sound or being used to transmit sound to the computing device 204) a first period of time before the speaker 488 emits sound, while the speaker 488 emits sound, and/or a second period of time after the speaker 488 emits sound. The first period and/or the second period can be at least one nanosecond, at least one millisecond, at least 50 milliseconds, and/or less than one second.

Referring now to FIG. 3, in some embodiments, multiple devices (e.g., 204, 306) are used to communicate with a visitor via at least one security system 202. Some methods include assigning superior communication rights to some devices (e.g., 204, 306) relative to other devices (e.g., 204, 306).

Pool Monitoring

Drowning is the second-leading cause of injury-related death for children under 14 years old. Traditional pool monitoring devices rely on detecting when a person enters the water. People can drown in less than two minutes. As a result, sending a notification to a remote computing device when a person enters the water can leave insufficient time for the user of the remote computing device to save the drowning person. Various embodiments described herein address at least some of these shortcomings of traditional pool monitoring devices.

Figure 50:
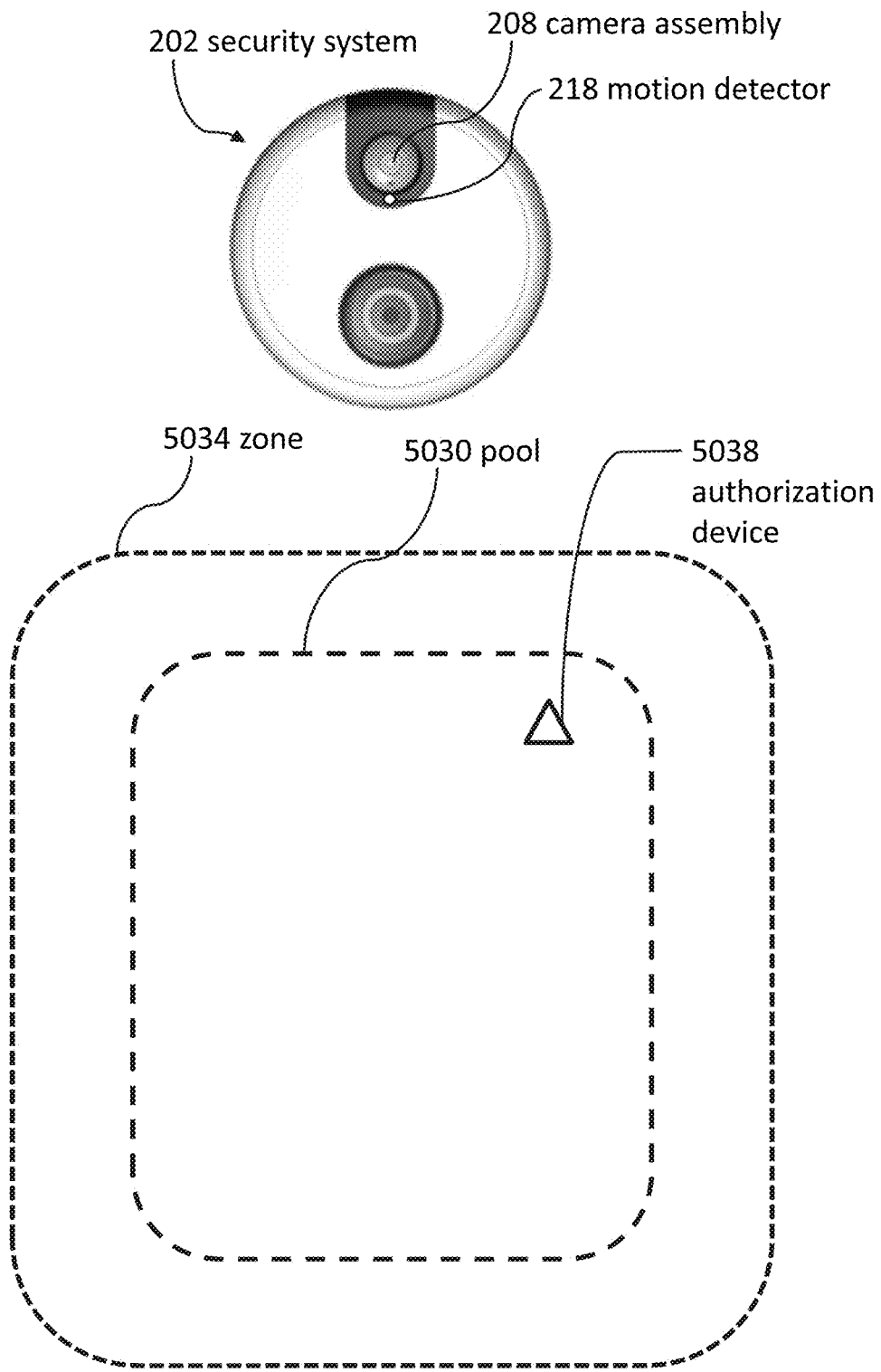
FIG. 50 illustrates a diagrammatic view of a security system used to monitor a pool area, according to some embodiments.

FIG. 50 illustrates a diagrammatic view of a security system 202 being used to monitor a pool area, according to some embodiments. The motion detector 218 can be configured to determine whether a person is located in the pool 5030 even when the security system 202 is located outside of the pool 5030. In some embodiments, the security system 202 is placed at least three feet and/or less than fifty feet from the pool 5030.

The security system 202 can take a picture 208 with the camera assembly 208 in response to detecting motion (e.g., via the motion detector 218). The security system 202 (or another portion of the communication system 200 illustrated in FIG. 1) can analyze the picture to determine if the motion was caused by an adult or by a child (e.g., by a person under a predetermined height threshold). In some cases, the height threshold can be 5 feet, 4.5 feet, 3.5 feet, or 3 feet.

The camera assembly 208 can be configured to visually identify people through machine vision and/or image recognition. For example, the camera assembly 208 can take an image of the person located near the pool 5030. Software run by any portion of the system can then analyze select features of the person from the image. The software can use scaling to estimate the height of the person (e.g., based on previous calibration procedures and information).

In some embodiments, if the motion was caused by an adult and/or by a person taller than the height threshold, then the system will not send a notification (e.g., alarm) to the remote computing device and/or will not emit an alert sound from the speaker 488 (shown in FIG. 11) of the security system 202. In some embodiments, if the motion was caused by a child and/or by a person shorter than the height threshold, then the system will send a notification to the remote computing device and/or will emit an alert from the speaker of the security system 202.

Although the security system 202 can be configured to detect if a person falls into the pool 5030, the security system 202 can also be configured to detect whether a person is located within a zone 5034 that includes at least a portion of the pool 5030. In some embodiments, the zone 5034 includes all of the pool 5030 and/or an area around the perimeter of the pool 5030. The zone 5034 can define a danger zone. Once the security system 202 detects that a person is located in the zone 5034, the security system can enter a Standby Mode in which the security system 202 conducts at least one analysis to determine if the person might be in danger (e.g., if the person is shorter than the height threshold or if the person is authorized to be in the zone 5034 and/or in the pool 5030).

In some embodiments, the security system 202 will send a notification to a remote computing device and/or emit an alert sound from the speaker unless the detected person is wearing a device that indicates the person is authorized to be in the zone 5034 and/or in the pool 5030. The authorization device 5038 can be a bracelet or other object worn by the person. The authorization device 5038 can include a radio-frequency identification ("RFID") or Bluetooth communication device configured to provide data to the security system 202 (e.g., data regarding the authorization of the device to be located in the zone 5034 and/or pool 5030).

Several methods include using the security system 202 to detect whether a person is located in the zone 5034. Methods can include determining whether the person is authorized to be in the zone 5034. In some embodiments, methods include sending a notification to a remote computing device and/or emitting an alert sound from the speaker 488 (shown in FIG. 11) of the security system 202 if the person is located in the zone 5034 and/or not authorized to be in the zone 5034.

Advertising

In some embodiments, the communication system 200 (shown in FIG. 1) is used to deliver targeted ads based on the location of the user of the remote computing device. Referring now to FIGS. 1 and 2, some embodiments include tracking the location (e.g., GPS coordinates) of the computing device 204 and using the location to select advertisements (e.g., based on the location). For example, if the remote computing device 204 is located in a particular city, the system 200 can deliver ads for nearby restaurants and services. The advertisements 258 can be displayed on the user interface 240 (shown in FIG. 2). In some embodiments, the advertisements are shown near the bottom of the screen of the computing device. The advertisements can be sent through and/or controlled by the server 206 and/or a database.

In several embodiments, the advertisements 258 are selected based on at least one feature or characteristic of the visitor. For example, if the visitor is a vacuum salesperson, then the advertisement 258 can be related to vacuums. In some embodiments, the advertisements 258 offer to provide additional information regarding the visitor (e.g., background check information, identity information, visit history information, relationships to acquaintances of the user).

Statistics

Several embodiments include tracking, recording, and/or providing information regarding visitors and/or visits. This information can include statistics and other forms of data. Referring now to FIG. 1, some embodiments track, record, and/or provide the number of times a visitor has visited and/or been detected by a security system 202. Several embodiments track, record, and/or provide the number of times a visitor has pressed (e.g., "rung") the doorbell button 212, visited a particular location (e.g., the building to which the security system 202 is coupled), and/or communicated with a particular computing device 204. Some embodiments track, record, and/or provide the number of visitors and/or the number of visits to a particular area monitored by a security system 202.

Several embodiments include aggregating, combining, and/or comparing information regarding visitors and/or visits from at least two security systems 202 (and/or from at least two buildings). This aggregated and/or combined data can be analyzed by a third party (e.g., not a user of one of the security systems 202) to identify visit trends and/or to track individual visitors. For example, this data can be used to determine which neighborhoods receive the most visitors and/or visits. This data can also be used to track a particular visitor as the visitor moves from one building to another building or neighborhood. Aggregated and/or combined data regarding visitors can be searched and/or analyzed to determine if a particular individual has visited a particular area, neighborhood, or building.

Some embodiments include creating a log that records the date and time of opening and closing of a door. Referring now to FIG. 23, the door log 916 can include locking and unlocking data. Several embodiments include a log that records whether a door was unlocked by a physical key or via an automated system (e.g., a security system 202). The security system 202 can lock and unlock a door lock 930. Data regarding whether a physical key or an automated system unlocked a door can aid criminal investigations. The door log 916 can also include a picture of visitors who unlock a door and/or pass through a door. A camera assembly 208 (shown in FIG. 1) can take the picture. The door log 916 can also include the identity of the visitors.

Security

In some embodiments, security systems 202 (e.g., doorbells) are disabled if they are stolen. This approach can deter theft once potential thieves know stolen systems will not function properly (e.g., once disabled).

In several methods, the owner (e.g., a user) of a stolen security system 202 can contact a remote administrator (e.g., the manufacturer of the stolen security system). Based on the request of the owner, the remote administrator can disable the stolen security system 202 remotely (e.g., without physically touching the security system 202). The remote administrator can use wireless communication 230 and/or a server 206 to disable the stolen security system 202.

In some embodiments, the remote administrator, the owner, and/or the user can detect the location of the stolen security system 202. The remote administrator can tell the owner the location of the stolen security system 202. For example, if a person connects the stolen security system 202 to a communication network (e.g., the Internet), the administrator can locate the stolen security system 202.

In several embodiments, once a security system 202 is connected to a wireless network, the security system 202 cannot connect to another wireless network without being "unlocked." Thus, if the security system 202 is stolen, the security system 202 could be nearly worthless because the thief likely will not be able to connect the security system to another wireless network (e.g., the wireless network at the thief's home). In this context, "unlocked" means that the security system 202 is capable of connecting to another wireless network and capable of sending notification requests to a remote computing device 204 via the other network. Thus, in some embodiments, once a security system 202 is connected to a first wireless network, the security system 202 cannot be connected to another wireless network without being unlocked (e.g., from the first wireless network). Once the security system 202 is unlocked, then it can be connected to a second wireless network.

A remote administrator and/or the owner can unlock the security system 202 by, for example, entering a password and/or logging into a website configured for unlocking security systems 202.

Delivery Identification

Figure 53:
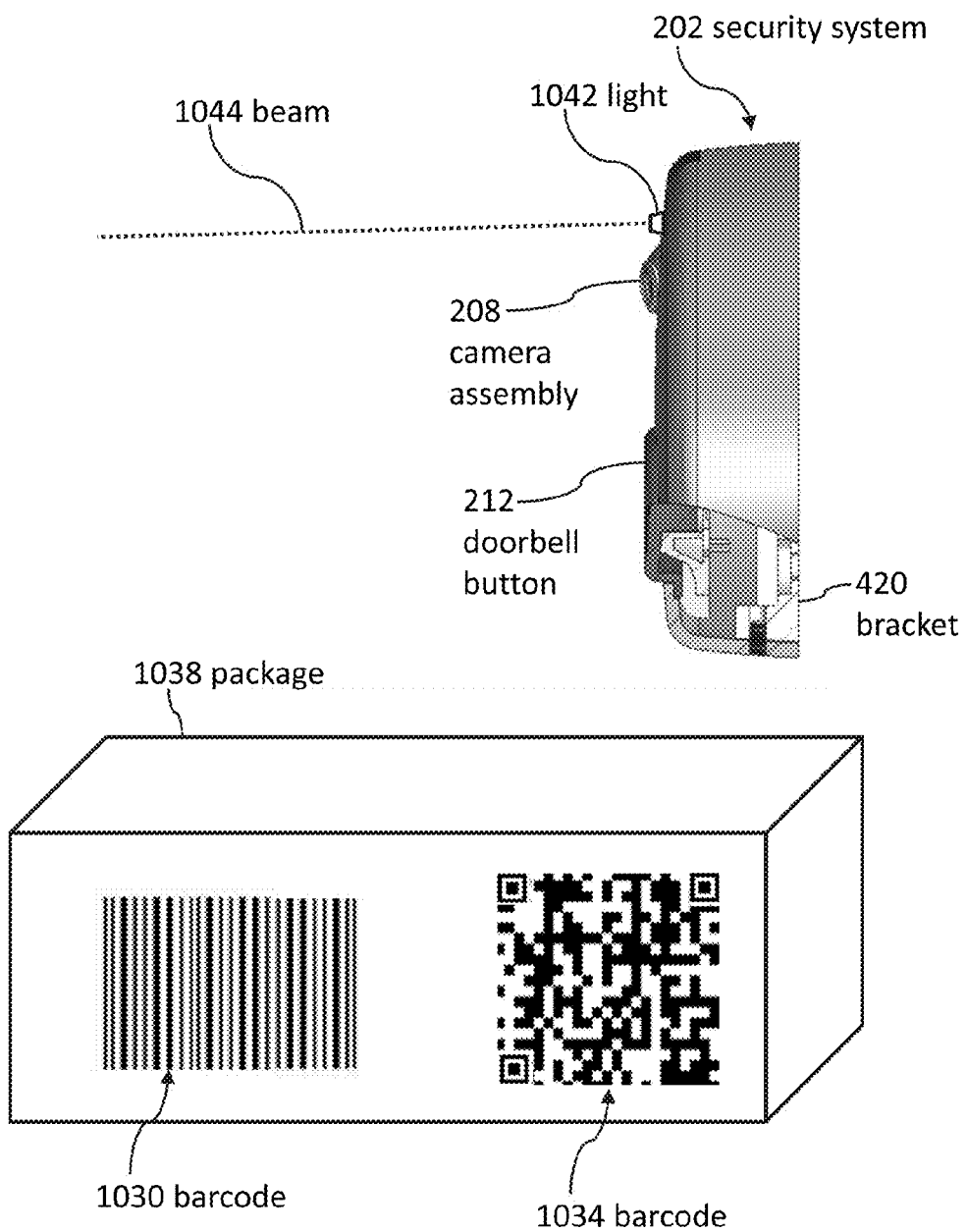
FIG. 53 illustrates scanning barcodes on a package to enable notifying a user regarding the delivery of the package, according to some embodiments.

FIG. 53 illustrates an embodiment of barcodes 1030, 1034 on a package 1038 being held up to a camera assembly 208 of a security system 202 to scan the barcodes 1030, 1034. In some embodiments, a doorbell is configured to identify a package by scanning a barcode. The package can be placed with 36 inches and/or within 20 inches of a camera of the doorbell to enable the doorbell to scan the barcode. "Barcode" is used in a broad sense herein and includes optical machine-readable representations of data regarding the object to which the barcode is attached. Barcodes can include many different geometric patterns and are not limited to straight lines. Barcodes can include Quick Response (QR) codes, Universal Product Codes (UPC), and many other machine-readable representations of data.

In some embodiments, once the security system 202 scans a barcode to enable identifying the package 1038, methods include sending a notification to a person associated with the package (such as the person to whom the package is addressed). The notification can include an email to the person, a text message, and/or an automated phone call. The notification can communicate that the package has arrived. The notification can also communicate the contents of the package. As used herein, "package" is used in a broad sense and can include letters and boxes delivered to a building.

Laser Identification

Referring now to FIG. 53, the security system 202 can include a light 1042, which can be a laser. The light 1042 can emit a beam of light 1044, which can be a laser beam. Some embodiments include using the laser beam to detect is a visitor is present near the security system 202. The security system 202 can be configured to detect whether a visitor is present based on whether the beam 1044 is broken (e.g., interrupted) by the visitor. In some embodiments, the security system 202 determines an average beam behavior and then identifies deviations from the average beam behavior as indications of a visitor. For example, if a beam 1044 typically travels 10 feet without being broken, but suddenly the beam only travels two feet without being broken, then the system can interpret the change in the beam signal as an indication of the presence of a visitor. Some security systems 202 are configured to detect light reflected back to the security system 202.

Answering Devices

Many types of computing devices can be used to receive notifications regarding the presence of a visitor and to communication with a visitor. For example, a car and glasses can be configured to receive alerts regarding the presence of a visitor.

Figure 54:
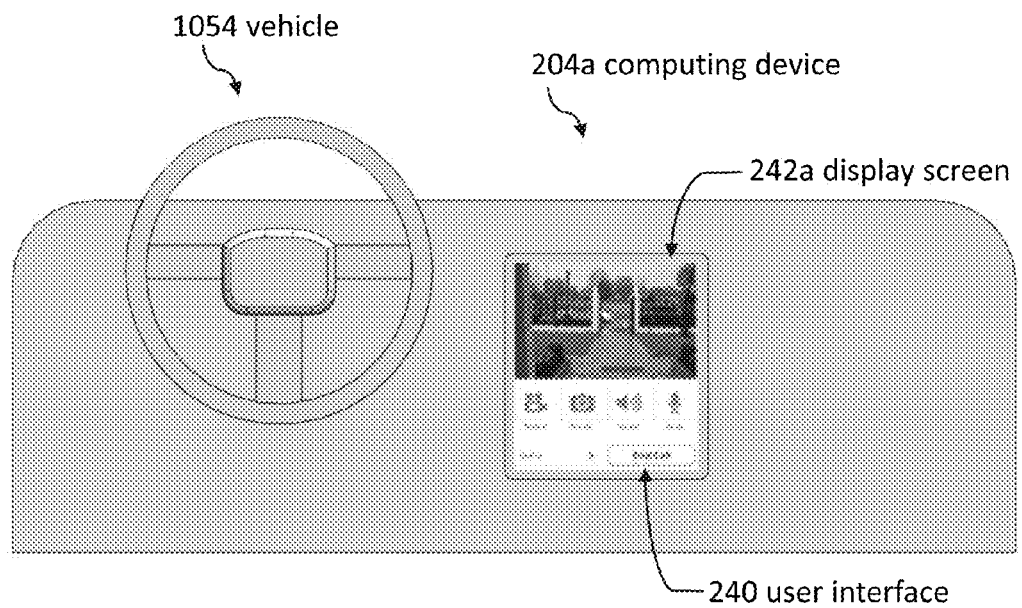
FIG. 54 illustrates a front view of a dashboard of a vehicle, according to some embodiments.

FIG. 54 illustrates a front view of a dashboard of a vehicle 1054 such as a car, truck, bus, airplane, or motorcycle. The vehicle includes a computing device 204a, which can include any of the features and perform any of the methods described herein in the context of other embodiments and computing devices 204. The computing device 204a can include a display screen 242a, which can be integrated into the dashboard of the vehicle 1054. Some embodiments include answering visitor alerts via vehicles 1054. A user interface 240 can enable users to control the computing device 204a.

In some embodiments, the display screen 242a is part of a television, which can be configured to receive alerts regarding the presence of visitors. The television can be configured to receive push notifications from a security system 202 (shown in FIG. 51). Televisions can be embodiments of computing devices 204 (shown in FIG. 51). Some embodiments include answering visitor alerts via televisions.

Figure 55:
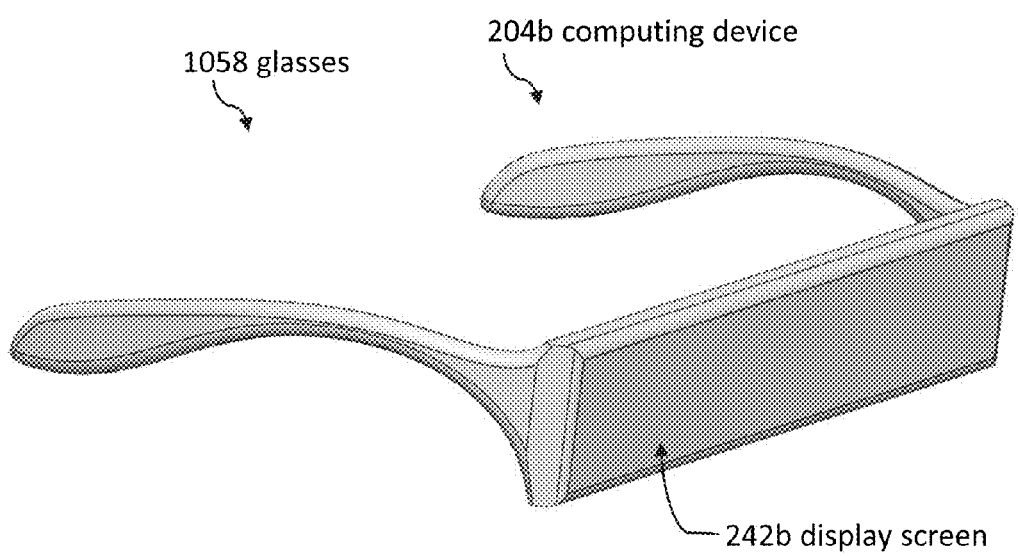
FIG. 55 illustrates a perspective view of glasses, according to some embodiments.

FIG. 55 illustrates a perspective view of glasses 1058, which can be virtual reality glasses, augmented reality glasses, and/or a Google Glass made by Google Inc. The glasses 1058 can include a display screen 242b. Glasses 1058 can be embodiments of a computing device 204b, which can include any of the features and perform any of the methods described herein in the context of other embodiments and computing devices 204.

Some embodiments include answering visitor alerts via glasses 1058. A user can control and interact with the glasses 1058 via voice commands. The glasses 1058 can include a speaker to allow the user to hear the visitor.

User Interfaces

FIGS. 57-60 illustrate front views of a display screen or portions thereof with graphical user interfaces. The graphical user interfaces can be displayed on the display screen 242 shown in FIG. 2. The graphical user interfaces can include any of the features described in the context of FIG. 2.

Figure 57:
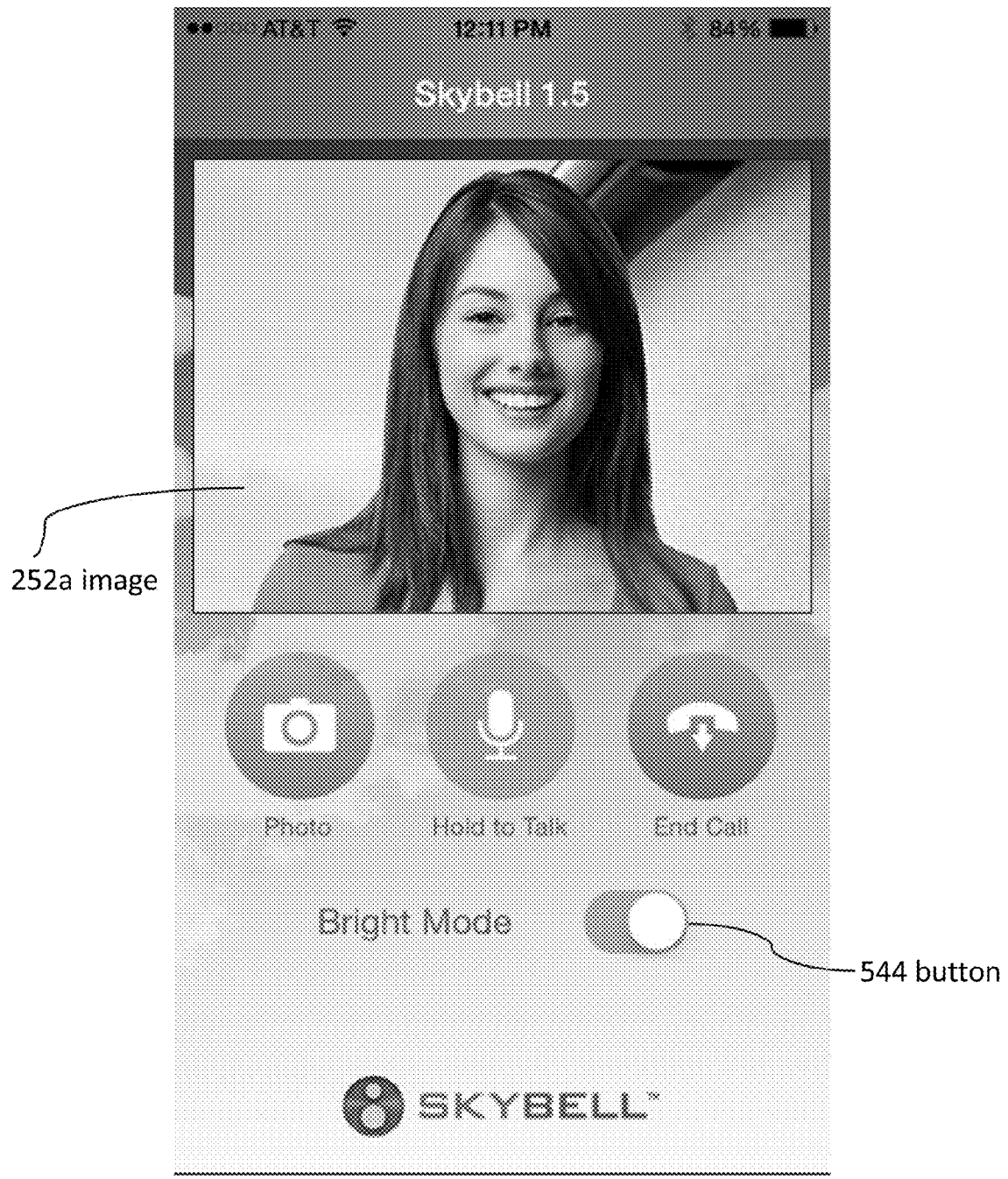
FIGS. 57-64 illustrate front views of a display screen or portions thereof with graphical user interfaces, according to some embodiments.
Figure 58:
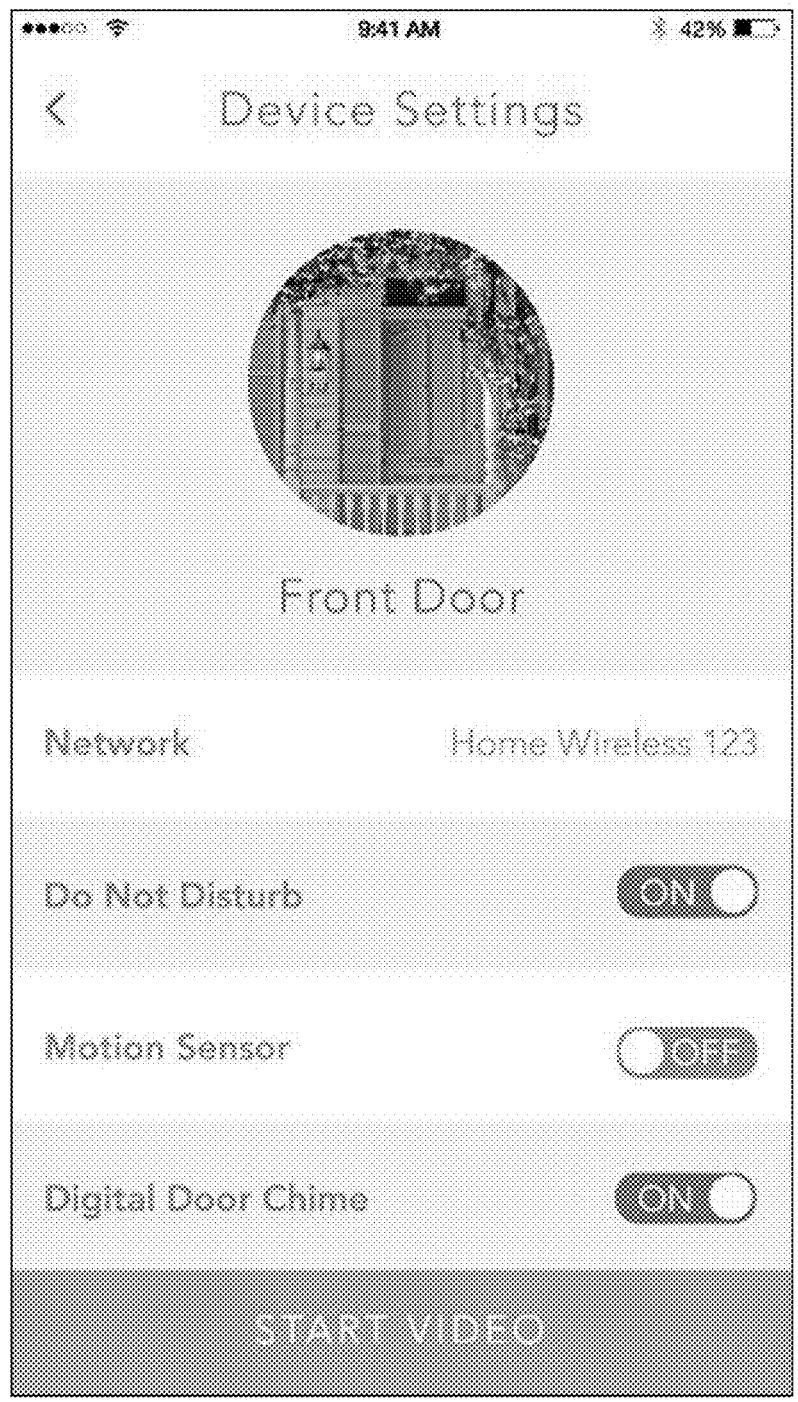
Figure 59:
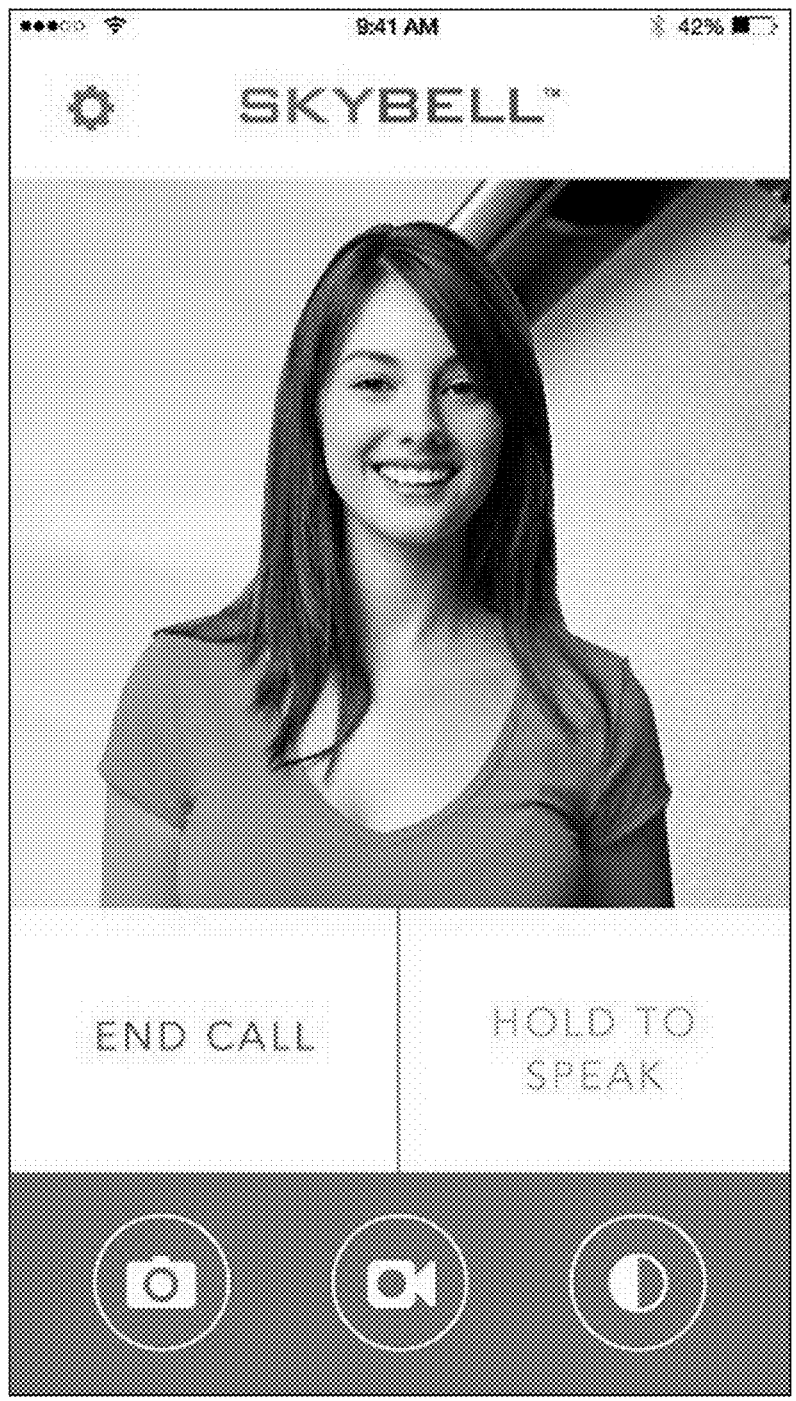
Figure 60:
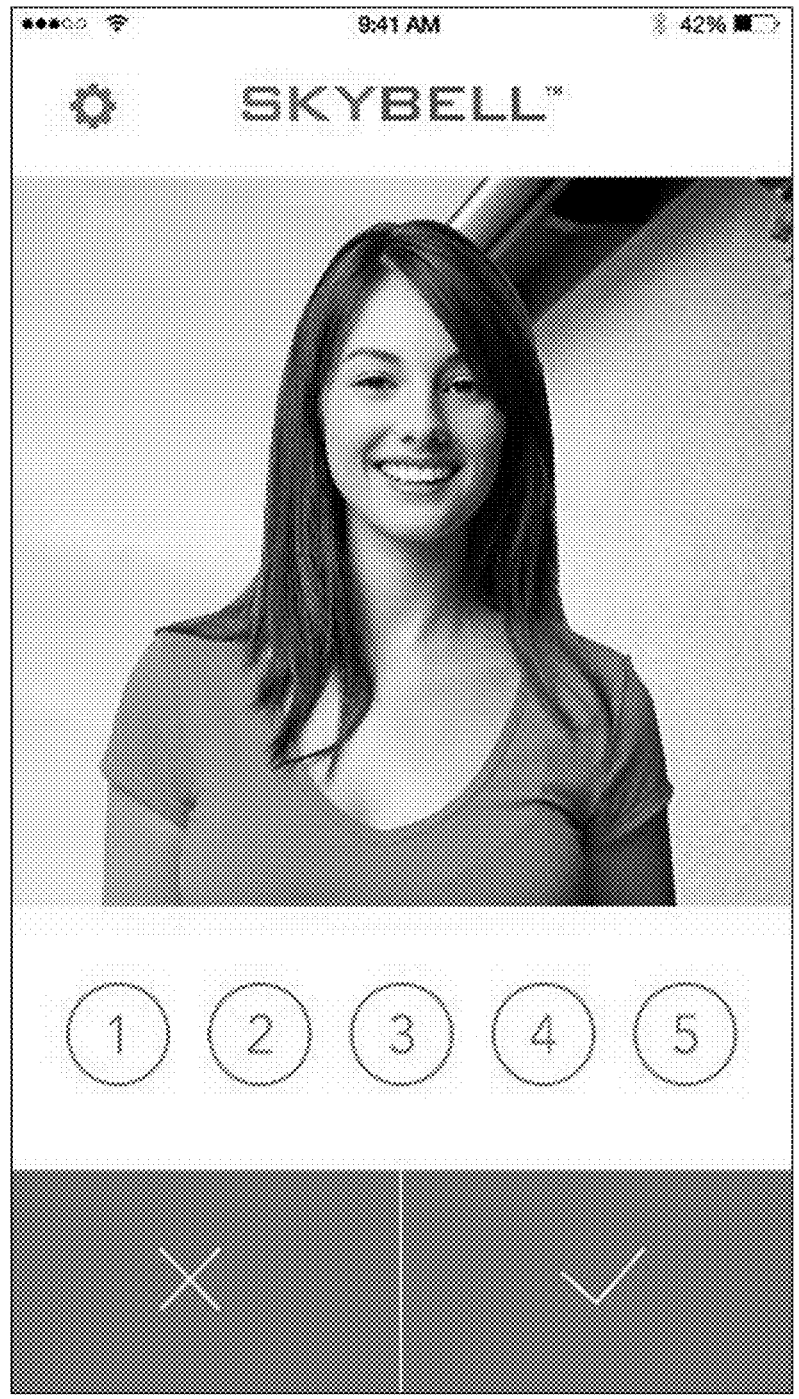
Figure 61:
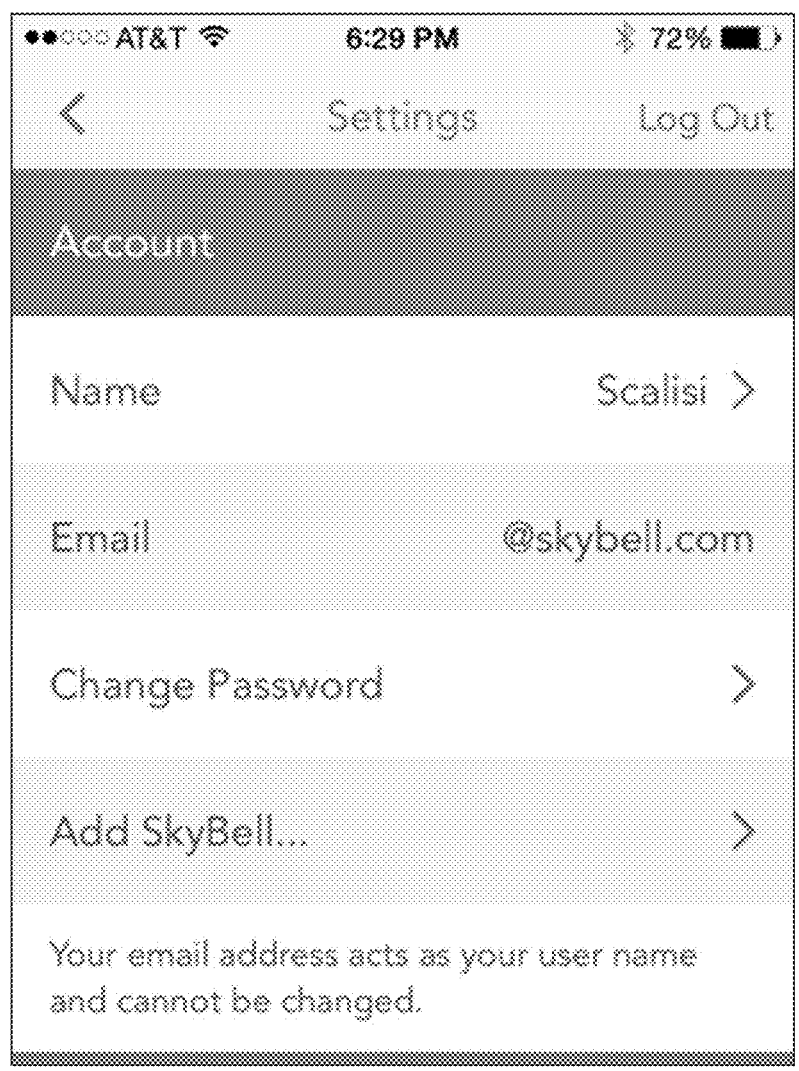

The graphical user interface shown in FIG. 57 includes a Bright Mode button 544. Touching the Bright Mode button on a display screen 242 (labeled in FIG. 2) can increase the brightness of the image 252a taken by the camera assembly 208 of the doorbell 202. Pressing the Bright Mode button 544 a second time can decrease the brightness of the image 252a.

Plug-In Embodiments

Figure 65:
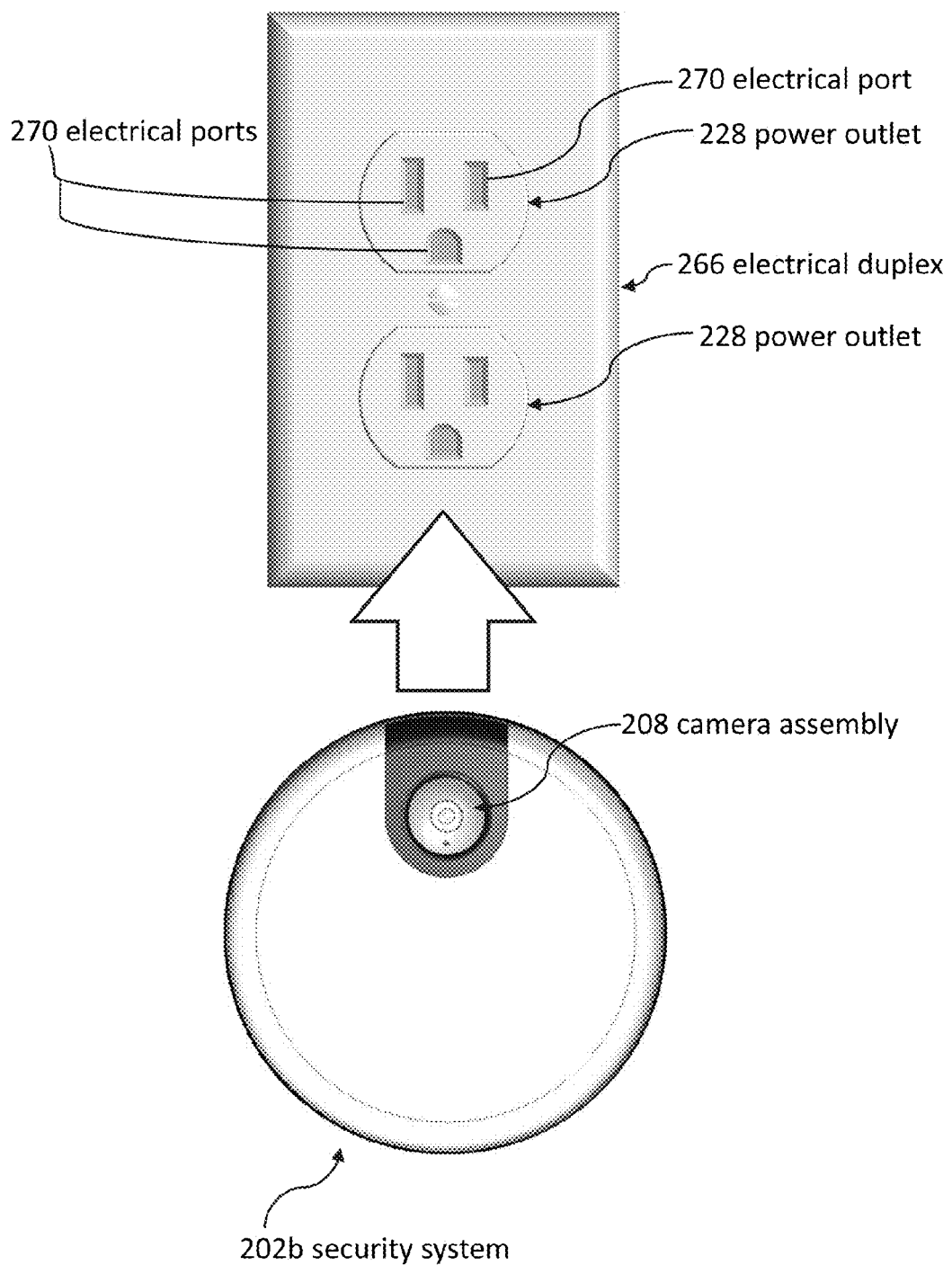
FIG. 65 illustrates a front view of the security system just before the security system is mounted to a power outlet, according to some embodiments.

FIG. 65 illustrates a front view of the security system 202b just before the security system 202b is mounted to a power outlet 228 by pressing electrical prongs 274 (shown in FIG. 67) that protrude from a backside 278 (shown in FIG. 67) of the security system 202b into electrical ports 270 of the power outlet 228. Each power outlet 228 includes at least two electrical ports 270 (not all of which are labeled to increase the clarity of the drawing).

Figure 66:
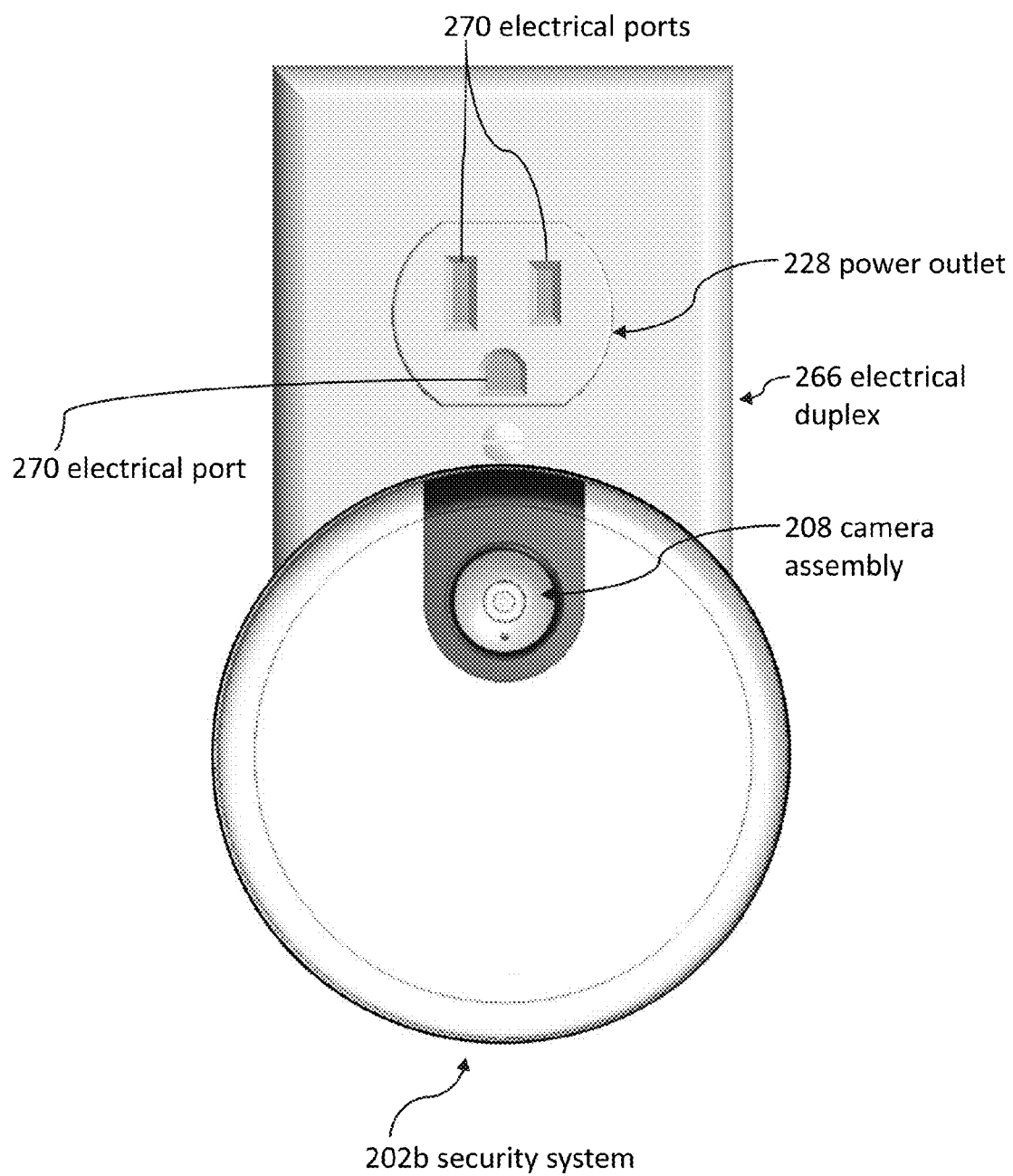
FIG. 66 illustrates a front view of the security system after the security system is mounted to a power outlet, according to some embodiments.

FIG. 66 illustrates a front view of the security system 202b after the security system 202b is mounted to a power outlet 228 by pressing electrical prongs that protrude from a backside of the security system 202b into electrical ports 270 of the power outlet 228.

Figure 67:
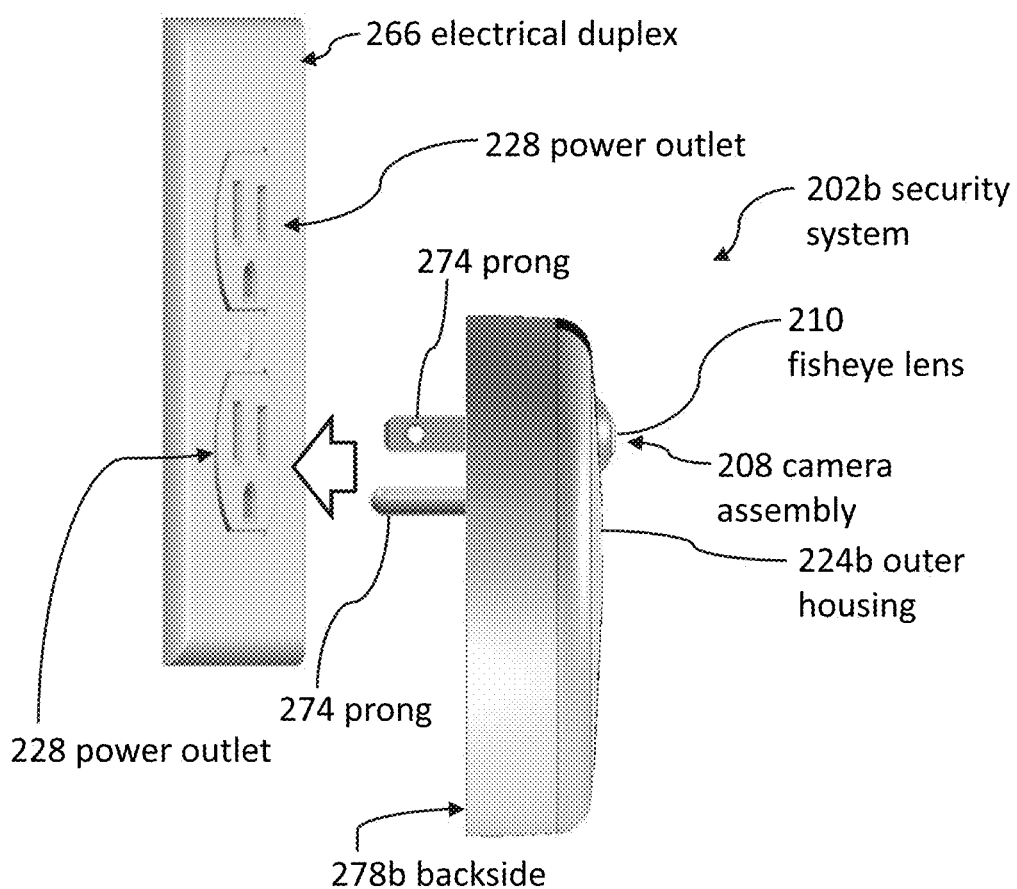
FIG. 67 illustrates a side perspective view of the security system just before the security system is mounted to a power outlet, according to some embodiments.

FIG. 67 illustrates a side perspective view of the security system 202b just before the security system 202b is mounted to a power outlet 228 by pressing electrical prongs 274 that protrude from a backside 278 of the security system 202b into electrical ports 270 of the power outlet 228.

A fisheye lens 210 can be configured to provide a 180-degree side-to-side view of the room in which the power outlet 228 is located. In some embodiments, the fisheye lens 210 provides a 360-degree view.

The security system 202b can include an outer housing 224b and a backside 278b. The backside 278b can face towards a power outlet 228 while the camera assembly 208 faces away from the power outlet 228.

The security system 202c illustrated in FIGS. 68-71 is also configured to plug into a power outlet 228 (shown in FIG. 65). The camera assembly 208c can include a high-resolution, wide-viewing-angle lens. A long-range motion detector 218c can protrude through the outer housing 224c.

All of the embodiments described in the context of other security systems (e.g., security system 202) described herein and/or described in applications and/or patents incorporated by reference can be applied to the security systems 202b, 202c shown in FIGS. 65-71.

The entire contents of the following patent application are incorporated by reference herein: U.S. Provisional Patent Application No. 62/016,863; filed Jun. 25, 2014; and entitled WALL PLUG CAMERAS.

Figure 79:
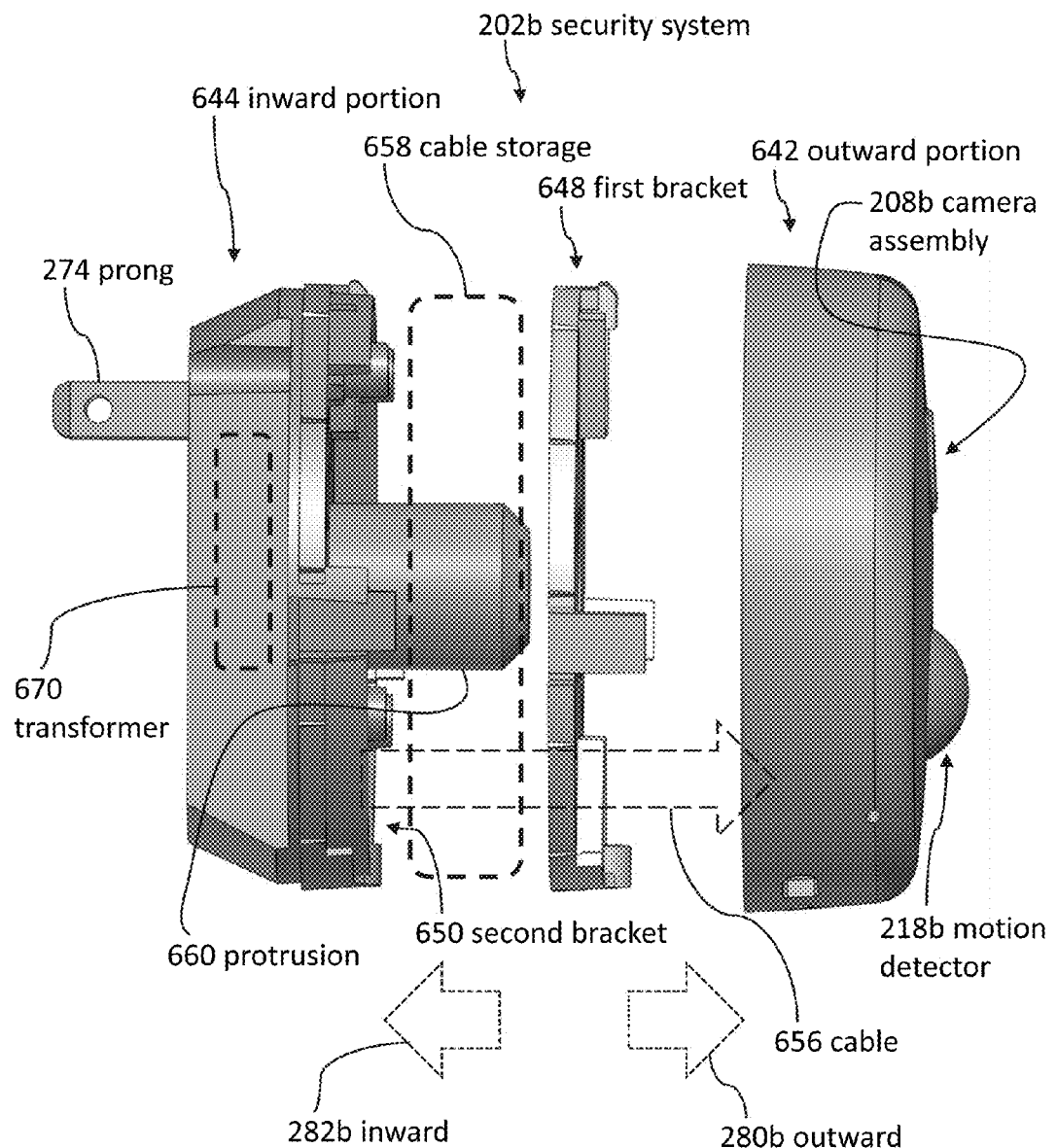
FIG. 79 illustrates a side view of a security system separated into multiple portions, according to some embodiments.
Figure 80:
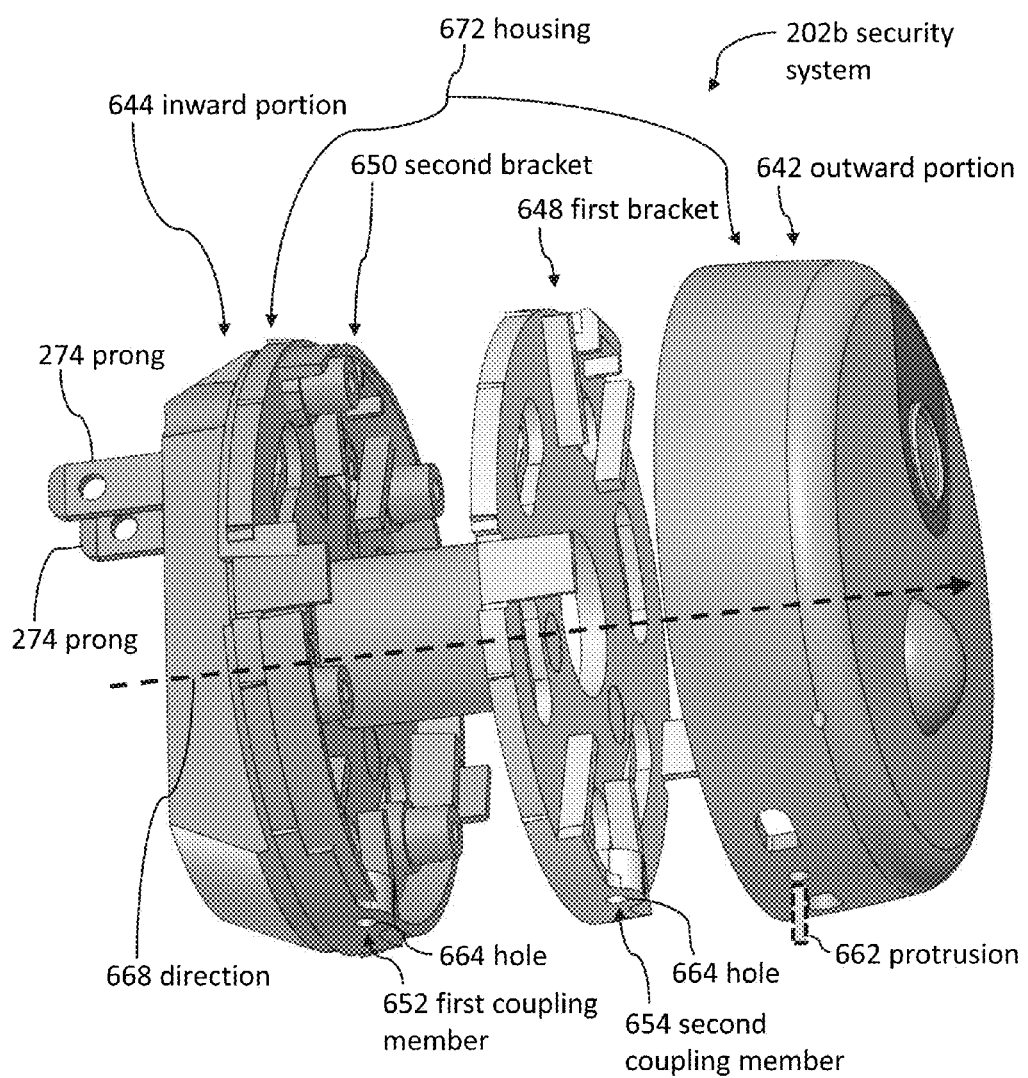
FIG. 80 illustrates a side, front, and bottom perspective view of a security system separated into multiple portions, according to some embodiments.
Figure 81:
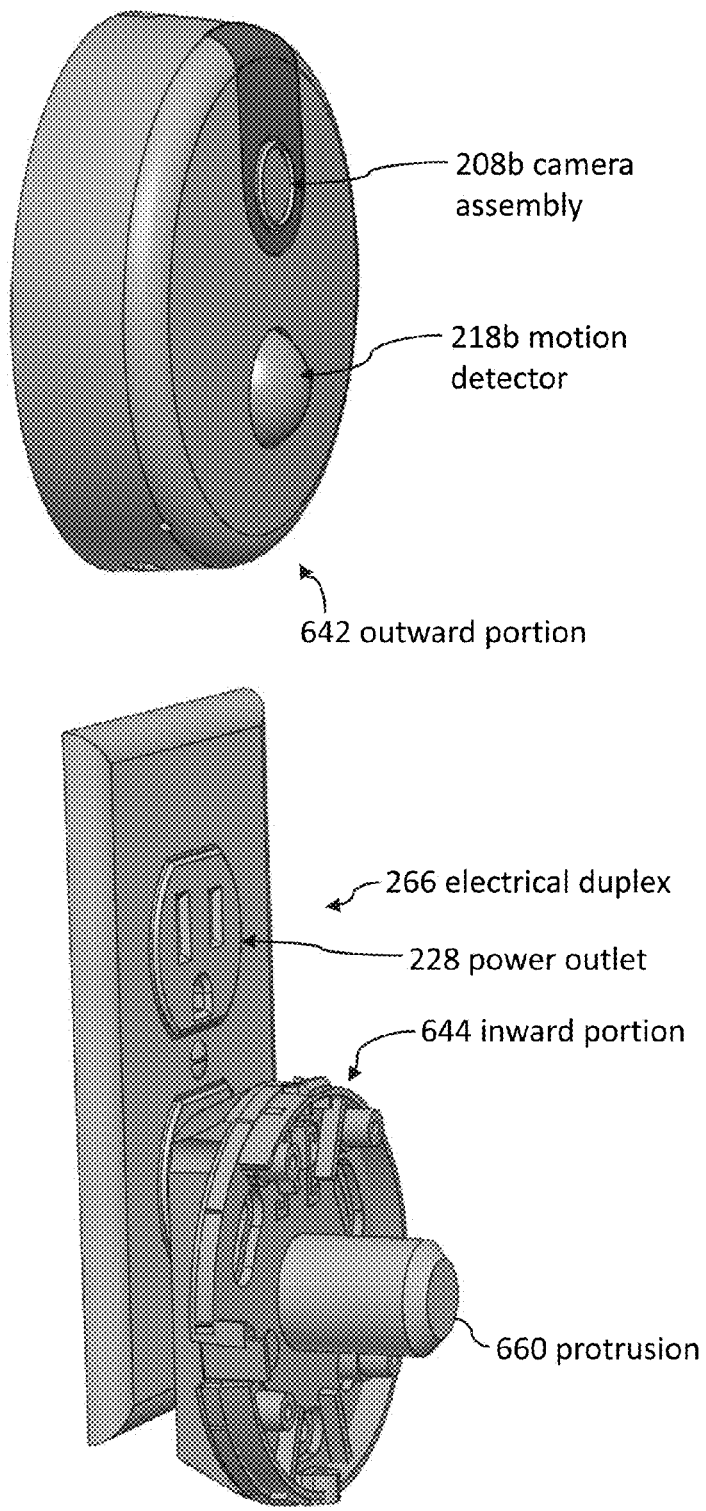
FIG. 81 illustrates a side and front perspective view in which an outwardly facing portion is mounted in a location away from a power outlet while an inwardly facing portion is attached to the power outlet, according to some embodiments.
Figure 82:
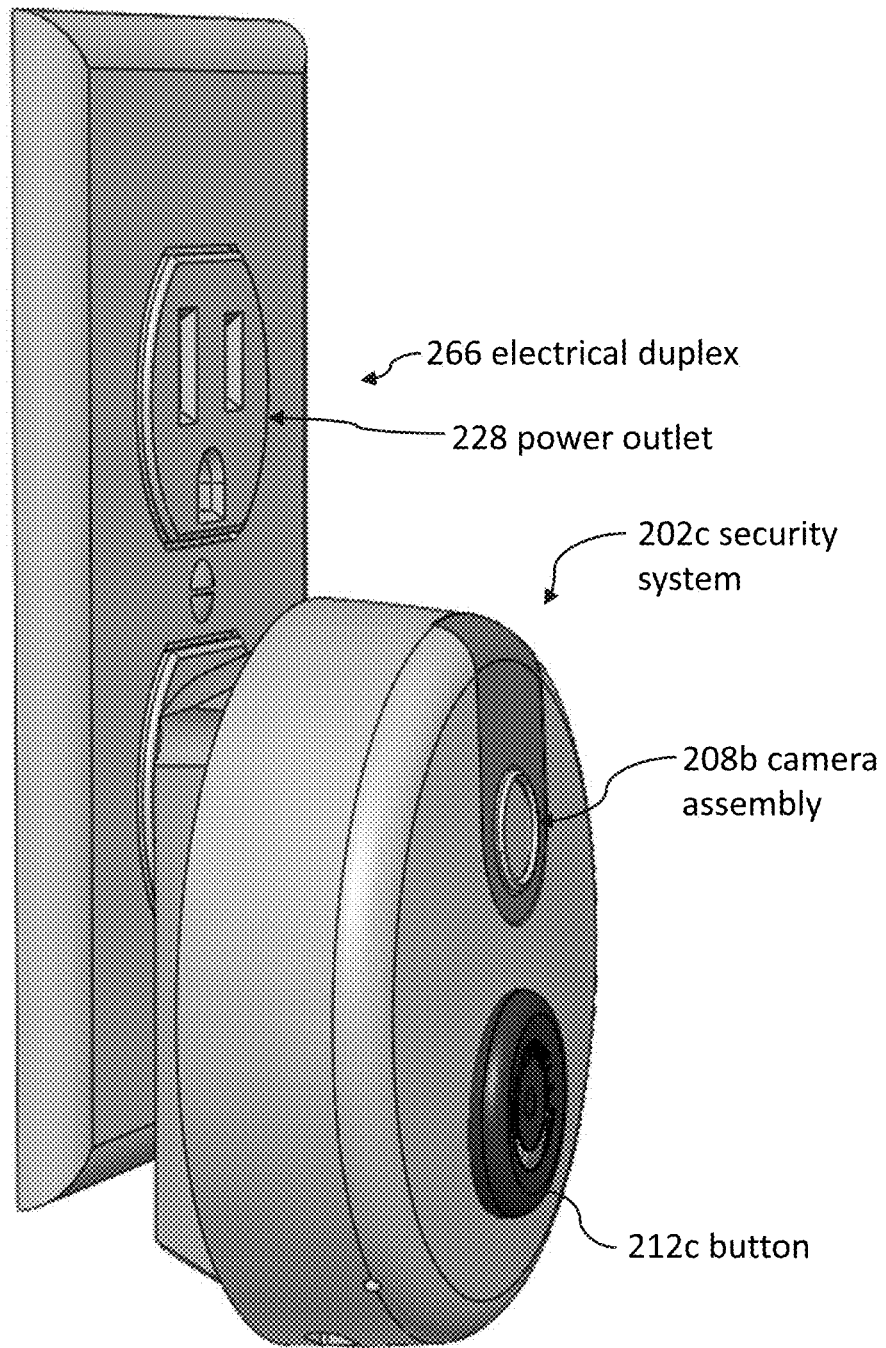
FIG. 82 illustrates a side and front perspective view in which an outwardly facing portion is mounted to an inwardly facing portion while the inwardly facing portion is attached to the power outlet, according to some embodiments.

Referring now to FIG. 79, one portion of the security system 202 faces inward 282b and one portion of the security system 202 faces outward 280b. Inward and outward directions are shown by arrows in FIG. 79. Inward faces towards a wall (e.g., towards the power outlet). Outward faces away from the wall (e.g., away from the power outlet).

The security system 202b illustrated in FIGS. 79-82 is also configured to plug into a power outlet 228 (shown in FIG. 65). The camera assembly 208b can include a high-resolution, wide-viewing-angle lens. A long-range motion detector 218b can protrude through the outer housing 224b.

All of the embodiments described in the context of other security systems (e.g., security system 202) described herein and/or described in applications and/or patents incorporated by reference can be applied to the security systems 202, 202b, 202c, 202d, 202e shown in FIGS. 79-84 (and also in several other figures). Some features are not labeled in FIGS. 79-84 to increase the clarity of labeled features.

FIG. 1 illustrates a remote surveillance system 200 (e.g., the security system 202 and the computing device 204). The remote surveillance system 200 can communicate via a server 206 and/or via wireless communication 230. The security system 202 is configured to mount to a power outlet 228 on a wall of a building.

The entire contents of the following patent application are incorporated by reference herein: U.S. Nonprovisional patent application Ser. No. 14/623,741; filed Feb. 17, 2015; and entitled POWER OUTLET CAMERAS. FIGS. 79-84 illustrate various embodiments described in U.S. Nonprovisional patent application Ser. No. 14/623,741.

FIG. 64 of U.S. Nonprovisional patent application Ser. No. 14/623,741 illustrates a remote surveillance system 200b, which can include a security system 202b and a remotely located computing device 204. The computing device 204 can be located remotely such that the computing device 204 is not mechanically or electrically coupled to the security system 202b (but can sometimes be in wireless communication with the security system 202b). In some embodiments, the remote surveillance system 200b does not include a remotely located computing device 204.

Referring now to FIGS. 65 and 66 of U.S. Nonprovisional patent application Ser. No. 14/623,741, the remote surveillance system can include an outwardly facing portion 642 configured to face away from the power outlet 228 (shown in FIG. 61 of U.S. Nonprovisional patent application Ser. No. 14/623,741). The system can also include an inwardly facing portion 644 having a first electrical prong 274 and a second electrical prong 274 that protrude into the power outlet to mount the inwardly facing portion to the power outlet. (Inward can be a direction towards the wall of the building.) A camera assembly 208b can be coupled to the outwardly facing portion 642. The camera assembly 208b can have a camera that faces outward. (Outward can mean away from the wall.) The camera can face directly outward (i.e., perpendicularly to the wall) or the camera can face outward at an angle (e.g., at an angle relative to the direction that is perpendicular to the wall).

As used herein, "outward" means in a direction away from a wall (but not necessarily in a direction perpendicular to the wall). "Inward" means in a direction towards a wall (but not necessarily in a direction perpendicular to the wall). In some embodiments, the camera faces directly outward from the wall (in a direction that is perpendicular to the wall). In several embodiments, the camera includes a pivot to enable changing the orientation of the camera relative to the wall and relative to the outwardly facing portion.

Referring now to FIGS. 11 and 64 of U.S. Nonprovisional patent application Ser. No. 14/623,741, the remote surveillance system 200b can include a wireless transmitter (e.g., the communication module 504) coupled to at least one of the outwardly facing portion and the inwardly facing portion. The remote surveillance system 200b can also include a remotely located computing device 204 that is in wireless communication with the wireless transmitter such that the wireless transmitter is configured to send a first picture taken by the camera assembly 208b to the remotely located computing device 204. The first picture can be a still picture or a part of a video.

FIG. 63 of U.S. Nonprovisional patent application Ser. No. 14/623,741 illustrates an embodiment in which the outwardly facing portion is coupled to the inwardly facing portion such that the outwardly facing portion is located directly over the power outlet 228. Once the prongs 274 of the security system 202 are inserted into the power outlet 228, the power outlet 228 can mechanically support each portion of the security system 202 (e.g., the outwardly facing portion and the camera assembly 208). FIG. 62 of U.S. Nonprovisional patent application Ser. No. 14/623,741 illustrates a power outlet (which is hidden by the security system 202) holding up the security system 202.

Figure 68:
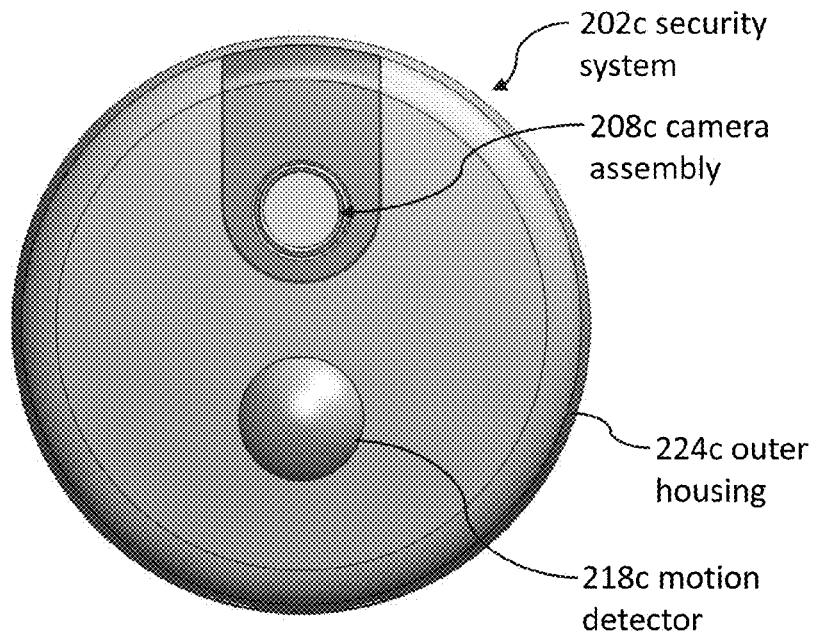
FIG. 68 illustrates a front view of a security system configured to mount to a power outlet, according to some embodiments.

Referring now to FIGS. 67 and 68 of U.S. Nonprovisional patent application Ser. No. 14/623,741, the security system 202b includes a separable connection 646 configured to couple the outwardly facing portion 642 to the inwardly facing portion 644 such that the power outlet can mechanically support the camera assembly 208b (shown in FIG. 64 of U.S. Nonprovisional patent application Ser. No. 14/623,741). This approach can provide a very convenient and minimally invasive way to mount the security system 202b.

Figure 70:
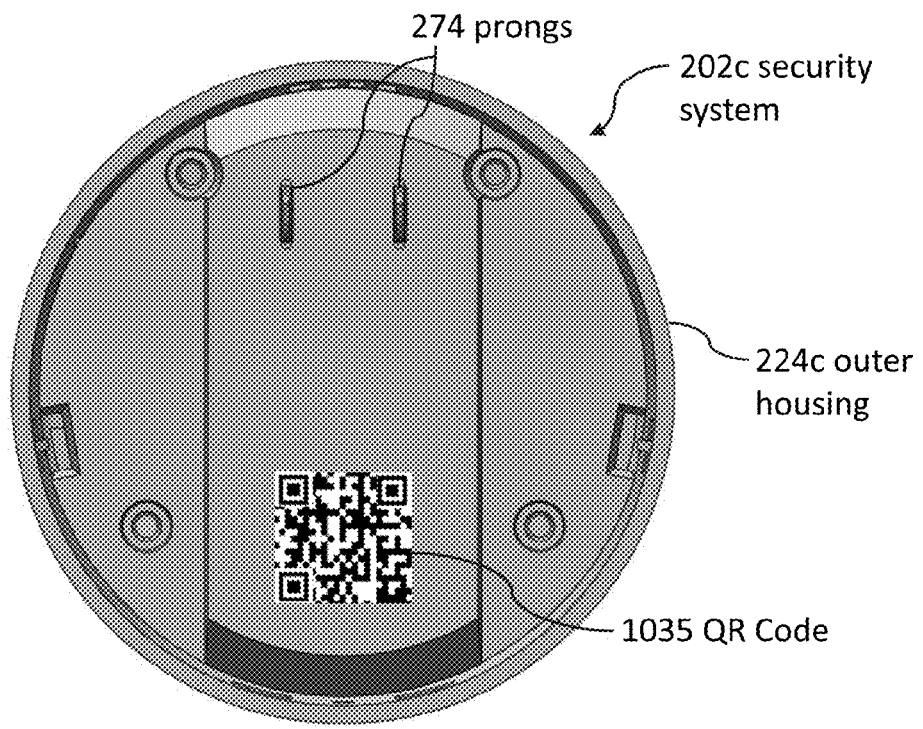
FIG. 70 illustrates a back view of the security system embodiment shown in FIG. 68, according to some embodiments.

The separable connection 646 can be configured to enable decoupling the outwardly facing portion 642 from the inwardly facing portion 644 to mount the outwardly facing portion 642 in a location away from the power outlet (as shown in FIG. 70 of U.S. Nonprovisional patent application Ser. No. 14/623,741). For example, the outwardly facing portion 642 can be mounted several feet higher on the wall than the inwardly facing portion.

In several embodiments, the remote surveillance system further comprises a first mounting bracket 648. The first mounting bracket 648 can be inserted into the outward facing portion 642 such that the first mounting bracket 648 is coupled to an inward section of the outwardly facing portion 642. The first mounting bracket 648 can be configured to mount the outwardly facing portion 642 to the wall in the location away from the power outlet 228 (as shown in FIG. 70 of U.S. Nonprovisional patent application Ser. No. 14/623,741). The remote surveillance system can also include a second mounting bracket 650 coupled to the inwardly facing portion 644. The second mounting bracket 650 can be configured to couple the outwardly facing portion 642 to the inwardly facing portion 644 (e.g., while the first bracket 648 is hidden inside the outward portion 642).

Figure 69:
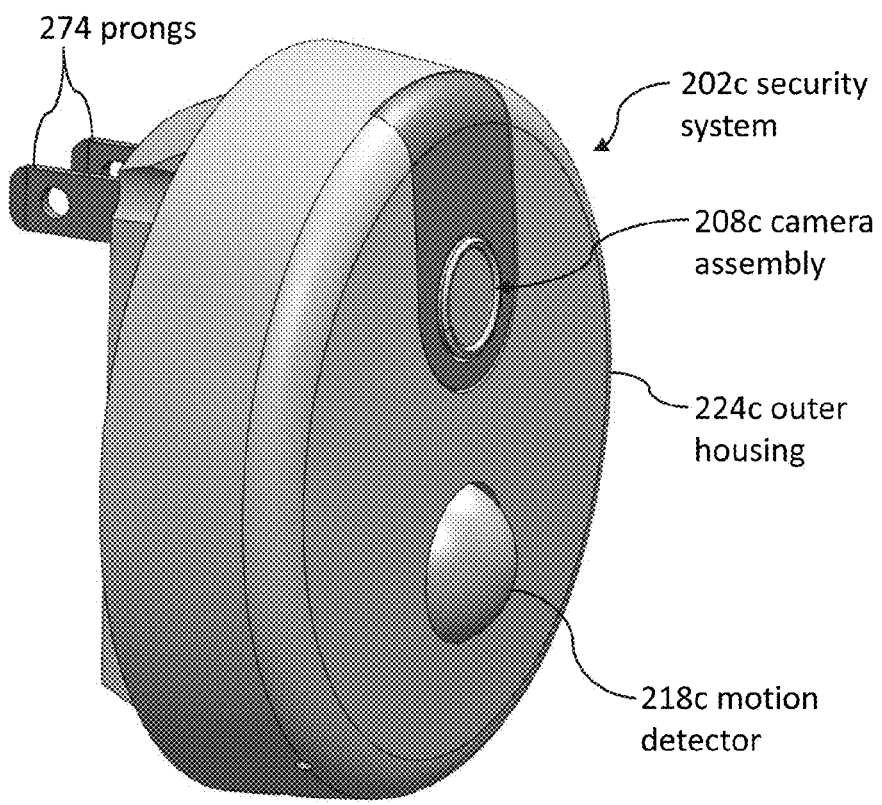
FIG. 69 illustrates a front, side, and top perspective view of the security system embodiment shown in FIG. 68, according to some embodiments.
Figure 71:
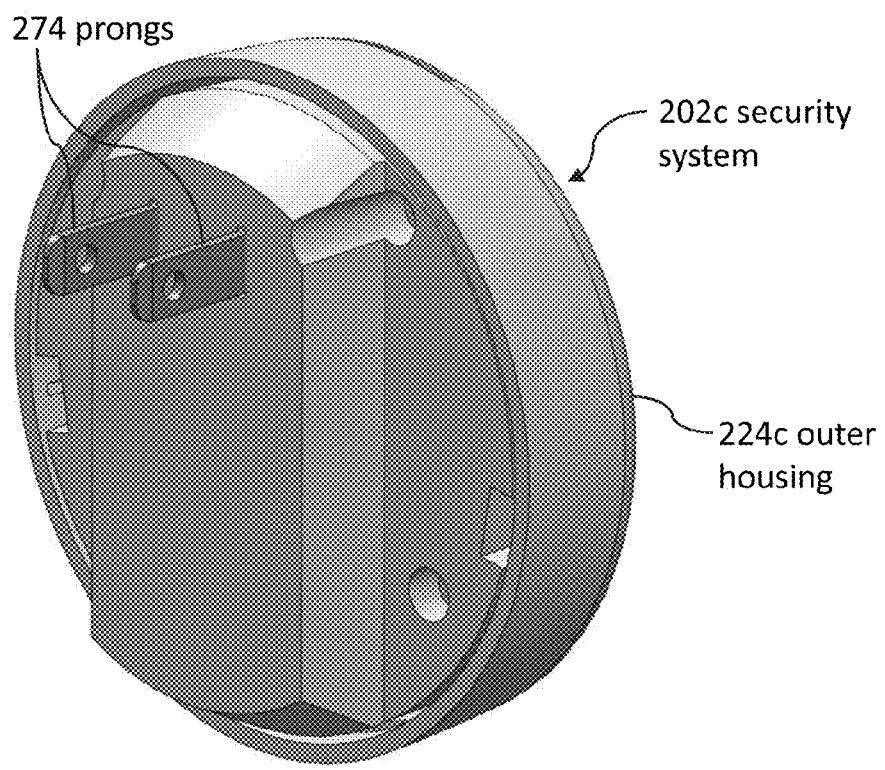
FIG. 71 illustrates a back, side, and top perspective view of the security system embodiment shown in FIG. 68, according to some embodiments.

As shown in FIGS. 68 and 69 of U.S. Nonprovisional patent application Ser. No. 14/623,741, the second mounting bracket 650 is coupled to an outward section of the inwardly facing portion 644. The first mounting bracket 648 can be located between the outwardly facing portion 642 and the inwardly facing portion 644 while the outwardly facing portion 642 is coupled to the inwardly facing portion 644 such that the power outlet 228 mechanically supports the camera assembly 208b (e.g., as shown in FIG. 71 of U.S. Nonprovisional patent application Ser. No. 14/623,741). As shown in FIGS. 67 and 71 of U.S. Nonprovisional patent application Ser. No. 14/623,741, the first mounting bracket 648 can be at least partially hidden between the outwardly facing portion 642 and the inwardly facing portion 644 while the outwardly facing portion 642 is located directly outward from the power outlet 228.

Referring now to FIGS. 67 and 69 of U.S. Nonprovisional patent application Ser. No. 14/623,741, the separable connection 646 comprises a first coupling member 652. The first mounting bracket 648 includes a second coupling member 654 that structurally matches the first coupling member 652, and in some cases, cosmetically matches the first coupling member. As used herein, "structurally matches" means that the structures are essentially the same (e.g., even if the structures have different cosmetic features such as colors, surface finishes, and ornamental features).

The separable connection 646 comprises at least one moveable protrusion 662, which can be a screw or other fastener. The first bracket 648 and the second bracket 650 include a hole 664. The protrusion 662 can move up and down to go into either hole 664 to secure the outward portion 642 to either the first bracket 648 (e.g., when the first bracket 648 is mounted on a wall) or the second bracket 650 (e.g., to rigidly couple the outward portion 642 to the inward portion 644).

Moving the protrusion 662 can decouple the outwardly facing portion 642 from the inwardly facing portion 644. In some embodiments, the protrusion 662 is a screw and the holes 664 are threaded holes. As shown in FIG. 69 of U.S. Nonprovisional patent application Ser. No. 14/623,741, the movable protrusion 662 is oriented radially away from a direction 668 that is perpendicular to the wall such that the movable protrusion moves radially to decouple the outwardly facing portion 642 from the inwardly facing portion 644 (e.g., even if the movable protrusion 662 is not oriented perpendicularly to the direction 668 that is perpendicular to the wall).

Referring now to FIG. 68 of U.S. Nonprovisional patent application Ser. No. 14/623,741, several embodiments include a flexible electrical cable 656 that electrically couples the outwardly facing portion 642 to the inwardly facing portion 644 to provide electricity when the outwardly facing portion 642 is located away from the power outlet 228 (shown in FIG. 70 of U.S. Nonprovisional patent application Ser. No. 14/623,741). The electrical cable 656 can be at least 18 inches long (e.g., to enable mounting the camera higher on the wall than the power outlet). The housing can include the outward portion 642 and the inward portion 644. A majority of the cable 656 can be wrapped between the outwardly facing portion 642 and the inwardly facing portion 644 (e.g., in a cable storage area 658, which can be a hollow volume inside the housing).

The cable 656 can be wrapped around a protrusion 660 that extends outward (e.g., between sections of the outward portion 642 and the inward portion 644). The cable 656 can be wrapped around the protrusion 660 in the cable storage area 658.

In the embodiment illustrated in FIG. 68 of U.S. Nonprovisional patent application Ser. No. 14/623,741, at least a portion of the camera assembly 208b is located directly outward from the power outlet 228, which is not shown, but the prongs 274 are located at least partially inside the power outlet 228. A motion sensor 218b can be coupled to the outwardly facing portion 642. The remote surveillance system can be configured to record a video in response to detecting motion (e.g., using the motion sensor 218b). The inwardly facing portion 644 can include a transformer 670 configured to reduce an input voltage from the power outlet 228. A wireless transmitter (e.g., the communication module 504 shown in FIG. 11 of U.S. Nonprovisional patent application Ser. No. 14/623,741) can be electrically coupled to the inwardly facing portion 644. The wireless transmitter can be configured to send a video taken using the camera assembly 208b to a remotely located computing device.

The remote surveillance system can include a printed circuit board 516 and a wireless transmitter 504 (shown in FIG. 11 of U.S. Nonprovisional patent application Ser. No. 14/623, 741) electrically coupled to the inwardly facing portion. The wireless transmitter 504 can be configured to send a video taken using the camera assembly 208b to a remotely located computing device. The printed circuit board 516 and the wireless transmitter 504 can be located within the housing 672 (labeled in FIG. 69 of U.S. Nonprovisional patent application Ser. No. 14/623,741).

FIG. 71 of U.S. Nonprovisional patent application Ser. No. 14/623,741 illustrates an embodiment with a button 212c that can be used to "ring" a chime and/or to initiate configuring at least one parameter of the security system 202c. The security system 202c is rigidly mounted to a power outlet that is partially hidden behind the security system 202c.

Any of the security system embodiments can be used with any of the methods described herein. Thus, structural elements described in the context of one embodiment can be applied to method embodiments described using other structural elements.

In some embodiments, a remote surveillance system comprises a remotely located computing device and a security system. The security system can comprise an outwardly facing portion having a camera assembly and an inwardly facing portion having a first electrical prong and a second electrical prong. Several methods include mounting the security system to a wall of a building by inserting the first electrical prong and the second electrical prong into a power outlet; using the camera assembly to take a first video while the outwardly facing portion is mechanically supported by the power outlet; and/or wirelessly sending the video to the remotely located computing device.

Several embodiments include decoupling the outwardly facing portion from the inwardly facing portion; attaching a mounting bracket to the wall; attaching the outwardly facing portion to the bracket while the inwardly facing portion is mechanically supported by the power outlet; and/or using the camera assembly to take a second video while the outwardly facing portion is mechanically supported by the bracket in a location away from the power outlet. Some methods include recording the first video in response to detecting a first motion, and recording the second video in response to detecting a second motion.

360-Degree Camera

Figure 83:
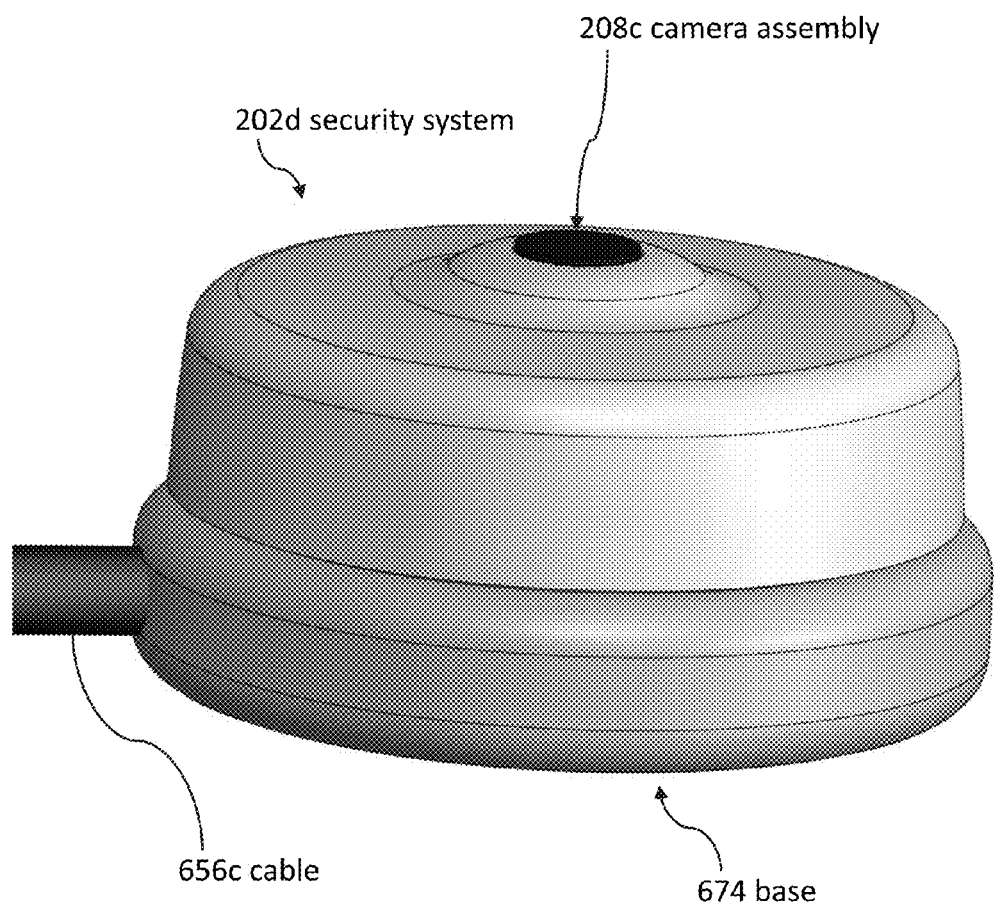
FIG. 83 illustrates a side and top perspective view of a security system that includes a 360-degree camera assembly, according to some embodiments.

FIG. 83 illustrates a security system 202d that includes a 360-degree camera assembly 208c (e.g., the camera 208c can see a complete panoramic view and/or can see a half-sphere). A cable 656c provides power from an electrical outlet to a base 674. The base 674 can charge the security system 202d. The security system 202d can be removed from the base 674 and relocated to a location that is remote relative to the base 674. The embodiment shown in FIG. 83 can be combined with any of the embodiments described herein and/or incorporated by reference.

Tabletop Camera

Figure 84:
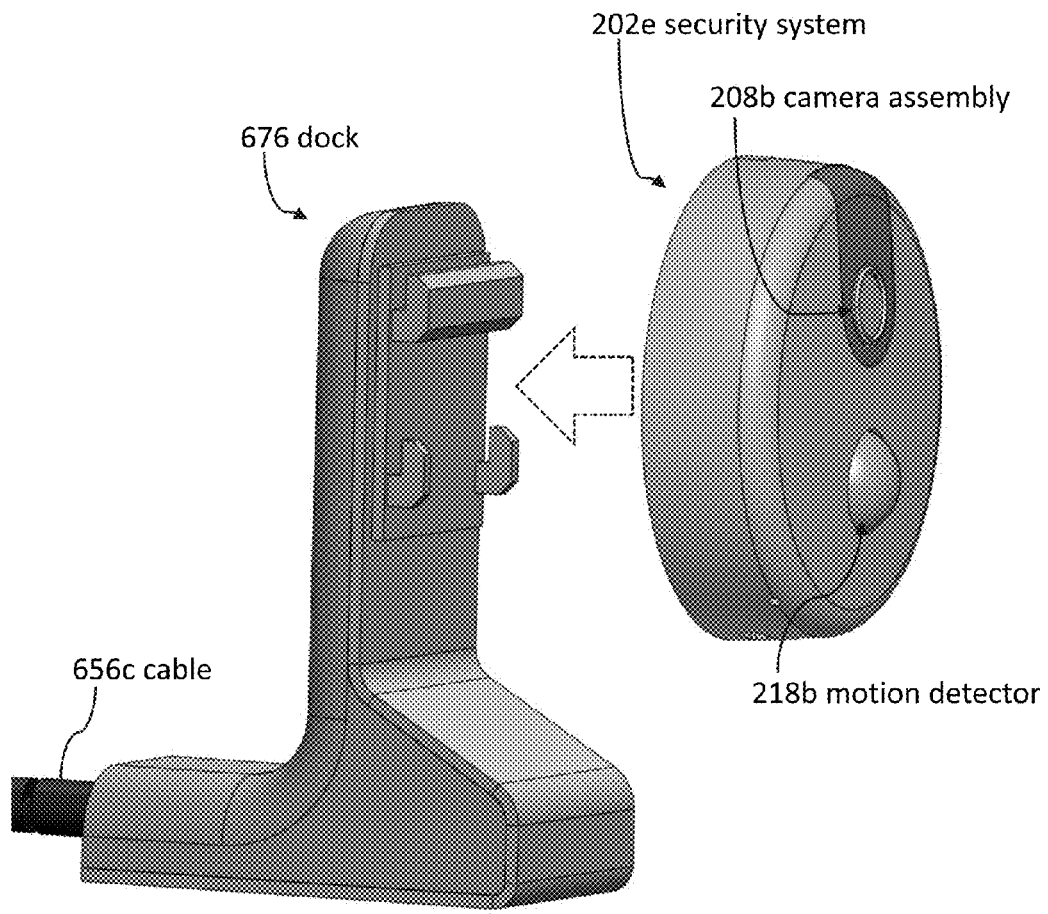
FIG. 84 illustrates a side and front perspective view of a security system and a dock configured to hold the security system, according to some embodiments.

FIG. 84 illustrates a security system 202e that can be coupled to a dock 676. The dock 676 can hold the security system 202e such that the camera assembly 208b can have a field of view that is perpendicular to the ground. A cable 656c can provide power to the dock 676, which can charge the security system 202e. The embodiment shown in FIG. 84 can be combined with any of the embodiments described herein and/or incorporated by reference.

Wired Home Automation Embodiments

Figure 76:
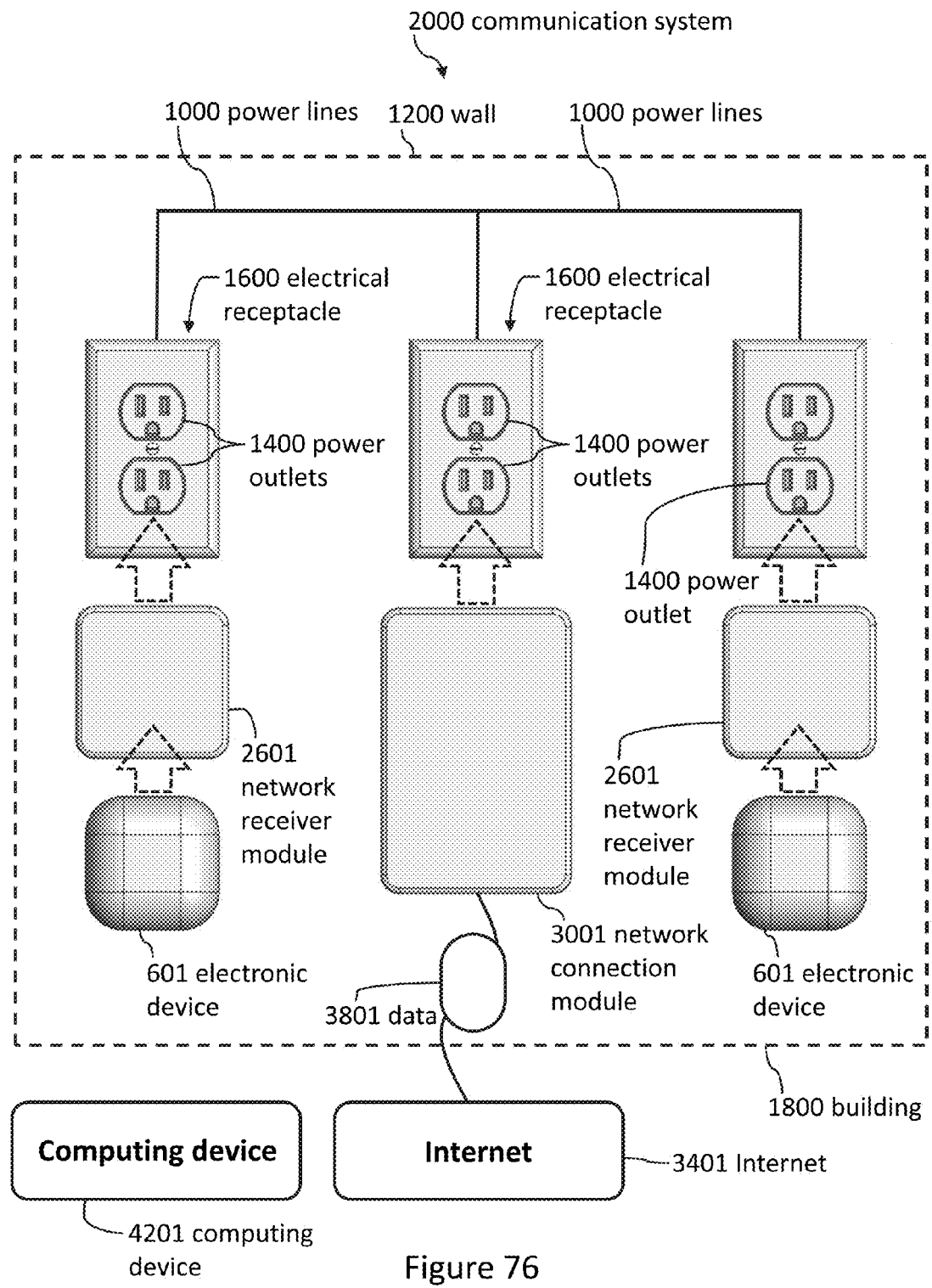
FIG. 76 illustrates a diagrammatic view of a system configured to communicate with electronic devices via electrical power lines, according to some embodiments.

FIG. 76 illustrates a diagrammatic view of a system 2000 configured to communicate with electronic devices 601 via electrical power lines 1000. The electrical power lines 1000 are configured to electrically couple power outlets 1401. Not all of the power outlets 1401 are labeled in the Figures to increase the clarity of other items. The entire contents of the following patent application are incorporated by reference herein: U.S. Provisional Patent Application No. 62/026,639; filed Jul. 19, 2014; and entitled WIRED HOME AUTOMATION METHODS AND SYSTEMS.

As used herein, power outlets 1401 refer to electrical connections that enable coupling an electronic device 601 to the power lines 1000 of a building 1800. Power outlets 1401 can take many forms. In some embodiments, a light socket 2001 (shown in FIG. 78) can be a power outlet 1401. In some embodiments, wires 2200 (shown in FIG. 77) protruding from a building 1800 (e.g., a home, an office, a warehouse) can enable a user to connect a doorbell to the power lines 1000 of the building 1800. Thus, the wires 2200 can be a power outlet 1401.

In some embodiments, a power outlet 1401 is part of an electrical receptacle 1600 partially embedded within a wall 1200 of a building 1800 such that an outer portion of the electrical receptacle 1600 protrudes outward from the wall. The outer portion of the electrical receptacle 1600 can be an electrical duplex; however some electrical receptacles 1600 have four power outlets 1401 or six power outlets 1401.

An electronic device 601 can be mechanically and electrically coupled to a network receiver module 2601. The network receiver module 2601 can be configured to send and receive data from a network connection module 3001 via electrical power lines 1000.

The network receiver modules 2601 and the network connection module 3001 can each be mechanically and electrically coupled to power outlets 1401. Each power outlet 1401 can be located in a different room of the building 1800 (e.g., a home). The network receiver modules 2601 can communicate with each other in a peer-to-peer manner while the network receiver modules 2601 are located in different rooms. In some embodiments, the network connection module 3001 acts as a smart hub and controls the electronic devices 601 by sending and/or receiving data (e.g., commands, information) via the power lines 1000. The power lines 1000 electrically couple the power outlets 1401 such that once the network receiver modules 2601 and the network connection module 3001 are coupled to the power outlets 1401, the network receiver modules 2601 and the network connection module 3001 can communicate through the power lines 1000. The power lines 1000 can include multiple wires (e.g., a positive wire, a negative wire, a ground wire).

The network connection module 3001 can be operably coupled to the Internet 3401 such that the network connection module 3001 is capable of connecting to the Internet 3401 to send and receive data 3801 via the Internet. The network connection module 3001 can also be configured to communicate with a computing device 4201, which can be located remotely from the network connection module 3001. In some embodiments, the computing device 4201 is located remotely from the building 1800 such that the network connection module 3001 uses wireless communication to receive data from the computing device 4201. The computing device 4201 can be used to receive data from elements (e.g., electronic devices 601) of the communication system 2000. The computing device 4201 can also be used to send commands (e.g., setting adjustment requests) wirelessly to the network connection module 3001, which can then send the commands to the electronic devices 601 via the network receiver modules 2601.

Although the network receiver modules 2601 are illustrated as being separate from the electronic devices 601 in FIG. 76, the network receiver modules 2601 can be integrated into the electronic devices 601 such that the network receiver modules 2601 are part of the electronic devices 601 (e.g., located within one plastic housing).

In some embodiments, the network receiver module 2601 and the network connection module 3001 are from TP-LINK Technologies Co., Ltd (e.g., the 300 Mbps Wi-Fi Range Extender AV500 Powerline Edition—Model TL-WPA4220KIT, which contains Models TL-WPA4220 and TL-PA4010).

Figure 77:
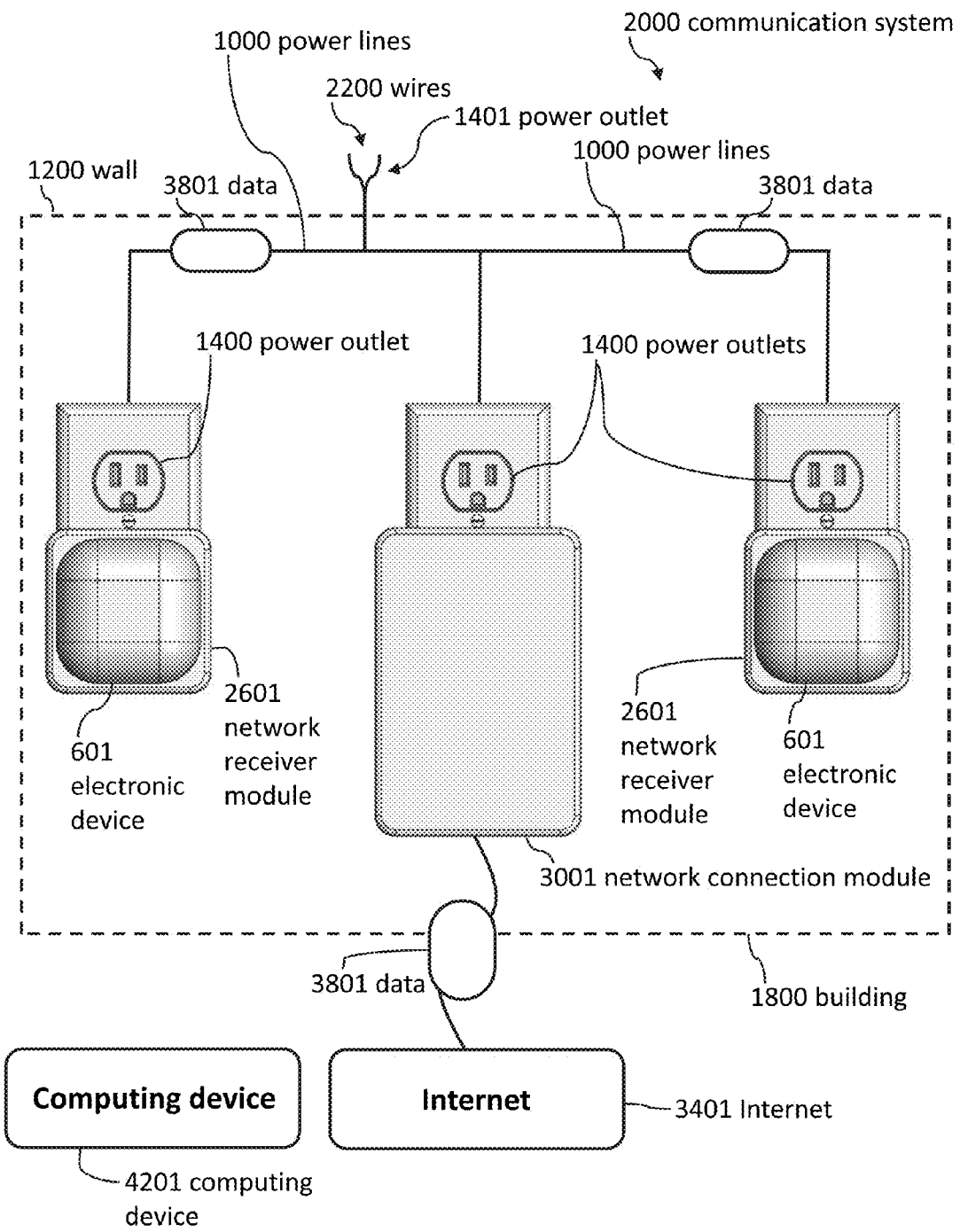
FIG. 77 illustrates a diagrammatic view of a network connection module and network receiver modules coupled to power outlets, according to some embodiments.

FIG. 77 illustrates a diagrammatic view of the network connection module 3001 and the network receiver modules 2601 coupled to power outlets 1401. In the embodiment illustrated in FIG. 77, the network receiver modules 2601 are configured to communicate with each other (e.g., to receive data from each other and/or to send commands to each other). The network connection module 3001 is also configured to communicate with the network receiver modules 2601, which are coupled to and/or integrated into electronic devices 601. The communication system 2000 is configured to send data 3801 via the electrical power lines 1000.

Figure 78:
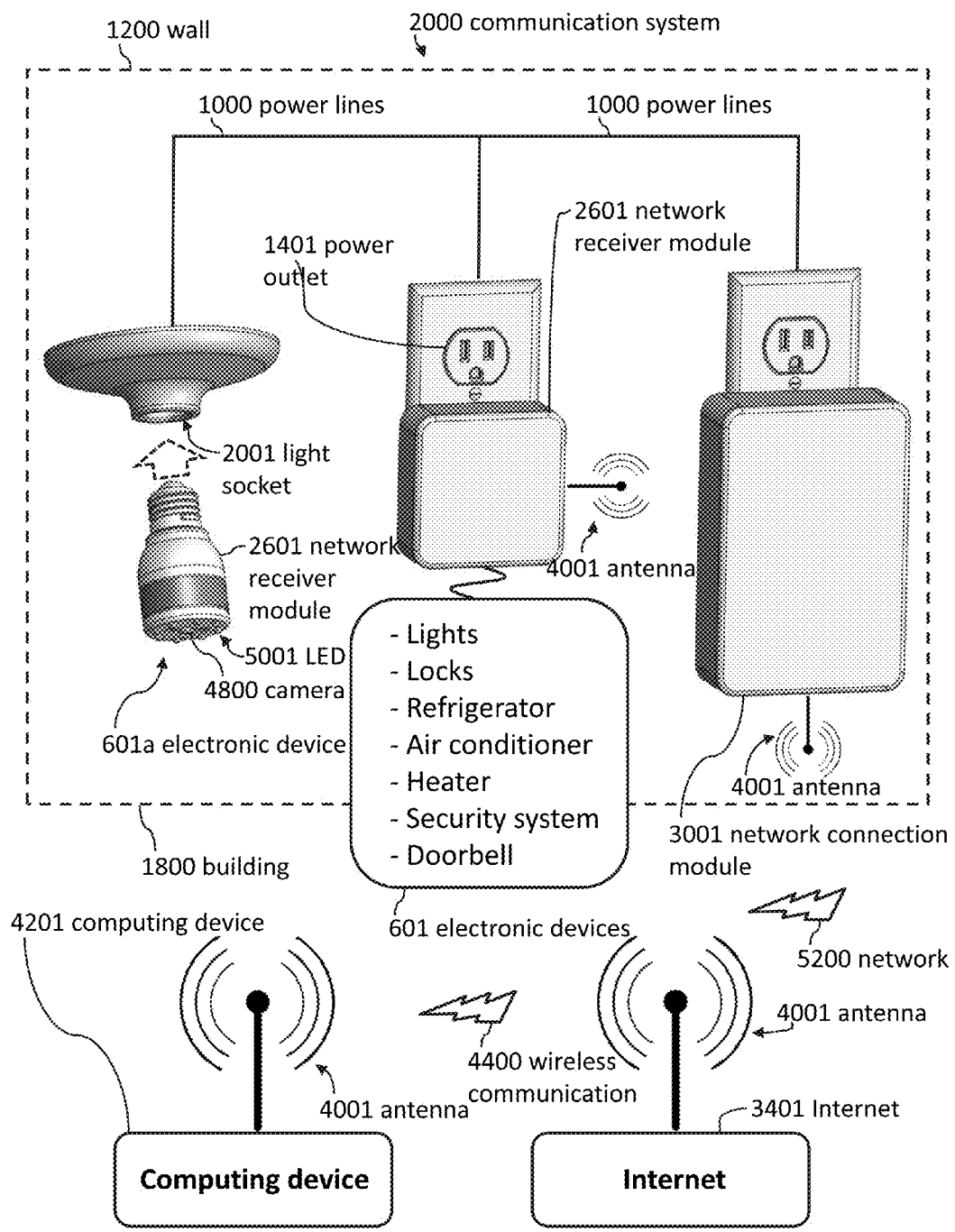
FIG. 78 illustrates a diagrammatic view of a system with wireless communication in addition to communication via electrical power lines, according to some embodiments.

FIG. 78 illustrates a diagrammatic view of the communication system 2000 with wireless communication 4400 in addition to communication via the electrical power lines 1000. Each network receiver module 2601 can act as a wireless network range extender. The network connection module 3001 can be connected to the Internet 3401 via wires or wirelessly (e.g., via an antenna 4001). Network receiver modules 2601 can be connected to the Internet via the electrical power lines 1000 and the network connection module 3001. Each network receiver module 2601 can include an antenna 4001 that is configured to wirelessly transmit the network's connection to the Internet 3401.

Many different types of electronic devices 601 can be coupled to the network receiver module 2601 to enable a remote computing device 4201 to communicate with and/or control the electronic devices 601. Embodiments use many different types of electronic devices 601. Some embodiments of electronic devices 601 include lights, locks, refrigerators, ovens, microwaves, toasters, coffeemakers, dishwashers, temperature control systems, air conditioners, heaters, fans, security systems, motion sensors, window sensors, door sensors, window openers, window blind openers, window shades, retractable awnings, doorbells, and cameras. Electronic devices 601 can be located inside of the building 1800, outside of the building 1800, coupled to an exterior surface of the building 1800, and/or coupled to an interior surface of the building 1800.

FIG. 78 illustrates a light socket 2001, which can be a type of power outlet 1401. The light socket 2001 is electrically coupled to the power lines 1000 to enable the light socket 2001 to send and/or receive data from the network connection module 3001 and/or another network receiver module 2601. An electronic device 601a can screw into the light socket 2001 to electrically couple the electronic device 601a to the light socket 2001. Once electrically coupled, the electronic device 601a can communicate with the network connection module 3001 and/or another network receiver module 2601. A network receiver module 2601 can be integrated inside of the electronic device 601a. The electronic device 601a can include a camera 4800 to record videos for subsequent transmission via the power lines 1000 to the network connection module 3001. The electronic device 601a can also include Light Emitting Diodes (LEDs) 5001 to illuminate an area in the field of view of the camera 4800.

Referring now to FIGS. 76-78, electrical power lines 1000 can be embedded within walls 1200 of buildings 1800 to supply electricity to power outlets 1401. Users can plug various devices into power outlets 1401 to enable the devices to receive electricity from the electrical power lines 1000. The electrical power lines 1000 can be electrically coupled to a power supply such as a public utility system. Although electrical power lines 1000 are often designed primarily to supply electricity, electrical power lines can also be configured to communicate data 3801 between electronic devices 601 (shown in FIG. 77). In some cases, communication systems 2000 can provide Internet 3401 access via electrical power lines 1000. Electrical power lines 1000 can include cables, wires, and conductors. Electrical power lines 1000 can be made of a conductive metal.

Several methods for communicating with an electronic device 601 comprise obtaining a first network receiver module 2601. The first network receiver module 2601 can be configured to communicate with a network connection module 3001 through electrical power lines 1000. The electrical power lines 1000 can be configured to couple a first power outlet 1401 and a second power outlet 1401. Electrical power lines 1000 can couple many different power outlets 1401 in a building 1800 with a power supply. The network connection module 3001 can be coupled to the first power outlet 1401 to electrically couple the network connection module 3001 to the electrical power lines 1000. The network connection module 3001 can be configured to connect to the Internet 3401 (e.g., to enable electronic devices 601 that are plugged into power outlets 1401 to communicate with remote computing devices 4201 such as computers, tablets, and smartphones).

Some embodiments include coupling the first network receiver module 2601 to the second power outlet 1401 to electrically couple the first network receiver module 2601 to the electrical power lines 1000. Methods can include communicating between the network connection module 3001 and the first network receiver module 2601 via the electrical power lines 1000. Several methods include coupling the first network receiver module 2601 to a first electronic device 601 such that the first electronic device 601 is configured to receive a first data 3801 via the electrical power lines 1000 (shown in FIG. 77).

Referring now to FIG. 78, in several embodiments, the first electronic device 601a comprises a camera 4800. Methods can include recording a video using the camera 4800 and sending the video from the first electronic device 601a to the first network receiver module 2601. Then, methods can include sending the video from the first network receiver module 2601 to the network connection module 3001 via the electrical power lines 1000. Then, some methods comprise sending the video from the network connection module 3001 to at least one of the Internet 3401 and a telecommunication network 5200. Many different types of telecommunications networks 5200 can be used, including cellular networks to enable communicating wirelessly with smartphones.

Power outlet standards can vary from country to country. Many different types of power outlets 1401 can be used. Power outlets 1401 can enable connecting to an alternating current (AC) power supply in a building 1800. In some embodiments, the second power outlet 1401 comprises a light socket 2001, and the method further comprises screwing the first electronic device 601a into the light socket 2001 such that the first electronic device 601a is capable of receiving electricity and the first data from the light socket 2001.

Referring now to FIGS. 77 and 78, in several embodiments, the second power outlet 1401 comprises a first wire 2200 and a second wire 2200 that protrude outside of a building 1800 (e.g., such as doorbell wires). Methods can further comprise electrically coupling the first electronic device 601 to the first wire 2200 and the second wire 2200 such that the first electronic device 601 is capable of receiving electricity and data from the first wire 2200 and the second wire 2200. The first electronic device 601 can comprise a doorbell configured to detect a visitor.

Methods can include using the doorbell to detect a visitor. Several methods include sending a digital notification regarding the visitor from the first network receiver module 2601 to the network connection module 3001 via the electrical power lines 1000. Some methods include sending the digital notification regarding the visitor from the network connection module 3001 to a remote computing device 4201 via the Internet 3401. The remote computing device 4201 can be any type of computer or phone (e.g., a laptop, a tablet, a smartphone).

Several embodiments include more than one network receiver 2601. The network receivers 2601 can communicate with each other (e.g., in a peer to peer format). Data 3801 from one network receiver 2601 can influence the behavior of an electronic device 601 coupled to another network receiver 2601. For example, if a first electronic device 601 detects that a door is unlocked, a second electronic device 601 can turn on a light and initiate temperature modification. Data 3801 can be transmitted between network receivers modules 2601 via the electrical power lines 1000.

In some embodiments, the network connection module 3001 acts as a smart hub to coordinate and/or control the behavior of multiple electronic devices 601 that are coupled to network receiver modules 2601. Thus, a smart hub can control multiple electronic devices 601 that communicate with the smart hub via electrical power lines 1000.

In some embodiments, simply plugging a network receiver module 2601 into a power outlet 1401 is sufficient to enable a network connection module 3001 to communicate with the network receiver module 2601 via the electrical power lines 1000. This "plug and play" system 2000 can reduce installation difficulty and time.

In several embodiments, each network receiver module 2601 can act as a repeater to strengthen the building's 1800 network (e.g., by increasing the effective range of the network).

Encryption can be used to increase the security of the communication system 2000. Encryption can be particularly helpful if the building 1800 is used by unrelated parties (such as is typically the case in an apartment building or office building).

Some methods include obtaining a second network receiver module 2601. The second network receiver module 2601 can be configured to communicate with the network connection module 3001 through the electrical power lines 1000. Methods can include coupling the second network receiver module 2601 to a third power outlet 1401 to electrically couple the second network receiver module 2601 to the electrical power lines 1000. Methods can include coupling the second network receiver module 2601 to a second electronic device 601 such that the second electronic device 601 is capable of communicating with the network connection module 3001.

Many different types of electronic devices 601 can be used with the methods described herein. The first electronic device 601 and/or the second electronic device 601 can comprise at least one of a light, a doorbell, a refrigerator, a door lock, a sprinkler, an air conditioner, and a heater.

Referring now to FIG. 77, some methods include sending the first data 3801 through the electrical power lines 1000 from the first electronic device 601 to the network connection module 3001. Methods can include sending a second data 3801 through the electrical power lines 1000 from the second electronic device 601 to the network connection module 3001.

Several methods include updating a first setting of the first electronic device 601 based on the second data 3801 from the second electrical device. Settings can include the brightness of a light, a notification setting of a doorbell, a temperature of a refrigerator, a lock/unlock status of a lock, the water output of a sprinkler, a watering time of a sprinkler, the cooling behavior of an air conditioner, and/or the heating behavior of a heater.

Some embodiments include using the network connection module 3001 to send a first signal through the electrical power lines 1000. Methods can also include using the first network receiver module 2601 to check for the first signal from the network connection module 3001 in response to at least one of the first network receiver module 2601 and the first electronic device 601 detecting electricity from the electrical power lines 1000. Several embodiments include establishing communication between the network connection module 3001 and the first network receiver module 2601 in response to the first network receiver module 2601 detecting the first signal. Some embodiments include using the first network receiver module 2601 to emit a second signal through the electrical power lines 1000.

In some embodiments, methods include using the second network receiver module 2601 to detect the second signal, and then automatically establishing communication between the second network receiver module 2601 and the first network receiver module 2601 through the electrical power lines 1000 in response to the second network receiver module 2601 detecting the second signal. Several embodiments include transmitting a second data 3801 between the first network receiver module 2601 and the second network receiver module 2601 and then altering a behavior of at least one of the first network receiver module 2601, the second network receiver module 2601, the first electronic device 601, and the second electronic device 601 in response to the second data.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A doorbell system comprising:
   a doorbell;
   a button coupled to the doorbell;
   an atmospheric pressure sensor coupled to the doorbell;
   a weather detection system coupled to the doorbell, the weather detection system comprising at least one of a camera and a microphone; and
   a wireless weather communication emitted by the doorbell in response to at least one of the pressure sensor, camera, and microphone detecting a weather event.

2. The doorbell system of claim 1, further comprising a printed circuit board electrically coupled to the pressure sensor and located at least partially inside the doorbell.

3. The doorbell system of claim 2, further comprising a communication device communicatively coupled to the doorbell.

4. The doorbell system of claim 3, wherein the communication device comprises a home automation hub, the doorbell system further comprising a weather notification received by the home automation hub in response to the wireless weather communication being emitted by the doorbell.

5. The doorbell system of claim 3, wherein the communication device comprises a remote computing device, the doorbell system further comprising a weather indication displayed by the remote computing device in response to the wireless weather communication being emitted by the doorbell.

6. The doorbell system of claim 2, further comprising a memory coupled to the printed circuit board, the memory comprising weather data that is stored for at least a predetermined time.

7. The doorbell system of claim 2, further comprising at least one of a weather video captured by the camera and a weather sound captured by the microphone.

8. The doorbell system of claim 1, further comprising a meteorology sensor coupled to the doorbell, the meteorology sensor comprising at least one of a humidity sensor, a precipitation sensor, a temperature sensor, a thunder and lightning sensor, a wind speed sensor, and a wind direction sensor.

9. A method of using a doorbell system to detect a weather event, wherein the doorbell system comprises a weather sensor coupled to a doorbell, the method comprising:
  determining, by the doorbell system, an occurrence of a weather event;
  transmitting, by the doorbell system, weather data to a remote server that is remotely located with respect to the doorbell system in response to the doorbell system determining the occurrence of the weather event, wherein the weather data is associated with the weather event; and
  initiating a communication session with a remote computing device that is communicatively coupled to the doorbell, wherein the communication session comprises an indication of the weather event.

10. The method of claim 9, wherein the doorbell system comprises a weather detection system coupled to the doorbell, the weather detection system comprising at least one of a camera and a microphone, the method further comprising:
  recording, by the weather detection system, at least one of audio and video associated with the weather event in response to the doorbell system determining the occurrence of the weather event,
  wherein transmitting, by the doorbell system, the weather data to the remote server comprises transmitting, by the doorbell system, at least one of the audio and the video to the remote server in response to the weather detection system recording at least one of the audio and the video.

11. The method of claim 9, wherein the weather data is used by the remote server to confirm the occurrence of the weather event.

12. The method of claim 9, further comprising activating an alert communication system of the doorbell in response to determining the occurrence of the weather event.

13. A method of using a doorbell system to receive an indication of a weather event, wherein the doorbell system comprises a doorbell coupled to a building, the method comprising:
  receiving, by the doorbell system, weather data from a third party source communicatively coupled to the doorbell system and remotely located with respect to the building; and
  activating an alert communication system of the doorbell in response to receiving the weather data from the third party source.

14. The method of claim 13, wherein the alert communication system comprises a speaker coupled to the doorbell, and wherein activating the alert communication system comprises emitting, from the speaker, an audible notification of the indication of the weather event.

15. The method of claim 14, wherein the alert communication system comprises a light coupled to the doorbell, and wherein activating the alert communication system comprises illuminating the light.

16. The method of claim 13, wherein the alert communication system comprises a communication device communicatively coupled to the doorbell and located within the building, wherein activating the alert communication system comprises at least one of illuminating a light of the communication device and emitting an audible notification of the weather event from the communication device.

17. A method of using a doorbell system to receive an indication of a weather event, wherein the doorbell system comprises a doorbell coupled to a building, the method comprising:
  receiving, by the doorbell system, weather data from a third party source communicatively coupled to the doorbell system and remotely located with respect to the building; and
  transmitting, by the doorbell system, a first indication of the weather data to a communication device that is communicatively coupled to the doorbell.

18. The method of claim 17, wherein the communication device comprises a home automation hub located within the building, the method further comprising transmitting a second indication of the weather data to a peripheral device that is communicatively coupled to the home automation hub in response to the doorbell system transmitting the first indication of the weather data to the communication device.

19. The method of claim 17, further comprising emitting, by the communication device, at least one of an audible alert and a visual alert.

20. The method of claim 17, wherein transmitting, by the doorbell system, the first indication of the weather data to the communication device comprises initiating a communication session with a remote computing device that is communicatively coupled to the doorbell, wherein the communication session comprises an indication of the weather event.

* * * * *